United States Patent
Scheucher

(10) Patent No.: US 8,710,795 B2
(45) Date of Patent: Apr. 29, 2014

(54) REFUELABLE BATTERY-POWERED ELECTRIC VEHICLE

(76) Inventor: Karl F. Scheucher, Waite Hill, OH (US)

( * ) Notice: Subject to any disclaimer, the term of this patent is extended or adjusted under 35 U.S.C. 154(b) by 551 days.

(21) Appl. No.: 12/814,486

(22) Filed: Jun. 14, 2010

(65) Prior Publication Data

US 2010/0250043 A1 Sep. 30, 2010

Related U.S. Application Data

(60) Division of application No. 11/851,504, filed on Sep. 7, 2007, now Pat. No. 7,948,207, which is a continuation-in-part of application No. 11/672,853, filed on Feb. 8, 2007, now Pat. No. 8,026,698, and a continuation-in-part of application No. 11/672,957, filed on Feb. 8, 2007, and a continuation-in-part of application No. 11/673,551, filed on Feb. 9, 2007, now Pat. No. 7,838,142.

(60) Provisional application No. 60/771,771, filed on Feb. 9, 2006, provisional application No. 60/781,959, filed on Mar. 12, 2006, provisional application No. 60/911,564, filed on Apr. 13, 2007.

(51) Int. Cl.
*H02J 7/14* (2006.01)

(52) U.S. Cl.
USPC ............ 320/104; 320/125; 320/134; 903/907

(58) Field of Classification Search
USPC .......... 320/104, 125, 132, 134, 163; 903/903, 903/907
See application file for complete search history.

(56) References Cited

U.S. PATENT DOCUMENTS

| | | | |
|---|---|---|---|
| 3,178,669 A | 4/1965 | Roberts |
| 3,391,374 A | 7/1968 | Schleicher |
| 3,543,043 A | 11/1970 | Dunn |
| 4,193,660 A | 3/1980 | Jaconette |
| D276,495 S | 11/1984 | Sylvia |

(Continued)

FOREIGN PATENT DOCUMENTS

| | | |
|---|---|---|
| DE | 2558456 A | 6/1977 |
| EP | 662725 A1 | 12/1995 |

(Continued)

OTHER PUBLICATIONS

Scheucher, Karl, "Effective Weapons in the War Against Dead Zones" Public Safety Communications, Sep. 2009, pp. 47-48, vol. 75, No. 9, Elsevier Public Safety, San Diego, CA, USA.

(Continued)

*Primary Examiner* — Edward Tso
*Assistant Examiner* — Aaron Piggush
(74) *Attorney, Agent, or Firm* — Woodling, Krost and Rust

(57) ABSTRACT

The electrical vehicle energy storage system permits the electric refueling of the electric vehicle just like an automobile would be refueled with gasoline at a gas station. Circuitry on board the vehicle accessible by the electric refueling station enables the determination of the energy content of the battery module or modules returned to the electric refueling station and the owner of the vehicle is given credit for the energy remaining in the battery module or modules which have been exchanged. Selective refueling may take place for given battery modules by removing them from the battery system and charging them at home, office or factory. A process for operating an electric vehicle is also disclosed and claimed.

11 Claims, 106 Drawing Sheets

(56) References Cited

U.S. PATENT DOCUMENTS

| | | | |
|---|---|---|---|
| 4,631,377 A | 12/1986 | Imazeki et al. | |
| 4,994,940 A | 2/1991 | Thouvenin et al. | |
| 5,187,423 A | 2/1993 | Marton | |
| 5,346,786 A | 9/1994 | Hodgetts | |
| 5,349,535 A | 9/1994 | Gupta | |
| 5,479,085 A | 12/1995 | Honda et al. | |
| 5,545,491 A | 8/1996 | Farley | |
| 5,563,493 A | 10/1996 | Matsuda et al. | |
| 5,656,915 A * | 8/1997 | Eaves | 320/118 |
| 5,694,019 A | 12/1997 | Uchida et al. | |
| 5,696,367 A | 12/1997 | Keith | |
| 5,711,648 A | 1/1998 | Hammerslag | |
| 5,773,962 A * | 6/1998 | Nor | 320/134 |
| 5,773,977 A | 6/1998 | Dougherty | |
| 5,792,573 A | 8/1998 | Pitzen et al. | |
| 5,806,948 A | 9/1998 | Rowan et al. | |
| 5,847,537 A | 12/1998 | Parmley | |
| 5,951,229 A | 9/1999 | Hammerslag | |
| 5,959,368 A | 9/1999 | Kubo et al. | |
| 5,998,963 A | 12/1999 | Aarseth | |
| 6,018,227 A | 1/2000 | Kumar et al. | |
| 6,085,836 A | 7/2000 | Burris et al. | |
| 6,087,806 A | 7/2000 | Fujoka | |
| 6,094,028 A | 7/2000 | Gu | |
| 6,140,798 A | 10/2000 | Krieger | |
| 6,150,823 A | 11/2000 | Takahashi et al. | |
| 6,154,006 A | 11/2000 | Hatanaka | |
| 6,157,162 A | 12/2000 | Hayashi | |
| 6,350,149 B1 | 2/2002 | Nakane | |
| 6,361,897 B1 | 3/2002 | Snyder | |
| 6,445,158 B1 | 9/2002 | Bertness et al. | |
| 6,465,986 B1 | 10/2002 | Haba | |
| 6,498,454 B1 | 12/2002 | Pinlam et al. | |
| 6,631,775 B1 | 10/2003 | Chaney | |
| D483,012 S | 12/2003 | Hsu | |
| 6,773,849 B2 | 8/2004 | Itoh et al. | |
| 6,788,025 B2 | 9/2004 | Bertness et al. | |
| 6,841,293 B1 | 1/2005 | Dreulle et al. | |
| 6,940,254 B2 | 9/2005 | Nagamine | |
| D511,744 S | 11/2005 | Hsu et al. | |
| D512,373 S | 12/2005 | Tsai et al. | |
| D514,060 S | 1/2006 | Wong et al. | |
| D516,020 S | 2/2006 | Wong et al. | |
| D524,728 S | 7/2006 | Watson | |
| 7,157,882 B2 | 1/2007 | Johnson et al. | |
| 7,157,883 B2 | 1/2007 | Johnson et al. | |
| 7,164,257 B2 | 1/2007 | Johnson et al. | |
| D537,408 S | 2/2007 | Aglassinger | |
| 7,176,654 B2 | 2/2007 | Meyer et al. | |
| 7,193,392 B2 | 3/2007 | King et al. | |
| D545,759 S | 7/2007 | Ino et al. | |
| 7,245,108 B2 | 7/2007 | Chertok et al. | |
| 7,253,585 B2 | 8/2007 | Johnson et al. | |
| 7,256,516 B2 | 8/2007 | Buchannan | |
| 7,262,580 B2 | 8/2007 | Meyer et al. | |
| D557,203 S | 12/2007 | Grunow et al. | |
| 7,313,469 B2 | 12/2007 | Wobben | |
| D559,175 S | 1/2008 | Houghton | |
| 7,321,219 B2 | 1/2008 | Meyer et al. | |
| 7,323,847 B2 | 1/2008 | Meyer et al. | |
| D562,228 S | 2/2008 | Okada et al. | |
| 7,327,122 B2 | 2/2008 | Kamenoff | |
| 7,342,381 B2 | 3/2008 | Johnson et al. | |
| D568,239 S | 5/2008 | Okada et al. | |
| 7,378,818 B2 | 5/2008 | Fowler et al. | |
| 7,492,124 B2 | 2/2009 | Johnson et al. | |
| 7,504,804 B2 | 3/2009 | Johnson et al. | |
| 7,508,167 B2 | 3/2009 | Meyer et al. | |
| 7,554,290 B2 | 6/2009 | Johnson et al. | |
| 7,557,534 B2 | 7/2009 | Uehlein-Proctor | |
| 7,557,535 B2 | 7/2009 | Johnson et al. | |
| 7,567,058 B2 | 7/2009 | Shimizu et al. | |
| D601,088 S | 9/2009 | Scheucher | |
| 7,589,500 B2 | 9/2009 | Johnson et al. | |
| 7,609,027 B2 | 10/2009 | Zick et al. | |
| 2001/0020838 A1 | 9/2001 | Malackowski | |
| 2002/0025471 A1 | 2/2002 | Velez et al. | |
| 2002/0096323 A1 | 7/2002 | Burris et al. | |
| 2002/0152476 A1 | 10/2002 | Anderson et al. | |
| 2003/0143455 A1 | 7/2003 | Partington et al. | |
| 2004/0160214 A1 | 8/2004 | Blair et al. | |
| 2004/0201362 A1 | 10/2004 | Borrego Bel et al. | |
| 2004/0257038 A1 | 12/2004 | Johnson et al. | |
| 2005/0007068 A1 | 1/2005 | Johnson et al. | |
| 2005/0017690 A1 | 1/2005 | Kamenoff | |
| 2005/0258801 A9 | 11/2005 | Johnson et al. | |
| 2006/0012342 A1 | 1/2006 | Kamenoff | |
| 2006/0028167 A1 | 2/2006 | Czubay et al. | |
| 2006/0091858 A1 | 5/2006 | Johnson et al. | |
| 2006/0127704 A1 * | 6/2006 | Raiser | 429/9 |
| 2006/0267547 A1 | 11/2006 | Godovich | |
| 2007/0103116 A1 | 5/2007 | Johnson et al. | |
| 2007/0103121 A1 | 5/2007 | Johnson et al. | |
| 2007/0108942 A1 | 5/2007 | Johnson et al. | |
| 2007/0182158 A1 | 8/2007 | Cerney et al. | |
| 2007/0184339 A1 | 8/2007 | Scheucher | |
| 2007/0188130 A1 | 8/2007 | Scheucher | |
| 2007/0188137 A1 | 8/2007 | Scheucher | |
| 2007/0273334 A1 | 11/2007 | Meyer et al. | |
| 2008/0008928 A1 | 1/2008 | Partin et al. | |
| 2008/0008933 A1 | 1/2008 | Lampe-Onnerud | |
| 2008/0012530 A1 | 1/2008 | Johnson et al. | |
| 2008/0018303 A1 | 1/2008 | Scheucher | |
| 2008/0053716 A1 | 3/2008 | Scheucher | |
| 2008/0079264 A1 | 4/2008 | Serdynski et al. | |
| 2008/0185993 A1 | 8/2008 | Johnson et al. | |
| 2008/0213652 A1 | 9/2008 | Scheucher | |
| 2008/0284370 A1 | 11/2008 | Manor et al. | |
| 2009/0029193 A1 | 1/2009 | Onnerud et al. | |
| 2009/0086043 A1 | 4/2009 | Scheucher | |
| 2009/0087729 A1 | 4/2009 | Johnson et al. | |
| 2009/0153101 A1 | 6/2009 | Meyer et al. | |
| 2009/0181296 A1 | 7/2009 | Lampe-Onnerud et al. | |
| 2009/0195216 A1 | 8/2009 | Johnson et al. | |
| 2009/0197152 A1 | 8/2009 | Johnson et al. | |

FOREIGN PATENT DOCUMENTS

| | | | |
|---|---|---|---|
| JP | 043544181 A | 12/1992 | |
| JP | 07059124 A | 3/1995 | |
| WO | 2007/092955 A2 | 8/2007 | |
| WO | 2007/092955 A3 | 6/2008 | |
| WO | 2009009176 A2 | 1/2009 | |
| WO | 2009009176 A3 | 3/2009 | |

OTHER PUBLICATIONS

Kiehne, H.A. "Battery Technology Handbook", 2003, p. 29, second edition, Marcel Dekker, New York, NY, USA.
U.S. Appl. No. 60/951,669, filed Jul. 24, 2007; Inventor Name: Toby Thomas.
U.S Appl. No. 60/909,873, filed Apr. 3, 2007; Inventor Name: David L. Hoelscher, 28 Pages.
U.S. Appl. No. 29/280,875, filed Jun. 8, 2007; Inventor Name: Karl Scheucher.
U.S. Appl. No. 60/952,240, filed Jul. 26, 2007; Inventor Name: Karl Scheucher.
U.S. Appl. No. 60/911,564, filed Apr. 13, 2007; Inventor Name: Karl Scheucher.
U.S. Appl. No. 29/266,852, filed Sep. 29, 2006; Inventor Name: Karl Scheucher.
U.S. Appl. No. 60/771,771, filed Feb. 9, 2006; Inventor Name: Karl Scheucher.
U.S. Appl. No. 60/781,959, filed Mar. 12, 2006; Inventor Name: Karl Scheucher.
U.S. Appl. No. 60/855,958, filed Nov. 1, 2006; Inventor Name: Karl Scheucher.
U.S. Appl. No. 60/857,079, filed Nov. 6, 2006; Inventor Name: Karl Scheucher.
Watson, R.L. et al; "Refueling Infrastructure for an All-Electric Car Fleet"; Transport and Road Research Laboratory; Research Report 66; 1986; 34 Pages; ISSN 0266-5247; HOBBS the Printers of Southampton, UK.

(56) References Cited

OTHER PUBLICATIONS

Meissner, E. et al. "Battery Monitoring and Electrical Energy Management Precondition for future vehicle electric power systems", Journal of Power Sources; 2003; pp. 79-98; 116; Elsevier Science B.V., Amsterdam 1043, NX.

Santhanagopalan, S. et al. "Online Estimation of the state of charge of a lithium ion cell". Journal of Power Sources; Jun. 19, 2006; pp. 1346-1355; 161; Elsevier Science B.V., Amsterdam 1043, NX.

Plett, G. L. "Extended Kalman filtering for battery management systems of LiPB-based HEV batter packs". Journal of Power Sources; Jun. 9, 2004; pp. 252-292; Elsevier Science B.V., Amsterdam 1043, NX.

U.S. Appl. No. 60/848,148, filed Sep. 29, 2006; Inventor Name: Karl Scheucher.

U.S. Appl. No. 12/697,289, filed Jan. 31, 2010, Inventor Name: Karl Scheucher.

U.S. Appl. No. 12/883,175, filed Sep. 15, 2010, Inventor Name: Karl F. Scheucher, High Voltage Battery Pack.

U.S. Appl. No. 60/771,771, Scheucher.
U.S. Appl. No. 60/781,959, Scheucher.
U.S. Appl. No. 60/911,564, Scheucher.
U.S. Appl. No. 60/855,958, Scheucher.
U.S. Appl. No. 60/857,079, Scheucher.
U.S. Appl. No. 29/266,852, Scheucher.
U.S. Appl. No. 60/952,240, Scheucher.
U.S. Appl. No. 29/280,875, Scheucher.

Motorola, Inc. WMC7300, 2006, pp. 1-2, Maitland, Florida 32794-8133, http://www.motorola.com/mesh/pdf/data_sheet_wmc7300.pdf.

Motorola, Inc. IAP 7300, 2006, pp. 1-2, www.motorola.com/mesh, Maitland, Florida 32794-8133, http://www.motorola.com/mesh/pdf/data_sheet_iap7300.pdf.

International Rectifier, IRF7240 HEXFET Power MOSFET, Mar. 6, 2001, IR World Headquarters: 233 Kansas St., El Segundo, California 90245, www.irf.com.

Kerchner, George A. "Battery Power Online" 2001, Webcom Communications Corp. http://www.batterypoweronline.com/july02LiIonRegulations.htm.

Acon, Inc., "MH Series, 100-300W" Oct. 21, 2004, pp. 1-17, www.aconinc.com.

CD Media Corporation, "150W DC to AC Power Inverter" 1999-2005, 1 page, http://www.hobbyracer.com/kv-150htm.

National Semiconductor, "LM2936-3.3 Ultra-Low Quiescent Current 3.3V Regulator", Jun. 2002, pp. 1-10, DS101324, National Semiconductor Corporation, www.national.com.

Texas Instruments, "MSP430X15X", SLAS368B, Mar. 2004, pp. 1-64, Texas Instruments, Dallas, Texas.

Nass, Richard, "Extending Battery Life" EE Times, Jan. 6, 1997, pp. 1-4, http://www.nexergy.com/extending-battery-life.htm.

Motorola, Inc. MWR7300, 2006, pp. 1-2, Motorola Maitland, Florida 32794-8133, http://www.motorola.com/mesh/pdf/data_sheet_mwr7300.pdf.

Motorola, Inc. VMM7300, 2006, pp. 1-2, Motorola Maitland, Florida 32794-8133, http://www.motorola.com/mesh/pdf/data_sheet_vmm7300.pdf.

McDowell Research, MRC-34, 2 Pages, Website: http://www.mcdowellresearch.com/datasheet.php?ID=MRC-34, Accessed May 8, 2007.

McDowell Research Briefcase Power System, 1 Page, Website: http://www.mcdowellresearch.com/subcategory.php?ID=21, Accessed May 8, 2007.

Automated Business Power, Uninterruptible Power Supply for Javelin CLU, 1 Page, Website: http://www.abpco.com/uninterruptible_power_suppy_javelin_clu.shtml, Accessed May 8, 2007.

Automated Business Power, Uninterruptible Power Transceiver Power Unit Applications, 2 Pages, Website: http://www.abpco.com/uninterrupitble_power_supply_transceiver_battery_eliminator_app.shtml, Accessed May 8, 2007.

Automated Business Power, Uninterruptible Power Supply Transceiver Battery Eliminator Applications, 2 Pages, Website: http://www.abpco.com/uninterruptible_power_supply_transceiver_battery_eliminator_app.shtml, Accessed May 8, 2007.

Diodes Incorporated, PDS1040CTL, Diodes Incorporated, pp. 1-3, www.diodes.com, Jan. 1, 2006.

Panasonic, Multilayer Chip NTC Thermistors, pp. 1-4, Sep. 24, 2002.

Powergate LLC, "Cosel 150 Watt Enclosed Single Output Switcher", pp. 1-2 Powergate LLC, 3000 Coronado Dr. Santa Clara, CA 95054, Jan. 12, 2006.

Transistor Devices, Inc. "2 KW Scaleable Li-Ion AC UPS", Website: http://www.tdipower.com/360/ups/ups_360.html, 1 Page, Accessed May 8, 2007.

Nexergy, "Portable Power Solutions: Designing the Optimal Portable Power System", pp. 1-8, http://www.nexergy.com/pdf/designing_optimal_ppwr.pdf, May 22, 2006.

\* cited by examiner

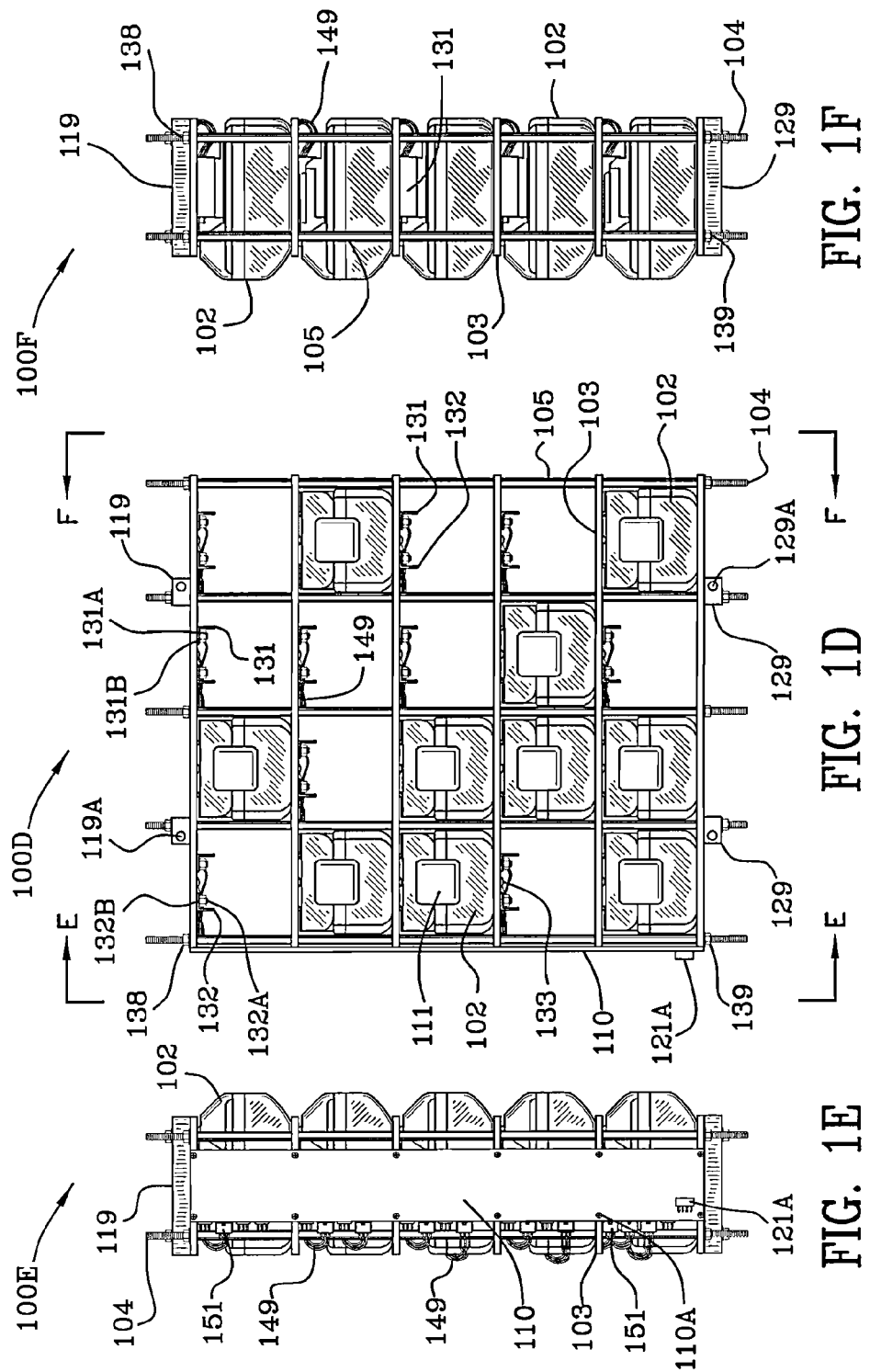

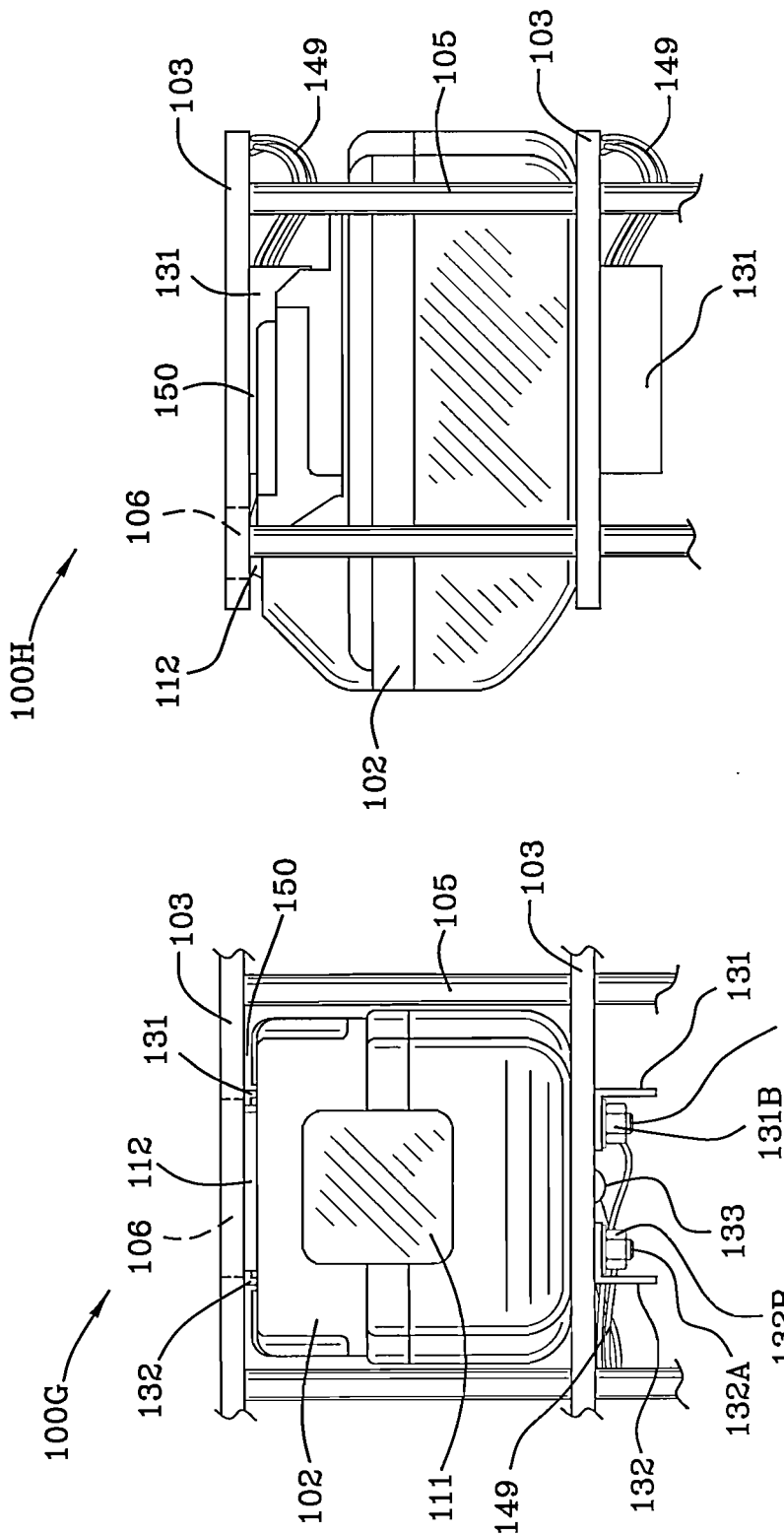

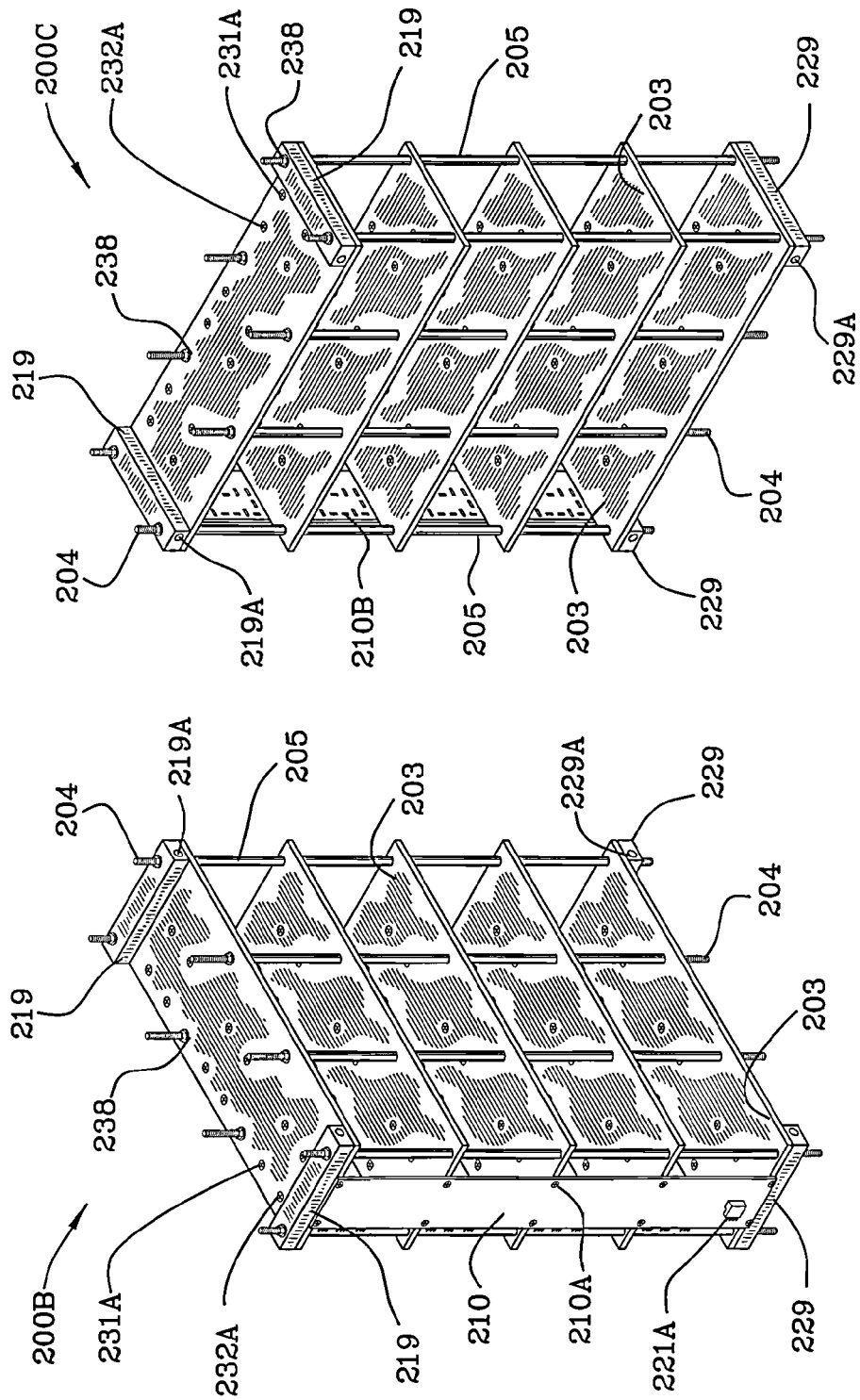

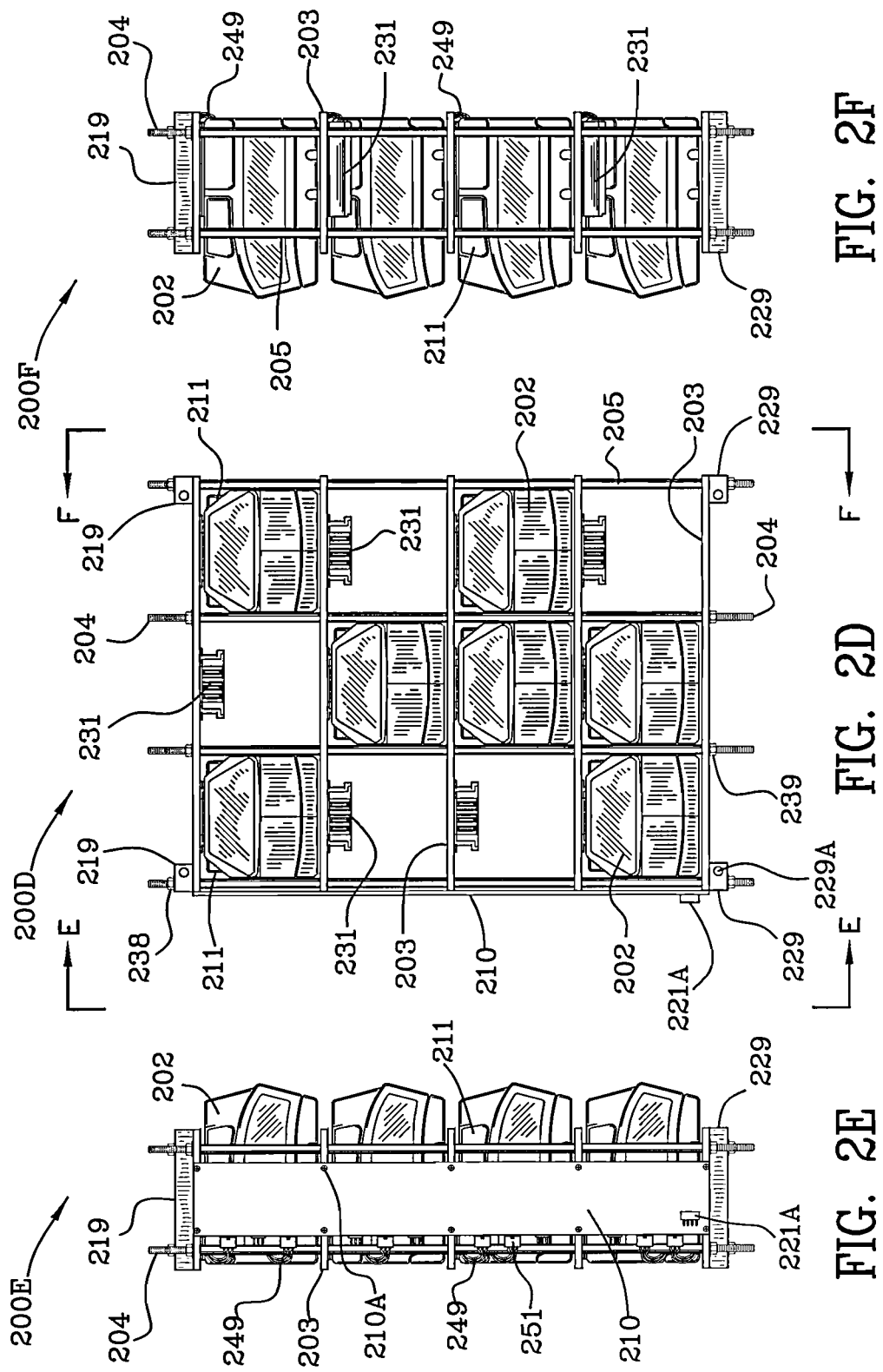

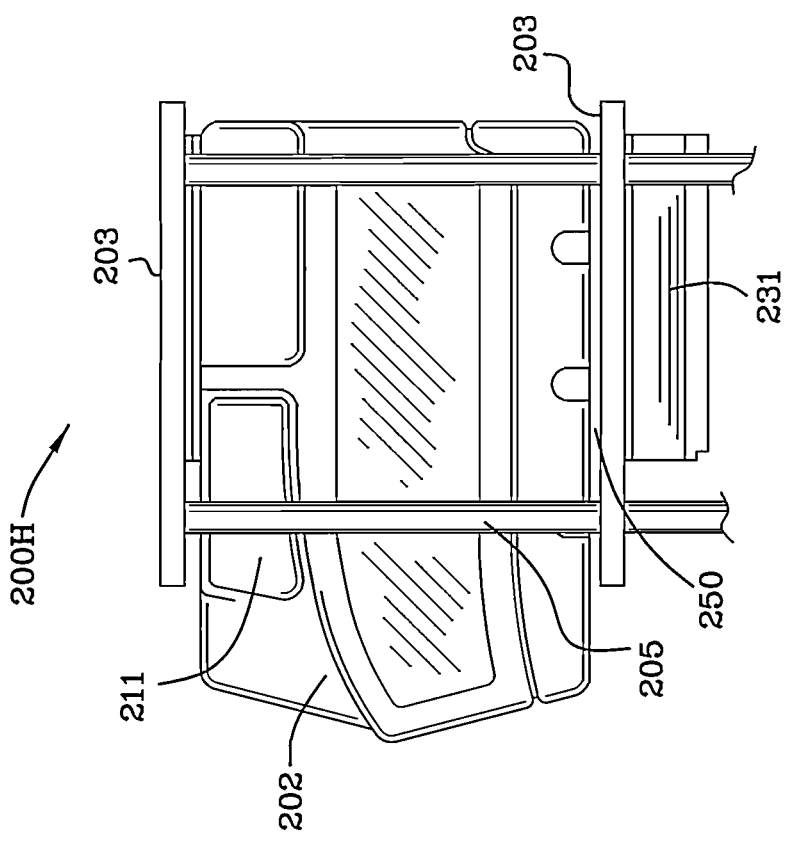
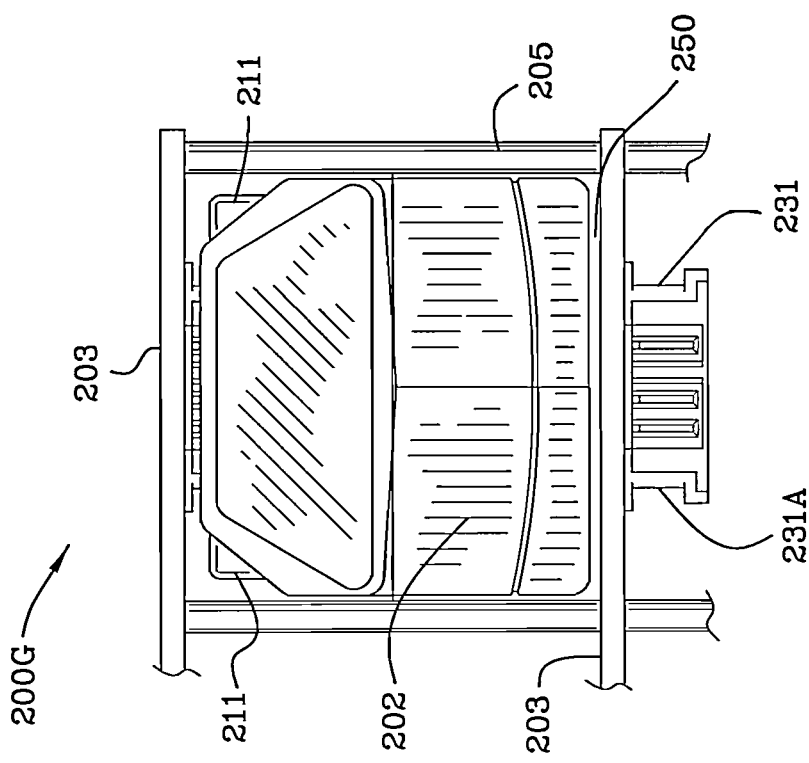

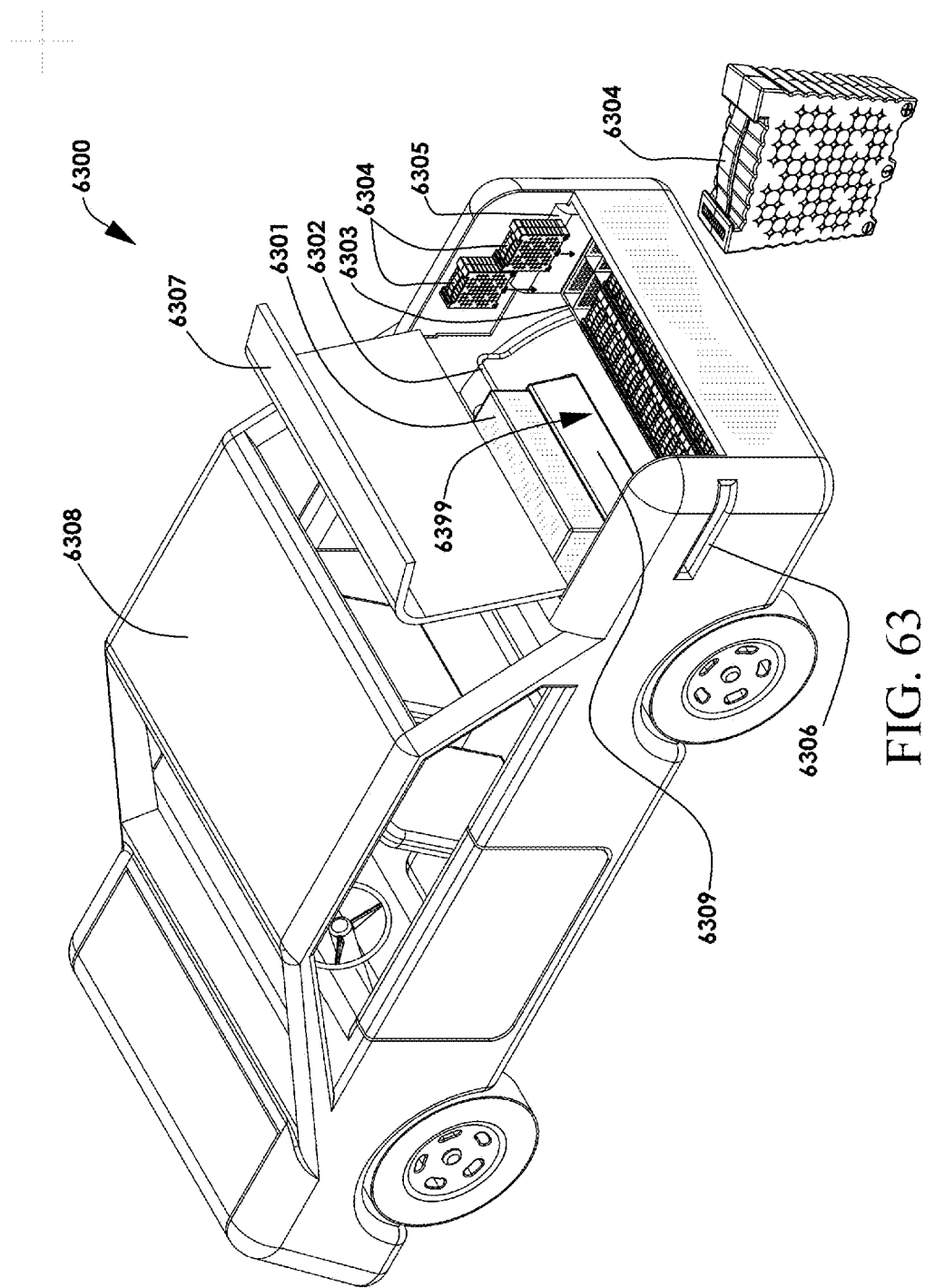

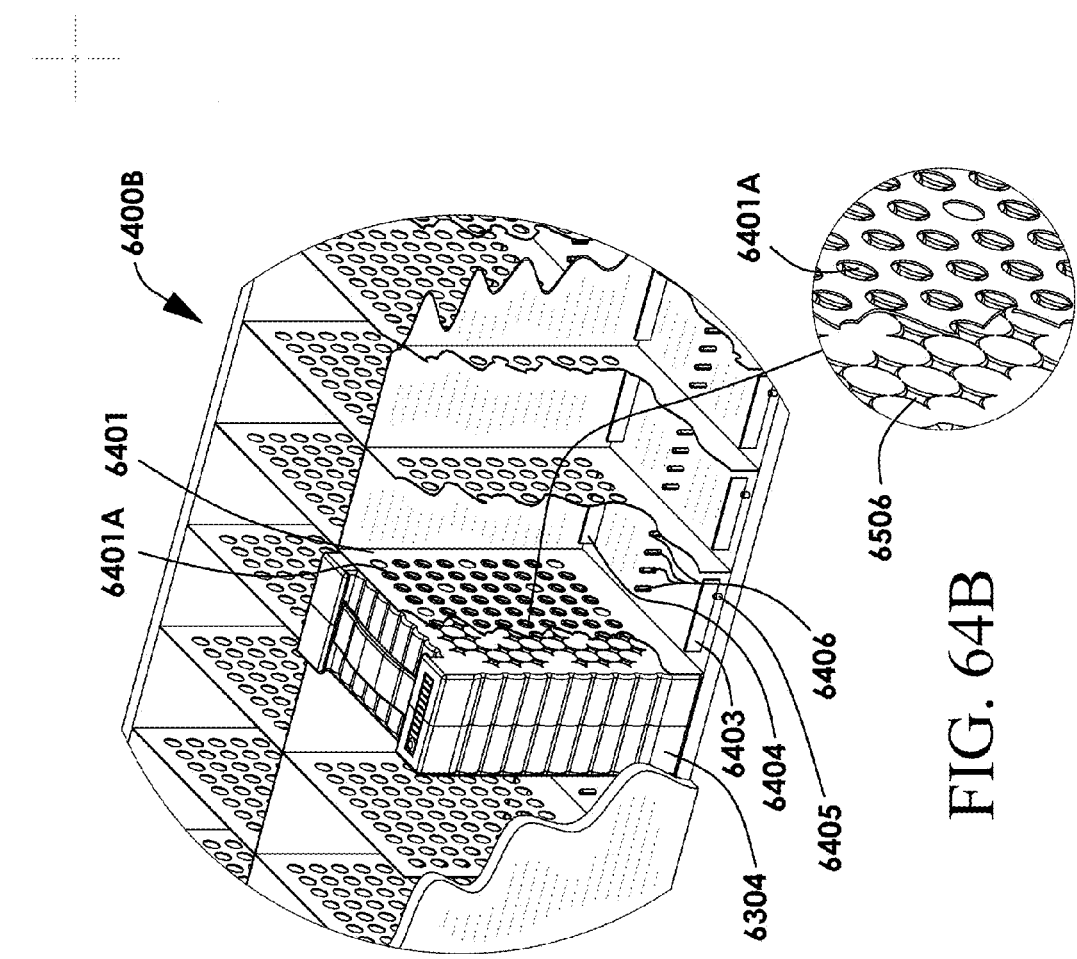
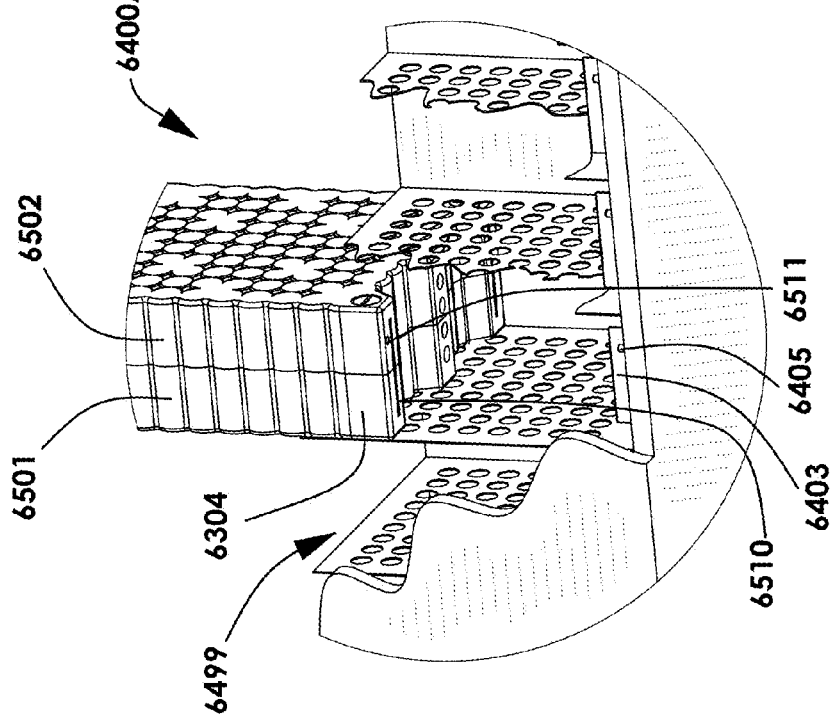
FIG. 64B
FIG. 64A

REFUELABLE BATTERY-POWERED ELECTRIC VEHICLE

This patent application is a divisional application of U.S. utility patent application Ser. No. 11/851,504, filed on Sep. 7, 2007, inventor Karl F. SCHEUCHER, now U.S. Pat. No. 7,948,207. U.S. patent application Ser. No. 11/851,504, now U.S. Pat. No. 7,948,207, is a: continuation in-part of utility patent application Ser. No. 11/672,853, filed Feb. 8, 2007, now U.S. Pat. No. 8,026,698, continuation-in-part of utility patent applicaiton Ser. No. 11/672,957 filed Feb. 8, 2007, and, continuation-in-part of utility patent application Ser. No. 11/673,551 filed Feb. 9, 2007, now U.S. Pat. No. 7,838,142, all of which claim priority to U.S. provisional patent application Ser. Nos. 60/771,771 filed Feb. 9, 2006 and 60/781,959 filed Mar. 12, 2006. U.S. patent application Ser. No. 11/851,504, now U.S. Pat. No. 7,948,207, also claims priority to U.S. provisional patent application Ser. No. 60/911,564 filed Apr. 13, 2007. All of the preceding applications are hereby expressly incorporated herein by reference.

FIELD OF THE INVENTION

The field of invention is in the field of intelligent power supply systems having multiple alternating and direct current inputs and outputs and rechargeable, interchangeable backup energy sources. Additionally, the invention is in the field of interchangeable battery powered electric vehicle management systems which include rechargeable, swap-able and replaceable battery packs at electric vehicle refueling stations. The field of invention is the field of battery electric vehicles.

BACKGROUND OF THE INVENTION

Various strategies have emerged in the quest to develop commercially viable, energy advantageous vehicles that use electrical energy in full or in part to propel the vehicle. Of great interest in the context of this invention is the way in which electrical energy is stored, controlled, and replenished in these different strategies.

The increasingly well-known Hybrid Electric Vehicle (HEV) strategy combines a combustion engine with an electric drive system. The electrical energy in the HEV is typically stored in batteries. The battery types or chemistries used to date include lead acid, Nickel Cadmium (NiCd), Nickel Metal Hydride (NiMH), lithium ion, zinc air, and others. Automotive manufacturers including Ford, GM, Mitsubishi, Nissan, and Toyota, to name a few, produce HEVs for the commercial markets. Electrical energy replenishment in the HEV comes from two sources: 1) electrical energy derived from the combustion engine powering an electrical generator, and 2) energy recaptured from regenerative braking wherein the electric drive motors reverse roles under braking conditions and become electrical generators. The first source, combustion engine generation, can operate whether the vehicle is in motion or at rest, but only when the combustion engine is running and consuming fuel. The second source, regenerative braking, only operates when the vehicle is decelerating. Both sources may operate concurrently.

A subtle yet important variation of the HEV is the Plug-in Hybrid Electric Vehicle (PHEV). Otherwise similar to the HEV, the PHEV adds a third source for replenishment of electrical energy in the batteries: 3) electrical grid power connected via an external power cord. Unlike combustion engine generation and regenerative braking, plug-in grid replenishment is only useable when the vehicle is at rest, in the proximity of an electrical outlet, and then only practical when the vehicle is to be parked for some period of time.

The Battery Electric Vehicle (BEV) is similar to the PHEV but lacks the combustion engine component. Batteries and the electric drive are the sole source of propulsion for the BEV. Replenishment is by plug-in only, and as previously stated, only when the vehicle is at rest near an electrical source. Current BEVs are best suited to short and mid range cycles of operation (20 to 200 mile range) requiring recharging periods of several to many hours in between excursions.

A fourth category of sources for battery energy replenishment applicable to HEV, PHEV, or BEV strategies includes all other electrical sources that can be substituted for the grid as a plug-in source. For example, solar power from vehicle born or stationary photovoltaic generators units can and has been demonstrated.

Recent emphasis to improve the practicality of BEVs has been placed upon faster recharging technology. For example, Phoenix Motorcars of Ontario, Calif. and Altair Nanotechnologies, Inc. of Reno, Nev., U.S.A. report a BEV having 35 kWh (kilowatt-hour) battery energy with a 130 plus mile range that can be recharged at a "fast charge station" in as less than 10 minutes. Several hurdles challenge this approach, however. First and most importantly, the energy density, both gravimetric (energy per unit weight) and volumetric (energy per unit volume) is generally inversely related to a batteries maximum electrical current and power handling capabilities. The higher the electrical discharge or charge current the battery can sustain, the lower the energy density tends to be. The fast recharge time comes with the penalty of heavier, larger, batteries and correspondingly reduced vehicle range. Secondly, a 10 minute charge time for a 35 kWh battery implies electrical power requirements in excess of 230 kW, perhaps 40-50 times or more greater than the typical residential electrical service in total, which is why specially equipped "fast charge stations" are specified.

Another electric vehicle strategy is the Fuel Cell Electric Vehicle (FCEV). The FCEV uses hydrogen or other fuel cell technology produce electrical power for the electric motor propulsion system. Although the FCEV strategy typically includes auxiliary electrical energy storage subsystems in the form of either batteries or so-called "ultra-capacitors" for the purpose of capturing regenerative braking energy and other electrical functions, the primary fuel source is typically the fuel in the cells, such as compressed hydrogen, and refueling does not typically involve recharging in the ordinary battery sense.

U.S. Pat. No. 5,187,423 discloses an electrical vehicle energy replenishment system offering uninterrupted operation for electric vehicles by removing batteries from a vehicle and by placing recharged batteries into the vehicle. What is referred to in the '423 patent as "uninterrupted operation" most likely means short interruptions for exchange (versus no interruption). The '423 patent further describes the battery replacement to be accomplished using a semi-automatic lifting device having powerful automatic gripping connectors, the lifting device being capable of handling one or two batteries simultaneously. The '423 patent also discloses a prerequisite condition for the application of the battery interchange system, namely an adequate battery standard providing control over battery attributes including dimensions, voltage, peak current, internal impedance, minimum capacity/weight ratio, and minimum life expectancy.

The '423 patent begins to address the problem of limited operation duty cycle standing in the way of wide spread acceptance of the plug-in recharge electric vehicle variants (motorists often prefer not to have to be "plugged in" for extended periods). However, there are new issues or problems created in the '423 patent disclosure. One issue is the requirements placed upon the replacement (exchange) mechanisms contemplated, those mechanisms being semi-automatic and powerful in nature. It would be preferable if simple, low power, or completely manual replacement or exchanges were possible.

At the other end of this spectrum, as the number of batteries in a given vehicle could be quite large compared to the one or two batteries contemplated in the '423 patent, it is preferable if the entire, large complement of batteries could be exchanged in one cycle by a fully rather than semi automated process. Another issue impeding the system contemplated in the '423 patent is the broad degree of battery standardization envisioned as a preliminary condition to the use of the system. As battery and electric drive technology advances, often in rapid fashion, a system requiring many attributes of the technology to remain fixed will be costly to update and maintain. A better system would require few rather than many aspects of battery and exchange technology to be invariant.

U.S. Pat. No. 5,631,536 discloses an apparatus and methods for the rapid exchange of a discharged or partially discharged battery in return for a charged unit for battery powered vehicles aimed at eliminating the need for a customer to wait during recharging. The '536 patent raises the idea of a vehicle using and its user exchanging multiple batteries but identifies a constraint that the multiple batteries be closely matched in their electrical characteristics to function efficiently together. The '536 patent further proposes a "central database" to track information of all individual batteries to facilitate the matching process when multiple batteries are to be deployed or exchanged. Both concepts, that of a close, intra-group battery matching requirement, and that of a central database are seen as limiting and therefore drawbacks in the context of the present invention.

The present invention contemplates a highly modular, intelligent, quick exchangeable vehicle battery system that addresses many of the shortcomings of preceding BEV strategies. The advantages of the invention will be explained in detail below. However, it is useful as background to examine in survey the parameters of the BEV system. In particular, it is helpful to examine some of the factors involved, including the characteristics of electric drive trains and vehicles, in order to develop an appreciation for the size and nature of the batteries required for a practical vehicle application. The following discussion aims to identify these factors and suggests ballpark values useful throughout the ensuing discussion.

In addition to the battery subsystem, an electrical vehicle propulsion system comprises a power electronics unit, battery charging control circuitry, and an electric traction motor. One commercially available system is offered for sale by AC Propulsion, Inc. of San Dimas, Calif. The AC propulsion system is specified to operate with battery supply voltages of 240 to 450 V. Vehicle power levels of 150 kW (approximately 200 HP) or higher are possible. Continuous operating power in the range of 50 kW (approximately 70 HP) is not unusual. Efficiencies on the order of 85% to 90% are realistic (the amount of battery energy resulting in useful work done propelling the vehicle). Many factors affect the energy efficiency (mileage) of a vehicle including size, weight (number of passengers), aerodynamics, terrain and other conditions, as well as the operating habits of the driver. A small to mid-size exemplary vehicle might achieve average electrical mileage performance in the range of 5 miles per kWh (200 Wh per mile). The same vehicle might achieve satisfactory acceleration and road performance given a peak power level of 85 to 135 HP or about 63 to 100 kW.

The efficiencies and characteristics of the exemplary vehicle described above demand certain characteristics in the batteries. For example, the energy content of the batteries will influence the range of the vehicle in the same way that the liquid fuel content of a combustion engine vehicle determines its range. In both cases, the efficiency of the vehicle drive train comes in to play. In the case of the electric vehicle, we have already mentioned that the efficiency of the propulsion system including the electronics unit, the regenerative charging unit, and the electric traction motor might be in the range of 90%. In addition one must consider the efficiency of the batteries themselves (some energy is lost via power dissipated within the batteries because of internal electrical resistance). This will of course depend on the particular type of batteries being used and the conditions under which the batteries are used. Lithium ion batteries are becoming increasingly attractive for BEV applications because of their high energy density. A lithium-ion rechargeable battery might operate with efficiencies in the range of 95%. The combined efficiency of the propulsion system and the batteries therefore would then be approximately 85%. Thus the net vehicle mileage of 5 miles per kWh at the wheel is reduced to about 4.3 miles per kWh in the batteries. It should be noted that the preceding discussion of efficiencies in the BEV drive train does not include any losses attributable to gearing or mechanical transmission.

The characteristics of a popular lithium-ion battery cell, the ubiquitous 18650 size cylindrical cell, include a nominal diameter of 18 mm and the nominal length of 65 mm of the cell. Variants of this cell are used extensively to power laptop computers. Such cells are readily available in capacities ranging from 1 Ah up to nearly 3 Ah. They deliver most of their energy and charge over a fairly narrow voltage range of 3.5 to 4 V. Peak operating currents ranging from 4 to 10 A or higher depending upon chemistry subspecies may be found. For the sake of this discussion, we will consider a "typical cell", one delivering 2.2 Ah at 3.6 V and 2.2 A (1C rate). The same cell in new condition would deliver about 8 Wh energy to its load at an 8 W power level over a one-hour interval during a complete discharge from the fully charged state. Peak power capability could be in the range of 16 W or higher. This average cell weighs in at about 45 grams having a cylindrical volume of about 18 cubic centimeters.

From an energy standpoint, the exemplary vehicle described above, getting around 4.3 miles per kWh, would need approximately 4,400 of the typical cells just described to drive a distance of 150 miles. Given a sustained power delivery of just 8 W per cell, these 4,400 cells would provide a sustained vehicle power of about 35 kW (about 48 HP). Peak power for acceleration would be about 70 kW (about 95 Hp). This collection of cells would weigh around 200 kg (435 lb.) and require a space within the vehicle of about 92 liters (3.3 cubic feet). By comparison, the cell count required for a 75 mile range would weigh 100 kg (217 lb.), a 35 mile range 45 kg (100 lbs.), etc.

It should be well noted that the 18650 size cylindrical cell described above is only one of a large number of cell geometries and types contemplated in the present invention for electric vehicle application. Other cell geometries include 26650 and 26700 cylindrical cells manufactured by suppliers such as A123 Systems of Watertown, Mass. and E-One Moli Energy Corp. of Taiwan. These are higher power, lower energy density cells. Compared to the 18650 cell described above, the larger A123 26650 cell delivers 2.3 Ah at 3.3 V and up to 70 A (30C rate) continuously or 120 A peak, delivering perhaps 6 Wh energy to its load at 100 W power levels. It weighs approximately 70 grams and has a cylindrical volume of about 34.5 cubic centimeters. The E-One Moli Energy 26700 cell delivers 2.9 Ah at 3.8 V and up to 15 A (5C rate) continuously, delivering perhaps 11 Wh energy to its load at 50 W power levels. It weighs approximately 100 grams and has a cylindrical volume of about 37 cubic centimeters.

The foregoing analysis shows that a collection of batteries large enough to have sufficient energy for reasonable driving ranges (35 miles or greater) weigh more than most humans would be comfortable handling. Generally vehicle weight is a significant variable determining vehicle mileage (energy efficiency), heavier vehicles getting lower mileage than lighter ones. One can also see that a weighty cache of batteries, while needed for extended range driving, equates to excess weight in shorter excursions detracting unnecessarily from vehicle operating efficiency. When short excursions are planned, it would be advantageous to adjust the amount of batteries on board so that the vehicle weight would be lessened and its efficiency improved.

As batteries age and go through an increasing number of charge and discharge cycles they wear out. This wear manifests itself in a decrease in battery capacity. The rate at which capacity is lost over time and use depends in complex ways on the chemistry of the battery, temperature, rate of charge, rate of discharge, depth of discharge and state of charge, time, and other factors. From the standpoint of the electric vehicle application, the "age" of the batteries will determine a reduction in the maximum range of the vehicle. Put another way, at any point in time, the maximum driving range of a vehicle with fully charged batteries will be a function of not only the number of batteries but also the cycle age of the batteries. In short, older batteries are depreciated and valued less than newer batteries with higher capacities.

Previous BEV applications operate under the tacit assumption that the batteries "built in" to the vehicle would discharge, charge, and age together as a synchronized group. Although the maximum operating range of such vehicle decreases over time and is expected, the previous BEV system provides no mechanisms to allow disparately aged or charged batteries to be efficiently utilized. Such mechanisms are provided by the present invention.

U.S. Pat. No. 6,465,986 B1 issued Oct. 15, 2002 discloses battery interconnection networks electrically connected to one another to provide a three-dimensional network of batteries. Each of the interconnection networks comprises a battery interconnection network having a plurality of individual component batteries configured with compound series parallel connections. A plurality of rows of individual component batteries are connected in parallel. A plurality of columns of individual component batteries are interconnected with the plurality of rows with each column having a plurality of individual component batteries connected in series with an adjacent individual component battery in the same column and electrically connected in parallel with an adjacent individual component battery in the same row.

McDowell Research Corporation of Waco, Tex. produces a Briefcase Power System for powering transceivers with an advertised DC input range of 11 to 36 VDC and an AC input range of 95 to 270VAC at 47 to 440 Hz. No outputs are specified in the advertisement at www.mcdowellresearch.com.

Automated Business Power, Inc. of Gaithersburg, Md. produces an Uninterruptible Power Supply Transceiver Power Unit with advertised DC input range of 9 to 36 VDC and AC input range of 85 to 270VAC at 47 to 440 Hz. Two outputs are specified both at 26.5VDC, one at 5.25 A and one called auxiliary at 1 A. Battery chemistry is not specified in the advertisement at www.abpco.com, but indications are given that non-compatible battery types including primary Lithium battery (BA-5590/U), NiCd (BB-590/U), NiMH (BB-390A/U) or any other non-compatible type shall not be useable.

There is a need for a lightweight intelligent energy system for use in a variety of applications including for use in energy supply systems for homeland defense, military, industrial and residential use. There is also a need for light-weight energy systems including battery systems for use in vehicles, cars, trucks, military vehicles and the like which can be refueled by swapping individual batteries or groups of batteries at energy filling stations much like the typical gas stations.

SUMMARY OF THE INVENTION

The circuitry and control methodology described herein is applicable to use of modular energy supply systems in automobiles. For instance, the control methodology described herein may be used in connection with Lithium ion batteries used in an automobile. In this way, the batteries may be removed from the automobile and recharged at a service station and then replaced into the vehicle fully charged. The batteries may be separately removed from the automobile or they may be removed in groups. The invention as taught and described herein enables the evaluation of individual batteries and the evaluation of the energy remaining in the batteries at the time they are swapped out (exchanged) for fully charged batteries. In this way a motorist can effectively refuel his or her vehicle and proceed on his or her way without worrying about stopping to charge the batteries which is time consuming as the recharge time for Lithium ion batteries is considerable. Having the ability to quickly swap the batteries in a Lithium ion car enables the driver to get credit for the energy in his "gas" tank. In reality the teachings of the instant invention enable the driver to effectively have an "energy tank" as compared to a "gas tank."

The present invention provides apparatus and methods for a battery electric vehicle (BEV) system utilizing hierarchical arrangements of cells, packs, and multi-pack racks along with distributed intelligence and power switching and mixing. This system solves the practical problems associated with quick exchange of modular batteries and off-vehicle recharging as an effective approach to fast BEV refueling. The system derives additional advantages including the ability to optimize vehicle energy efficiency as a function of driving range requirements and the economic flexibility for a user to purchase more or less energy at any service interval. The particular, modular approach to battery organization along with the distributed intelligence included therein facilitates continuous battery monitoring thereby yielding efficient and economic detection and correction of individual cell, pack, or module problems or failures. Further, the nature of the scalable, intelligent battery system herein described lends itself to many other applications including backup power for home and business as well as fully portable power for a growing host of applications in civilian and military arenas.

A preferred implementation includes a multi-cell battery pack comprising 100 individual battery cells arranged in a series electrical configuration. This pack includes housing components encasing printed circuit boards which in combination provide for the mechanical containment and electrical interconnection of the individual cells in the form of high-power, lightweight battery pack. The printed circuits further comprise a controller as well as the electrical components used by the controller for switching and monitoring charge and discharge currents, monitoring individual cell voltages and temperatures, computing state of charge or state of discharge information, tracking the characteristics of operation over time, and providing important safety functions. The battery pack includes external positive and negative electrical connections as well as connections in support of electronic communications with external devices.

In the preferred implementation, a multi-pack rack has multiple receptacles each accepting one of the aforementioned battery packs. The multi-pack rack includes electrical and mechanical connections for the battery pack, a controller and the electrical components to be used by the controller for communicating with the battery pack controllers, switching and monitoring charge and discharge currents, and monitoring battery pack voltages. The multi-pack rack includes external positive and negative electrical connections as well as connections in support of electronic communications with external devices.

Another aspect of the preferred implementation includes an electric vehicle having one or more receptacles for either battery packs and/or multi-pack racks as described above. The vehicle includes electrical and mechanical connections for the battery pack and/or multi-pack rack, a controller and the electrical components to be used by the controller for communicating with the pack and/or rack controllers, switching and monitoring charge and discharge currents, and monitoring pack and/or rack voltages. The vehicle also includes electric motors and electrical systems needed to efficiently operate these motors. External connections for positive and negative electrical power as well as connections facilitating electronic communications with external devices may also be included in the vehicle.

An off-vehicle battery pack charging system is also included. This charging system is connected to an external source of power such as the electrical grid, photovoltaic generator, wind generator, etc. also connecting to one or more battery packs and/or multi-pack racks The charging system includes electrical and mechanical connections for the battery pack and/or multi-pack rack, a controller and the electrical components to be used by the controller for communicating with the pack and/or rack controllers, switching and monitoring charge currents, and monitoring pack and/or rack voltages.

The benefits of my device and process include:

Quick exchange by either man or machine.

Modular packs with enhanced serviceability and maintenance.

Modular packs for adaptability of cost, power, range, and weight, life extension, temperature management (SIPS).

Roadside emergency efficiency.

Modular packs for multiple uses.

Safety and theft.

Intelligent packs for improved use in the vehicle and in the charging station.

Hierarchical drawers of packs for reduced service time.

Energy accounting.

Life use accounting.

Safety.

Shipping efficiency.

An electric vehicle energy system includes an electrical system having a first mating receptacle and a first energy module having a first plug and a second mating receptacle. The electric vehicle energy system further includes a second energy module having a second plug. The second plug of the second energy module couples to and uncouples from the second mating receptacle of the first energy module. The first plug of the first energy modules couples to and uncouples from the first mating receptacle of the electrical system.

A hierarchically arranged quick-removable-quick-replaceable electric energy module system wherein the second quick-removable-quick-replaceable energy module includes a second electrical interface which comprises at least two electrical contacts implementing a communications channel. The second mating receptacle of the first, larger, encompassing, quick-removable-quick-replaceable electric energy module also comprises at least two electrical contacts implementing a communications channel. The second electrical interface communication contacts couple and decouple with the respective communication contacts of the second mating receptacle such that, when so coupled, information encoded in the form of electrical signals may be transmitted and received between the second energy module and the first energy module.

My invention solves many problems including the problem with electric vehicles which exists today, namely, refueling. Hybrid vehicles utilize batteries recharged while the vehicle is operating through recovery of kinetic energy of the vehicle due to its' motion. Alternatively and conjunctively hybrid vehicles utilize batteries recharged due to the absorption of electrical energy created by the vehicle's engine/electrical generator. Hybrid vehicle utilize liquid fuel such as gasoline, diesel or ethanol in a more efficient mode.

Presently, to charge a vehicle electric battery it is necessary to charge it on-board or to bring the vehicle to a charging station to connect the vehicle to the energy source.

My invention enables the lightweight battery modules to be charged virtually anywhere in an office, a factory, or a home. The lightweight battery modules using a typical 18650 sized lithium ion cell weigh about 10 pounds each and supply enough energy to power a vehicle for about 4 miles while supplying about 2 horsepower.

A typical 18650 sized lithium ion cell holds approximately 8 Wh of energy. It has an operating voltage around 3.6V and can provide 2.2 A current on average (peak currents of 4 A or higher for a short durations). The pack depicted herein uses 100 cells in series. Therefore, energy is 100×8 Wh or 800 Wh, pack operating voltage is 100×3.6V or 360V, and average current is 2.2 A. Average power level is 360V×2.2 A=792 W (peak power levels of 1440 W or higher). Assuming a vehicle requires 200 Wh at the wheel energy per mile, and assuming an electric drive train efficiency of around 89%, battery energy required for a mile is around 225 Wh. 800 Wh/225 Wh/mile equates to about 3.6 miles. In summary, one battery module with 100 cells in series can supply average power around 1 horsepower with peak power around 2 HP. Typical range supplied by one pack is around 3.6 miles (about 4).

If the 26700-sized cell is used in place of the 18650 cell, the 100 cell battery module would weigh approximately 22 lbs., supply enough energy to power the vehicle for about 5 miles, while supplying 15 horsepower peak. Similar figures result from the use of the 26650-sized cell. My invention is conceived to utilize and be readily adapted to any size, geometry, chemistry, or other variant of battery cells.

A power supply is disclosed which includes multiple alternating current and direct current inputs and outputs. One of the inputs is a back-up energy source which is carried on board within the power supply. The back-up energy source may be batteries or fuel cells. An enclosure used to house the power supply is expandable to include additional battery racks each housed within an individual frame of the enclosure. A power supply may also be expanded by interconnecting separate enclosures with the use of appropriate cables.

The power supply is microprocessor controlled based on the status (voltage, current and temperature) of the inputs including the status of the back-up energy source, the status of converters and internal buses, and the status of the outputs. The microprocessor manages the back-up energy source and the overall operation of the power supply by selectively coupling system inputs, buses and outputs. Where power sources are combined in an "or" relationship, diodes or their equivalents are used to prohibit undesirable current flows. MOSFET based switches or their equivalents controlled by the microprocessor are used extensively in the selective coupling of the system inputs, buses and outputs.

The power supply disclosed herein resides in one or more weatherproof enclosures housing a battery rack having a plurality of batteries in at least one frame portion. First and second fastening bars are affixed to the frame portion. First and second connecting rods are attached to the first and second fastening bars and extend therefrom; the battery rack includes a frame fastener and first and second fastening bars interconnect with the frame fastener to secure the battery rack to the frame. A rearward portion of the frame includes an electrical motherboard mounted thereon. A front door portion of the frame may include one or more vents and fans.

Alternatively, the power supply is mounted in an enclosure which includes a plurality of frame portions connected to one another via robust hinges and latches with weatherproof gasketing along the entire frame to frame interface surfaces. A plurality of battery racks reside within the power supply with one rack residing in each frame and being secured thereto. Since the frames are hinged together they may be separated from each other for maintenance. Additional frames may be added to allow greater power levels or extended operating time or both. Likewise one or more frames may be removed if the power level or operating time they represent becomes superfluous. Each rack includes a plurality of batteries in electrical communication with a motherboard which resides in the rearward-most portion of the plurality of frame portions hinged together. The front-most frame is a front door portion which includes vents and fans to cool the batteries and electronics of the power supply. Other relative positions of frame modules are possible and anticipated. For instance, vents and fans may be positioned in the rearward-most frame. The front-most frame may contain the motherboard. Alternatively, an intermediate frame may contain the motherboard and rearward-most and front-most frames could both contain fans and/or vents.

A process for servicing the embodiment of the power supply which includes a plurality of frame portions hinged together (with each frame securing an arrayed rack of batteries) includes the steps of: unlocking the latch side of a frame from the next adjacent frame; and, rotating the next adjacent frame about its hinged side to expose the frame to be serviced. The next adjacent frame may be the rearward-most frame which includes the motherboard for controlling each rack containing a plurality of arrayed batteries. The next adjacent frame may be any frame intermediate the rearward-most frame and the front-most frame. Each frame may be separated from the next adjacent frame as the frames are hinged together. Removal of the hinge pin from the hinge may accomplish the separation of the frames, or removal of fasteners retaining flanges associated with the hinges to a frame may perform the separation, or other logical means of disconnecting framed, door-like, hinge connected modules from one another may be employed.

Alternatively, the above described frame portions may be separately enclosed and interconnected as required using appropriate weatherproof cable assemblies. A rack for housing a plurality of removable cartridge batteries includes a plurality of shelves arranged in a stack type relationship. The stack includes a bottom shelf and a top shelf. Intermediate shelves residing between the bottom shelf and the top shelf are vertically spaced apart from each other. The shelves include a plurality of bores therethrough with interconnecting rods extending vertically through the bores in the shelves. A plurality of hollow spacing tubes (spacers) reside concentrically around the plurality of interconnecting rods and intermediate each of the shelves spacing them apart. Fasteners, such as nuts, are affixed to the interconnecting rods beneath the bottom shelf and above the top shelf. Other techniques of construction are also contemplated wherein the spatial relationship of the shelves and overall ruggedness of the structure is maintained comparable to the above described connecting rod and spacing tube construction technique. These other techniques may include formed sheet metal components welded together or connected by fasteners to form a superstructure into which the shelf elements may be placed and securely retained by features of the engagement between the sheet metal and shelf elements (snap together construction) or by additional fasteners or other adhesive techniques.

Each of the removable cartridge type batteries includes a first electrical contact and a second electrical contact. The removable cartridge type batteries may be removable cordless tool batteries. Each shelf contains one or more battery docking locations. Each docking location includes a first electrical connector which matingly engages the first electrical contact of the battery and a second electrical connector which matingly engages the second electrical contact. First and second wires are affixed to the first and second electrical connectors and are routed to a battery interface circuit. Additional contacts and corresponding electrical contacts may be present upon batteries and docking locations.

Alternatively, the shelves may include battery interface circuits in the form of printed circuits thereon. Each shelf includes a connector for communication with another board, typically a rack common board which in turn connects typically to the aforementioned motherboard. In this example the first and second connectors engage and are electrically connected to appropriate points of each respective printed circuit.

The power supply includes a programmable microprocessor for managing inputs, internal components and outputs based on continuously sampled and processed voltage, current and temperature measurements. An alternating current input source is selectively coupled to an AC/DC converter which, in turn, is selectively coupled with an intermediate DC bus and/or a second DC bus and/or a third DC bus. First, second, and third direct current input sources are selectively coupled with the intermediate DC bus and/or the first DC bus and/or the second DC bus and/or the third DC bus. The intermediate DC bus is selectively coupled with a first DC output and/or a DC/AC inverter and/or a third DC/DC converter.

The third DC/DC converter is coupled to a second DC output and a third DC output. The first DC bus is coupled to a first DC/DC converter which, in turn, is selectively coupled to the intermediate DC bus and/or the third DC bus and/or a DC charge bus.

The second DC bus is coupled to a second DC/DC converter which, in turn, is selectively coupled to the intermediate DC bus and/or the third DC bus and/or the DC charge bus.

The third DC bus is coupled to a fourth DC output and the third DC bus is selectively coupled to a fourth DC/DC converter which, in turn, is coupled to a fifth and sixth direct current output. The charge bus is coupled to the third direct current input source. The third direct current input source is the battery back-up current source containing literally almost any number of individual batteries. Batteries over a wide range of inputs from 10 to 40 VDC will be used. However, it is specifically envisioned that batteries over a wider range such as 1.5 VDC up to hundreds of volts direct current may be used provided appropriate circuit element adaptations are made such as utilizing switches rated for the voltage ranges being switched.

As previously stated, the power supply includes a microprocessor and the third direct current input source includes a nearly limitless plurality of removable cartridge battery packs. Each of the removable cartridge battery packs is selectively connected or disconnected with a battery bus interconnected with a load. Each of the removable cartridge battery packs is also selectively connected or disconnected with a charge bus.

One exemplary algorithm for operation of the plurality of batteries is as follows. The microprocessor selectively connects a first portion of the plurality of removable cartridge battery packs with the battery bus. The microprocessor selectively connects a second portion of the plurality of removable cartridge battery packs with the charge bus. The microprocessor selectively connects a third portion of the plurality of removable cartridge battery packs with both the battery bus and the charge bus. The microprocessor selectively disconnects a fourth portion of the plurality of removable cartridge packs from both the charge bus and the battery bus.

The first, second, third and fourth portions of the plurality of removable cartridge battery packs may include one, more than one, all, or none of the plurality of removable cartridge battery packs. The plurality of removable cartridge battery packs may include batteries having different nominal voltages. "Nominal voltage" as used herein means the voltage across a fully charged battery, namely, the open circuit voltage.

One exemplary process for operating a power supply having a plurality of battery packs is disclosed and includes the steps of: monitoring the battery bus output branch associated with each of the selected battery packs and measuring the voltages thereon while supplying a load which includes a direct current to direct current step up converter; monitoring the battery bus output branch associated with each of the selected battery packs and measuring the voltages thereon while disconnected from the load; comparing the unloaded and loaded voltages of each respective battery selected for operation and connection to the load; and, identifying battery packs to be charged depending on the comparison of the unloaded and loaded voltages on each of the respective battery bus output branch(es). The process can also include the step of charging the identified battery packs. Still additionally, the process can include the step of charging the identified battery packs at a voltage higher than the nominal voltage of each of the battery packs.

The battery back-up direct current input can be virtually limitless in size. Multiple frames can house multiple racks of back-up batteries. The back-up batteries are expected to be in the range of 10 VDC to 40 VDC. Commercially available cordless tool batteries are in this range. Therefore, the power supply disclosed and claimed herein includes a microprocessor and up to K batteries in parallel, where K is any positive integer. I disclose battery arrays having 20 Li-Ion batteries per rack. In the 20 batteries per rack example each battery has a nominal unloaded voltage of 18 VDC. Each battery has a battery interface circuit which switchably interconnects each battery with up to N loads where N is any positive integer. Each battery is switchably connected (through the battery interface circuit) with the charge bus. The back-up batteries are connected in parallel and may be removed for use in another application such as in another power supply or in a cordless tool, other cordless appliance, vehicle, or other backup energy application. A monitor bus is also switchably interconnected by the battery interface circuit of each battery and may monitor up to K batteries. Lastly, a sense resistor bus switchably interconnects with up to K batteries. The microprocessor directs power into and out of each described bus controlling up to K battery connections with up to N load, charge, monitor, and sense buses.

The microprocessor also prioritizes up to N loads and disconnects the loads in a prescribed order as to their relative importance at prescribed levels or remaining energy as remaining backup energy diminishes through periods of continuing operation.

Another embodiment of the power supply includes a plurality of hot-swappable removable cartridge battery packs in parallel interconnected with either a DC-AC inverter or with a DC-DC converter which in turn leads to the DC-AC inverter after the DC voltage is appropriately modified. Usually this modification will involve a step-up of the voltage. The DC-AC inverter provides an AC output. The removable cartridge battery packs are arranged in parallel with each other and include a common battery bus for communicating power to the DC-AC inverter. Each of the battery packs includes an output and a diode or equivalent circuit substituting the diode function arranged in series with the output of the battery pack communicating power to the common battery bus. It should be noted that alternative circuit implementations are possible and contemplated.

The AC-DC input is fed to an AC-DC converter and then is ored together with the output of the DC-DC converter. Alternatively, the output of the AC-DC converter could be ored together with the common battery bus if no modification of the common battery bus DC voltage is desired.

The output of the AC-DC converter is interconnected in series with a diode and said common battery bus is interconnected in series with a diode and the diodes are interconnected in an oring fashion. In this fashion the diodes or equivalent circuits protect the common battery bus and/or the DC-DC converter and/or the AC-DC converter from back fed current. The diodes are commonly joined in a bus which is interconnected with the DC-AC inverter.

The conceptual management hierarchy of the power supply system is disclosed herein. Using this hierarchical arrangement the network management user may access the status and control parameters for all subsystems under a particular gateway. Information is shown for the batteries (energy subsystems and energy modules), inputs, converters, and outputs (power conversion and control units), and gateway. All aspects of the underlying power supply status and operation may be monitored and controlled by the user via this network. Up to P power conversion and control units may be (where P is a positive integer) connected for management purposes to each gateway. Similarly, up to S energy subsystems (where S is a positive integer) may be connected for management purposes to each power conversion and control unit. Up to M energy modules (where M is a positive integer) may be connected for management purposes to each energy subsystem. Energy modules include but are not limited to lithium ion based batteries.

By virtue of this hierarchical arrangement the power supply user may configure and control a power supply systems under a particular gateway. For example, one such physical arrangement may be a gateway unit connected to at least one power conversion and control unit which in turn is connected to at least one energy subsystem which in turn is connected to at least one energy module. As long as at least one energy subsystem having at least one energy module is connected to a power conversion and control unit, the power conversion and control unit may continue to operate provide power and management control to the user.

It is an object of the invention to provide a power supply wherein at least one input is a back-up energy source and wherein the back-up energy source is rechargeable within the battery rack, is rechargeable within the rack but with the rack removed from the power supply, or is rechargeable when removed from the rack and from the power supply.

It is an object of the invention to provide a power supply wherein a back-up energy source includes a rack of individually controlled and rechargeable removable cartridge type energy packs.

It is an object of the invention to provide a power supply wherein removable cartridge type energy packs are batteries.

It is an object of the invention to provide a power supply wherein removable cartridge type energy packs are batteries at different voltages.

It is an object of the invention to provide a power supply capable of receiving I (where I is a positive integer) AC or DC inputs and controlling, measuring, sensing, charging and converting those inputs.

It is an object of the invention to provide a power supply capable of supplying Q (where Q is a positive integer) AC or DC outputs and controlling, measuring, and sensing, those outputs.

It is an object of the invention to provide a power supply capable of managing I AC or DC inputs and managing Q AC or DC outputs by periodically and continuously sampling and measuring system currents, voltages and temperatures.

It is an object of the invention to provide a power supply having I AC or DC inputs wherein at least one of those inputs is back-up energy source which may be a fuel cell rack, an atomic-powered generator rack, a Li-Ion battery rack, a NiMH battery rack, a NiCd battery rack, a lead acid battery rack, a Li-Ion polymer battery rack, or an Alkaline battery rack. It is an object to provide a microprocessor controlled intelligent power supply which effectively manages its backup power supply input.

It is an object of the present invention to provide a power supply having a DC input from a plurality of removable, hot-swappable, and interchangeable batteries which provide power on a common battery bus to a DC-AC inverter. Alternatively, and additionally, AC power may be supplied to the power supply through an AC-DC converter which is then converted back to AC for purposes of reliability and for the purpose of seamless transition (uninterruptible power supply on-line topology). The output of the DC to AC converter is arranged in a diode oring fashion together with the output from the common battery bus. The diode oring selects the higher voltage in converting from DC to AC power. Further, the common battery bus voltage may be converted by a DC-to-DC converter intermediate the common battery bus and the diode in series leading to the junction with the output of the AC-DC converter. Use of the DC-to-DC converter enables use of rechargeable batteries which have a relatively low output voltage. It is an object of the invention, in this example, to provide a power supply which does not require a microprocessor to manage its operations. Rather, this example provides a seamless transition from an AC power input to a DC power input with hot-swappablility of the batteries. The batteries may be cordless tool batteries capable of dual use. Further, the batteries may be Li-Ion or any of the types referred to herein.

It is an object of the invention to enable use of batteries in an electric or hybrid automobile such that the batteries may be interchanged and exchanged at a service station.

It is an object of the invention to enable the use of electric vehicles by intelligently interchanging the batteries of the vehicles at a service station.

It is an object of the invention to enable the use of electric batteries in a vehicle such as a car wherein the electric batteries are interchanged at a service station and credit is given for the energy left in the batteries.

It is an object of the invention to enable use of electric vehicles anywhere over long distances at high speeds without lengthy recharge periods as the batteries may be replaced at service stations just as a gasoline powered car is fueled at a gasoline service station.

It is an object of the invention to utilize battery modules which can employ any number of battery cells thus enabling different configurations or arrangements to be utilized which suit the particular use of an electric vehicle.

It is an object of the invention to enable electric vehicles having batteries arranged in series or parallel to be interchanged at a service station.

It is an object of the invention to enable continuous operation of electric vehicles indefinitely without taking the vehicle out of service to recharge the batteries on board.

These and other objects will be best understood when reference is made to the following Brief Description Of The Drawings, Description of the Invention and Claims which follow hereinbelow.

BRIEF DESCRIPTION OF THE DRAWINGS

FIG. 1D is a front view of the rack partially populated with the removable cartridge energy packs in the rack.

FIG. 1E is a side view of the rack taken along the lines 1E-1E of FIG. 1D.

FIG. 1F is a side view of the rack taken along the lines 1F-1F of FIG. 1D.

FIG. 1G is an enlargement of a portion of FIG. 1D illustrating one of the removable cartridge energy packs in the rack.

FIG. 1H is an enlargement of a portion of FIG. 1F illustrating one of the removable cartridge energy packs in the rack.

FIG. 2B is a front perspective view of the second rack illustrated in FIGS. 2 and 2A.

FIG. 2C is another front perspective view of the second rack illustrated in FIGS. 2 and 2A.

FIG. 2D is a front view of the second rack partially populated with the removable cartridge energy packs in the second rack.

FIG. 2E is a side view of the second rack taken along the lines 2E-2E of FIG. 2D.

FIG. 2F is a side view of the second rack taken along the lines 2F-2F of FIG. 2D.

FIG. 2G is an enlargement of a portion of FIG. 2D illustrating one of the removable cartridge energy packs in the second rack.

FIG. 2H is an enlargement of a portion of FIG. 2F illustrating one of the removable cartridge energy packs in the second rack.

FIG. 63 is a view of a refuelable electric vehicle.

FIG. 64A is a view of a battery pack/battery module mating with a battery system enclosure.

FIG. 64B is another view of a battery pack/battery module mating with a battery system enclosure.

A better understanding of the drawings will be had when reference is made to the Description Of The Invention and Claims which follow hereinbelow.

DESCRIPTION OF THE INVENTION

Figure 3:
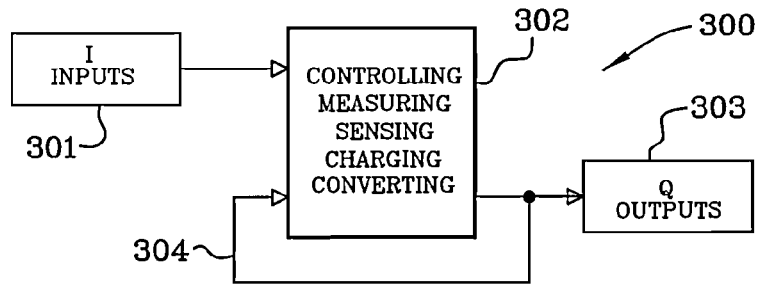
FIG. 3 is a schematic for controlling, measuring, sensing, charging and converting multiple inputs (energy sources) and multiple outputs (energy loads).

FIG. 3 is a schematic 300 for controlling, measuring, sensing, charging and converting 302 multiple inputs (energy sources) 301 and multiple outputs (energy loads) 303 with some of the energy routed back 304 for further processing by the controlling, sensing, charging, and converting module 302.

Figure 1:
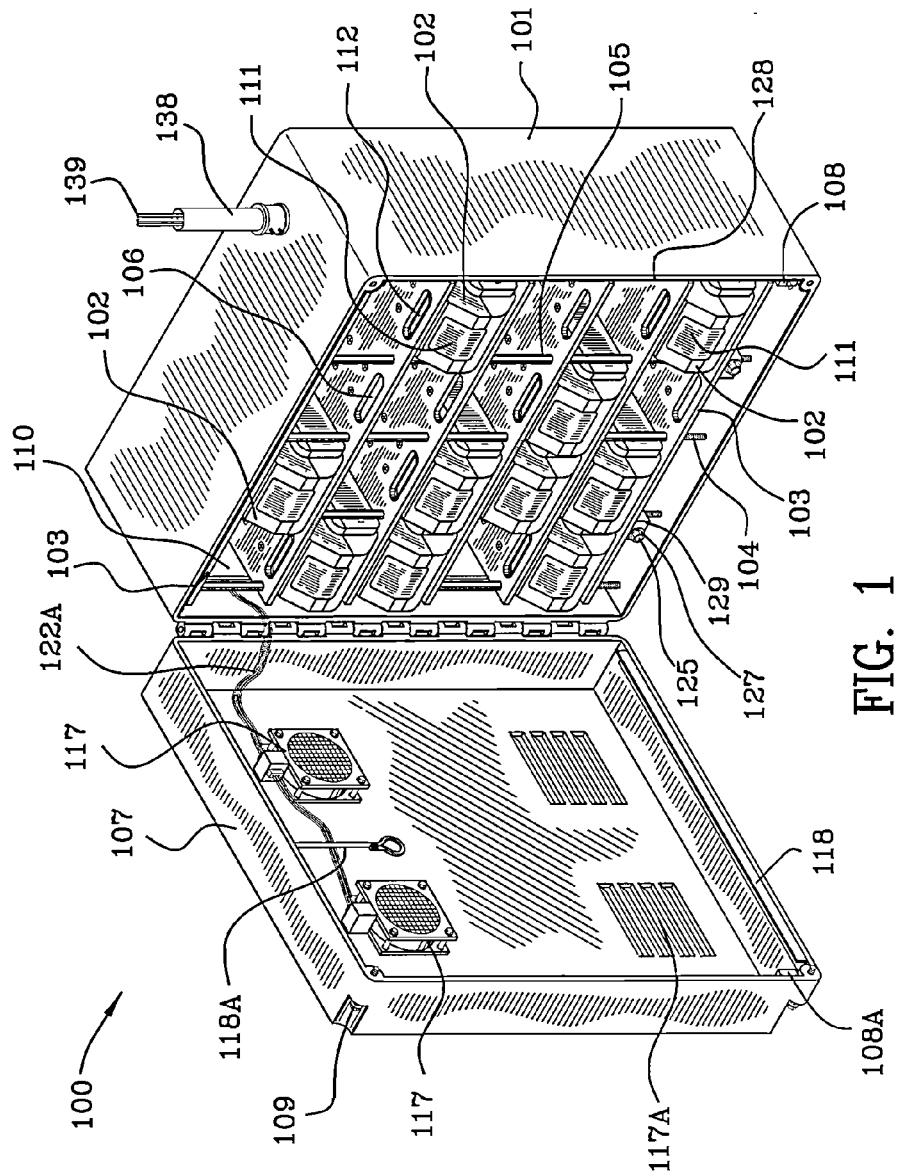
FIG. 1 is a front perspective view of the intelligent power supply device illustrating a plurality of removable cartridge energy packs in a rack.

FIG. 1 is a front perspective view 100 of the intelligent power supply device illustrating a plurality of removable cartridge energy packs 102 in a rack residing in an enclosure 101. The rack is best viewed in FIGS. 1C, 1D, 1E and 1F. Referring again to FIG. 1 the rack is not fully populated with batteries. The removable cartridge energy packs 102 are preferably batteries and those shown are representative of a nominal 18 VDC Li-Ion cordless tool battery manufactured and sold by Makita®. Makita® is believed to be a trademark of Makita Corporation of Anjo-shi, Aichi-ken, Japan. Any type of battery may be used but Li-ion (lithium ion), NiMH (Nickel Metal Hydride), NiCd (Nickel Cadmium), Li-ion polymer, lead acid or alkaline batteries are presently contemplated. Li-Ion is one preferable choice because of its gravimetric (energy per unit mass/weight) and volumetric (energy per unit volume) efficiencies.

The United States Government (see 49 C.F.R. §173.185) and the United Nations (see 4th Edition of the Manual of Tests and Criteria) places restrictions upon the transportation of certain lithium and lithium-ion batteries. Certain lithium-ion batteries having a smaller capacity and therefore a lower lithium or equivalent lithium content are exempted from these restrictions. This becomes an advantage of the intelligent power supply design in that it preferentially incorporates these smaller lithium-ion removable cartridge batteries.

Referring, again to FIG. 1, a partially populated rack is illustrated to demonstrate that the power supply device will operate with at least one back-up battery 102. The batteries 102 may be removed at any time even while they are in operation and even while the power supply device is in operation. This is known as being hot swappable. Reference numeral 110 indicates a printed circuit board which contains 20 battery interface circuits thereon. FIG. 1C is a front perspective view 100C of the rack illustrated in FIGS. 1 and 1A and shows the back side of the printed battery interface circuit board 110 attached to the shelves 103 of the rack with screws 110A. Alternatively, the printed battery interface circuit board may be attached to the rack through the use of adhesives or by interlocking aspects of the circuit board and the shelves or rack implementing a "snap together" construction.

Figure 1A:
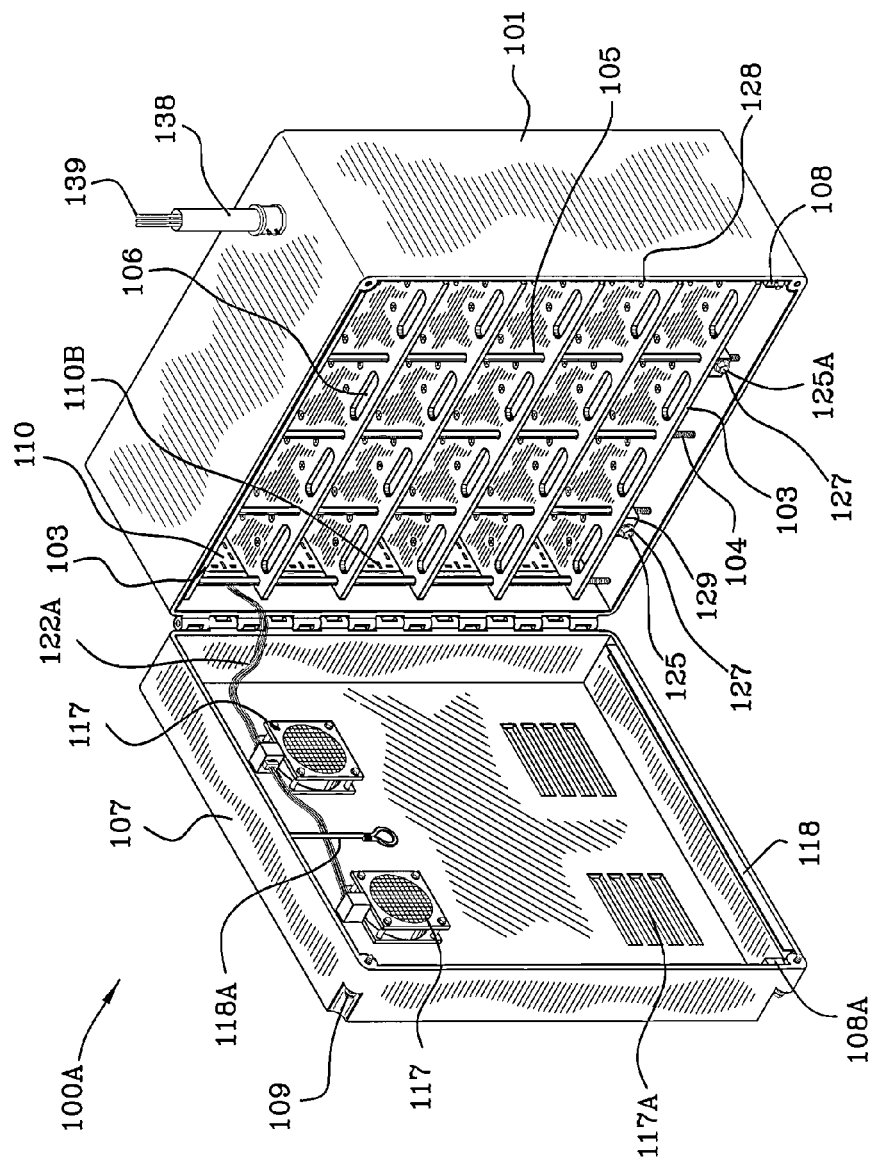
FIG. 1A is a front perspective view of the intelligent power supply device similar to FIG. 1 without the removable cartridge energy packs in the rack.

FIG. 1A is a front perspective view 100A of the power supply device similar to FIG. 1 illustrating the power supply device without the removable cartridge energy packs in the rack. It is anticipated that a user would wish to run the intelligent power supply device without populating the rack with batteries since in fact, as explained herein, the power supply device is functional provided an alternating current source and/or a direct current source is available. In this mode, the power supply can serve to transform power sources on behalf of the user. For example, a 230VAC 50 Hz input can be usefully transformed by the intelligent power supply into an 115VAC 60 Hz output. See, FIGS. 4, 4A, 4B and 4C. Still referring to FIG. 1A, printed circuit board traces are indicated by reference numeral 110B.

Referring to FIGS. 1 and 1A, shelves 103 are adapted to receive the Makita® 18 VDC Li-Ion batteries 102. Shelves 103 may be made of an electrical insulator such as polycarbonate. Recesses 106 receive spring loaded locks 111, 112. Reference is made to FIG. 1J, a perspective illustration 100J of the removable cartridge energy pack/battery pack 102 manufactured by Makita® and which is illustrated in FIG. 1 et seq. FIG. 1K is a front view 100K of the removable cartridge energy pack/battery pack 102 and FIG. 1L is a side view 100L of the removable cartridge energy pack/battery pack 102 illustrated in FIG. 1 et seq. Parts labeled 111, 112 are integral such that as button 111 is depressed downwardly when viewing FIG. 1J against the force of an internal spring (not shown) tongue 112 recedes into the battery pack enabling insertion and withdrawal into the rack which is generally denoted by reference numeral 100C. In this way tongue 112 engages the recess 106 of each shelf 103 and securely positions the battery into place such that it cannot be removed even if the enclosure 101 is accidentally or purposefully knocked over or subject to such shock and vibration as is typically present in vehicle, aircraft, vessel, or spacecraft born applications.

Still referring to FIGS. 1 and 1A, front door portion 107 is shown in the open position exposing the interior of the enclosure 101 and the interior of the door. Door 107 can be securely locked and padlocked to protect the power supply device through known means. A threaded screw 109 is illustrated as one way to secure the closure of the door.

Door 107 includes vents 117A which allow ventilation of the interior of the enclosure when door 107 is closed. Filters may be placed over vents 117A to protect from the intrusion of unwanted dust, debris, insects or other foreign matters. Fans 117 located in the upper portion of the door 107 expel warmer air from the device creating negative pressure thus drawing cooler air in through vents 117A. Duct or baffling elements (not shown) can be included to the effect of directing cooler air entering via vents 117A first beneath battery rack lower shelf 103 wherefrom it flows upward across motherboard 120 (FIG. 1B) before traversing over top of the uppermost shelf and exiting via fans 117. In this way cooling of power conversion elements and other electronic and electrical elements housed on motherboard 120 is efficiently accomplished. Operation of the fans 117 is controlled by the microprocessor 495 based on various temperature measurements. Wire harness 122A powers fans 117.

Figure 1B:
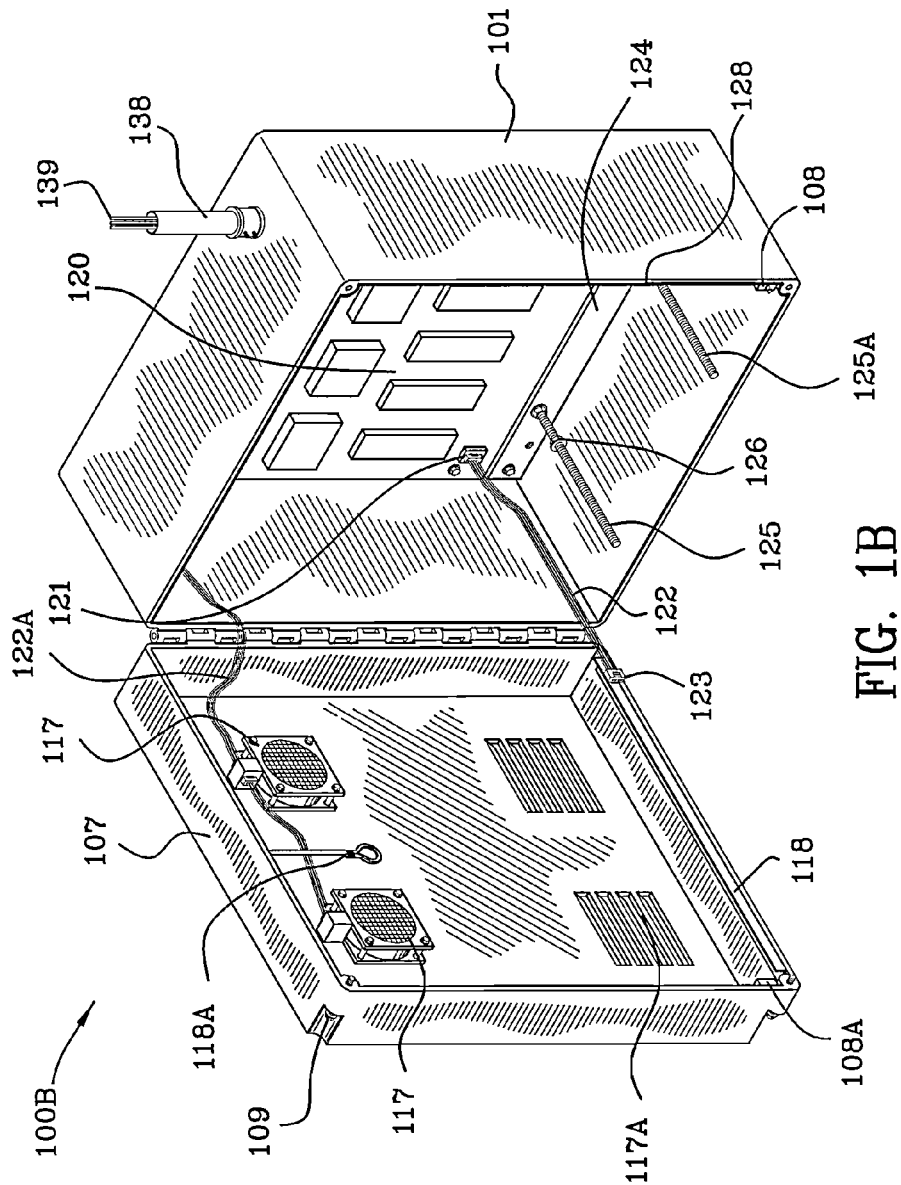
FIG. 1B is a front perspective view of the intelligent power supply device without the rack and without the removable cartridge energy packs in the rack.
Figure 1C:
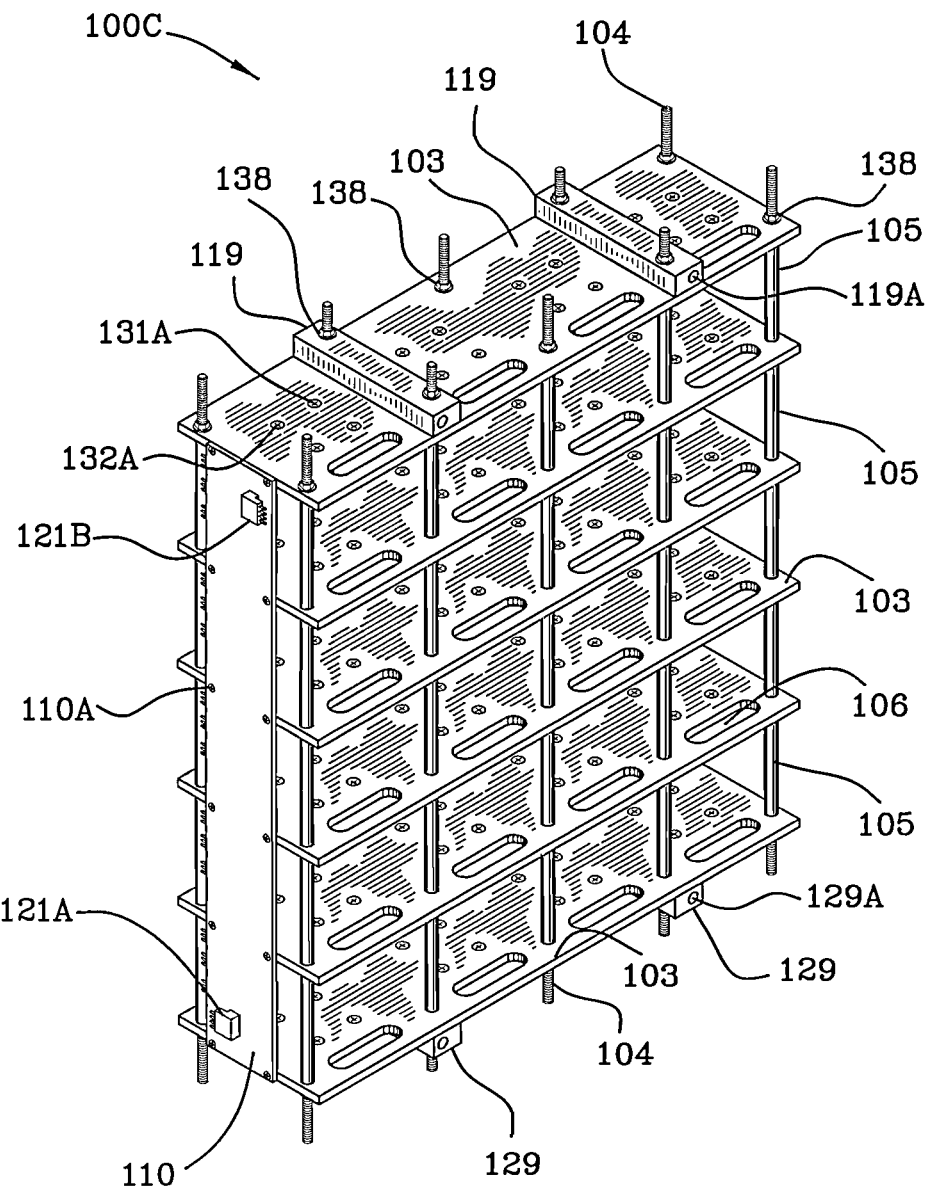
FIG. 1C is a front perspective view of the rack illustrated in FIGS. 1 and 1A.
Figure 1I:
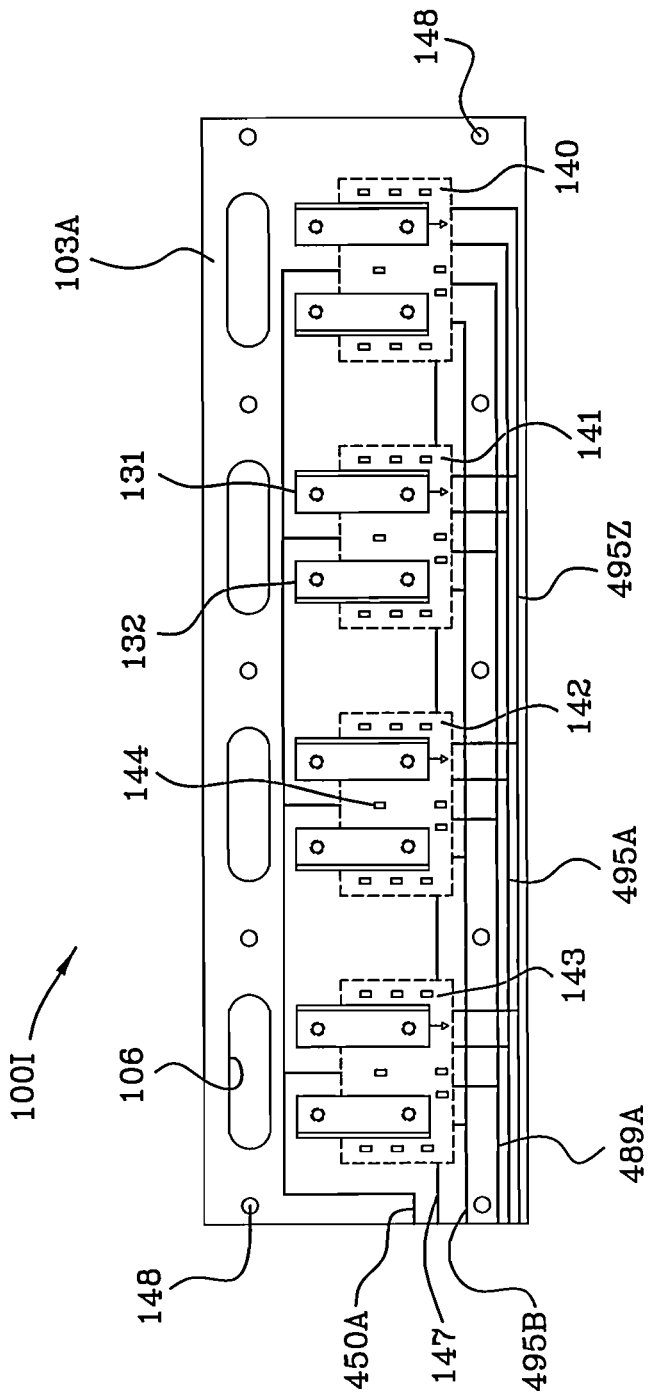
FIG. 1I is an illustration of one of the shelves of the rack having the battery interface circuits on and in the shelf underneath the battery contacts/guides.
Figure 1J:
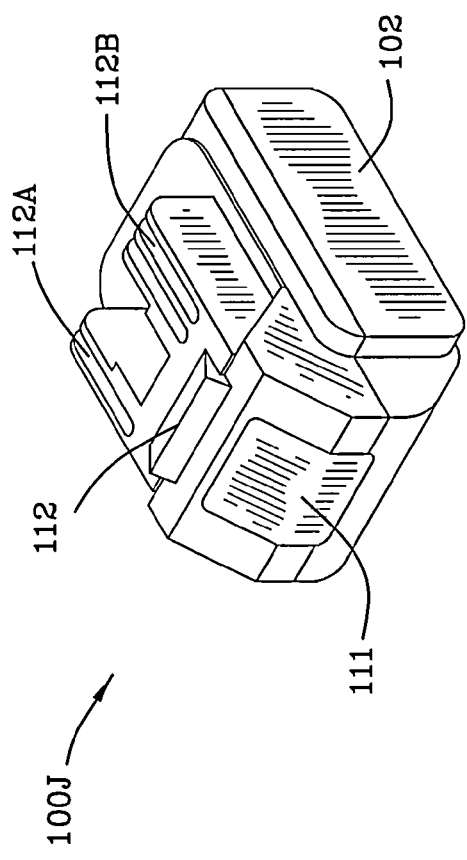
FIG. 1J is a perspective illustration of the removable cartridge energy pack/battery pack illustrated in FIG. 1.
Figure 1L:
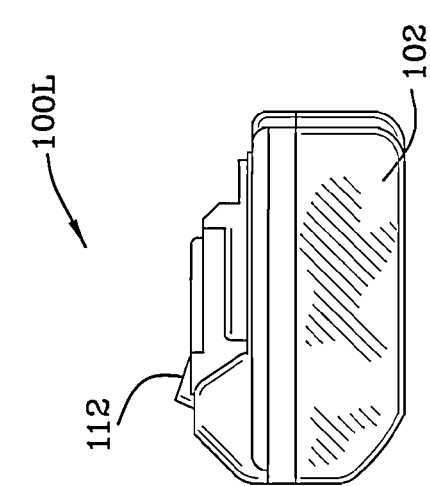
FIG. 1L is a side view of the removable cartridge energy pack/battery pack illustrated in FIG. 1.
Figure 1K:
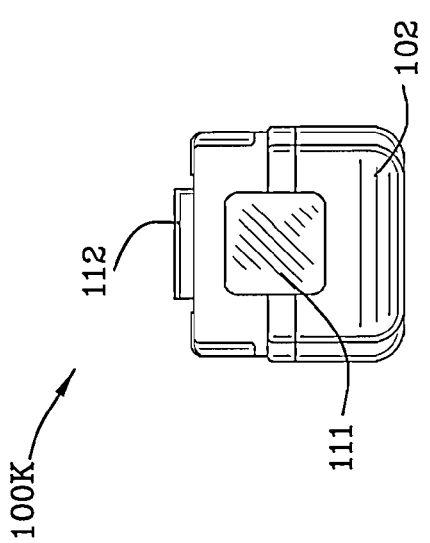
FIG. 1K is a front view of the removable cartridge energy pack/battery pack illustrated in FIG. 1.
Figure 1M:
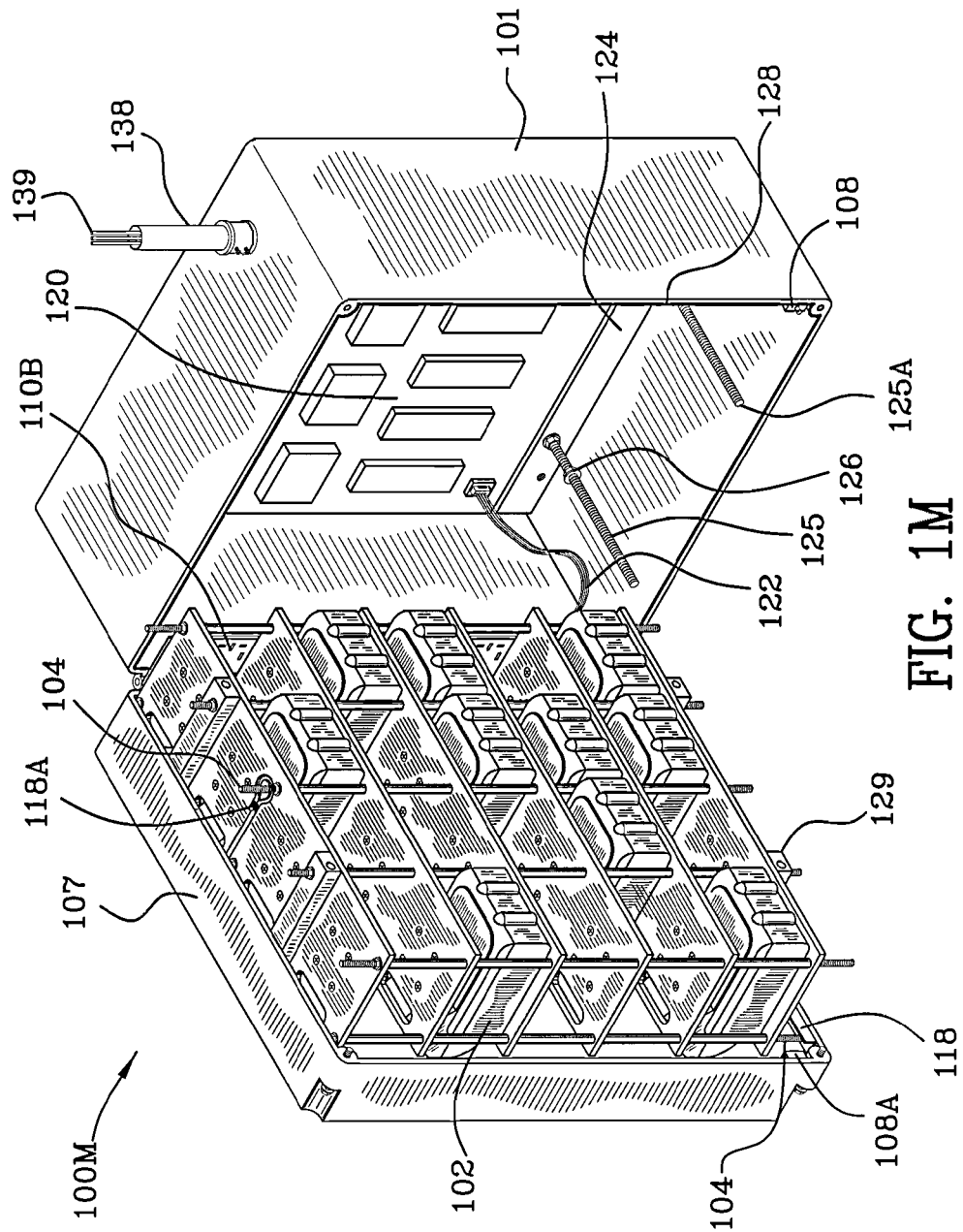
FIG. 1M is a perspective view of the removable cartridge energy pack/battery pack rack removed from the frame of the intelligent power supply device and stored in the door enabling maintenance on the motherboard in the rear of the device.

Still referring to FIGS. 1 and 1A, lip 118 is affixed to door 107 and is used to temporarily store the battery rack as illustrated in FIG. 1M. FIG. 1M a perspective view 100M of the removable cartridge energy pack/battery pack rack removed from the frame 101 of the intelligent power supply device and stored in the door 107 enabling maintenance on the motherboard 120 in the rear of the device. Loop 118A is used in conjunction with one of the threaded interconnecting rods 104 to secure the rack in the door. Lip 118 secures another of the threaded interconnecting rods 104. Door open sensor 108 interacts with block 108A on door 107 to sense the position of the door. Door open sensor 108 is interconnected to the microprocessor as indicated in FIG. 4C. In FIG. 4C the door open sensor is schematically illustrated using reference numeral 491.

Still referring to FIG. 1, wires 139 are illustrated in conduit 138 interconnecting with enclosure 101. Wires 139 include AC and DC inputs and outputs and communication lines. As previously indicated, microprocessor 495 is programmable over an Ethernet connection such that once the intelligent power supply is fixed, for example, to a pole or other bulwark and electrically connected to a network access element such as a wireless access point via its Ethernet connection, it may be re-programmed periodically to carry out different algorithms or operations depending upon the management systems' commands and requirements.

FIG. 1B is a front perspective view 100B of the intelligent power supply device without the rack 100C and without the removable cartridge energy packs 102 in the rack. Motherboard 120 is illustrated schematically in FIG. 1B and includes, but is not limited to: input and output circuitry; the AC/DC converter; the DC/AC inverter; the first, second, third and fourth DC/DC converters; the first, second, third, intermediate and charge DC buses; the microprocessor; interconnections between the microprocessor and the voltage and current sensors on all inputs and outputs; and, interconnections between the microprocessor and temperature sensors located in proximity to the converters.

Referring to FIGS. 4, 4A, 4B and 4C, the microprocessor 495 makes voltage measurements at all places indicated with a "V" having a circle around it. Similarly, the microprocessor 495 makes current measurements at all places indicated with an "I" having a circle around it. Similarly, the microprocessor 495 makes temperature measurements at all places indicated with a "T" having a circle around it. It will be noticed that the temperature measurements are not indicated as being directly engaging any of the converters such as 406 and 414 for example illustrated in FIG. 4. Rather, these temperature measurements are made by sensors on the motherboard in proximity to the device whose temperature is being monitored. The sensors may be thermocouples, thermistors, platinum RTDs, semiconductors (temperature sensor integrated circuits) or any other device which indicates a change in temperature as a function of voltage and/or current. Voltage, current and temperature interfaces (460, 461 and 462) are interposed between the microprocessor and the sensors. The microprocessor 495 may, for example, be a Texas Instruments mixed signal microcontroller capable of analog to digital conversion and digital to analog conversion and many other functions. Many other microprocessors may be used instead of the Texas Instruments mixed signal microcontroller. An onboard and/or external timebase 463 will provide a realtime clock calendar so that time of day and date is known and it will provide a high resolution clock so as to make accurately timed measurements of system operation. Referring to FIG. 1B, a fastening bar 124 is affixed to the enclosure 101. Another fastening bar not shown resides above the motherboard 120. First and second connecting rods 125, 125A are affixed to the fastening bar 124 and extend outwardly therefrom toward the front of the device. Nuts 126 are threaded and secured to the connecting rods 125, 125A to position the rack (generally indicated as 110C) properly within the enclosure 110. Nuts 126 limit the rearward travel of the rack so that the rack does not engage or come too close to the motherboard.

Still referring to FIG. 1B, communication and power wire harness 122 is illustrated as extending from connector 121 to connector 123. Connector 123 joins with connector 121A on the printed battery interface circuit board 110. Alternatively, wire harness 122 may transmit power and communication signals with the individual shelves 103A having battery interface circuits thereon. See, FIG. 1I for the example of the battery interface circuits residing on the shelves 103A. Gasket 128 protects the interior of the enclosure 101 from rain, snow, other forms of moisture such as salt and fresh water spray, dust, insects, and other foreign and possibly degrading matter.

Referring to FIG. 1C shelves 103 having apertures 106 are shown in a stacked relationship separated by hollow tube spacers 105. FIG. 1I is an illustration 100I of one of the shelves 103A of the rack having printed battery interface circuits (140, 141, 142, 143) on and in the shelf underneath the electrical contacts/guides 131, 132. Guides/electrical contacts 131, 132 are "L"-shaped electrically conductive and metallic and are adapted to interfit with the Makita® battery packs 102. Referring to FIG. 1J slots 112A, 112B engage electrical contacts 131, 132 and include battery contacts (not shown) which conduct energy to and from the battery 102. Referring to FIGS. 1D, 1G and 1F it will be noticed that the batteries 102 rest upon one of the shelves 103 and are spaced apart from the next adjacent shelf above the battery. FIG. 1G is an enlargement of a portion 100G of FIG. 1D illustrating one of the removable cartridge energy packs 102 in the rack and illustrating the gap or space 150 between the battery and the shelf A spring loaded lock 112 is illustrated residing in aperture 106 of the shelf in FIGS. 1G and 1H.

Figure 5:
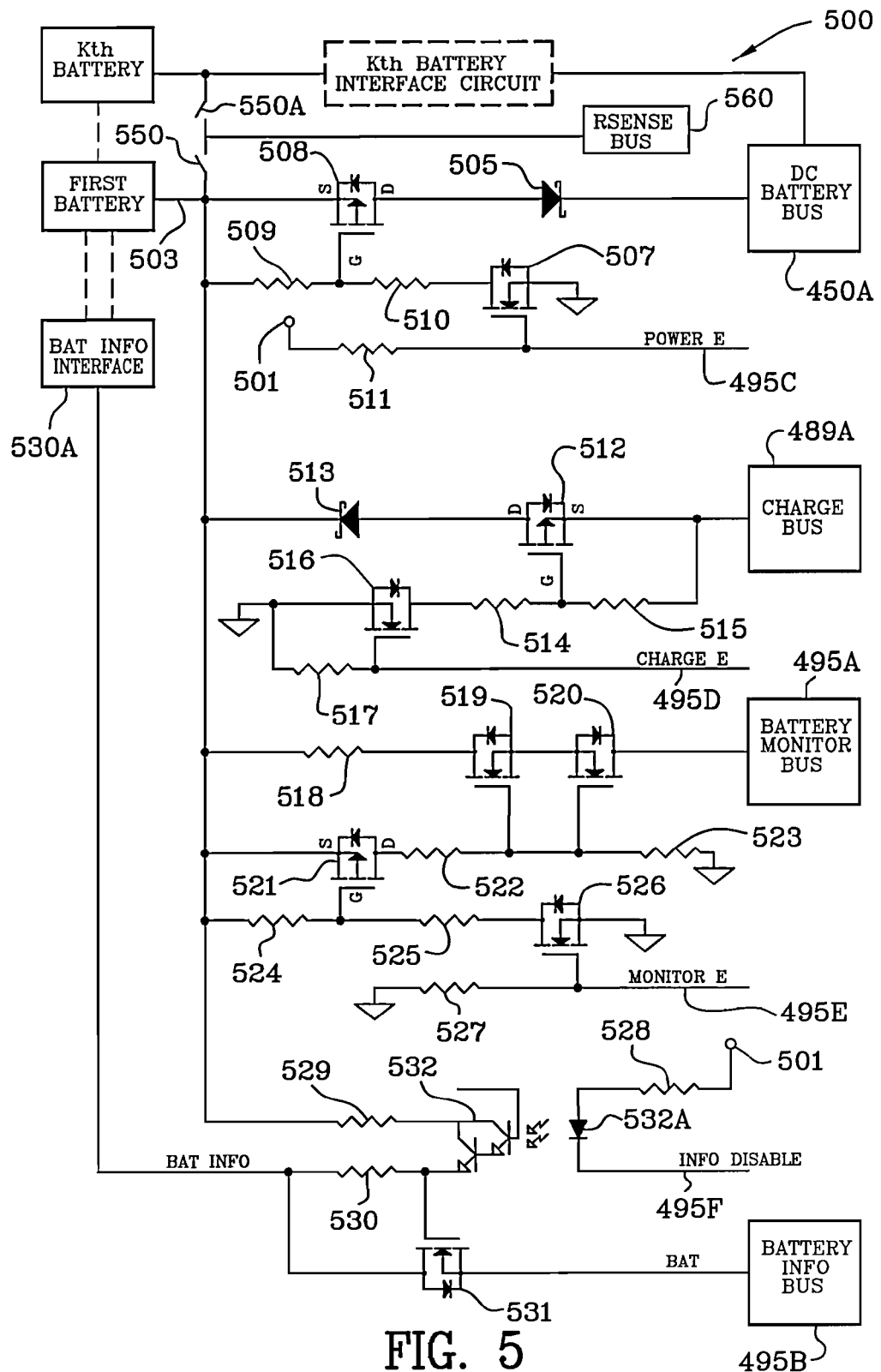
FIG. 5 is a schematic of one individual microprocessor-controlled interface circuit; each individual interface circuit controls one of the removable cartridge energy packs/battery packs and the selective interconnection with the direct current energy pack/battery pack bus, the charge bus, the energy pack/battery pack monitor bus and/or the energy pack/battery pack information bus.

FIGS. 1D-1H illustrate the example wherein wires 149 are used to transmit power from the individual batteries (or other energy source) to the respective battery interface circuit which is located on and in printed circuit board 110 as illustrated in FIGS. 1C, 1D and 1E. In the example illustrated in FIGS. 1C-1F there are 20 battery interface circuits on printed circuit board 110. Another example (not shown) houses the 20 battery interface circuits directly upon motherboard 120 with the individual battery connections made via wires from each battery connector location on each shelf to an appropriate connector associated with the battery interface circuit housed upon the motherboard. FIG. 5 is a schematic 500 of one of the microprocessor-controlled interface circuits; each individual interface circuit controls one of the removable cartridge energy packs/battery packs 102, 202 (see, FIG. 2) and the selective interconnection with the direct current energy pack/battery pack bus 450A, the charge bus 489A, the energy pack/battery pack monitor bus 495A and the energy pack/battery pack information bus 495B.

FIG. 1G is an enlargement of a portion 100G of FIG. 1D illustrating one of the removable cartridge energy packs 102 in the rack. FIG. 1H is an enlargement of a portion 100H of FIG. 1F illustrating one of the removable cartridge energy packs 102 in the rack. When reference is made to FIGS. 1G and 1H, two of the wires referred to by reference numeral 149 are viewed connected to threaded posts 131A and 132A by nuts 131B and 132B. The threaded posts and corresponding nuts also serve the function of securing the electrical contacts against the polycarbonate shelves. Posts 131A, 132A are viewed from above the shelves in FIG. 1C and extend through the shelves and the guides/contacts 131, 132. It will also be noticed from FIG. 1C that an additional screw (unnumbered) is threaded into the guides/contacts to secure them to the polycarbonate shelf. FIGS. 1D and 1E illustrate the example where the temperature sensor 133 is located in proximity to the battery 102 and a wire(s) are connected to the sensor for communication with the battery interface circuit. All of the wires 149 are connected to connectors 151 on the printed circuit board 110. Each shelf as viewed in FIG. 1E includes 4 connectors for communication with the battery interface circuit.

FIG. 1I is an illustration 100I of one of the shelves 103A of the rack having the battery interface circuits on and in shelf underneath the battery contacts/guides. In the example of FIG. 1I, the shelves are made of material suitable for the formation of printed circuits thereon, for example, glass reinforced epoxy resin material. Vertically extending connecting rods 104 run through bores 148 in the shelves 103 and hollow tube spacers 105 separate the shelves from each other. Spacers 105 are stainless steel and sufficiently strong to support the shelves.

Still referring to FIG. 1I, a representative temperature sensor 144 which may be any of those referred to above is located intermediate electrical contacts 131, 132 above the 18VDC Makita® batteries. In this example the temperature sensor is part of the printed circuit board which resides underneath the electrical contacts 131, 132. As stated previously, the Makita® battery 102 is a dual use battery wherein it may also be used in a cordless tool application. Other batteries including user-defined batteries may be used in a wide range of voltages and capacities. Batteries can be charged on board the rack 110C within the power supply or on a separate charger not associated with the power supply device. Alternatively, an entire rack of batteries may be removed from the power supply device and connected to a special purpose external charger designed to charge any and all of the batteries in the rack. Battery power is supplied to bus 450A and reference numeral 147 indicates system common Temperature sensor information is communicated using a battery information bus 495B. A charge bus 489A is interconnected with each battery information circuit (140, 141, 142, 143) printed on the shelf 103A. Battery voltage information is communicated on battery monitoring bus 495A and battery control information is communicated as represented by line 495Z. Reference numeral 495Z represents several discrete control enable and disable channels grouped together in combination. In the example of FIG. 1I, a connector will be employed to communicate with another printed circuit on board 110 which then communicates through connector 121A back to the motherboard. Alternatively, each shelf 103A may communicate directly back to a connector on the motherboard as described above in descriptions pertaining to FIGS. 1D-1H.

Referring to FIGS. 1C, 1D, 1E and 1F, the top-most shelf 103 is held in place against the spacer 105 beneath it by nut 138. Other fasteners may be used to hold the shelves in place. FIG. 1D is a front view 100D of the rack partially populated with the removable cartridge energy packs 102 in the rack. FIG. 1E is a side view 100E of the rack taken along the lines 1E-1E of FIG. 1D. FIG. 1F is a side view 100F of the rack taken along the lines 1F-1F of FIG. 1D. Fastening bars 119 are secured above the top-most shelf 103 and fastening bars 129 are secured beneath the bottom-most shelf. Each of the fastening bars 119, 129 include bores 119A, 129A therethrough for receiving rods 125, 125A which extend from bar 124 affixed to the enclosure 101. Additionally, fastening bars 119, 129 include bores which allow vertical threaded interconnecting rods 104 to pass therethrough. Nuts 138, 139 secure bars 119, 129 to the shelves. With bars 119, 129 secured to the rack and with interconnecting rods 104/spacers 105 secured in place the rack functions as a stable and rigid unit. Bars 119, 129 includes bores 119A, 129A which allow passage of rods 125, 125A therethrough as well as other rods not shown but described herein. Rods 125, 125A protrude from the end of bars 129 as illustrated in FIGS. 1 and 1A and nuts 127 are threaded onto rods 125, 125A to secure the rack firmly in place within the enclosure 101.

Figure 1N:
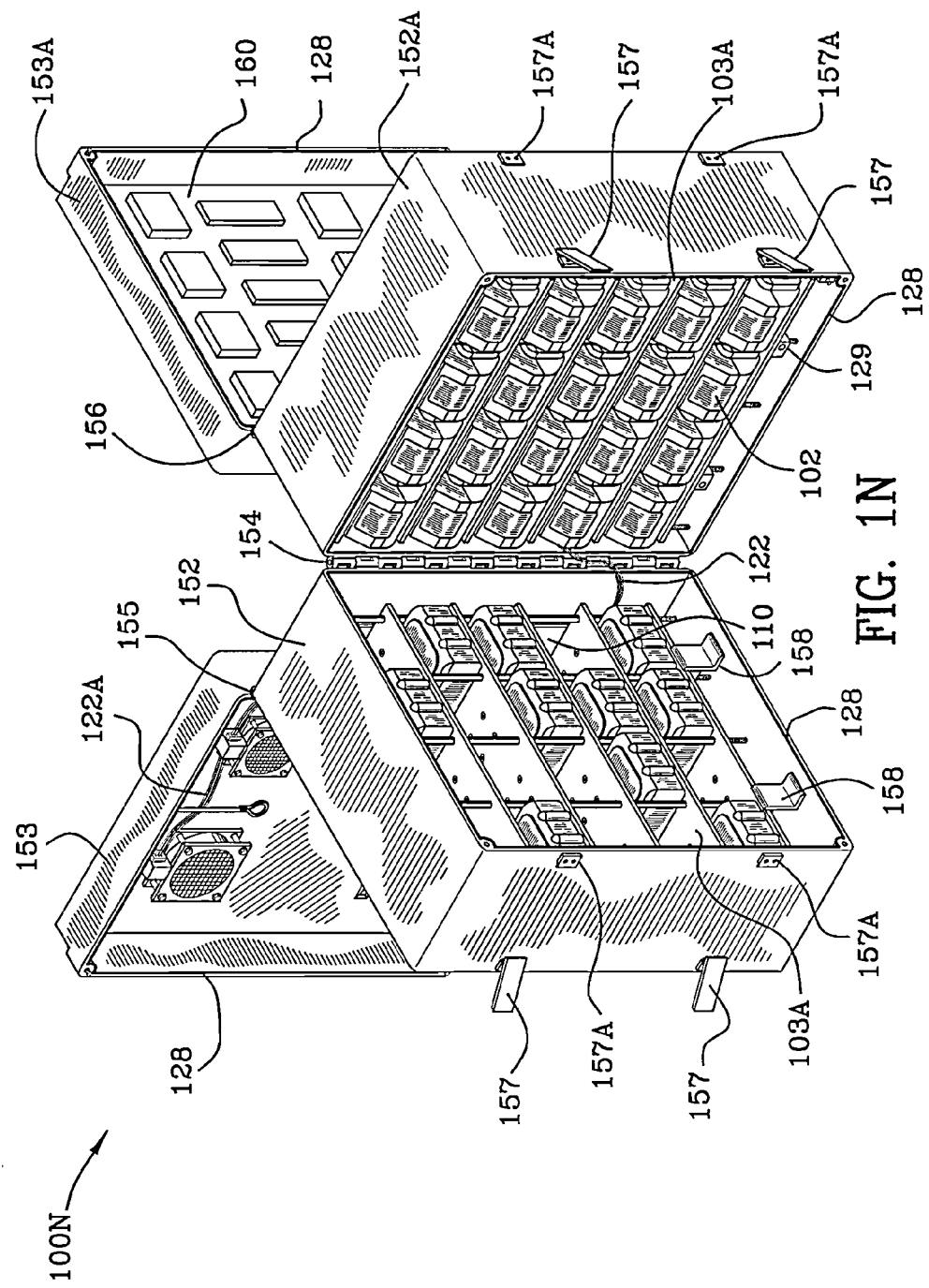
FIG. 1N is a perspective view of a modular intelligent power supply device indicating two frames each holding a removable cartridge energy pack/battery rack, a front cover hinged to one frame and including ventilating fans and ports, and a rear cover hinged to another frame.

FIG. 1N is a perspective view 100N a modular intelligent power supply device having two intermediate frames 152, 152A, each of which houses and holds a rack housing a plurality of removable cartridge energy packs/batteries. A front cover 153 is hinged 155 to the first intermediate frame 152 and includes ventilating fans and ports. The first intermediate frame 152 is hinged 154 to the second intermediate frame 152A. In turn, the second intermediate frame 152A is hinged 156 to the rear cover 153A. Rear cover 163A includes a motherboard 160. When fully populated the modular intelligent power supply device of the example of FIG. 1N provides twice the energy and power of the example illustrated in FIG. 1 fully populated.

FIG. 1N illustrates frame 152 being partially populated and employing shelves 103A having the battery interface circuits printed on the underside thereof. Frame 152 may be partially populated because some of the batteries have been removed for use in other applications such as on a cordless tool. Or, the batteries may have been removed for use in another power supply or they may have been removed to enable charging on a separate stand-alone charger. It will be noted that the modular power supply device may be taken apart for maintenance by simply removing the hinge pin(s) holding the frame of interest. One major advantage of the modular design is that it enables servicing of the motherboard while maintaining (not interrupting) operation of the power supply system.

Figure 2:
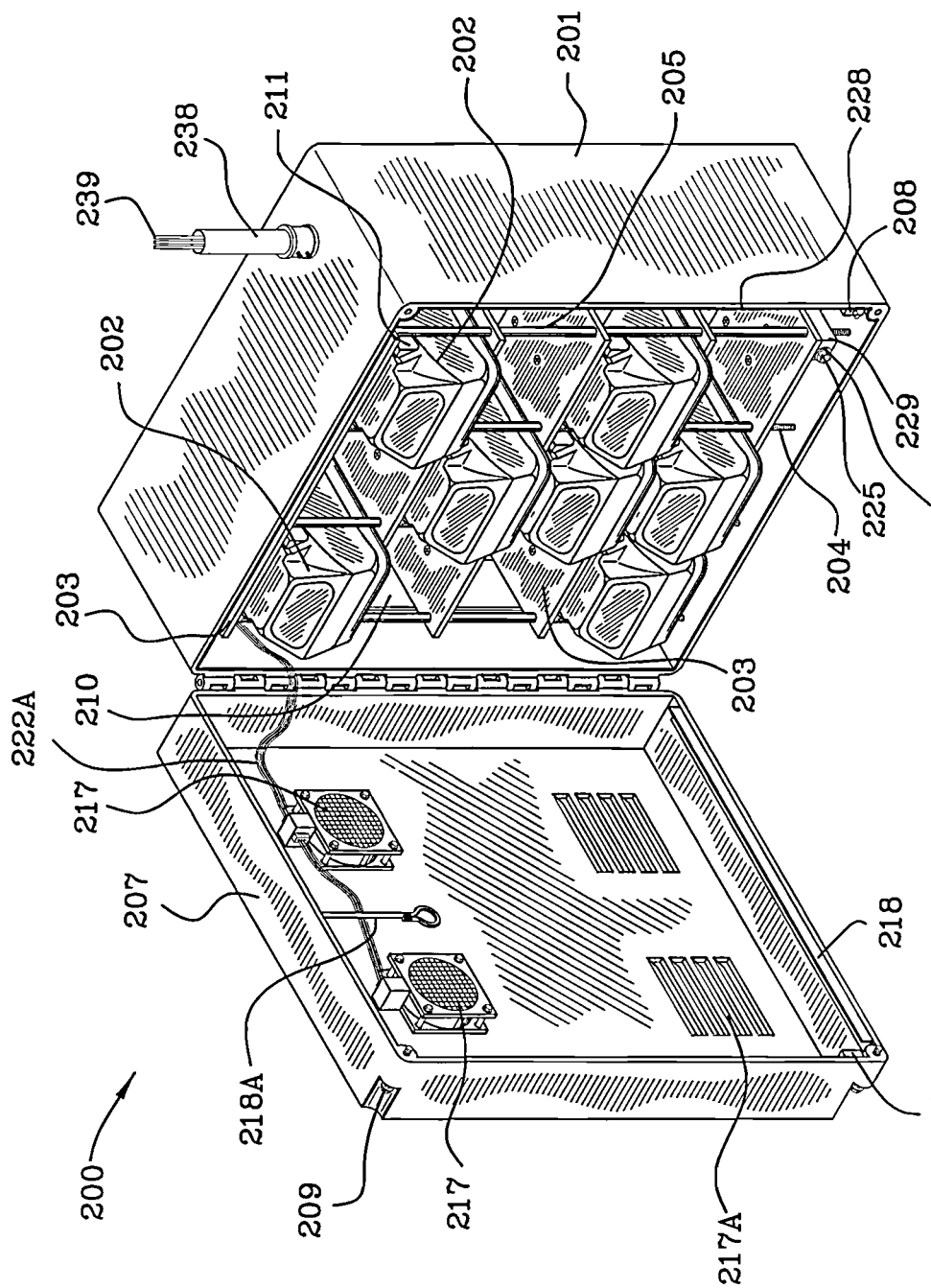
FIG. 2 is a front perspective view of the intelligent power supply device illustrating a plurality of other removable cartridge energy packs in a second rack.

FIG. 2 is a front perspective view 200 of the intelligent power supply device illustrating a plurality of removable cartridge energy packs 202 in a second rack. The other removable cartridge energy packs 202 illustrated are 28 VDC Li-Ion batteries made by Milwaukee®, a registered trademark of Milwaukee Electric Tool Corporation of Brookfield, Wis. The examples of FIG. 1 and FIG. 2 provide approximately the same energy (nominally 1000 Watt-hours) and power (150 Watts) and weigh approximately 50 pounds. The example of FIG. 2 uses 12, 28 VDC Li-ion batteries. The example of FIG. 1N will provide approximately twice the energy (nominally 2000 Watts-hours). Different power levels may be possible in any of the described configurations. A power level of 150 Watts may be useful for powering lighter loads such as mobile wireless routers or wireless access points. A higher power level may be desirable for various transmitter or transceiver communications gear, perhaps 300 to 400 Watts. These and other power levels may be implemented via the use of appropriately sized AC/DC, DC/DC, and DC/AC conversion units within the intelligent power supply. Larger conversion units may require larger space within the power supply. Larger space may be achieved in the modular approaches of FIG. 1 or 1N by simply increasing the depth of the frame containing the motherboard or by increasing the width and height of all frame elements or both. Larger conversion units and higher power levels may also require larger fans and greater cooling capacity. Larger fans can be accommodated easily in any of the described design approaches by increasing the depth of the fan and vent frame or by increasing the width and height of all frames or both. In this way, a very wide range in the amount of backup energy and the power level of the supply can be achieved in appropriately scaled versions of the intelligent power supply.

Again referring to FIG. 1N, any number of intermediate frames may be added to the modular power supply device to achieve the amount of backup energy desired for a given application. In addition to the size of fans and vents being variable, the number of fans and vents may be increased to improve cooling capacity as the number of intermediate frames is increased as well. Power to operate the fans is provided by cabling as indicated by reference numeral 122A. Power supplied to and from the battery racks housed in the intermediate frames is controlled by the battery interface circuits associated with each battery and cable 122 provides transmission of that power to and from the motherboard 160. Cable 122 also transmits control signals from the microprocessor to each battery interface circuit. In the example of FIG. 1N, fastening bars 119, 129 are fastened to each of the intermediate frames by mounts 158 or the like. Buckle type latches 157, 157A may be padlocked for security purposes to prevent the theft of the power supply device or its components. The door open sensor 108 allows the microprocessor to be informed if a door is opened. Using a network connection to a management system the microprocessor can then inform the management entity with a door open event alarm and can differentiate tampering versus bona fide, scheduled service so that management personnel can respond appropriately.

Figure 2A:
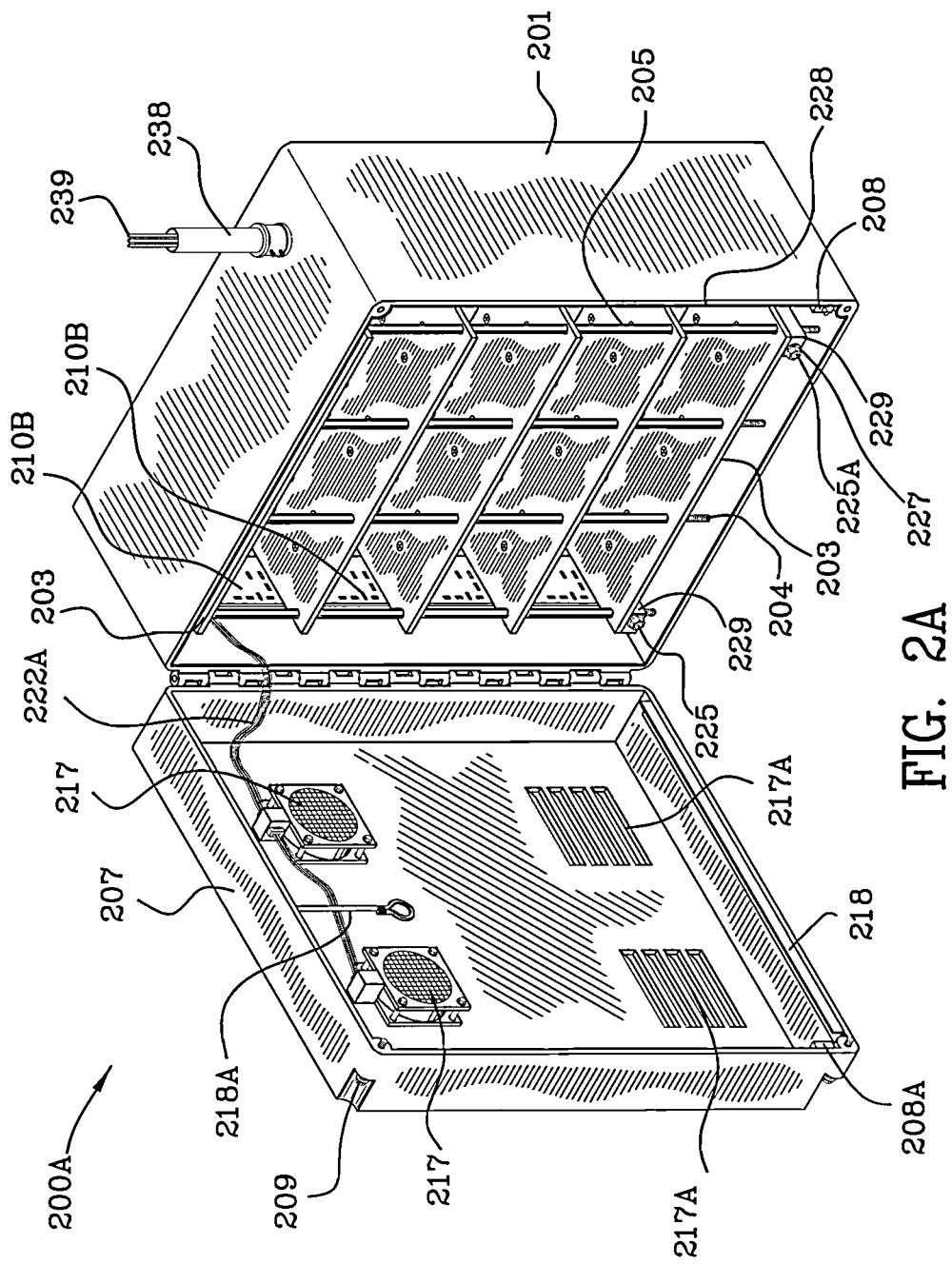
FIG. 2A is a front perspective view of the intelligent power supply device similar to FIG. 2 without the plurality of the other removable cartridge energy packs in the second rack.

FIG. 2A is a front perspective view 200A of the intelligent power supply device similar to FIG. 2 without the plurality of the other removable cartridge energy packs in the second rack. Similar reference numerals will be used in connection with describing the example of FIG. 2. FIG. 2B is a front perspective view 200B of the second rack illustrated in FIGS. 2 and 2A. FIG. 2C is another front perspective view 200C of the second rack illustrated in FIGS. 2 and 2A.

Referring to FIG. 2, 28 VDC removable cartridge type batteries 202 are illustrated in a partially populated rack affixed within enclosure 201. As with the example of FIG. 1 input and output power and communication wires 238 are illustrated entering through an electrical conduit 238. The structural arrangement of the rack as identified generally by reference numerals 200B, 200C is substantially the same as the example of FIG. 1 only modified to accommodate the physically larger batteries 202. Referring to FIGS. 2B-2E, vertical connecting rods 204 pass through bores in shelves 203. Spacers 205 reside over the vertical connecting rods 204 and support and separate the shelves 203 from each other. Spacers 205 have a diameter larger than the diameter of the bars in the shelves 203. Fastener bars 219, 229 include bores 219A, 229A therethrough for interconnection with rods 225, 225A for affixing the rack to the enclosure. Nuts 227 interengage the rods 225, 225A and secure the rack to the enclosure 201. There are additional bores through the fastener bars 219, 219A for interconnection with the vertically extending connecting rods 204. The fastener bars 219, 219A are mounted above the top shelf and below the bottom shelf as illustrated. Rods 204 are threaded and in conjunction with nuts 238 and 239 provide a secure and stable rack which can be handled without twisting and bending.

Door 207 operates to enable maintenance of the rack and the removal of the batteries 202. The rack can be stored over lip 218 by using loop 218A to secure same and to enable maintenance on the motherboard. Fans 217, power cable 222A, vents 217A, door open switch 208A, and block 208 operate as was explained above in connection with similar components in FIG. 1. Gasket 228 keeps unwanted rain and snow out of enclosure 201 and closure means 209 locks the door 207 to the enclosure.

Referring to FIG. 2A et seq. printed battery interface circuit board 210B is illustrated. Reference numeral 210 is used to generally indicate the battery interface circuit and it will be apparent to those of ordinary skill in the art that the printed battery interface circuits (one for each battery) may reside on either the inboard side or the outboard side of the board 210. Connector 221A and an unnumbered cable are used to transmit power and control signals between the battery interface circuits and the motherboard. Additional motherboard connectors are used if additional racks of batteries in additional frames are employed.

FIG. 2D is a front view 200D of the second rack partially populated with the removable cartridge energy packs 202 in the second rack. FIG. 2E is a side view 200E of the second rack taken along the lines 2E-2E of FIG. 2D. FIG. 2F is a side view 200F of the second rack taken along the lines 2F-2F of FIG. 2D.

FIG. 2G is an enlargement of a portion 200G of FIG. 2D illustrating one of the removable cartridge energy packs 202 in the second rack. FIG. 2H is an enlargement of a portion 200H of FIG. 2F illustrating one of the removable cartridge energy packs in the second rack. Battery 202 interconnects with a Milwaukee® connector 231 and is spaced above the shelf 203 as indicated by the reference numeral 250. The Milwaukee® 28 VDC battery 202 includes a locking mechanism 211 which coacts with connector 231 to ensure that batteries are not unintentionally removed from the rack. The Milwaukee® connector includes two lips 230, 231 which support battery 202 above the shelf 203. Connector 231 is secured to the underside of shelf 203 with screws 231A, 232A as is best illustrated in FIGS. 2B and 2C.

Figure 2I:
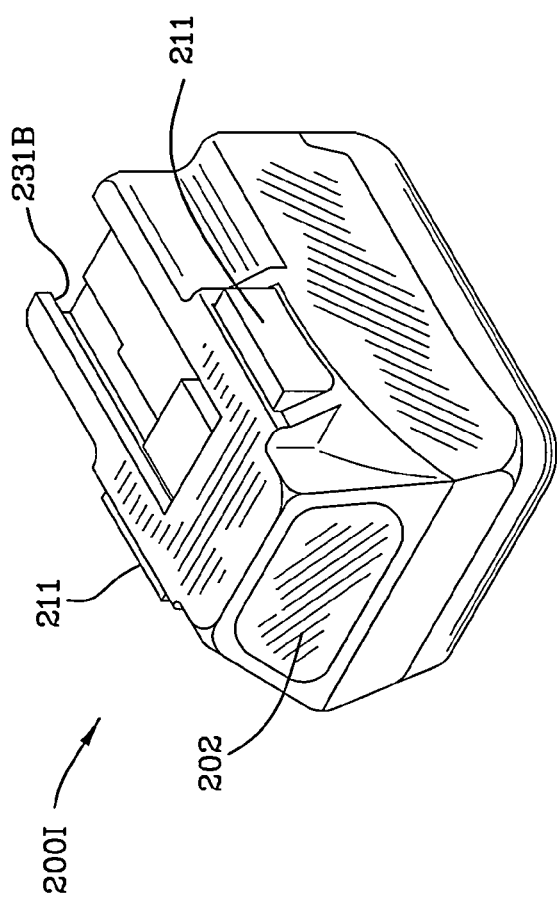
FIG. 2I is a perspective illustration of the removable cartridge energy pack/battery pack illustrated in FIG. 2.
Figure 2K:
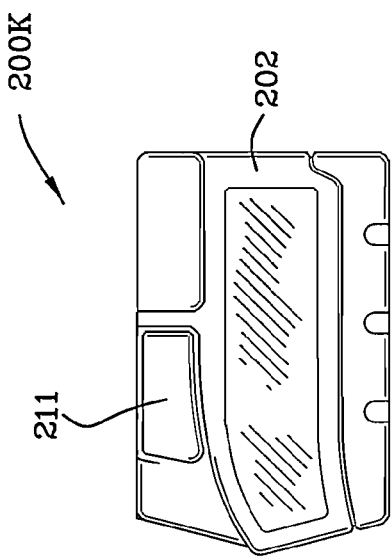
FIG. 2K is a side view of the removable cartridge energy pack/battery pack illustrated in FIG. 2.
Figure 2J:
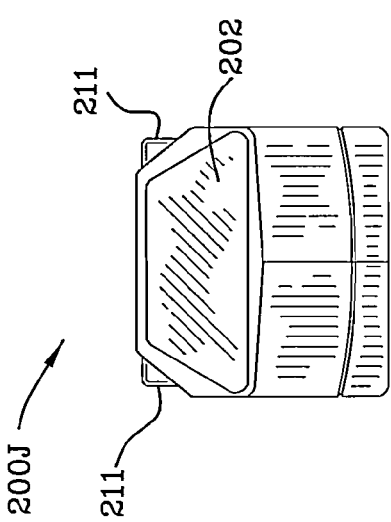
FIG. 2J is a front view of the removable cartridge energy pack/battery pack illustrated in FIG. 2.

FIG. 2I is a perspective illustration 200I of the removable cartridge energy pack/battery pack 202 illustrated in FIG. 2. FIG. 2I illustrates a groove 231B which coacts with the lips on the connector 231 illustrated in FIG. 2G. FIG. 2J is a front view 200J of the removable cartridge energy pack/battery pack 202 illustrated in FIG. 2. FIG. 2K is a side view 200K of the removable cartridge energy pack/battery pack 202 illustrated in FIG. 2.

Figure 2L:
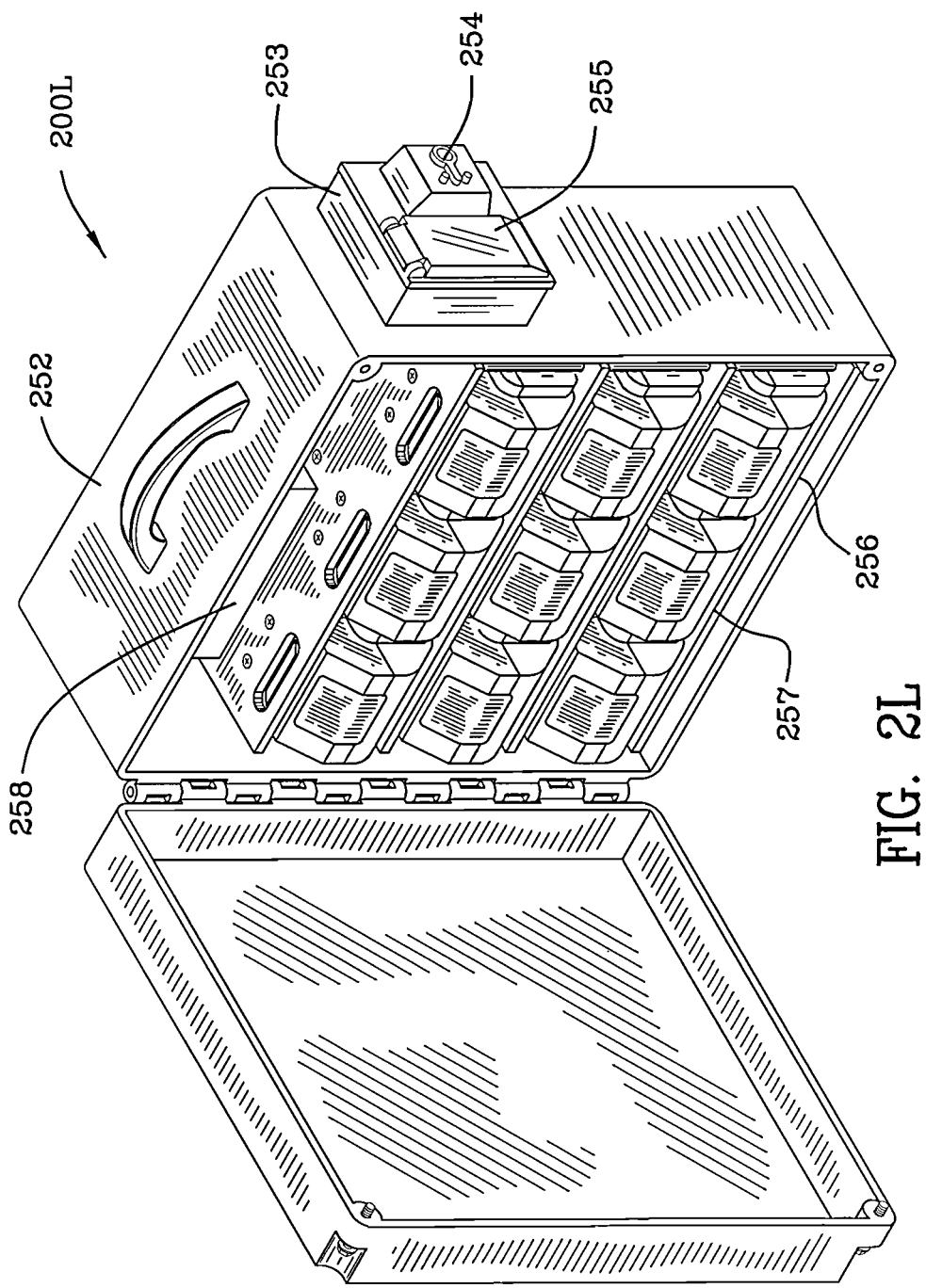
FIG. 2L is an example of a power supply which includes a three by three battery array mounted in the rack along with receptacles and an on-off switch.

FIG. 2L is an example 200L of a power supply which includes a three by three battery array 257 mounted in the rack 256 enclosed in weatherproof cabinet 252 along with receptacles 255 and on-off switch 254 enclosed in weatherproof electrical box 253. Electronics are indicated with reference numeral 258.

In addition to the battery packs referenced above supplied by Makita® and Milwaukee®, other commercially available battery packs from other application markets are anticipated and useable as backup energy sources within the power supply. An example of such a battery pack would be the Digital DIONIC 160® power system offered by Anton Bauer, Inc. of Shelton, Conn. In any case, a shelf arrangement as depicted in FIG. 1 and FIG. 2 for specific battery pack types would be further adapted to enable use of the Anton Bauer® or any other cartridge style energy pack.

FIG. 5 is a schematic 500 of one of the microprocessor-controlled battery interface circuits. An interface circuit controls one of the removable cartridge energy packs/battery packs 102, 202 and the selective interconnection with the direct current energy pack/battery pack bus 450A, the charge bus 489A, the energy pack/battery pack monitor bus 495A and the energy pack/battery pack information bus 495B.

Still referring to FIG. 5, the microprocessor 495 multiplexes voltage signals from the battery monitor bus 495A and, as explained previously, is capable of converting analog to digital signals. The microprocessor enables 495E the voltage monitoring of each of K batteries in the system according to clocked signals (i.e., the timebase 463, see, FIG. 4C). The battery monitor bus is isolated from the battery output/input 503 by two N-channel MOSFETs 519, 520. The monitor enable 495E applies voltage across resistor 527 to the gate of N-channel MOSFET 526 which, in turn, divides the battery voltage across resistor 525 in proportion to the combined resistance of resistors 524 and 525 and applies that voltage to the gate of P-channel MOSFET 521. P-channel MOSFET 521 then allows conduction of current through resistors 522 and 523 dividing the voltage across resistor 523 in proportion to the combined resistance of resistors 522 and 523 and applies that voltage to the gate of N-channel MOSFETs 519, 520 enabling the voltage to be measured and sampled by the microprocessor 495. One exemplary P-channel MOSFET which may be used is P channel Metal Oxide Semiconductor Field Effect Transistor (MOSFET) made by International Rectifier. One exemplary N-channel MOSFET which may be used is N-channel Metal Oxide Semiconductor Field Effect Transistor made by Vishay Intertechnology, Inc. Other N-channel and P-channel MOSFETs may be used depending on the specific application.

Still referring to FIG. 5, the microprocessor 495 generates a charge enable 495D voltage across resistor 517 which drives the gate of N-channel MOSFET 516 which divides the charge bus 489A voltage across resistor 514 in proportion to the combined resistance of resistors 514 and 515 which in turn enables P-channel MOSFET 512 allowing the application of charge bus current to the battery 102, 202 by way of battery output/input 503. Charge bus 489A is isolated from the battery output/input 503 by a diode. A representative diode which may be used is a Schottky Diode such as a 10 A Dual Low Vf Schottky Barrier Rectifier made by Diodes Incorporated. Wherever such Schottky Diode applications arise within the intelligent power supply, one may substitute an active diode oring circuit. This type of circuit prevents reverse current flow in the same way such flow is blocked by the diode. It has the further advantages of allowing forward current flow with a forward voltage drop which is substantially less than the diode. The active oring approach therefore provides diode functionality with reduced cost in terms of system power. One exemplary implementation of the active oring alternative is based upon a control IC such as International Rectifier's IR5001s used in conjunction with an appropriate N-channel MOSFET.

Still referring to FIG. 5, the microprocessor 495 multiplexes battery information signals from the battery information bus 495B and, as explained previously, is capable of converting analog to digital signals. Reference numeral 501 indicates a voltage applied by a voltage regulator 497A. The microprocessor de-asserts an information disable signal 495F allowing current to flow through resistor 528 and a light emitting diode 532A coupling the output of battery 102, 202 across resistor 530 in proportion to the resistance of 530 in proportion to the combined resistance of resistors 529 and 530 which drives the gate of N-channel MOSFET 531 effectively connecting the battery information bus 495B with a battery information interface 530A to the effect of sensing one or more parameters about the battery such as temperature. The battery information interface may, for example, be a temperature sensor such as that denoted earlier by reference numerals 133, 144. Alternatively, the battery information interface may provide access to a more or less complex communications protocol supported by a particular type of battery or energy pack, such protocol being based upon analog or digital modulated or un-modulated physical signaling mechanisms in conjunction with protocol software used to achieve higher levels of logical communications between the microcontroller of the intelligent power supply and a peer process or controller within the battery or energy pack. This approach allows a very wide range of information exchange including status information from the energy pack as well as control and command information to the energy pack to be communicated. One known example of a communications protocol used in the exchange of information with batteries is the SMBus. SMBus is the System Management Bus defined by Intel® Corporation in 1995. SMBus or other possible protocols may require multiple signals (e.g. clock and data signals). Although only one interface signal 531 is depicted in FIG. 5 it is intended that the battery information bus 495B may be multiple signals in width and that additional switches will be included as required to multiplex additional info bus signals when they are used.

In addition to the obvious benefits of accessing battery information via the battery information bus 495B, the possibility to implement security and anti-theft functions are also important. In on scheme, energy packs (battery packs) would be disabled and unusable whenever they are outside of and independent of the power supply system. Using information secret to each power supply, and communicating via the battery information bus 495B, the power supply would selectively enable such energy packs only upon their insertion and recognition by the system. This would effectively thwart any motivation for theft of such packs (since they become useless once removed). Along similar lines, when the system detects that a pack or packs have been removed as evidenced either by voltage deficiency at the respective location on the battery monitor bus 495A or cessation of communications at the respective location on the battery information bus 495B, the power supply can note such removals and report same as an alarm or information event to its network management entities. Finally, the insertion of unauthorized or counterfeit packs may similarly be detected and reported.

Still referring to FIG. 5, reference numeral 501 is a voltage source from the voltage regulator 497A and the microprocessor 495 generates a power enable 495C voltage across resistor 511 voltage to drive the gate of N-channel MOSFET 507 allowing the division of battery voltage across resistor 510 in proportion to the sum of the resistance of resistor 509 and resistor 510. The divided voltage is applied to the gate of P-channel MOSFET 508 permitting conduction of current from the battery output/input 503 to the direct current battery bus 450A. In general, the switching circuit just described using MOSFETs 507 and 508 in conjunction with various resistors, voltage sources, and control signals is representative of one implementation for switching functions depicted in other parts of the figures such as elements 413 and 425 in FIG. 4 and even elements 550 and 550A in FIG. 5 itself Diode 505 permits forward current in the direction of the dc battery bus only and could be implemented at least using either the Schottky Diode or active oring circuits mentioned previously in conjunction with the discussion surrounding charge bus 489A.

Still referring to FIG. 5, a switch 550 is schematically indicated as interconnected with Rsense bus 560. A Kth battery interface circuit is illustrated as being connected to the DC Battery Bus 450A to emphasize that there are K battery interface circuits. The Kth battery is also interconnected via switch 550A to Rsense bus 560.

The structure and function disclosed herein can be used in automobiles and other vehicles. Specifically, the structure and function of the instant invention can monitor the performance of a Lithium-ion powered automobile to determine the performance of individual battery packs or individual battery cells within the packs. This enables the clusters or groups of Lithium ion batteries to be used in a vehicle such that these clusters operate and function as a "gas" tank or more appropriately as an "energy" tank. The microprocessor used herein notifies the driver of the status of his energy tank thus informing the driver that it is time to refuel. The driver then stops at a service station where one or more of his battery packs is removed from his vehicle and exchanged with freshly charged battery packs or groups or clusters of battery packs. The driver is given credit for the energy stored within his packs or clusters or groups of battery packs. In this way operation of battery powered electric vehicles becomes just like operation of a gasoline driven vehicle.

All of the switching (selectively coupling) performed by the battery interface circuits is programmable with respect to operation of the rack of batteries and also with respect to other system inputs and outputs.

Figure 7:
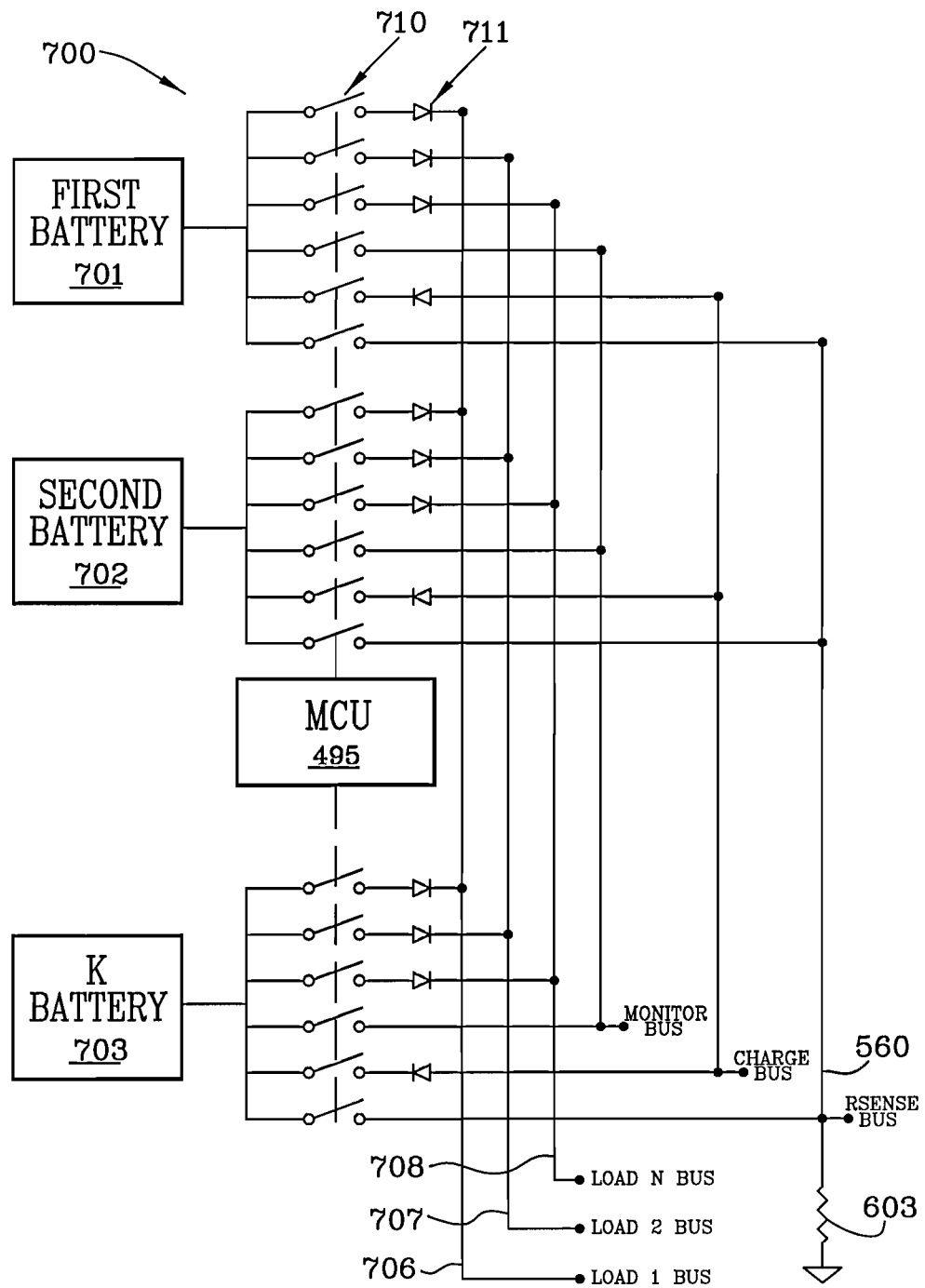
FIG. 7 is a schematic illustrating up to K removable cartridge energy packs/battery packs selectively interconnected with N load buses, a sense resistor bus, a charge bus and a monitor bus.

FIG. 7 is a schematic 700 illustrating up to K removable cartridge energy packs/battery packs 701, 702, 703 selectively interconnected with N load buses 706, 707, 708, a sense resistor 603, an Rsense bus 560, a charge bus 489A and a monitor bus 495A. A plurality of switches 710 are shown each of which is controlled by microprocessor 495. MCU 495 receives inputs as described previously in connection with FIG. 5 and also receives inputs as indicated schematically in connection with FIGS. 4, 4A, 4B and 4C including voltage, current, and temperature inputs. FIG. 7 also illustrates diodes 711 to inhibit reverse current flow with respect to each load bus 706, 707, 708 and the charge bus 489A. The load buses 706, 707, 708 may be selectively disconnected from the load by the microprocessor.

Figure 6:
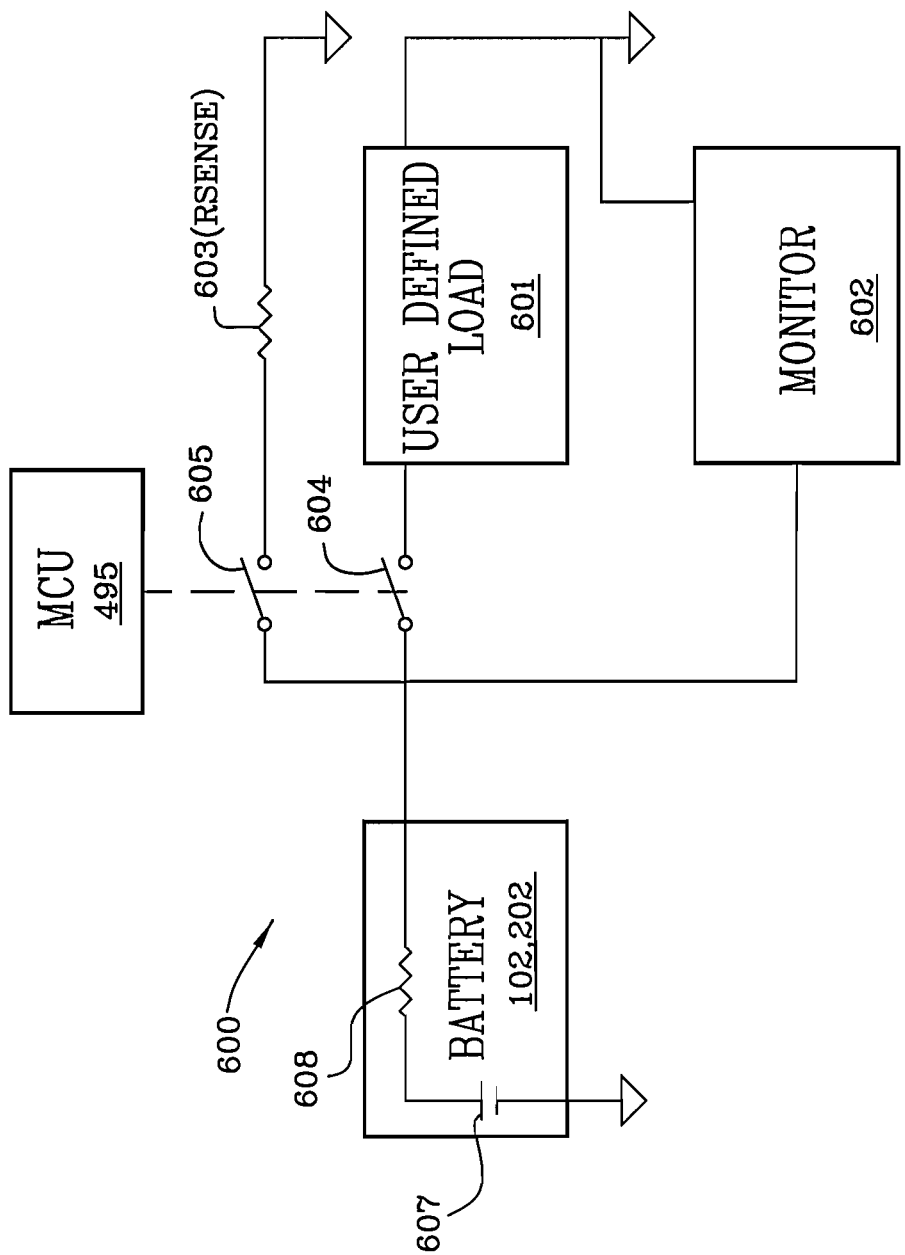
FIG. 6 is a schematic illustration for obtaining load and removable cartridge energy pack/battery pack information for use by the microprocessor with the load continuously connected to the removable cartridge energy pack/battery pack and with the load disconnected from the removable cartridge energy pack/battery pack.

FIG. 6 is a schematic 600 for obtaining load and removable cartridge energy pack/battery pack 102, 202 information for use by the microprocessor 495. Battery 102, 202 includes an energy source Vbat 607 and an internal resistance Re 608. Monitor 602 measures the terminal output voltage across the battery 102, 202. The battery 102, 202 is selectively interconnected (coupled) by switch 604 with a user defined load or loads 601 and is also selectively interconnected (coupled) by switch 605 with a sense resistor 603 of known resistance.

Still referring to FIG. 6, three measurement processes are implemented. In the first process or first algorithm, the battery 102 is selectively connected to and disconnected from the user defined load 601 using switch 604. Voltage measurements are made by the voltage monitor 602 with switch 604 closed to obtain the voltage across the user defined load (Vcc-voltage closed circuit user defined load) and with the switch open to obtain the terminal output voltage across the battery 102 (Voc, voltage open circuit). In this process switch 605 disconnects sense resistor 603 from the battery 102 at all times.

Still referring to FIG. 6, in the second process or second algorithm, the user defined load 601 is selectively disconnected by switch 604 from the battery 102 while voltage measures are being taken. Voltage measurements are made by the voltage monitor 602 with switch 605 closed (Vcc-sr, voltage closed circuit-sense resistor) and voltage measurements are made by the voltage monitor 602 with the switch 605 open (Voc, voltage open circuit).

Still referring to FIG. 6, in the third process or third algorithm, the user defined load 601 is selectively connected to the battery by switch 604 at all times. Switch 605 is selectively connected to and disconnected from the sense resistor 603 using switch 605. Voltage measurements are made across the sense resistor 603 in parallel with the user defined load Vcc (sr||ul)(voltage closed circuit, sense resistor||user defined load) when the switch 605 is closed. Voltage measurements are also made across the user defined load Vcc(ul) (voltage closed circuit-user defined load) when switch 605 is open.

In the first and second algorithms the closed circuit current, for example, the load current (Icc) may be obtained by:

$$Vload = Vbat - Vrbat \quad (1)$$

where Vload=Vcc(ul) (voltage closed circuit-user defined load) or where Vload=Vcc(sr) (voltage closed circuit-sense resistor) and Vrbat is the voltage drop across Re during the condition when Vload is established, and where Vbat=Voc, substituting $$Voc - Vcc = Vrbat \quad (2)$$

assuming Rbat (Re) is known, dividing $$Vrbat/Rbat = Icc \quad (3)$$

Alternatively, assuming the load current, Iload, whether it be through the user defined load (ul) or the sensor resistor load (sr), is known, then $$Re = (Voc - Vcc(ul))/Iload \text{ or}, Re = (Voc - Vcc(sr))/Iload \quad (4)$$

In the third algorithm, Rbat (Re) and Rsense (Rs) are known from prior determination. We measure Vcc(ul) (voltage closed circuit-user defined load) and Vcc(sr||ul) (voltage closed circuit, sense resistor user defined load). Icc(ul) (current through the user defined load) is determined as follows:

$$Vcc(ul) = Vbat * Rload/(Rload + Rbat) \quad (5)$$

and, $$Vcc(ul||sr) = Vbat * (Rload||Rsense)/((Rload||Rsense) + Rbat), \text{ where} \quad (6)$$

$$Rload||Rsense = Rload * Rsense/(Rload + Rsense), \text{ solving for } Rload \quad (7)$$

$$Rload = Rbat * (Vcc(ul) - Vcc(sr||ul))/[Vcc(sr||ul)(1 + Rbat/Rsense) - Vcc(ul)], \quad (8)$$

and, once Rload is known then the current through the load and the battery can be determined by dividing Vcc(ul)/Rload=Iload.

The current through the parallel combination of Rsense and Rload can be calculated by:

$$Icc(ul||sr) = Vcc(ul||sr)/(Road * Rsense/(Road + Rsense)) \quad (9)$$

In the third algorithm, if the load current, Iload, through Rload is known by measurement, then Rload can be calculated by:

$$Vcc(ul)/Icc(ul) = Rload, \quad (10)$$

and once Rload is known, then Rbat=Re can be calculated from equation 8 if Vcc(ul), Vcc(sr||ul) and Rsense are known.

If the current through the user defined load is known and if the internal resistance of the battery, Re, is known then a calculation of the voltage drop across the internal resistance of the battery can be made. Batteries, and in particular Li-Ion batteries, may be damaged if they are operated below a critical voltage which inferentially indicates that the state of charge is too low. Current flow through the battery, therefore, provides valuable information about the battery enabling the user or system to decide whether a measured terminal voltage is due to a high load or is due to a low state of charge operation. Li-Ion batteries which are drained below a protective state of charge may be permanently damaged. Therefore, the microprocessor may selectively disconnect a particular back-up battery if its state of charge is too low. The microprocessor may decide to charge the particular battery if its state of charge is approaching a critical value or the microprocessor may supply charge current which is summed with the current available from the particular battery of interest and continue the contribution (albeit diminished now by the amount of the added charge current) of that battery as an energy source.

If the discharge current through the load, Iload, is known or if the charge current into a battery, Icharge, is known by a current measuring device then Re can be determined as indicated above. Re is important because it varies as a function of temperature, age, and other conditions of the battery and may indicate trouble with or end of life for the battery. Therefore, the microprocessor may selectively disable a particular back-up battery depending on a calculated Re, or the microprocessor may signal an alarm event to inform the network management entity of the inferred problem with a particular battery. An intermediate possibility exists wherein the microprocessor deploys or uses (connects to loads) each battery with a duty cycle proportional in some predictable way to the inferred health of each battery. For example, an older failing battery will be used seldom (but not go completely unused) compared to a brand new battery having maximal energy which will be used often and preferentially. In this way, for a given population of K batteries in the system, the microprocessor may proceed to deploy these batteries in such a way that tends to equalize the health or electrical status of all. Another valuable function of the system rests on the microprocessor's ability, via the measurements of voltage, current, and temperature, to estimate the absolute capacity of each particular battery or energy source during a discharge followed by a charge cycle. The microprocessor can connect a particular battery to a load until such time as its state of charge is seen to be approaching 0% (fully discharged). From that point, the microprocessor can disconnect said battery from the load and connect said battery to the charge bus. The microprocessor can monitor the current over the time of charge of the particular battery until an appropriate charge termination event such as a voltage or temperature event indicates completion of charge and arrival by the battery at the 100% state of charge level. The record of current multiplied by time increment during the charge cycle then indicates the electric charge imparted to the battery in the transformation from 0% to 100% state of charge. In the case of a coulombic efficient battery chemistry such as lithium-ion, the charge transferred will rather directly reflect the charge capacity at 100% state of charge. This capacity compared to the corresponding capacity of a new, unused battery will in turn reflect the age or conversely remaining useful life of the battery. For example, when the battery charge capacity at 100% state of charge falls below 50% or the new charge capacity, the battery may be nearing the end of its useful life. In other cases where the chemistry is not 100% charge efficient, the 100% state of charge energy will nonetheless provide insight and inference into the state of health of the battery. As mentioned earlier, in either case whether the battery chemistry is charge efficient or not, estimation of the inherent resistance of the battery (Re) in light of the prevailing temperature of the battery will also provide valuable inference into the state of health of the battery.

Figure 4:
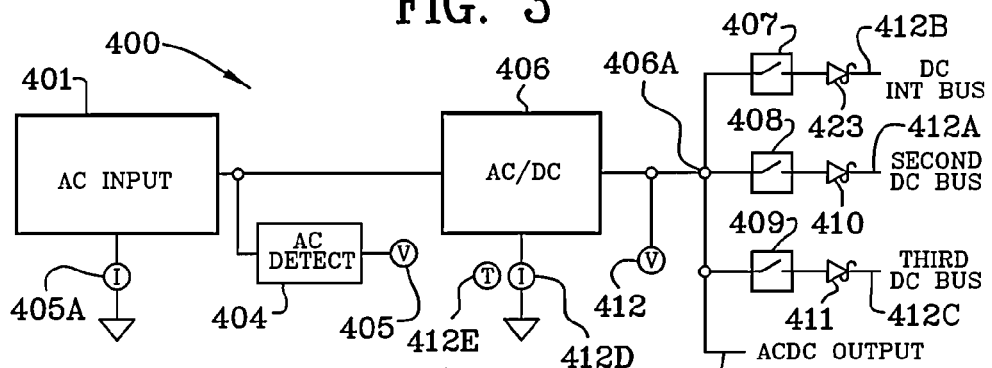
FIG. 4 is a schematic illustrating: an alternating current input converted to a direct current which is selectively switched to interconnect with a direct current intermediate bus and/or a second direct current bus and/or a third direct current bus; the direct current intermediate bus being selectively interconnected to a direct current to alternating current converter providing an alternating current output and/or the direct current intermediate bus is selectively interconnected to a first direct current output and/or the direct current intermediate bus is selectively interconnected to a third direct current to direct current converter to provide second and third direct current outputs.

FIG. 4 is a schematic 400 illustrating an alternating current input 401 converted to a direct current by an AC/DC converter 406. The output 406A of the converter 406 is selectively switched by switch 407 to interconnect with a direct current intermediate bus 412B and/or is selectively switched by switch 408 to a second direct current bus 412A and/or is selectively switched to a third direct current bus 412C by switch 409. Output 406A of the converter is coupled via connection 403 to the MCU 495 (see, FIG. 4C).

All of the elements indicated and described on FIGS. 4, 4A, 4B and 4C are mounted on the motherboard (printed circuit board). All of the elements are scalable. For instance, one example of the system may provide 1000 Watt-hours of energy and can supply power nominally at 150 Watts. Another example may supply 4000 Watt-hours of energy and can supply power at 800 Watts, etc.

Still referring to FIG. 4, diode 423 ensures that current flows from the output of the AC/DC converter to the direct current intermediate bus 412B but not the reverse. Diodes 410 and 411 similarly ensure that current flows from the output of the AC/DC converter to the second direct current bus 412A and the third direct current bus 412C, respectively, but inhibits its flow in the reverse direction. The AC input is converted using AC detect 404 into a direct current voltage to which microprocessor 495 is selectively coupled to measure allowing the voltage 405 of the AC input to be thereby estimated. Current flowing through the AC input 401 is sensed by a current detector and microprocessor 495 is selectively coupled to measure the current 405A. The output 406A of the AC/DC converter is selectively coupled to the microprocessor to measure the voltage 412.

The AC/DC converter may for example be a 150 Watt enclosed single out switcher capable of accepting 85-264 VAC input with a 24 VDC output, manufactured by Cosel. Other AC/DC converters may be used which are capable of converting a larger or smaller VAC input and are capable of producing much higher or lower VDC outputs at much higher or lower wattage. Virtually any AC input may be accepted by the power supply device and converter with a properly selected converter.

Still referring to FIG. 4, the current output of the AC/DC converter 406 is sensed and selectively coupled to the microprocessor to measure the current 412D. A temperature sensor may be located on the motherboard in proximity to the AC/DC converter and is selectively coupled with the microprocessor to measure the temperature 412E.

The direct current bus may operate over a wide range of voltages and currents as determined by user specifications and the requirements of a particular application. Typical voltages of the direct current intermediate bus 412 are expected to be in the 12-30VDC range to enable supply of the intermediate bus not only from an AC/DC converter but also from back-up energy sources such as removable cartridge direct current batteries which may or may not be dual purpose batteries.

Still referring to FIG. 4, the direct current intermediate bus 412B is selectively interconnected by switch 413 to a direct current to alternating current converter 414 providing an alternating current output 417 and/or the direct current intermediate bus 412B is selectively coupled by switch 425 to a first direct current output 421 and/or the direct current intermediate bus is selectively coupled via switch 425A to a third direct current to direct current converter 427 to provide second 426 and third 428 direct current outputs. Voltage output 424, current output 424A and temperature 424B of the direct current to direct current converter 427 are monitored by the microprocessor. The input voltage 419 to the direct current to alternating current converter is monitored by the microprocessor 495. The alternating current output voltage 416 of converter 414 is converted by detector 415 and monitored by the microprocessor, as is the output current 416A. Temperature 416B of the direct current to alternating current converter 414 is also monitored by the microprocessor. The voltage 420 and current 420A of the first 421 direct current output are monitored by microprocessor 495.

The direct current to direct current converters may, for example be 10-32 VDC converters supplied by ACON. The AC/DC inverter may be a 150 Watt inverter supplied by CD Media Corp.

When the phrase "monitored by the microprocessor" is used herein it means that the microprocessor 495 converts a parameter such as voltage, current or temperature from an analog to a digital signal and then processes that signal data according to a well defined algorithm.

Selective coupling or connection is accomplished by the microprocessor and its control of the switches which interconnect the buses to the sources. As described above, the output of the AC/DC converter is bused 406A to switches 407, 408 and 409 in parallel leading to respective buses. The microprocessor controls switches 407, 408 and 409 (which may be implemented using P-channel MOSFETS or other suitable electronic or mechanical switches) according to system voltages, currents and temperatures of the inputs (including the back up batteries), outputs, buses, and converters according to pre-defined programming or specified manual control. For instance, there may be situations when the user defines to preferentially use a particular input despite the availability of other inputs. An example may be a military application where it is decided to use the back up batteries as the energy source despite the availability of a direct current source from a vehicle so as to not deplete the batteries of the vehicle in a combat situation. As a further example, the microprocessor may infer from the level of the DC input representing the vehicle input whether or not the vehicle is running and correspondingly whether or not the vehicle's charging circuit is actively supplying current. With this information, the system can implement a control plan wherein the power supply load is sourced by the vehicle when it is running, by the backup batteries when the vehicle is not running, and then again by the non-running vehicle battery after the backup batteries are depleted to a specified level (say 5% state of charge). Finally, the load can be disconnected when both the vehicle and backup batteries have reached a pre-defined low state of charge. In this way, the intelligent power supply has maximized the run time of the load while maintaining the best disposition of vehicle reserve battery energy, and in the end, at least sufficient residual vehicle battery energy to guarantee the ability to start the vehicle.

Figure 4A:
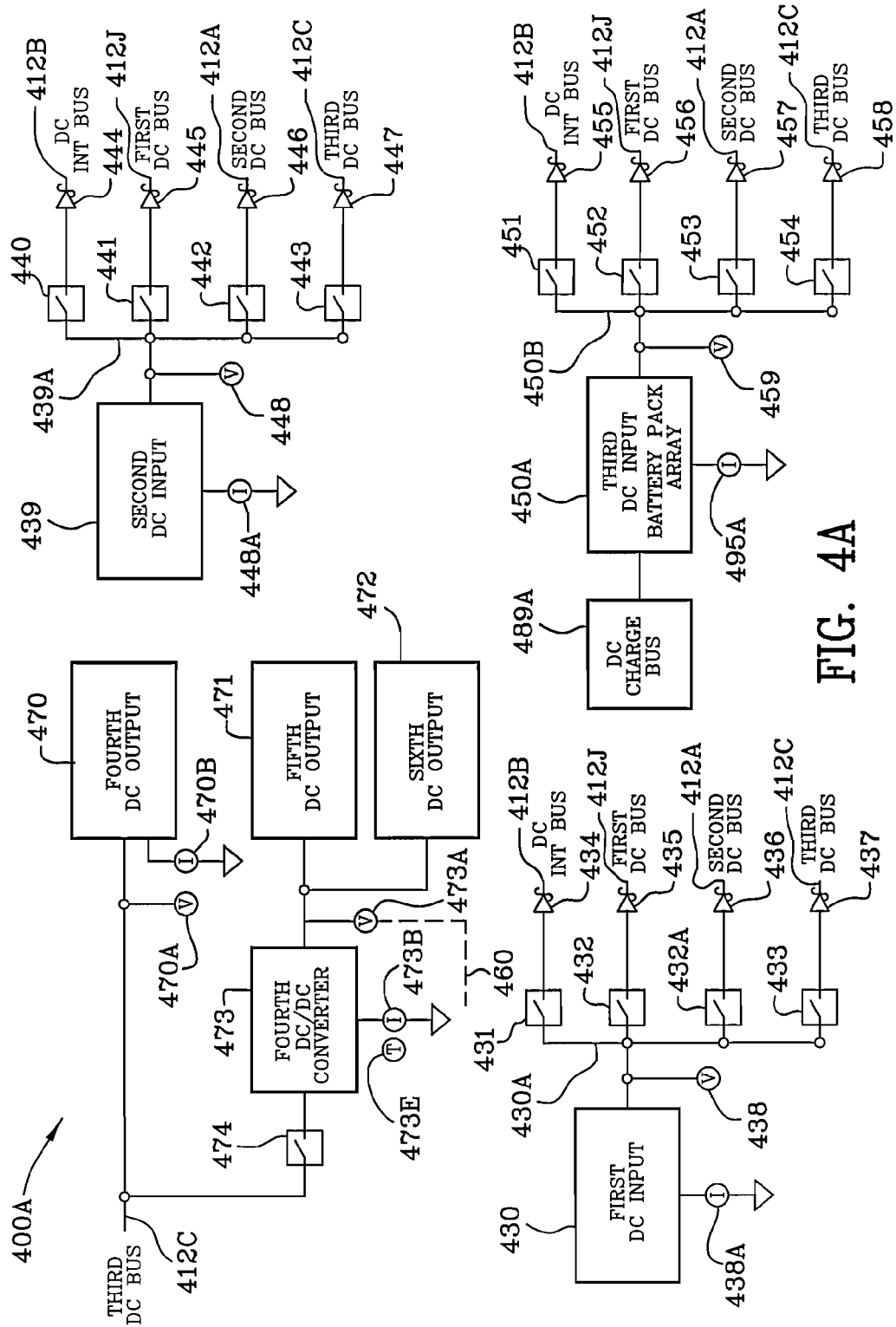
FIG. 4A is a schematic illustrating a first direct current input, a second direct current input and a third direct current input comprising a removable cartridge energy pack rack direct current input, each of which is independently selectively interconnected to the direct current intermediate bus and/or the first direct current bus and/or the second direct current bus and/or the third direct current bus.

FIG. 4A is a schematic 400A of a first 430 direct current input, a second 439 direct current input and a third direct current input 450A (battery pack array) each of which is selectively coupled to the direct current intermediate bus 412B, and/or the first direct current bus 412J and/or, the second direct current bus 412A and/or the third direct current bus 412C. The first direct current input 430 is bused 430A and is selectively coupled by switch 431 with the direct current intermediate bus 412B and/or is selectively coupled via switch 432 with the first direct current bus 412J and/or is selectively coupled by switch 432A with the second direct current bus 412A and/or is selectively coupled by switch 433 with the third direct current bus 412C. Diodes 434, 435, 436, and 437 are located downstream from their respective switches and ensure current flow from bus 430A to the respective buses and not the other way around. Voltage 438 and current 438A supplied by the first direct current input 430 is monitored by the microprocessor 495.

Third direct current input is a battery pack described herein above in regard to FIGS. 1, 2, 5, 6 and 7. An array of batteries arranged in parallel supplies power to bus 450B. The individual batteries may be of different individual voltages and chemistries and their use is controlled by the battery interface circuits described above employing a selective coupling system together with diode protection.

Still referring to FIG. 4A, the third direct current input 450A is bused 450B and is selectively coupled by switch 451 with the direct current intermediate bus 412B and/or is selectively coupled by switch 452 with the first direct current bus 412J and/or is selectively coupled by switch 453 with the second direct current bus 412A and/or is selectively coupled by switch 454 with the third direct current bus 412C. Diodes 455, 456, 457, and 458 are located downstream from their respective switches and ensure current flow from bus 450B to the respective buses but inhibit the reverse flow. The switches may be P-channel MOSFETs and the diodes may be Schottky diodes. Voltage 459 and current 459A supplied by the third direct current input 450A is monitored by the microprocessor 495. Each of the direct current inputs 430, 439, 450A. The AC/DC converter 406 and the first and second converters 475, 483 are protected against over-current and over-voltage conditions using devices such as fuses or PTC thermistor devices and Metal Oxide Varistars (MOVs) or other transient voltage suppression techniques.

Still referring to FIG. 4A, charge bus 489A is interconnected with the third direct current input so as to enable selective recharging or load sharing as described above in connection with FIG. 5, the battery interface circuit.

Still referring to FIG. 4A, the second direct current input 439 is bused (439A) and is selectively coupled by switch 440 with the direct current intermediate bus 412B and/or is selectively coupled by switch 441 with the first direct current bus 412J and/or is selectively coupled by switch 442 with the second direct current bus 412A and/or is selectively coupled by switch 443 with the third direct current bus 412C. Diodes 444, 445, 446, and 447 are located downstream from their respective switches and ensure current flow from bus 439A to the respective buses but not in the reverse direction. The switches may be P-channel MOSFETs and the diodes may be Schottky diodes. Voltage 448 and current 448A supplied by the third direct current input 450A is monitored by the microprocessor 495.

Still referring to FIG. 4A, third direct current bus 412C is coupled to fourth direct current output 470 and its output voltage 470A and current 470B are monitored by the microprocessor 495. The third direct current bus 412C may also be selectively coupled via switch 474 to the fourth direct current to direct current converter 473 which outputs to the fifth 471 and sixth 472 direct current outputs. Voltage 473A and current 473B and the temperature 473E of the converter 473 are monitored by the microprocessor 495.

Figure 4B:
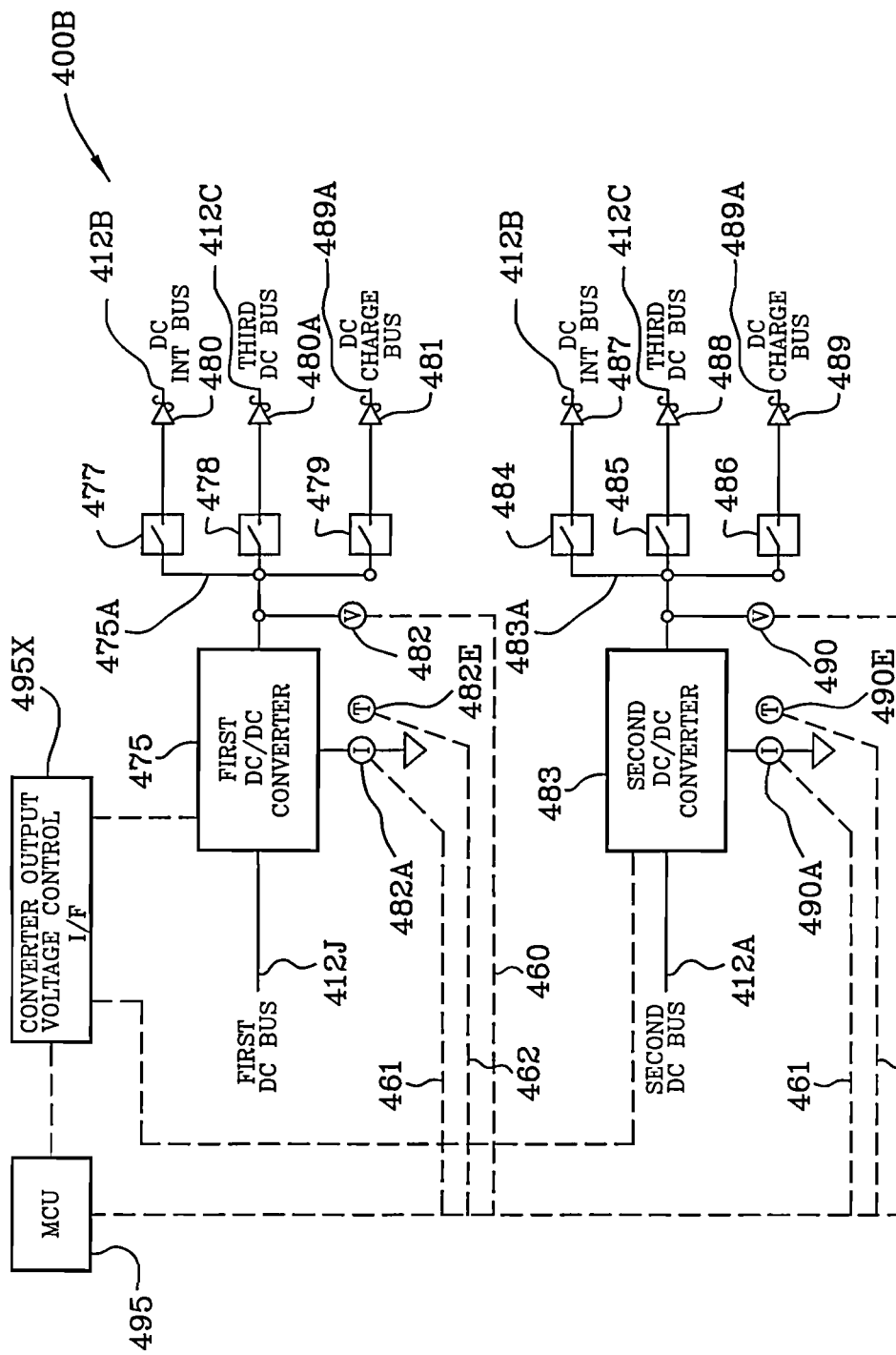
FIG. 4B is a schematic illustrating: the first direct current bus interconnected with the input of a first direct current to direct current converter and the output of the first direct current to direct current converter is selectively connected to the direct current intermediate bus and/or the third direct current bus and/or the direct current charge bus; the second direct current bus is interconnected with the input of a second direct current to direct current converter and the output of the second direct current to direct current converter is selectively interconnected to the direct current intermediate bus and/or the third direct current bus and/or the direct current charge bus.
Figure 4C:
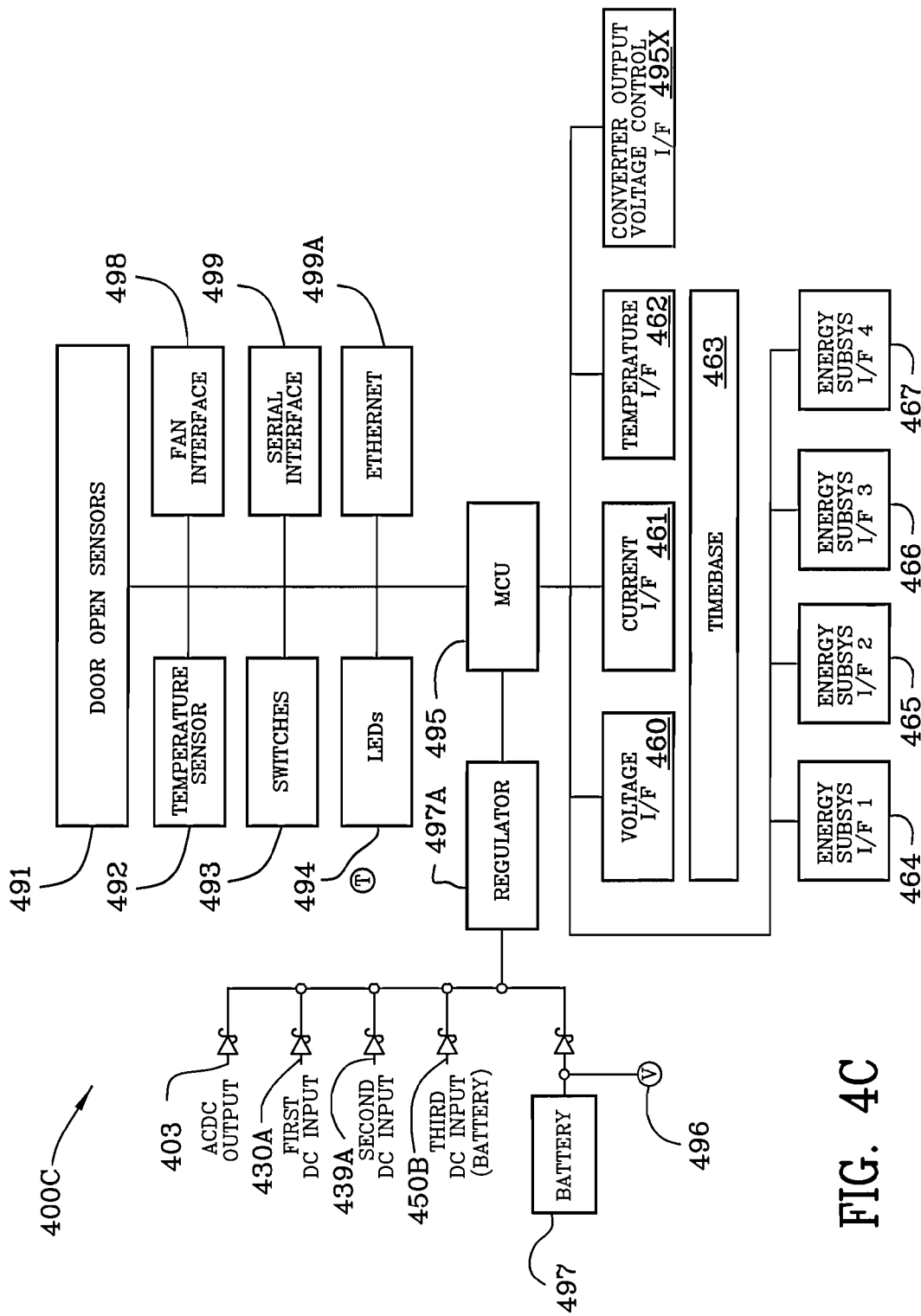
FIG. 4C is a schematic illustrating the microprocessor, its power supply and interfaces.

FIG. 4B is a schematic 400B illustrating the first direct current bus 412J interconnected with a first direct current to direct current converter 475 and the output 475A of the first direct current to direct current converter 475 selectively coupled to the direct current intermediate bus 412B and/or the third direct current bus 412C and/or the direct current charge bus 489A. The output bus 475A is selectively coupled via switch 477 with the direct current intermediate bus 412B and/or is selectively coupled via switch 478 with the third direct current bus 412C and/or is selectively coupled via switch 479 with the direct current charge bus 489A. Diodes 480, 480A, and 481 are located downstream from their respective switches and ensure unidirectional current flow from bus 475A to the respective buses. The switches may be P-channel MOSFETs and the diodes may be Schottky diodes. Voltage 482 and current 482A of the first direct current to direct current converter 475 as well as temperature 482E in the proximity of the converter are monitored by the microprocessor 495.

Still referring to FIG. 4B, the second direct current bus 412A is interconnected with the input of a second direct current to direct current converter 483 and the output 483A of the second direct current to direct current converter 483 is selectively interconnected to the direct current intermediate bus 412B and/or the third direct current bus 412C and/or the direct current charge bus 489. The output bus 483A and is selectively coupled via switch 484 with the direct current intermediate bus 412B and/or is selectively coupled via switch 485 with the third direct current bus 412C and/or is selectively coupled via switch 486 with the direct current charge bus 489A. Diodes 484, 485, and 486 are located downstream from their respective switches allowing current to flow from bus 483A only in the direction of the respective buses 412B, 412C, and 489A. Once again, the switches may be P-channel MOSFETs and the diodes may be Schottky diodes. Voltage 490 and current 490A of the second direct current to direct current converter 483 as well as temperature 490A in the proximity of the converter are monitored by the microprocessor 495. The charge bus 489A is interconnected with the removable cartridge energy pack rack.

Again referring to FIG. 4B, it can be seen that microprocessor 495 has the ability via converter output voltage control interface 495X to control the output voltage of DC/DC converter elements 475 and 483. The microprocessor can decide, upon measuring the voltages and currents in different channels within the system, a best output voltage adjustment for each DC/DC converter such that the mix of power provided by each channel is thereby optimized according to some pre-defined goal of the system. For example, a goal of utilizing 30% current from first DC input 430 along with 70% current from third DC input representing backup batteries 450A can be realized by switching first DC input to power first DC/DC converter, switching third DC input to power second DC/DC converter, and adjusting first DC converter voltage output and second DC converter voltage output up or down as required so that the current sensed at 482A compared to the current sensed at 490A are in the proportions 3:7. The scenario described is one from the category of control algorithms allowing intelligent power mixing. As compared to an all or nothing contribution decision represented by a simple switch, power mixing allows a continuum of adjustments regarding how much power is utilized from each source.

Figure 52:
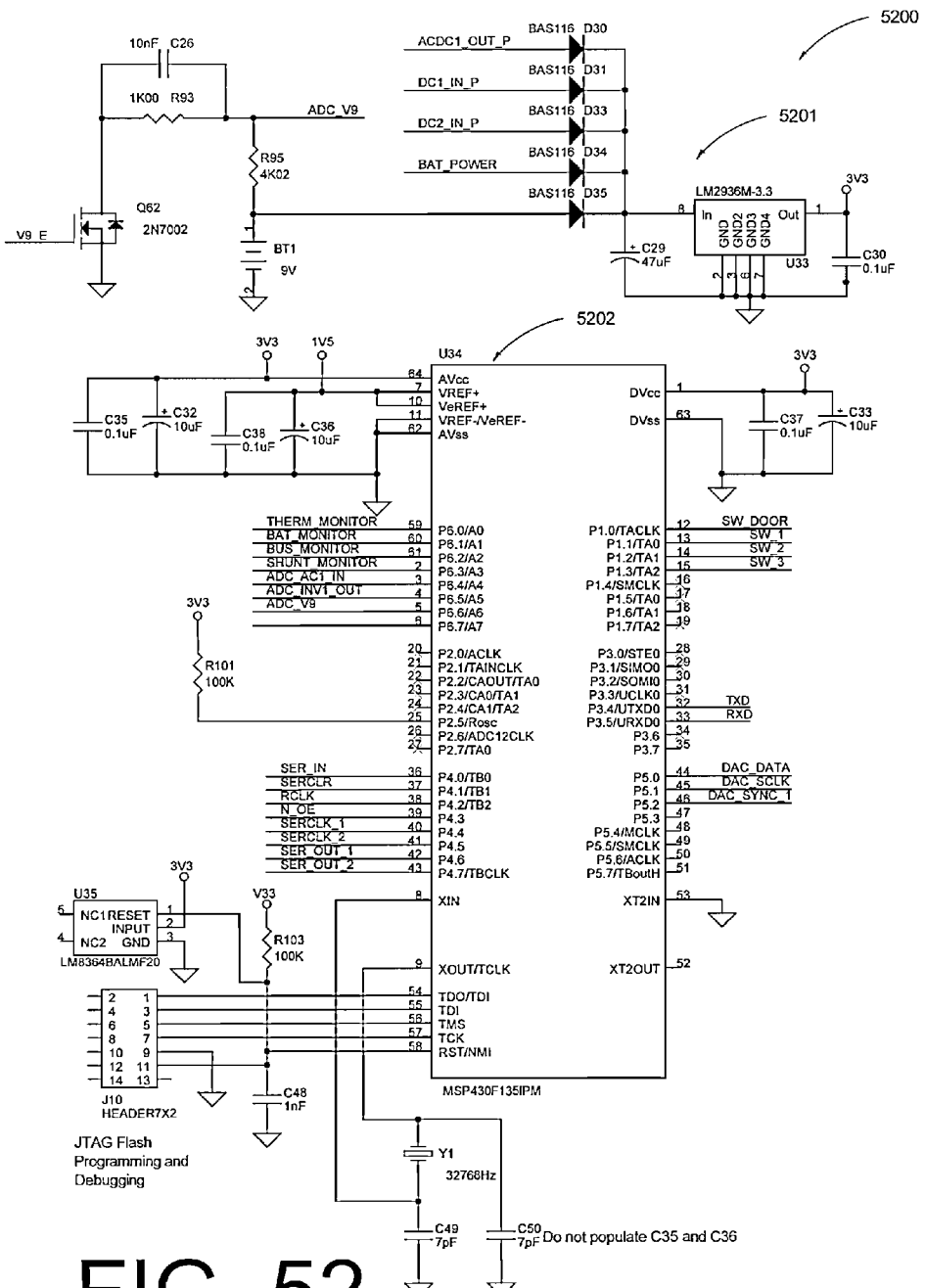
FIG. 52 illustrates an example of Microcontroller and support circuits.
Figure 57:
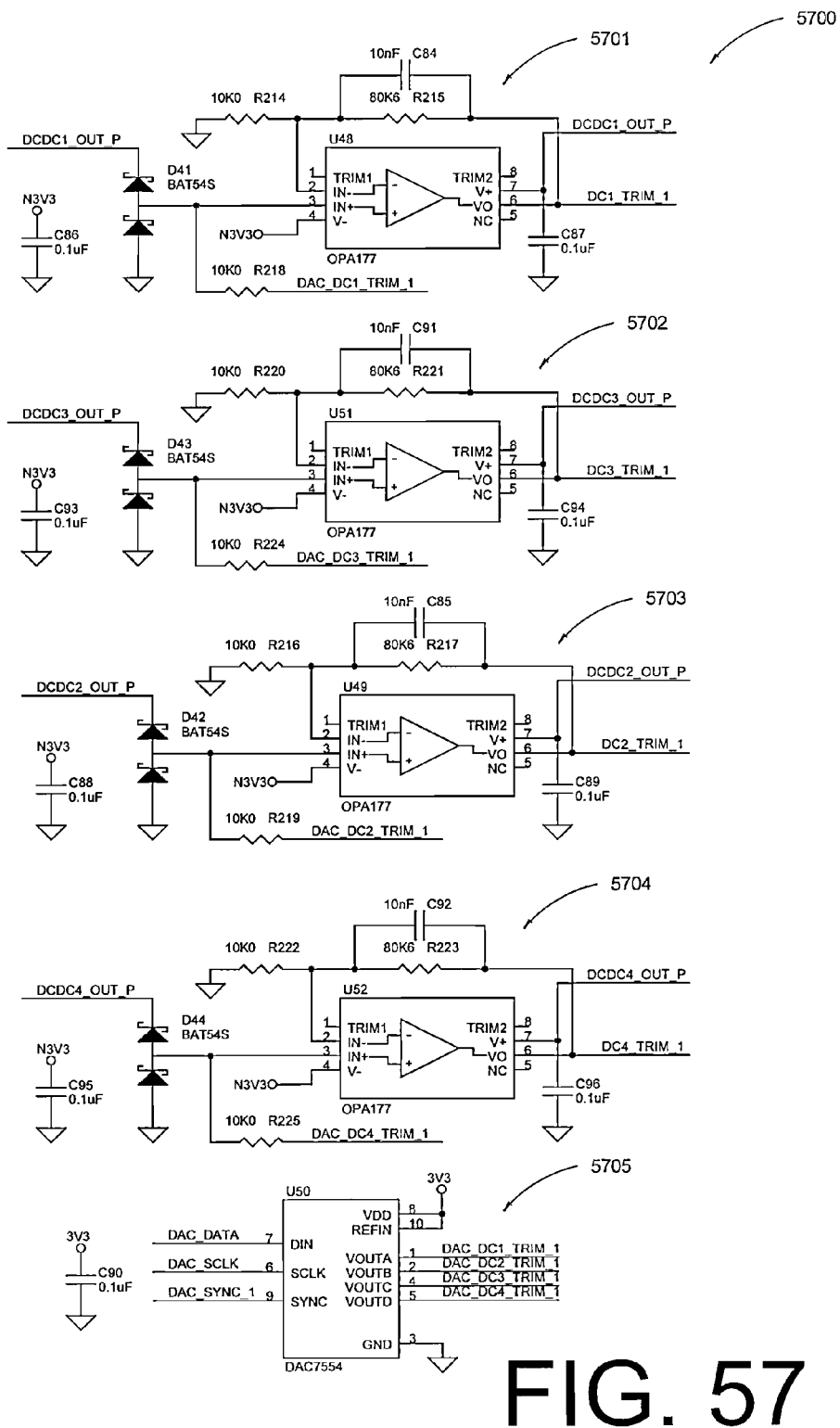
FIG. 57 illustrates an example of DC/DC converter voltage programming circuits.

The converter voltage output control can be further understood by viewing FIG. 52 signals DAC_DATA, DAC_SCLK, and DAC_SYNC_1 emanate from U34 MCU and go to FIG. 57 D1 DAC (Digital to Analog Converter) U50 where four analog voltage outputs are generated, DAC_DC1_TRIM_1 through DAC_DC4_TRIM_1. These signals route for amplification to respective amplifier circuits U48, U49, U51, and U52. These amplifiers in turn generate voltage control output signals DC1_TRIM_1 through DC4_TRIM_1. These signals connect to the respective DCDC converter TRIM input pins on FIG. 39 (DCDC1 U3 or U4) FIG. 41 (DCDC2 U5 or U6) FIG. 58 (DCDC3 U57) and FIG. 46 (DCDC4 U11).

Power mixing is important as one or more direct current to direct current converters are arranged in an oring fashion. For example, a user defined direct current input source may be combined with the arrayed battery direct current input source comprising a plurality of batteries for the purpose of supplying one or more user selected loads in parallel. A first direct current to direct current converter may be coupled with the user defined direct current input source and a second direct current to direct current converter may coupled with the arrayed battery direct current input source, and, as just described the first and second converters have adjustable output voltages.

A microprocessor coupled to the first and second converters controls the output voltages of the converters and the contribution of each of the direct current sources to the energy flowing on the DC bus(es) fed by both converters. Secondly, the converters may be coupled together as illustrated in FIG. 4B using diodes such as Schottky diodes. Since the microprocessor measures the current and voltage output by each converter as well as the current and voltage of the respective inputs supplying said converters, it is possible for the microprocessor to adjust the output voltages of each converter to achieve several end goals including controlling the current, voltage, or power of each input, controlling the current, voltage, power, or temperature of each converter, and/or controlling the current, voltage, or power of the load bus(es). Finally, since the voltages of the converters are controlled according to net input, converter, or load characteristics measured by the microprocessor on a continuous basis, the control process will cancel out varying characteristics such as forward voltage drop of the diodes or varying characteristics of the converters of other components employed in the circuits. That is to say that the control process has the advantages of a closed loop process running to measured as opposed to predicted response variables.

The functions of measuring currents in the respective input, conversion, and output channels is further illuminated. Shunt resistors are placed in the negative leg of the component whose current is to be measured, e.g. FIG. 46 U11 pin 8 (VOUT_Negative) connects to point DCDC4_OUT_N. At FIG. 56 this signal connects to GROUND via a shunt resistance formed by resistors R207 and R208 in parallel (0.0025 ohms net). The small voltage developed across this shunt resistance is proportional to the current flowing and is amplified in the example by differential amplifier formed around Op Amp U47. The output voltage from U47 is scaled suitably for measurement by the MCU Analog to Digital converter and is enabled onto the measurement bus for that purpose via an electronic switch formed by Q108 and Q109. In this way the MCU can determine the current in any of the "I" circled points (e.g. 490A, 482A) networked to the microprocessor interface 461 at any moment in time (see FIGS. 4B and 4C).

Voltage measurements (e.g. 490, 482) are made similarly by appropriate scaling by resistive voltage dividers and electronic switch multiplexing onto an ADC input channel of the MCU representing the interface 460 again in FIGS. 4B and 4C.

Temperature measurements (e.g. 490E, 482E) are made similarly by using NTC thermistor devices in a voltage division network such that the voltage measured by the MCU via another multiplexed ADC input channel represented by interface 462 in FIGS. 4B and 4C is proportional to the thermistor resistance which in turn is non-linearly indicative of the thermistor's temperature.

Exemplary modes of switch control are disclosed herein. The many system switches such as those depicted in FIGS. 4, 4A, 4B, 4C, and 5 are controlled via digital signals developed in the serial to parallel data conversion circuits at FIGS. 47-50. Using a few interface signals, the MCU can serially program these daisy chained serial to parallel conversion circuits and cause their many parallel outputs to update to the desired control states (on or off, controlling whether corresponding switches are open or closed).

FIG. 4C is a schematic 400C illustrating the microprocessor 495, its power supply (voltage regulator) 497A and interfaces. The voltage regulator 497A may be a 3.3 VDC regulator from National Semiconductor. The voltage regulator outputs 3.3 VDC to terminals represented by reference numeral 501 in FIG. 5, the battery interface circuit. The alternating current to direct current converter 403, the first direct current input bus 430A, the second direct current input bus 439A, the third direct current input bus 450B and an independent replaceable battery 497 are supplied in parallel to the voltage regulator to ensure power 497A and control of the power supply device. Voltage 496 of the battery is monitored by the microprocessor to inform the user that battery 497 is low. Also schematically indicated are interfaces 464, 465, 466, and 467 with a plurality of back-up energy subsystems which may be a rack of rechargeable batteries. Voltage 460, current 461 and temperatures from the individual components mounted on the mother board are indicated as well as a time base for clocking measurements, controlling the switching and communicating internally and externally. The interface 495X converter output voltage control interface which allows the microprocessor to control and adjust the voltage (and thereby current) of each DC/DC converter in the system is also depicted.

Still referring to FIG. 4C, other inputs to the microprocessor includes a door open sensor 491, power supply ambient temperature 492, status LEDs 494, fan interface 498, serial interface 499 and Ethernet interface 499A. The serial interface may be used in conjunction with a service computer to interface to all status and control features of the intelligent power supply. Likewise, the Ethernet interface may be used for local interface and inquiries or may be used to connect the intelligent power supply to a network whereby its management functions may be implemented from client computers anywhere in the world having network access. Switches 493 indicate globally the control of all switches on the motherboard for directing and routing power, and all switches for all of the battery interface circuits. There may also be pushbutton or other user input switches which are sensed and upon actuation responded to by the power supply controller.

Figure 8:
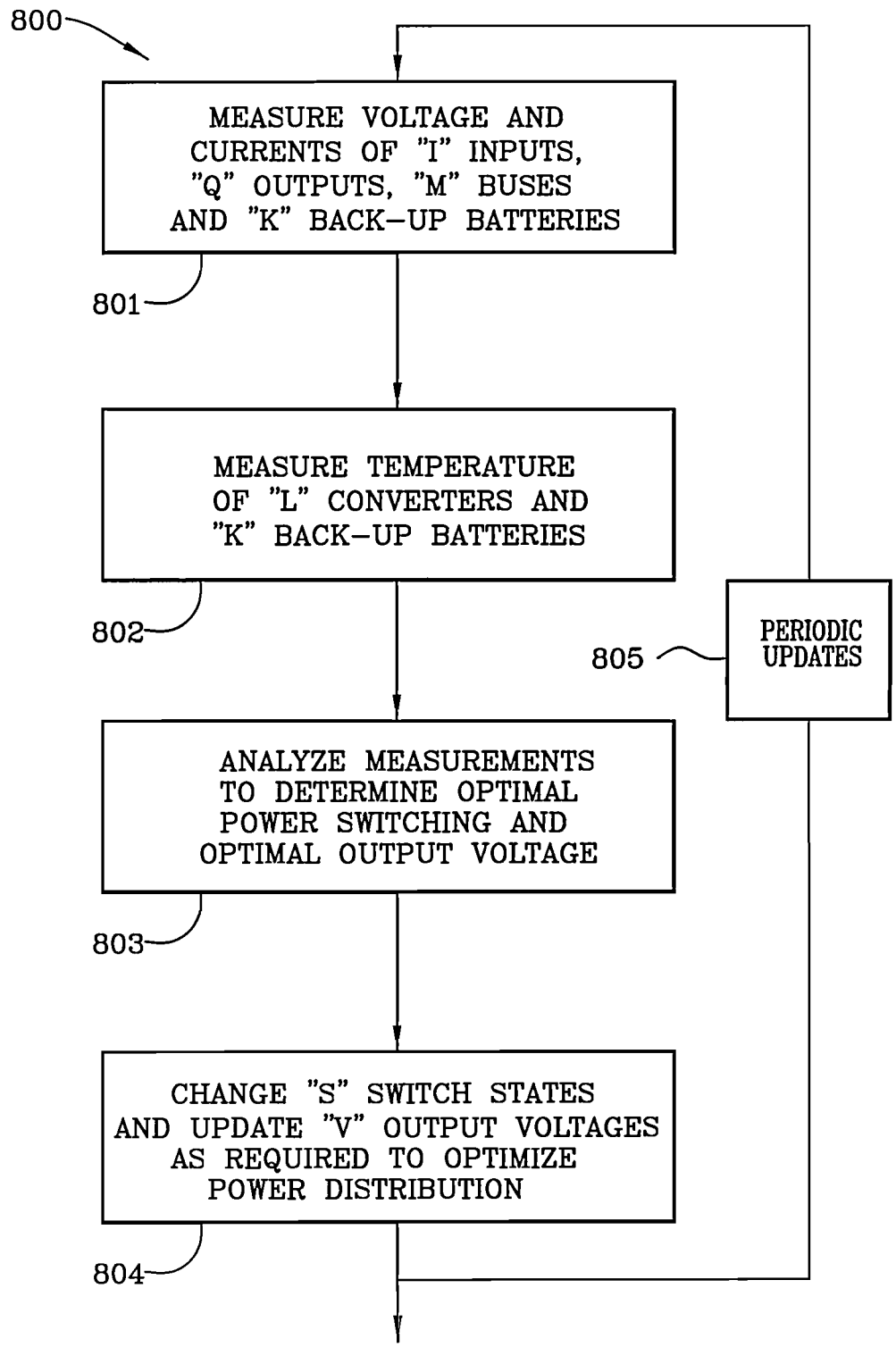
FIG. 8 is an illustration of the processing steps used in a configurable power supply control algorithm implemented using a microcontroller.

FIG. 8 is an illustration 800 of the processing steps used in a configurable microprocessor control algorithm including: measuring voltages and currents of I inputs, Q outputs, M buses, and K back-up batteries 801; measuring temperatures of L converters and K back-up batteries 802; analyzing measurements to determine optimal power switching 803; changing up to S switch states and V converter output voltages as required to optimize power distribution 804, and periodically updating all measurements and repeating all of the steps 805.

Figure 9A:
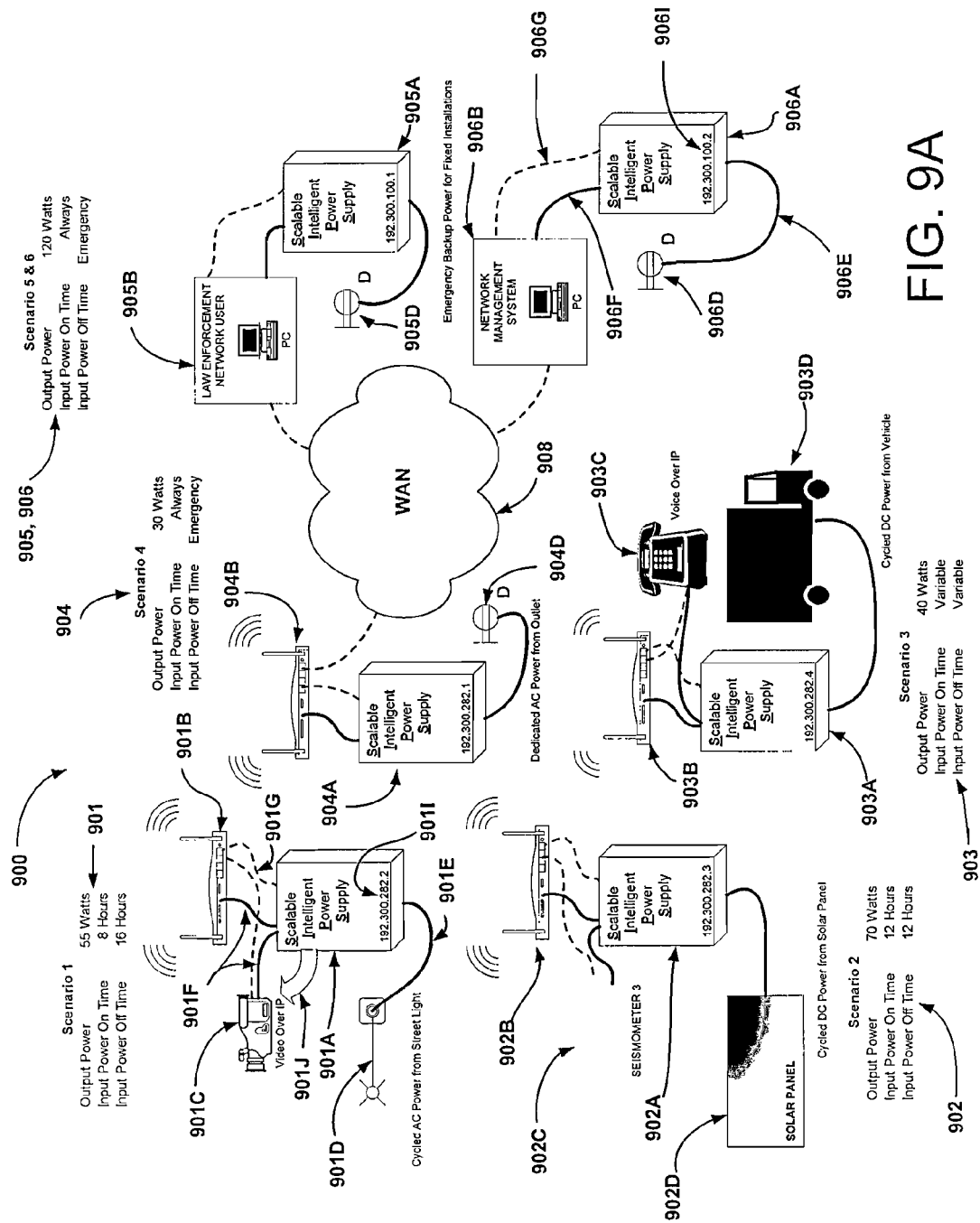
FIG. 9A is a representation of intelligent power supplies connected to various loads (wireless routers and associated devices) for the two purposes of supplying power to the loads and interfacing to a network.
Figure 9B:
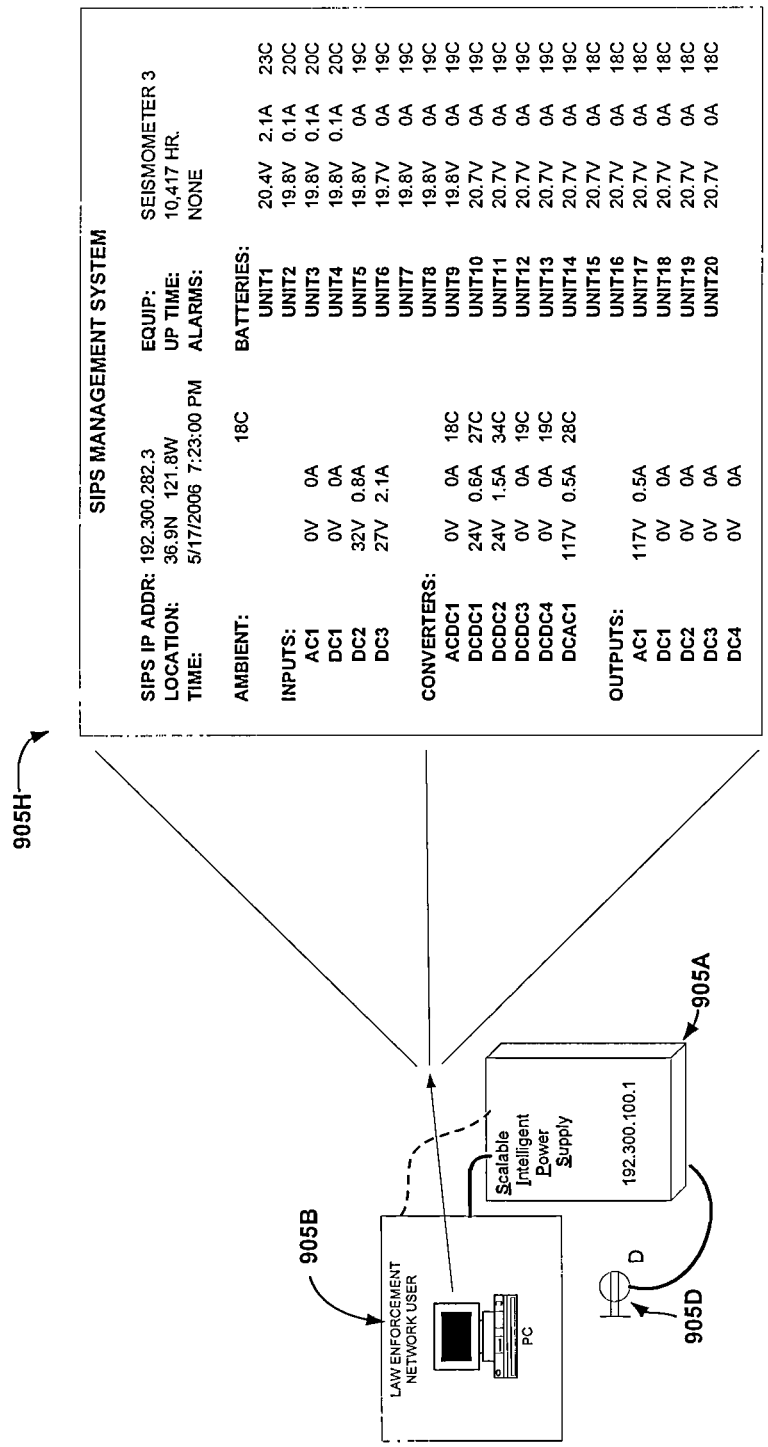
FIG. 9B is a table illustrating computer monitoring and management of the scalable intelligent power supply management system.

FIGS. 9A and 9B deserve in depth study as many of the features, benefits, and potential uses of the scalable intelligent power supply invention are depicted therein. Scalable Intelligent Power Supply blocks are shown 901A through 906A, each having a unique Internet Protocol (IP) address assigned as exemplified at 906I. The unique IP address coupled with the Ethernet interface shown at 499A along with appropriate software contained in MCU 495 allows each power supply to communicate in a network fashion with each other, other equipment such as IP peripherals such as 901C, 902C, or 903C, as well as management computers and systems such as those depicted at 905B and 906B. This communications allows information to be exchanged pertaining to the status or operating mode of the power supplies or other equipment. For example, a status report screen is depicted schematically at network management computer 905B with related close up view in 905H. 905H depicts a report originating from power supply 902A having IP address 192.300.282.3. It can be seen that the status information includes details pertaining to the voltages, currents, temperatures, and utilizations as applicable for each input, converter, output, or battery within said power supply. That fact that this power supply is operating on behalf of seismometer 3 as well as its location in coordinates of latitude and longitude is also reported. This information is beneficial to efficient management of the overall system as well as each particular node. Other computers including the management computer at 906B and ad hoc computers such as laptops in the field can also access this information. Appropriate security mechanisms including information encryption and password protection are envisioned as an integral part of the intelligent power supply system.

Several power supply use scenarios are depicted in FIGS. 9A and 9B. Scenario 1 at 901 depicts a power supply interfaced to a wireless router 901B and a video camera 901C capable of transmitting video over Internet Protocol (VoIP). The interfaces include a power interface 901F to the VoIP camera and both a power 901F and an Ethernet interface 901G to the wireless router whereby its Internet Address 901I renders it reachable from anywhere on the Wide Area Network (WAN) 908. The power supply is also interfaced to a street light 901D whereby it receives input power via interface 901E. The specification for the scenario contained in descriptive block 901 indicate that the combined load requirements for the wireless router and the VoIP camera add up to 55 Watts. The output power type might be AC or DC voltages of appropriate levels depending upon the requirements of the load devices. The scenario also specifies that input power from street light 901D will be intermittent, i.e., switched on 8 hours and off 16 hours of each day. The power supply will therefore power the camera and router from battery backup power for 16 hours while the street light power is disabled (presumably during daylight hours) and will power the camera and router loads as well as recharge the backup batteries for 8 hours while the street light power is enabled. Should power fail unexpectedly during any interval, the power supply will switch instantly to backup battery power so that operation of the loads goes without interruption until input power is re-established. At all times, the power supply will measure and estimate the amount of backup energy available and compare this to the amount it knows to be required for operation to proceed without interruption in the normal course of power cycling (8 hours on, 16 hours off). It will be an important feature of the power supply system to be able to predict energy deficiencies and subsequent power inadequacies and report same as an information or alarm event to its network management entities well in advance of such an event occurring. This report coupled with the capability of hot-swappable battery packs will allow maintenance personnel to visit the location in advance of power running out and swap an adequate complement of worn batteries for freshly charged ones to preclude the power failure.

Often peripherals such as the VoIP camera 901C involved in outdoor deployments such as the street light scenario 901 will require ancillary heating under cold environmental conditions in order to maintain correct operation. This requirement is conventionally addressed with the addition of a heater device which would also be powered by the power supply. This increases the power level and backup energy required in the power supply accordingly, an appropriate heater costing an additional 20 to 30 Watts by way of example. The opportunity arises, with the intelligent power supply, to accomplish the requirement for ancillary heat more efficiently. In particular, heat is generated inside the power supply as a result of operation of voltage conversion units, charging of batteries, and power dissipation in the electronic and electrical components of the power supply system in general. If the power supply is connected via a duct or conduit such as that schematically depicted by 901J, air warmed within the power supply by aforementioned phenomenon may be conveyed to the peripheral device requiring ancillary heat. The ducting may be accomplished coaxially in the conduit already positioned to convey the power cables or may occur via a separate conduit placed expressly for the heating purposes. A fan inside the power supply, controlled by MCU 495, may be used to produce the desired air flow. The power supply may control the amount of warm air, if any, based upon its measurement of external temperature, its measurement of its internal air temperature, and communications of information via its Ethernet connection with either the peripheral requiring heat and/or its network management systems.

Scenario 2 at 902 depicts what might be instrumentation (seismometer 902C) deployed in a sunny, remote location such as the American southwest desert. In this case power supply 902A powers the seismometer 902C as well as a wireless network access device 902B. Power will be available to the power supply via solar panel 902D, ordinarily over the course of 12 hours of daylight only. During the dark periods the power supply must operate from its backup energy sources. Cloudy days may occur when the "dark period" is extended from 12 to perhaps 48 or more hours. Therefore, a typical deployment may utilize additional backup energy frames such as those depicted in FIG. 1N to achieve the requisite backup energy reservoir needed for prolonged, input-power-deprived operation.

Scenario 903 depicts a mobile, vehicle born application wherein power supply 903A derives input power from vehicle 903D when available, charging its backup energy sources and powering its loads including network access device 903B and Voice over IP telephone 903C. The power supply may be programmed to be cognizant of the state of the vehicle power system. The MCU 495 may infer from voltage measurements of the DC input coming from the vehicle whether or not the vehicle is running and actively charging its own battery. In the case where the vehicle is running, its power may be the preferred source. In the case where the vehicle is not running, it may be preferred to power the loads from the backup energy sources within the power supply thus preserving the vehicle battery maximally. It may also be possible to remove (disconnect) from the vehicle altogether and transport the power supply along with it wireless router and telephone to a different location, perhaps another vehicle or outpost having a different power source available. It may then be possible to reconnect the power supply to a new power source when available and re-charge any backup energy that was used in the transition between power sources all the while operating the network interfaces and telephone (or other peripherals) without interruption.

Scenarios 904, 905, and 906 depict power supply applications wherein input power is provided by a dedicated, full time AC outlet. The only interruptions expected are those interruptions that occur on occasion in the utility grid (black out or brown out events). These interruptions may be infrequent and of typically short duration. Therefore, it is possible that the backup energy required in these power supplies 904A, 905A, and 906A may be substantially less than that required in the previously described scenarios. The advantage of the scalable power supply architecture would then allow few backup energy packs to be populated (a partial rack full) and therefore allow a lower cost for the required system. Alternatively, one or more of the fixed computers or network interfaces may desirably have extended backup time to cover an extended power outage. The precise number of energy packs and/or the desired number of frames of power packs may be applied to each node as desired or required on a node-by-node energy/backup time requirement basis. Finally, it may be possible that power outages may exceed the interval for which backup power has been designed. The power supply has the advantages of being able to accurately predict the amount of backup power remaining, communicate anticipated backup energy deficits well in advance via its network interface, and remain functional for additional extended periods by the mechanism of hot swapping energy packs via maintenance intervention.

Figure 10:
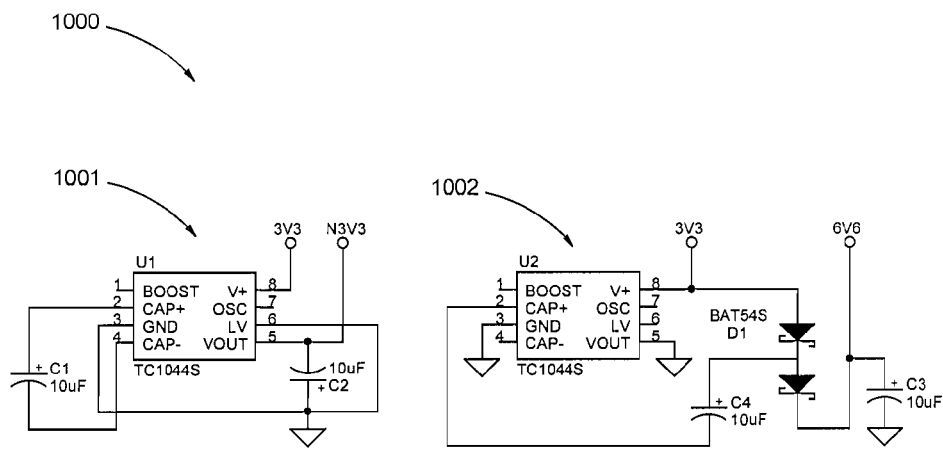
FIG. 10 is a schematic of the 3.3V and 6.6V Power Supplies.

FIG. 10 illustrates exemplary power supply generation circuits wherein reference numeral 1001 indicates a negative 3.3V supply and reference numeral 1002 indicates a positive 6.6V supply.

Figure 11:
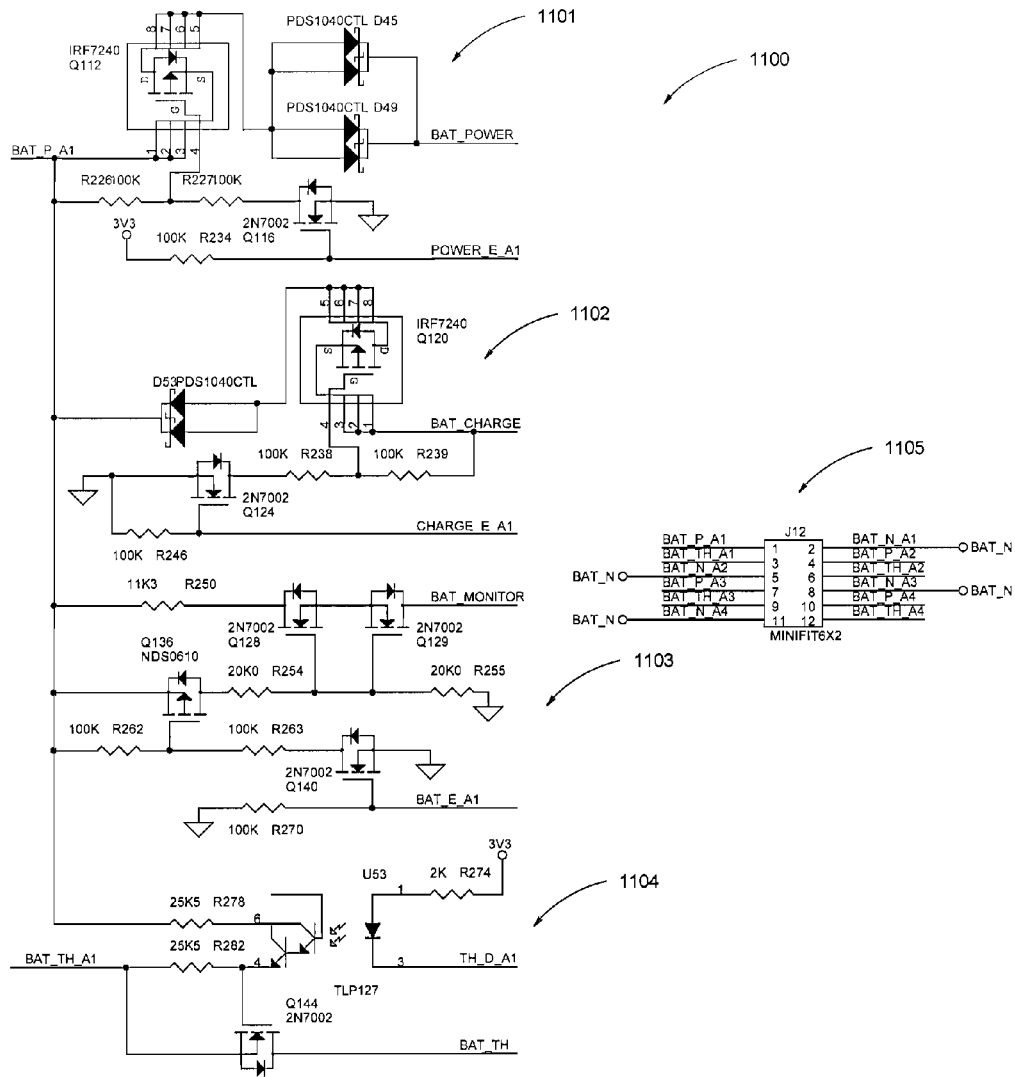
FIG. 11 is an example of a schematic similar to FIG. 5 of one individual microprocessor-controlled interface circuit for the control of one the removable cartridge energy packs/battery packs and the selective interconnection with the direct current energy pack/battery pack bus, the charge bus, the energy pack/battery pack monitor bus and/or the energy pack/battery pack information bus.
Figure 12:
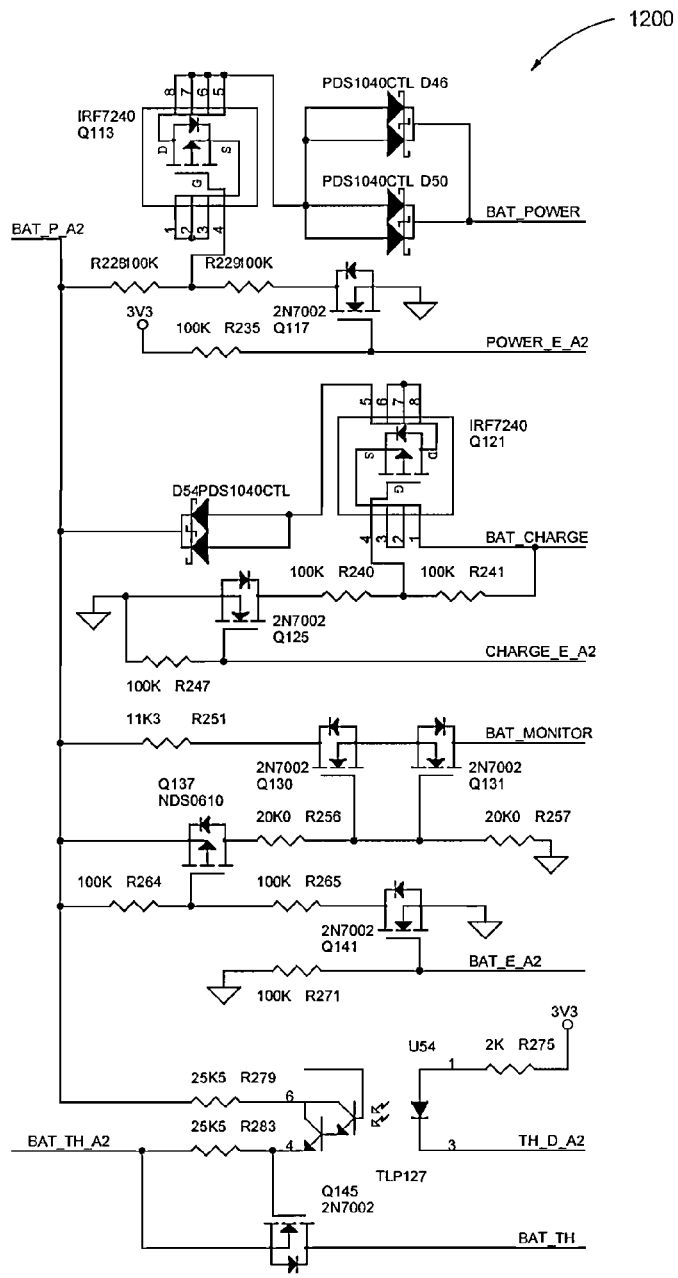
FIG. 12 is an example of a schematic similar to FIG. 5 of another individual microprocessor-controlled interface circuit.
Figure 13:
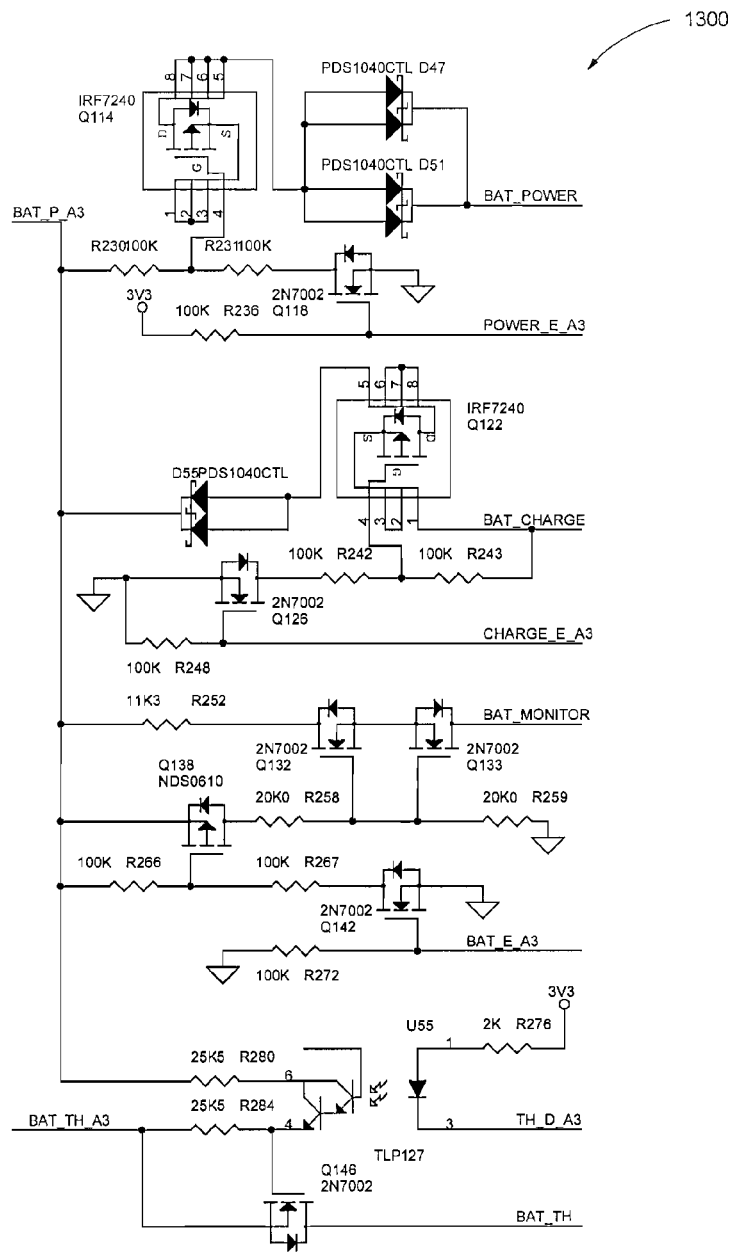
FIG. 13 is an example of a schematic similar to FIG. 5 of another individual microprocessor-controlled interface circuit.
Figure 14:
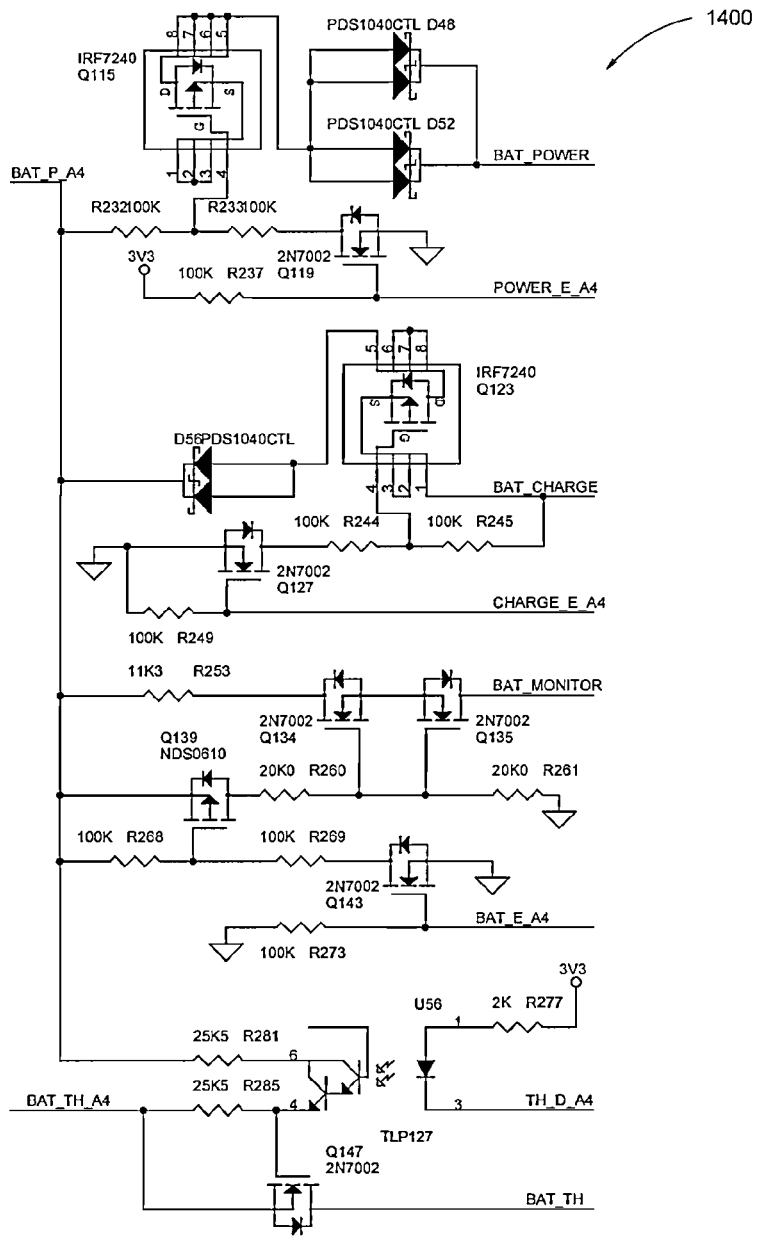
FIG. 14 is an example of a schematic similar to FIG. 5 of another individual microprocessor-controlled interface circuit.
Figure 15:
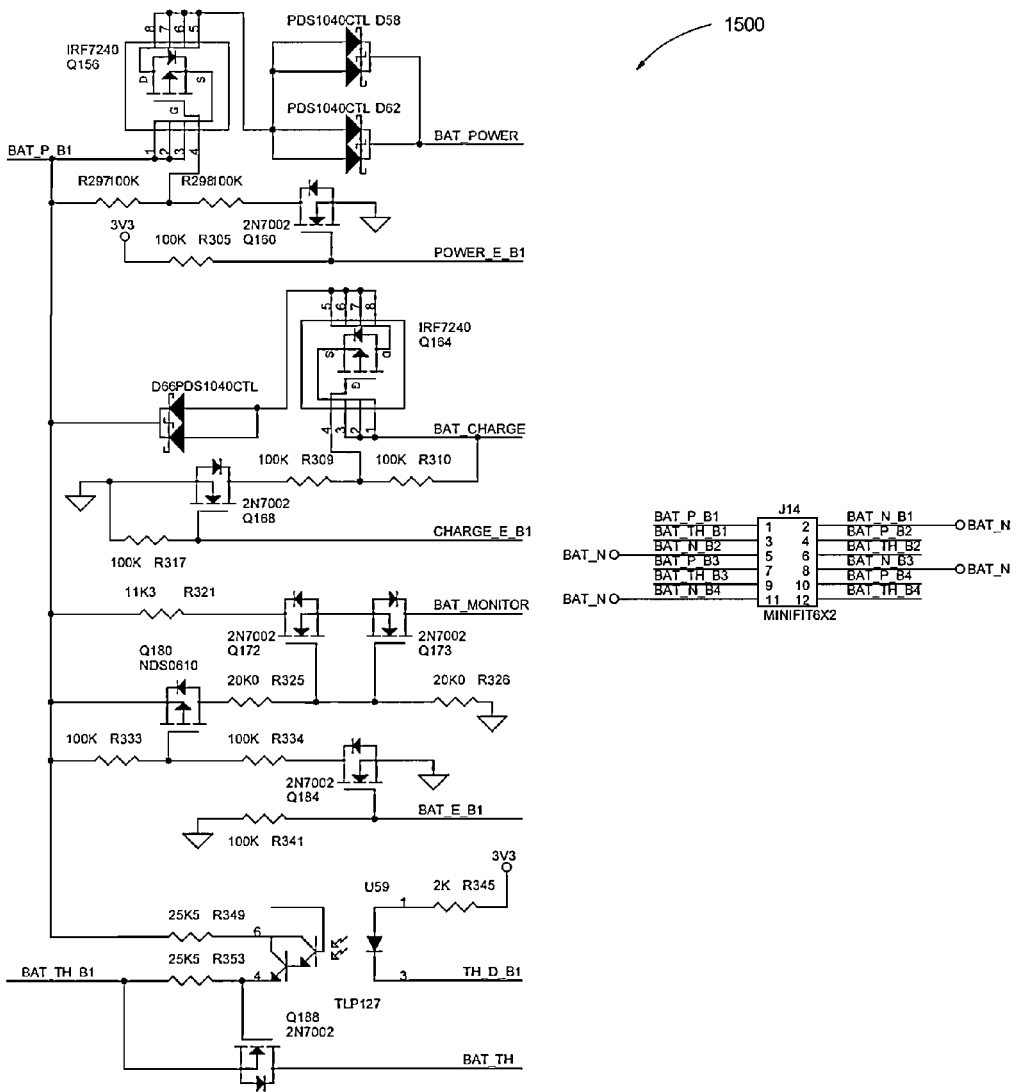
FIG. 15 is an example of a schematic similar to FIG. 5 of another individual microprocessor-controlled interface circuit.
Figure 16:
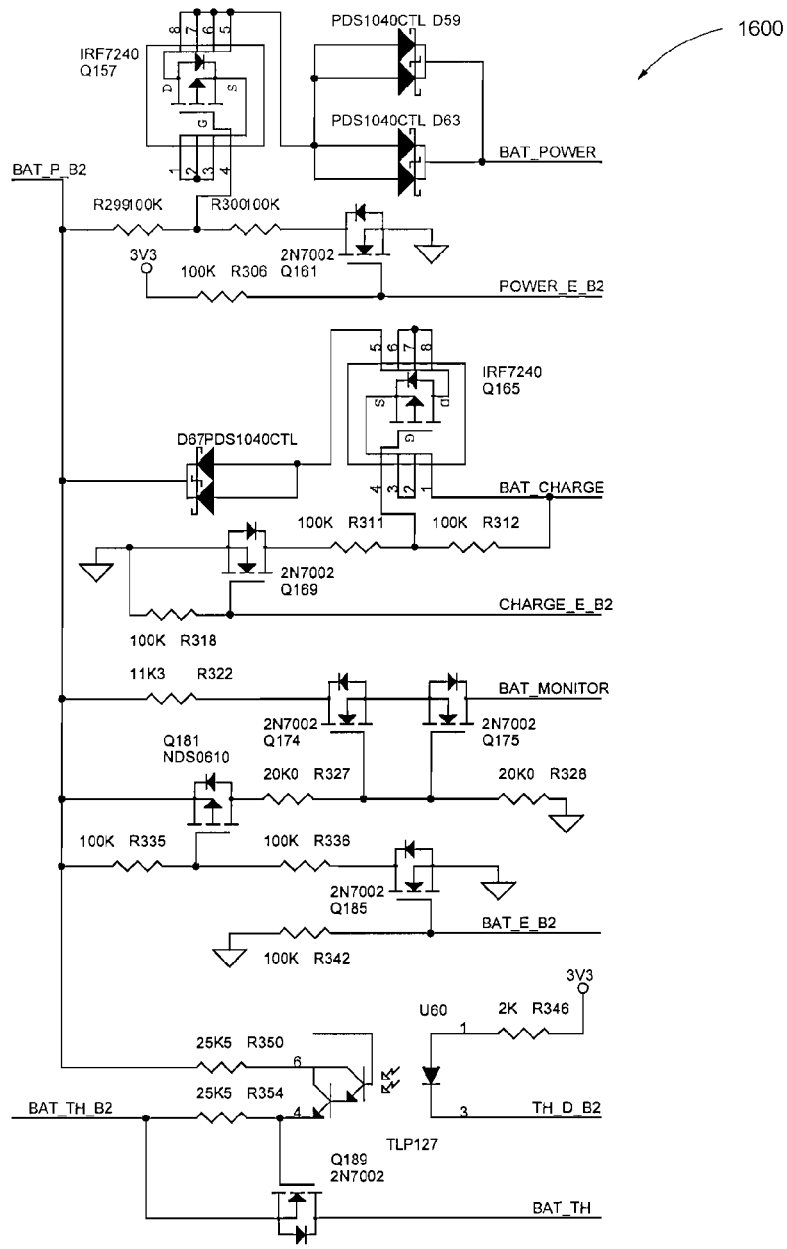
FIG. 16 is an example of a schematic similar to FIG. 5 of another individual microprocessor-controlled interface circuit.
Figure 17:
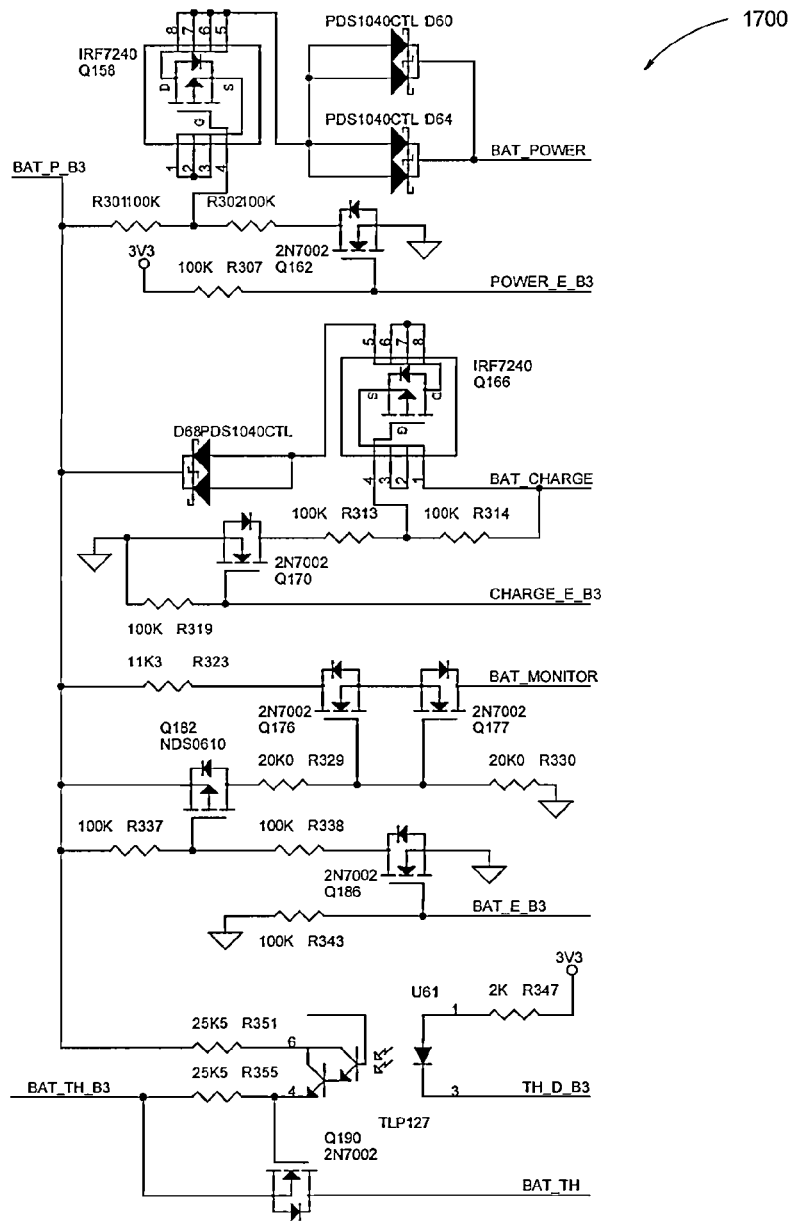
FIG. 17 is an example of a schematic similar to FIG. 5 of another individual microprocessor-controlled interface circuit.
Figure 18:
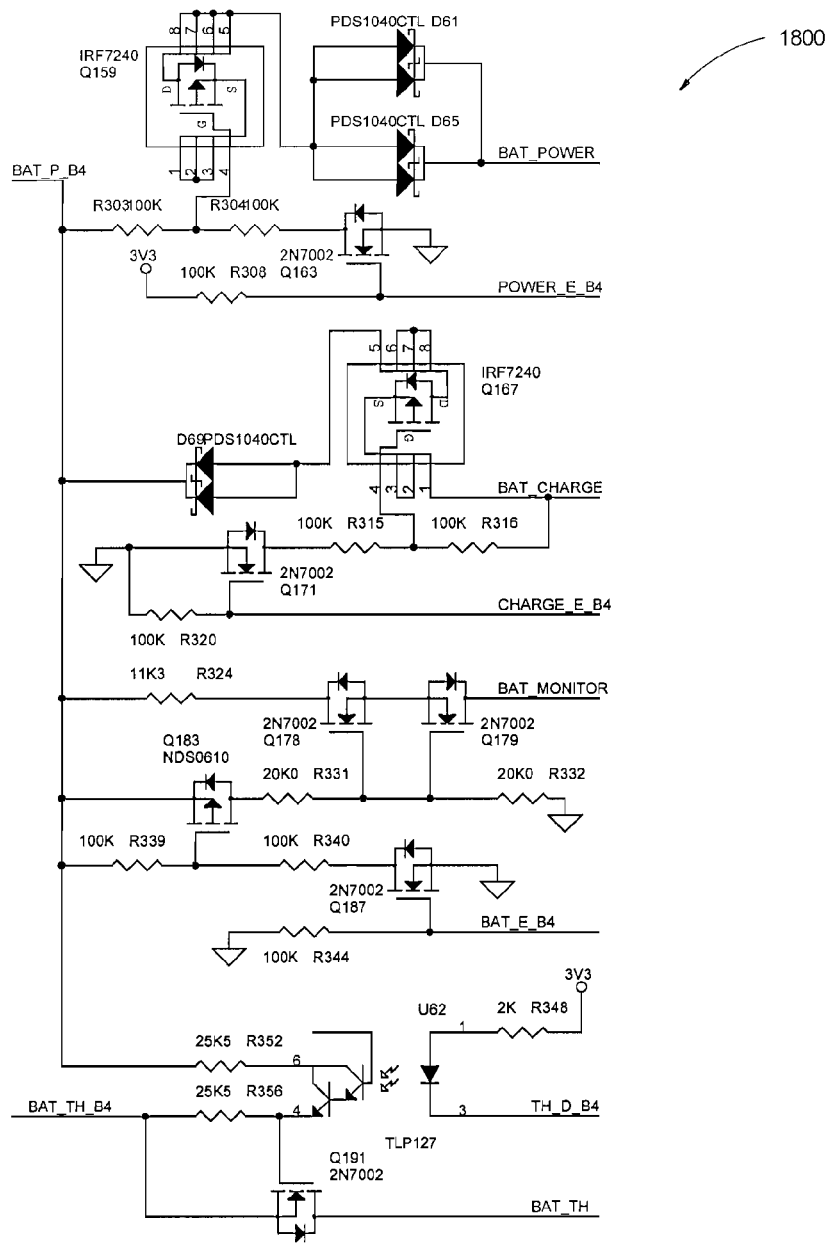
FIG. 18 is an example of a schematic similar to FIG. 5 of another individual microprocessor-controlled interface circuit.
Figure 19:
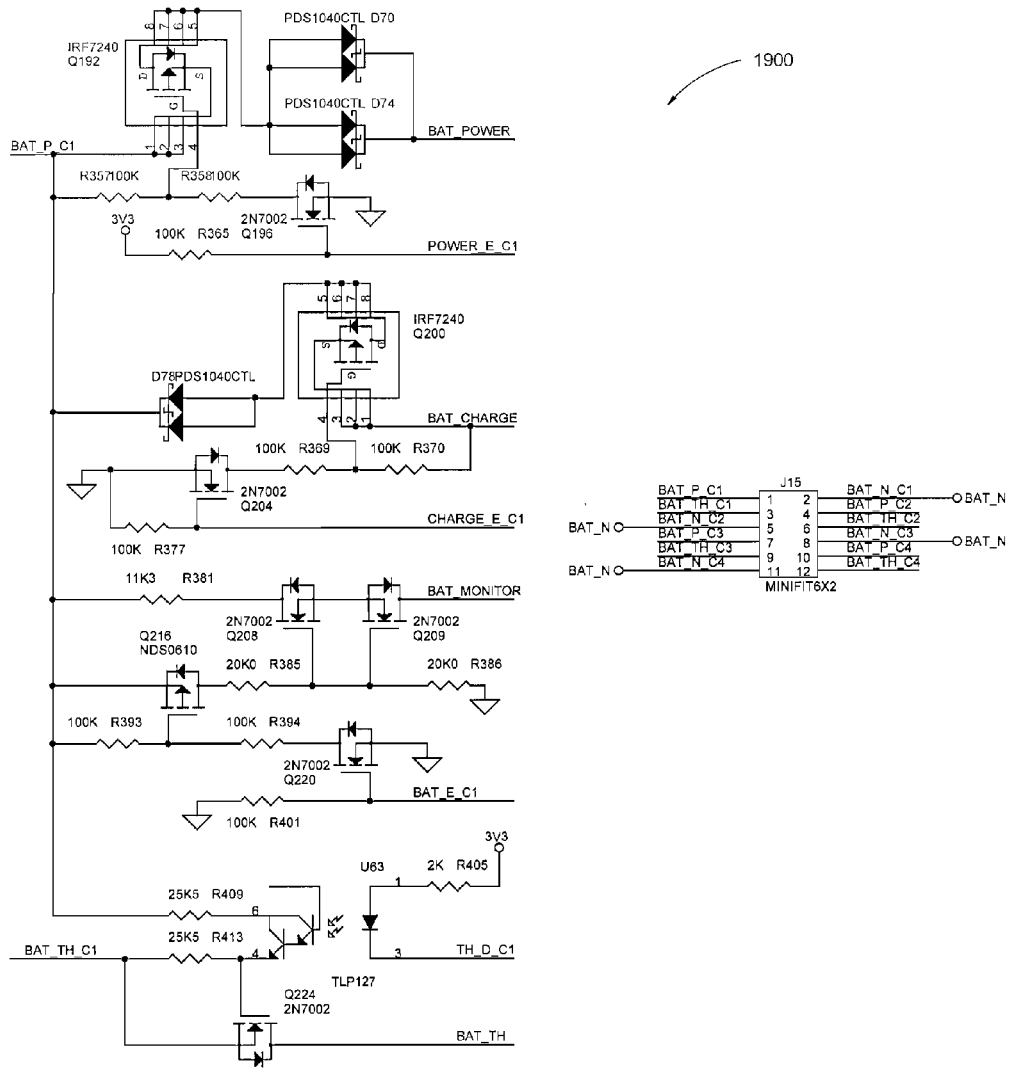
FIG. 19 is an example of a schematic similar to FIG. 5 of another individual microprocessor-controlled interface circuit.
Figure 20:
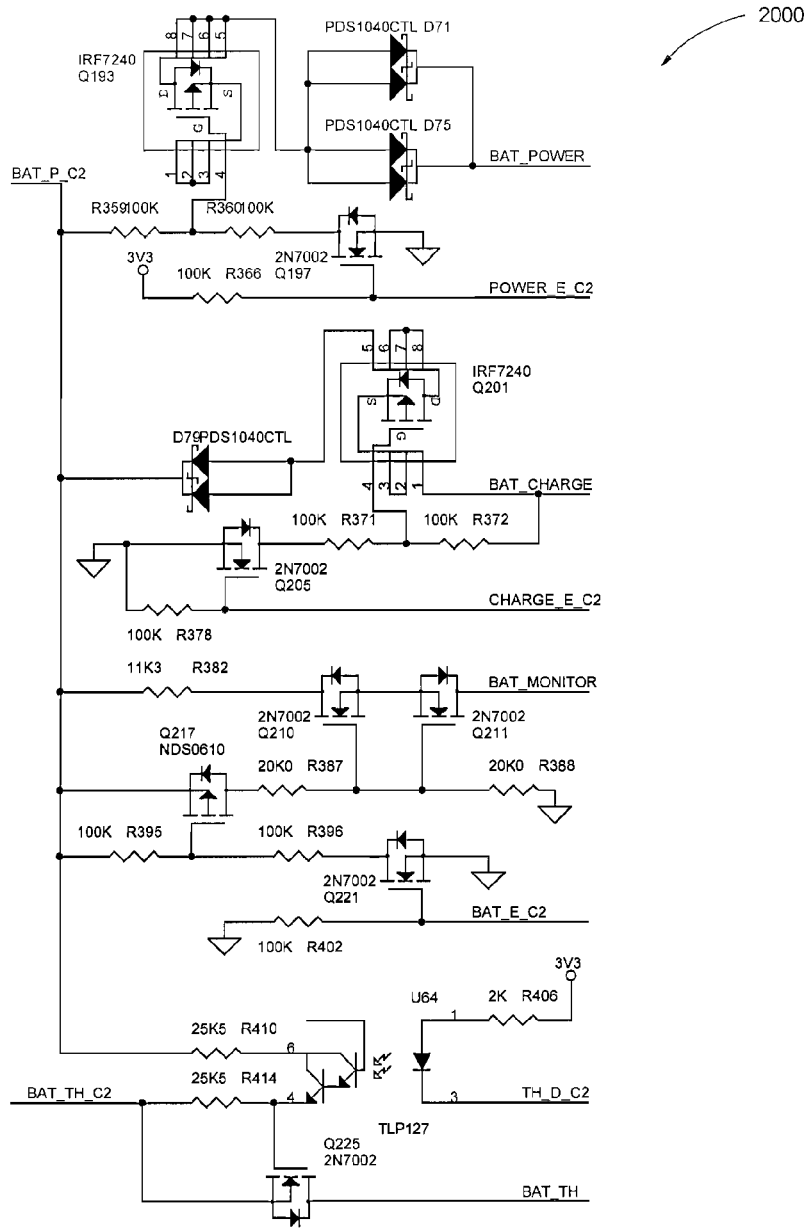
FIG. 20 is an example of a schematic similar to FIG. 5 of another individual microprocessor-controlled interface circuit.
Figure 21:
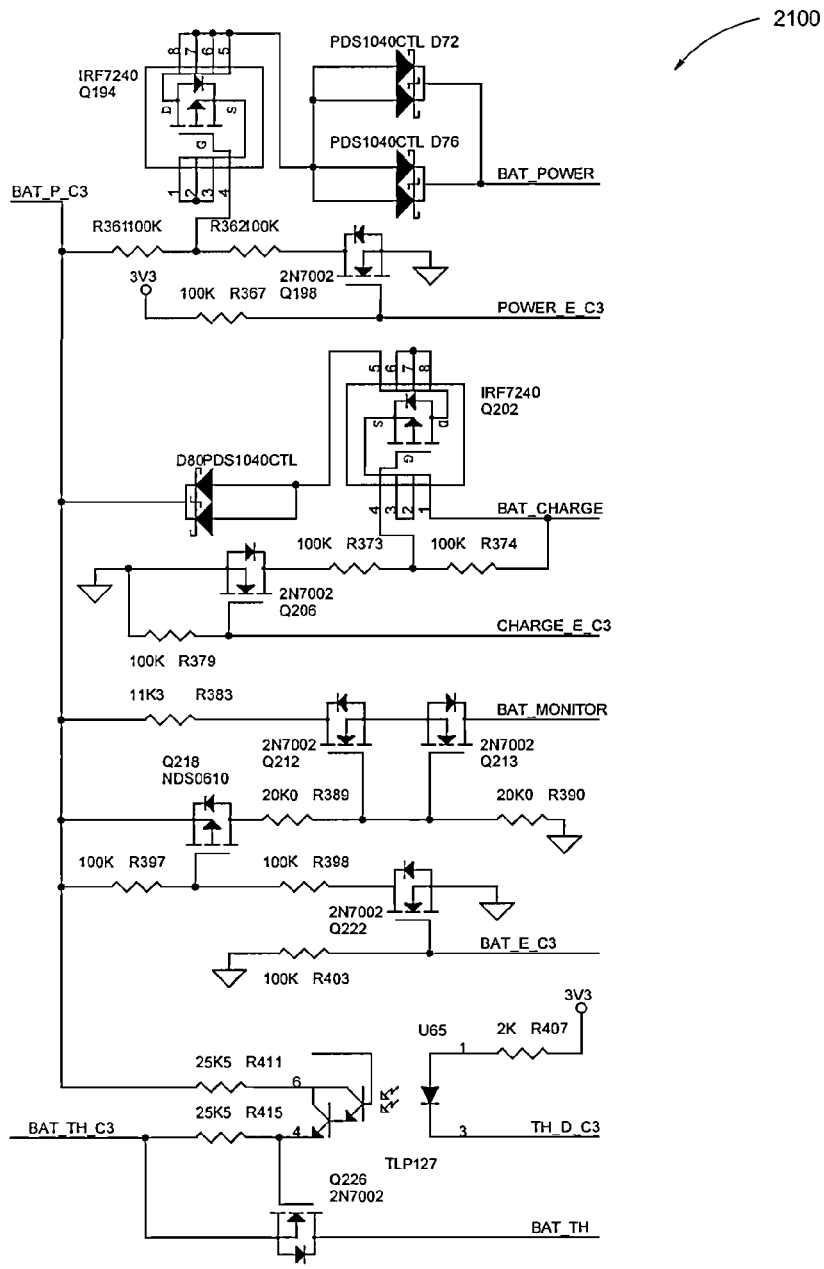
FIG. 21 is an example of a schematic similar to FIG. 5 of another individual microprocessor-controlled interface circuit.
Figure 22:
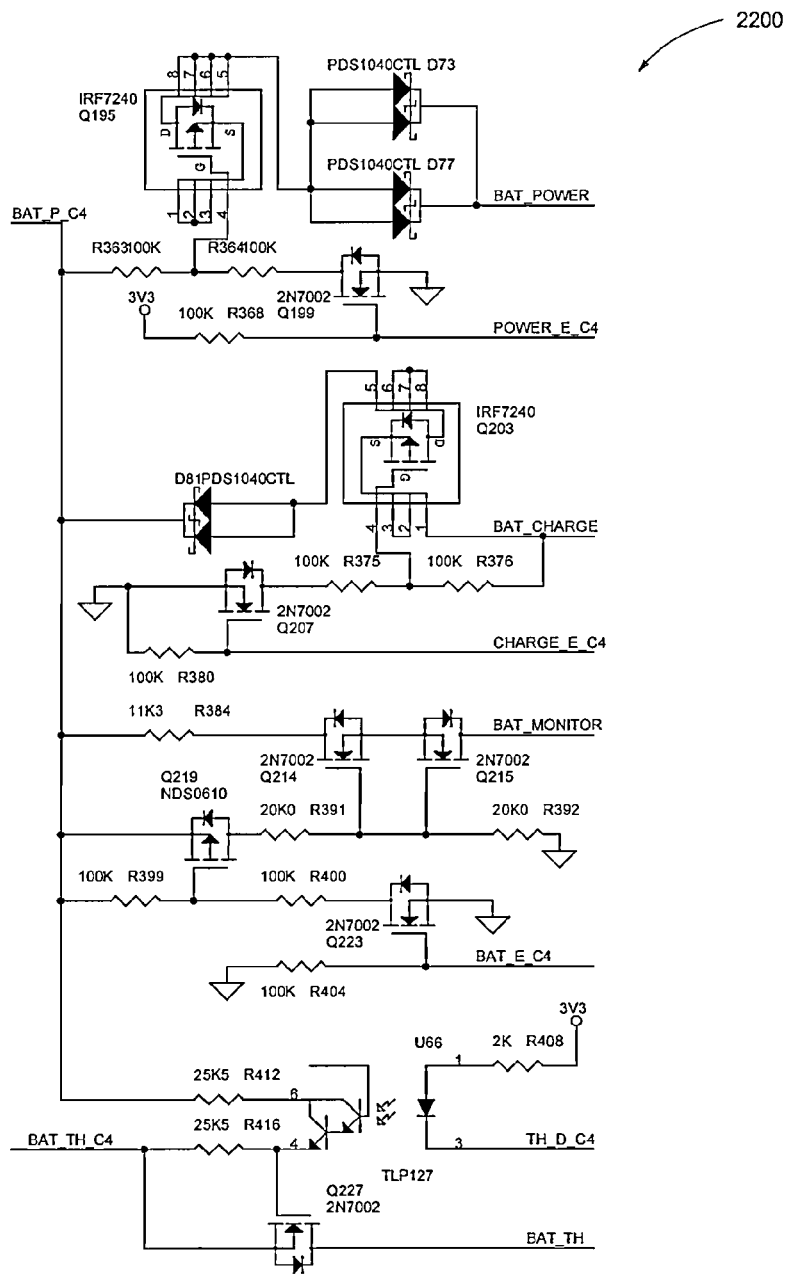
FIG. 22 is an example of a schematic similar to FIG. 5 of another individual microprocessor-controlled interface circuit.
Figure 23:
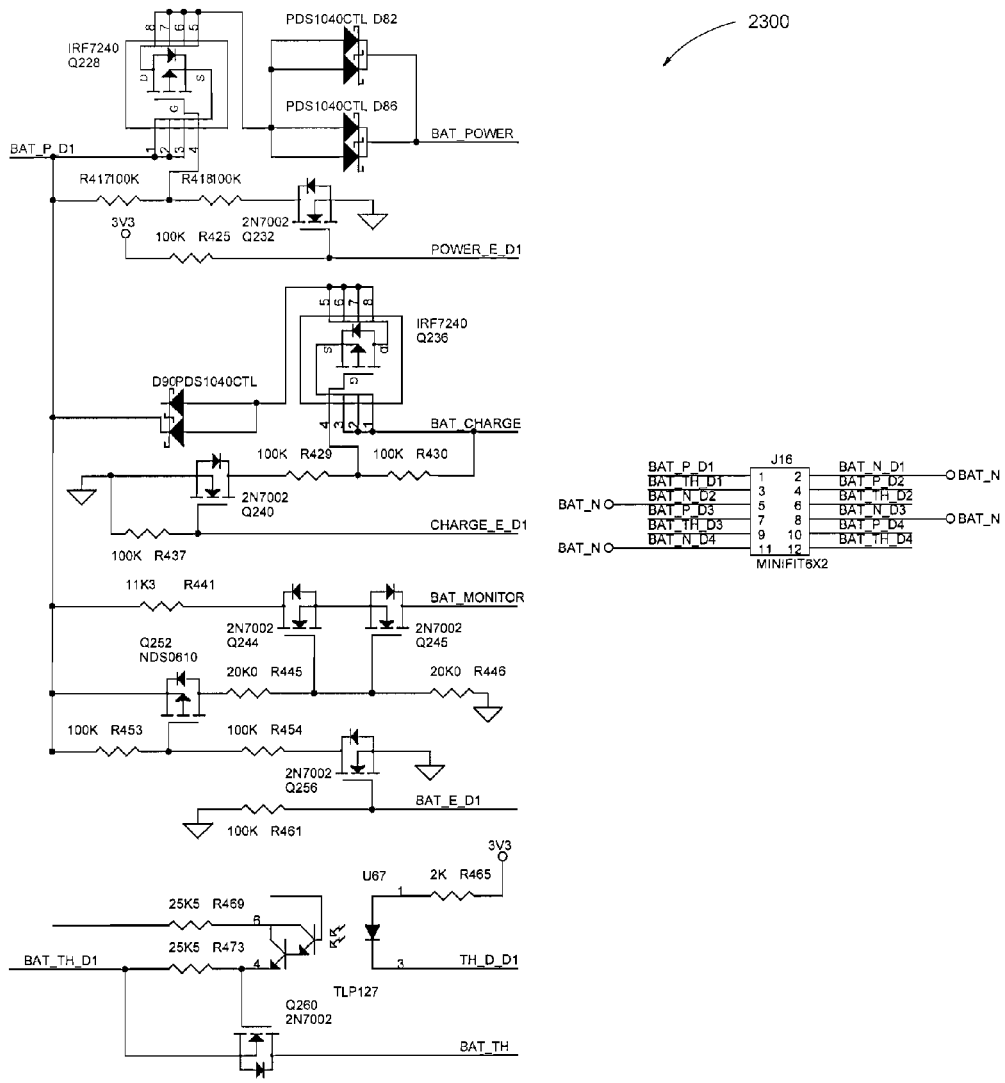
FIG. 23 is an example of a schematic similar to FIG. 5 of another individual microprocessor-controlled interface circuit.
Figure 24:
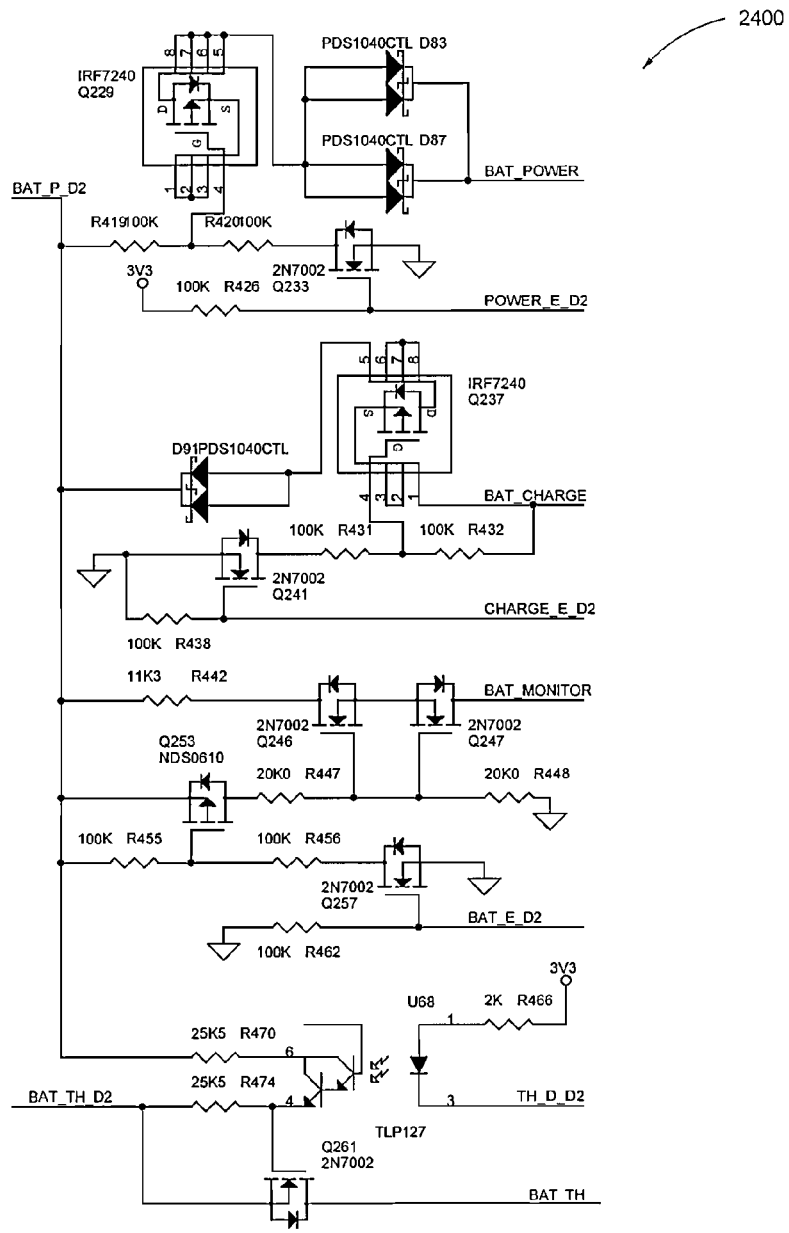
FIG. 24 is an example of a schematic similar to FIG. 5 of another individual microprocessor-controlled interface circuit.
Figure 25:
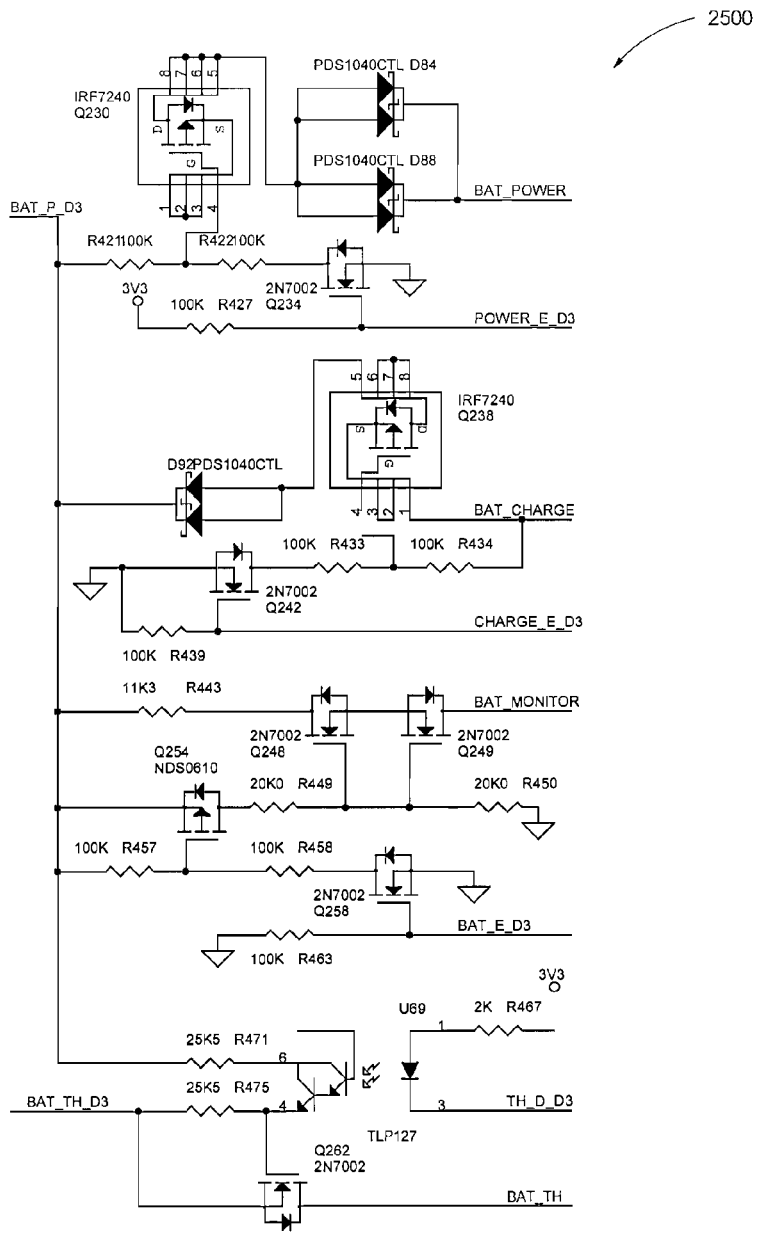
FIG. 25 is an example of a schematic similar to FIG. 5 of another individual microprocessor-controlled interface circuit.
Figure 26:
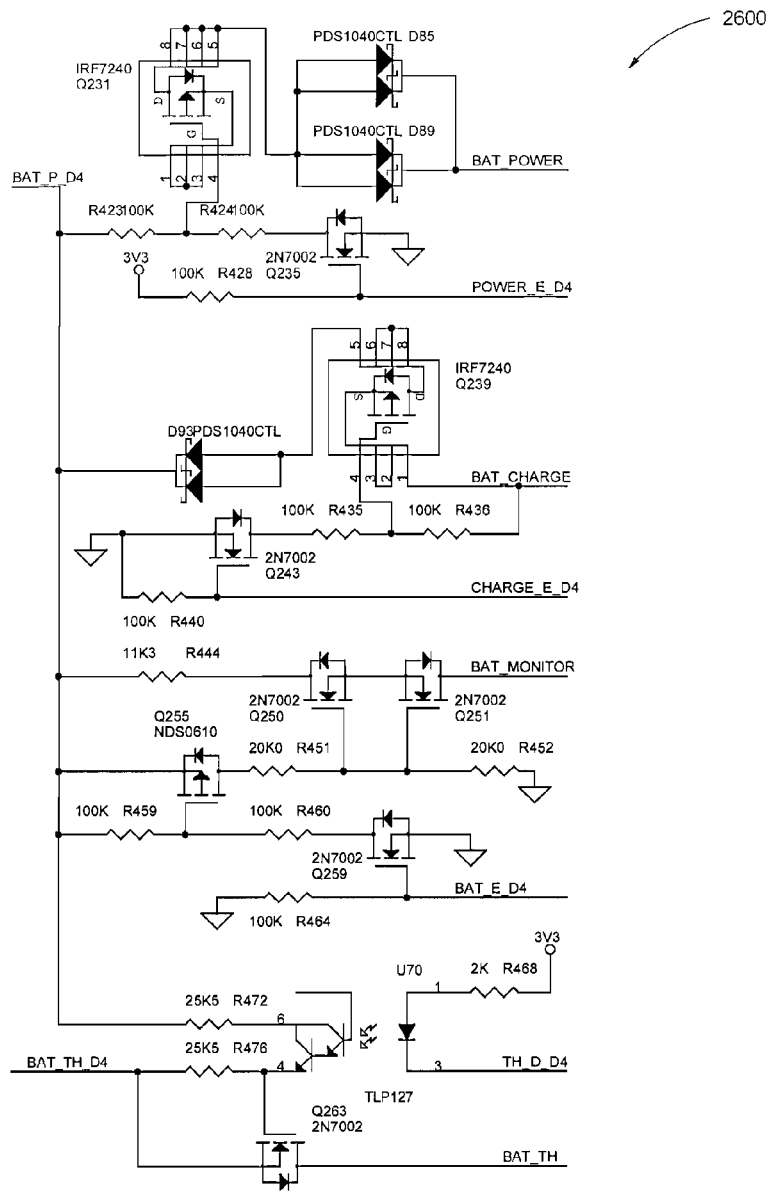
FIG. 26 is an example of a schematic similar to FIG. 5 of another individual microprocessor-controlled interface circuit.
Figure 27:
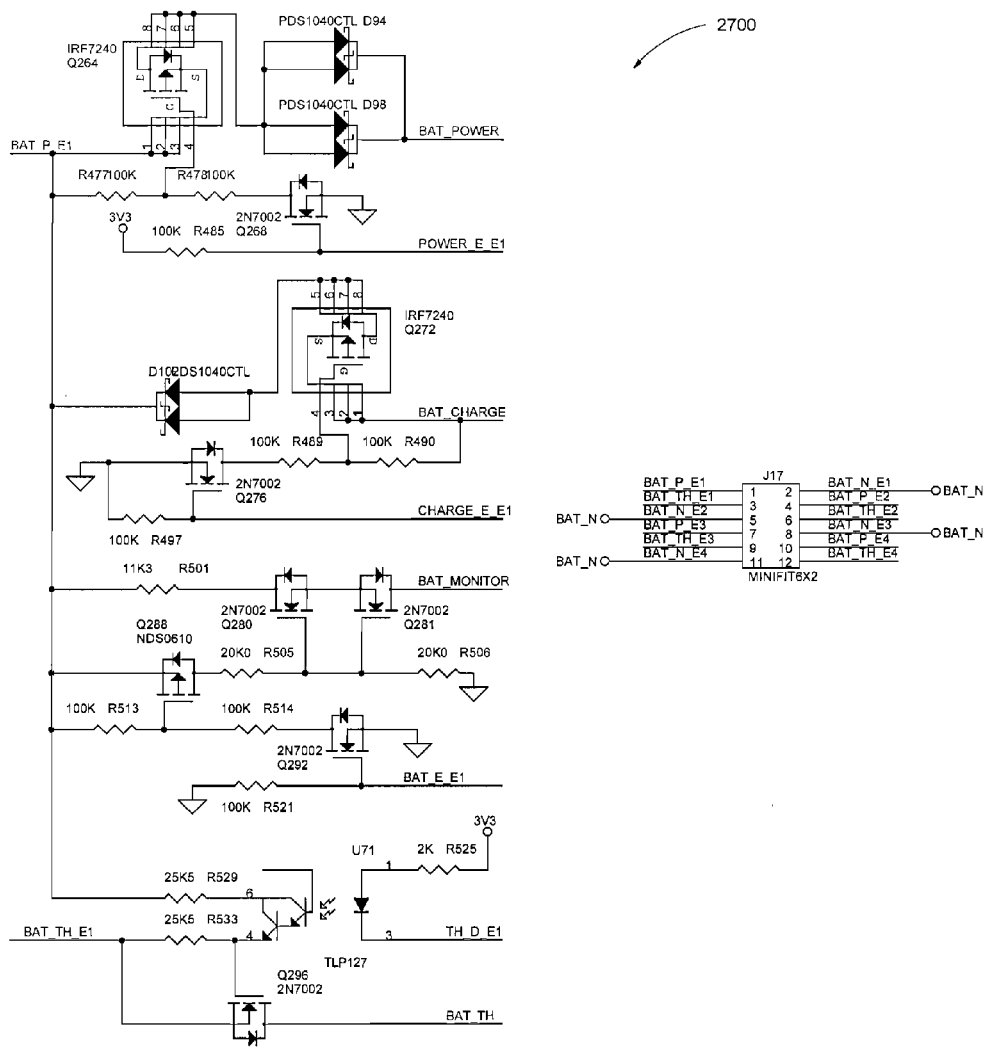
FIG. 27 is an example of a schematic similar to FIG. 5 of another individual microprocessor-controlled interface circuit.
Figure 28:
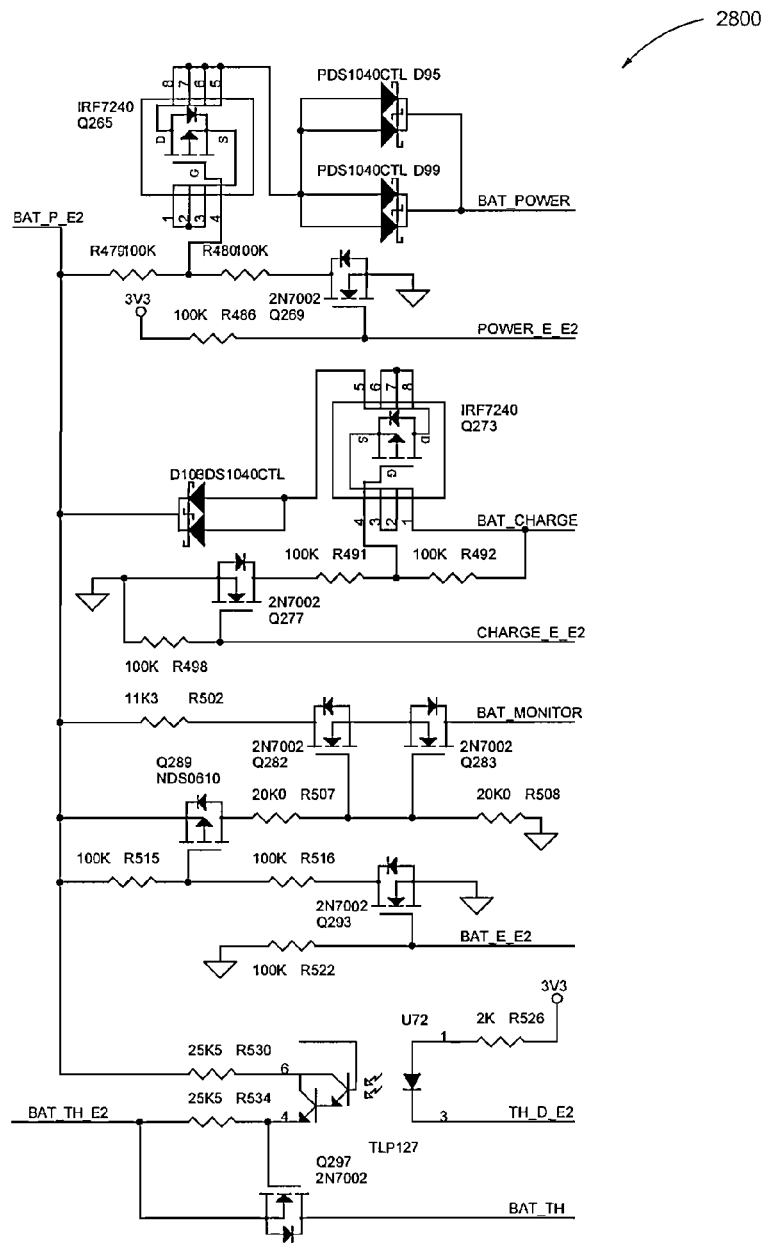
FIG. 28 is an example of a schematic similar to FIG. 5 of another individual microprocessor-controlled interface circuit.
Figure 29:
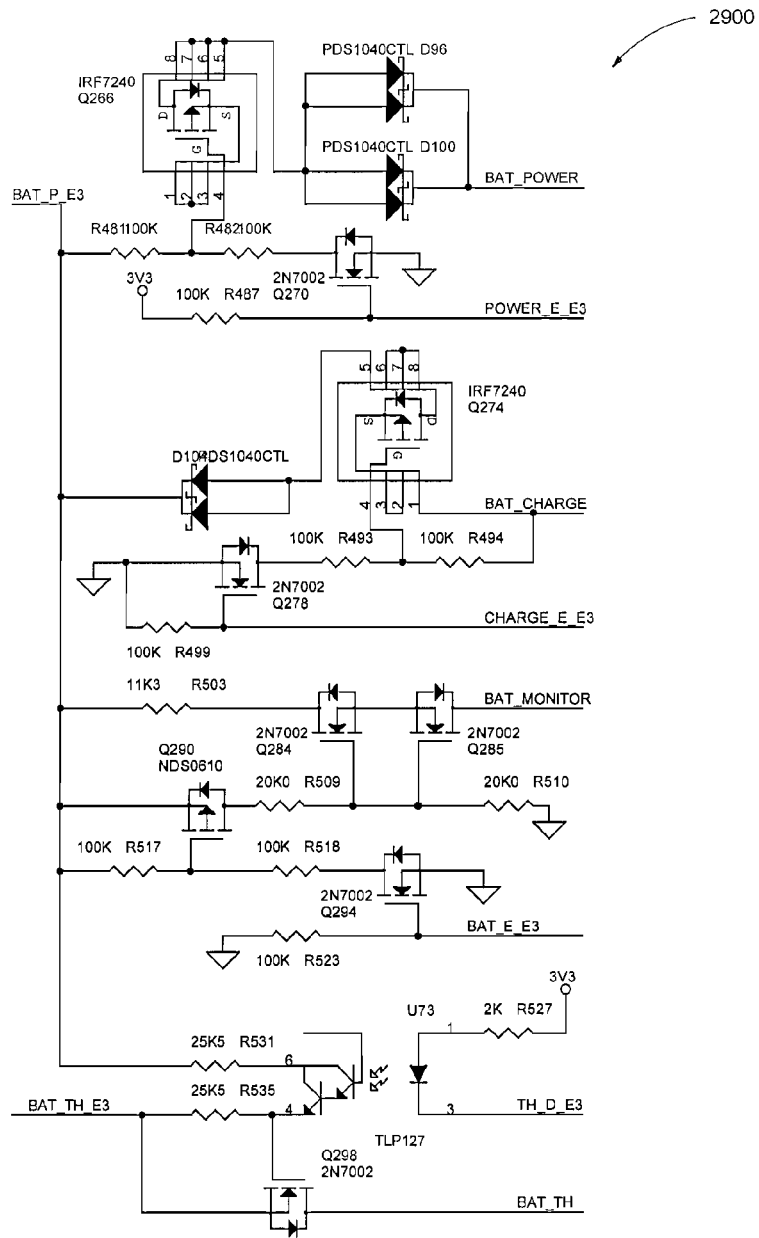
FIG. 29 is an example of a schematic similar to FIG. 5 of another individual microprocessor-controlled interface circuit.
Figure 30:
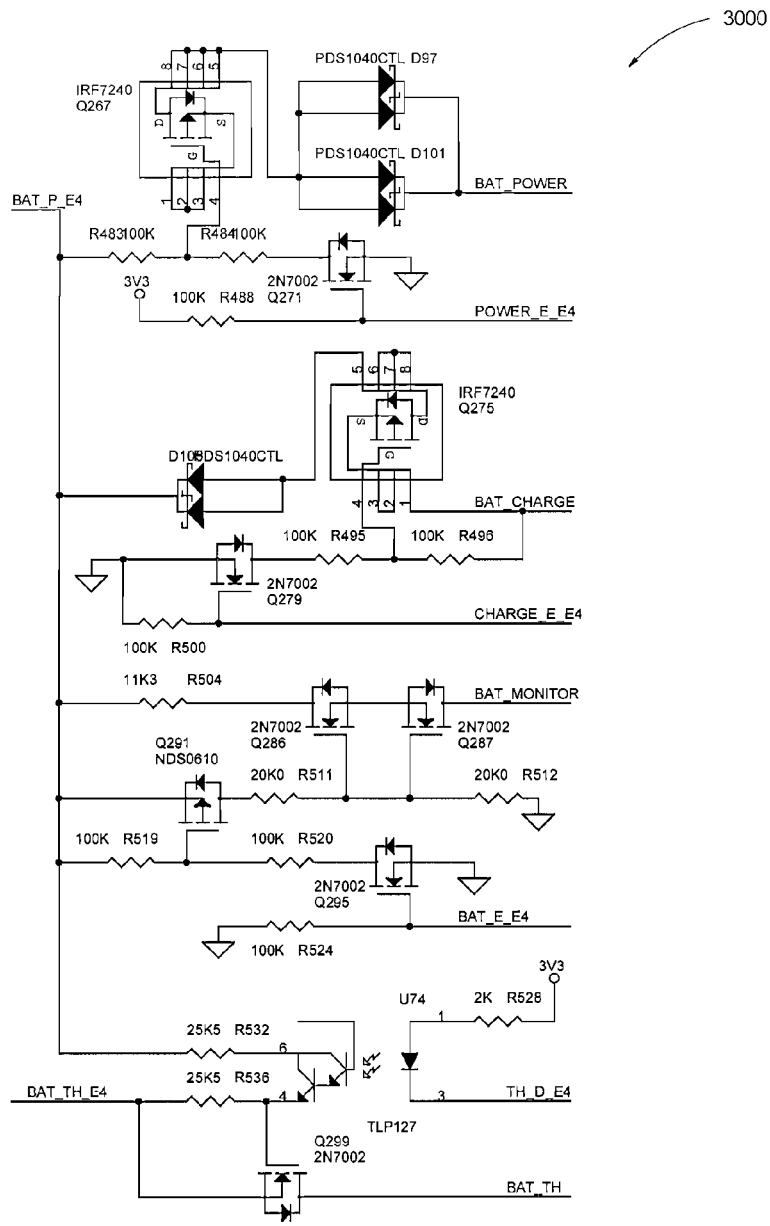
FIG. 30 is an example of a schematic similar to FIG. 5 of another individual microprocessor-controlled interface circuit.

FIG. 11 illustrates exemplary microprocessor-controlled battery interface circuits, detailed example, (1 of 20). Reference numeral 1101 is the discharge control switch circuitry, as described in connection with FIG. 5 above. Charge control switch circuit 1102 is shown in exemplary fashion and has been described in connection with FIG. 5 above. Battery monitor bus multiplex circuit 1103 has been described above in connection with FIG. 5. And, battery information bus switch circuit 1104 has been described above as well in connection with FIG. 5. Connector 1105, by which battery bus and switch control signals are connected with other system elements including the microprocessor and power conversion units, is illustrated in FIG. 11. FIGS. 12 through 30, are exemplary of battery interface circuits like the one just described in connection with FIG. 11 and FIG. 5. Reference numerals 1200, 1300, 1400, 1500, 1600, 1700, 1800, 1900, 2000, 2100, 2200, 2300, 2400, 2500, 2600, 2700, 2800, 2900 and 3000, illustrate the nineteen additional microprocessor-controlled battery interface circuits. Any number of battery interface circuits may be employed.

The circuitry and control methodology described herein is equally applicable to use of modular energy supply systems in automobiles. For instance, the control methodology described herein may be used in connection with Lithium ion batteries used in an automobile. In this way, the batteries may be removed from the automobile and recharged at a service station and then replaced into the vehicle fully charged. The batteries may be separately removed from the automobile or they may be removed in groups. The invention as taught and described herein enable the evaluation of individual batteries and the evaluation of the energy remaining in the batteries at the time they are swapped out (exchanged) for fully charged batteries. In this way a motorist can effectively refuel his or her vehicle and proceed on his or her way without worrying about stopping to charge the batteries which is time consuming as the recharge time for Lithium ion batteries is considerable. Having the ability to quickly swap the batteries in a Lithium ion car enables the driver to get credit for the energy in his "gas" tank. In reality the teachings of the instant invention enable the driver to effectively have an "energy tank" as compared to a "gas tank."

Figure 31:
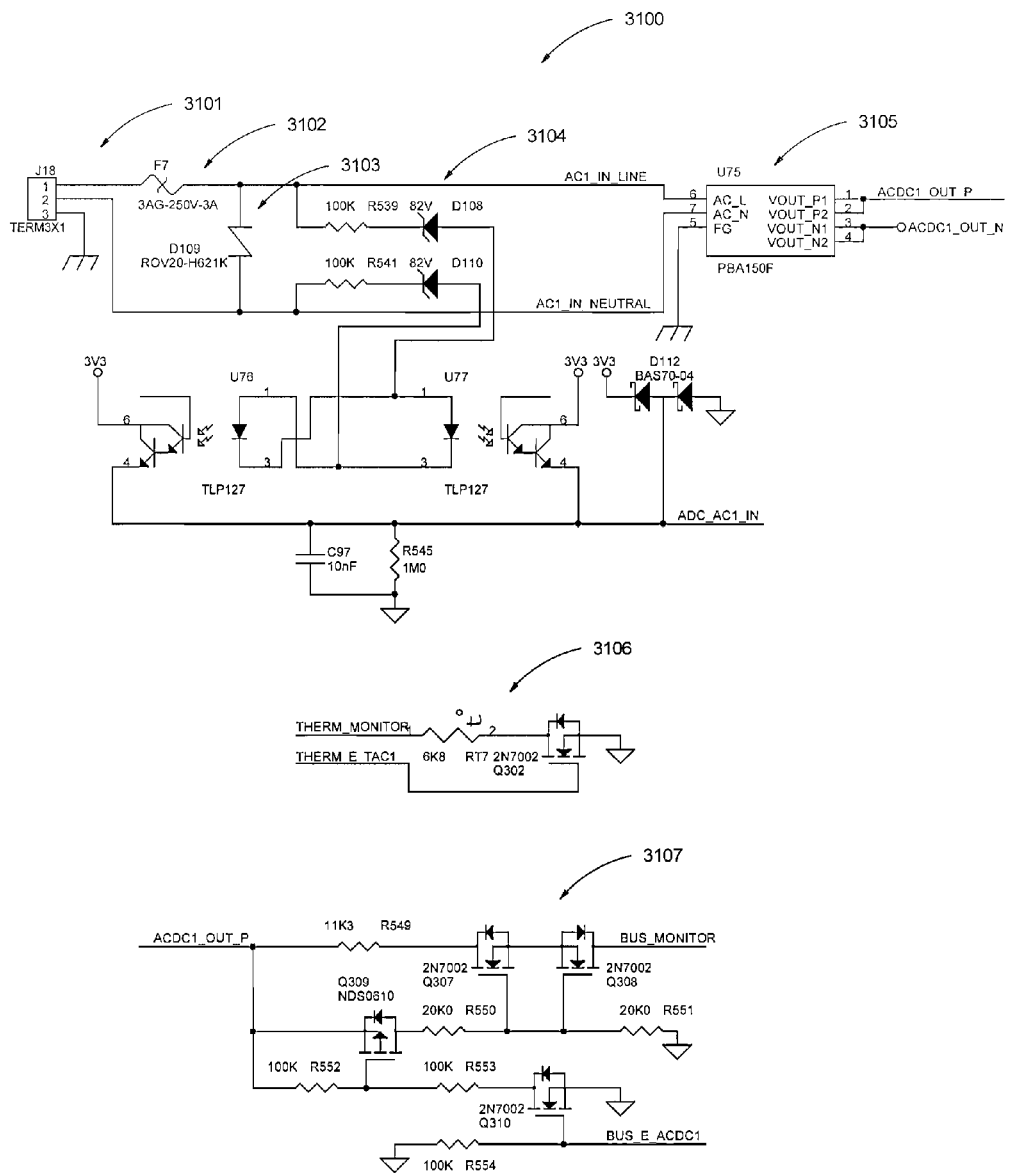
FIG. 31 indicates an example of AC input and AC/DC converter circuits.

FIG. 31 illustrates 3100 exemplary AC input and AC/DC converter circuits which are described elsewhere hereinabove in connection with FIGS. 4, 4A, 4B, 4C and 5. Reference numeral 3101 indicates input terminals for AC line, neutral, and ground. Reference numeral 3102 indicates an AC input fuse which protects converter 406. Reference numeral 3103 is an AC input transient voltage suppression circuit protecting converter 406. Reference numeral 3104 is an indication of an AC detect circuit, as described elsewhere referring to FIG. 4, reference numerals 404, 405. Reference numeral 3105 indicates in an exemplary fashion AC/DC converter, as described elsewhere referring to FIG. 4, reference numeral 406. Reference numeral 3106 is exemplary of AC/DC temperature sensing circuit, as described elsewhere referring to FIG. 4, reference numeral 412E. Reference numeral 3107 indicates AC/DC converter DC output voltage selective coupling as described elsewhere referring to FIG. 4 (reference numerals 406A and 412).

Figure 32:
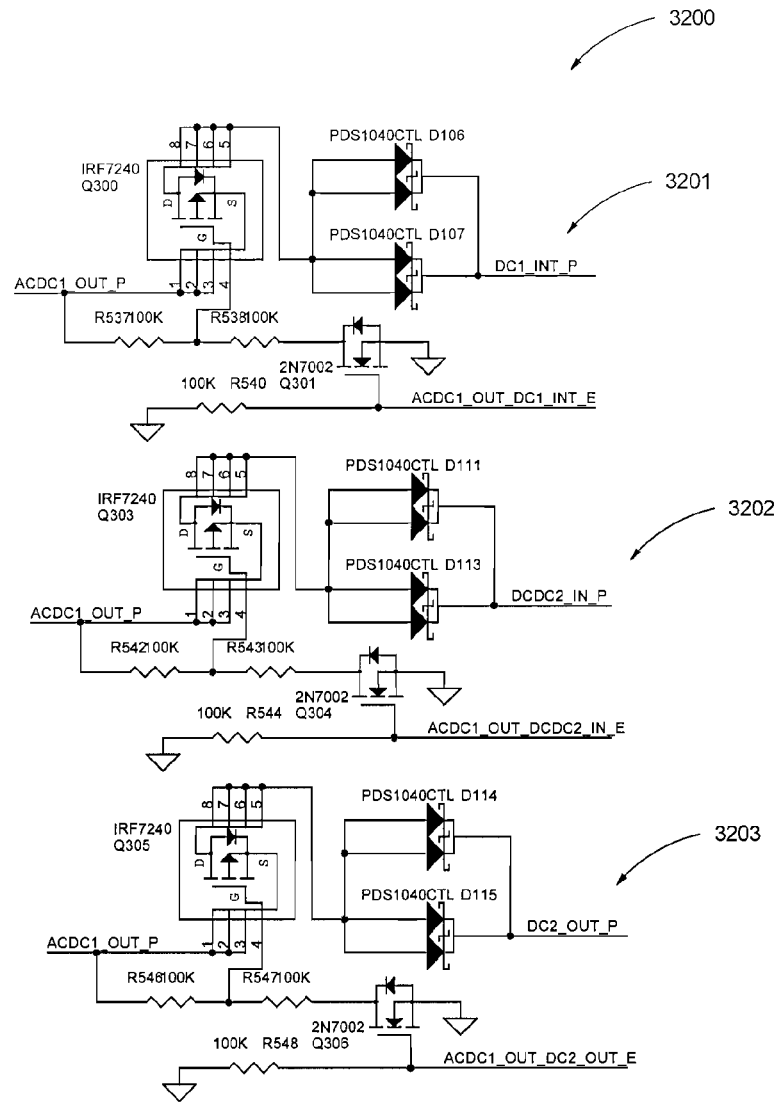
FIG. 32 is an example of an AC/DC converter and DC output voltage bus connection switch.

FIG. 32 illustrates 3200 exemplary AC/DC converter DC output voltage bus connection switches. Selective coupling circuits 3201 are illustrated for AC/DC to DC INT BUS, as described elsewhere referring to FIG. 4 (reference numerals 406A, 407, 423, and 412B). Selective coupling circuits 3202 for coupling the AC/DC to SECOND DC BUS as set forth and previously described in connection with FIG. 4 (406A, 408, 410, and 412A). And, selective coupling circuits 3203 for coupling the AC/DC to THIRD DC BUS, as described elsewhere referring to FIG. 4 (reference numerals 406A, 409, 411, and 412C).

Figure 33:
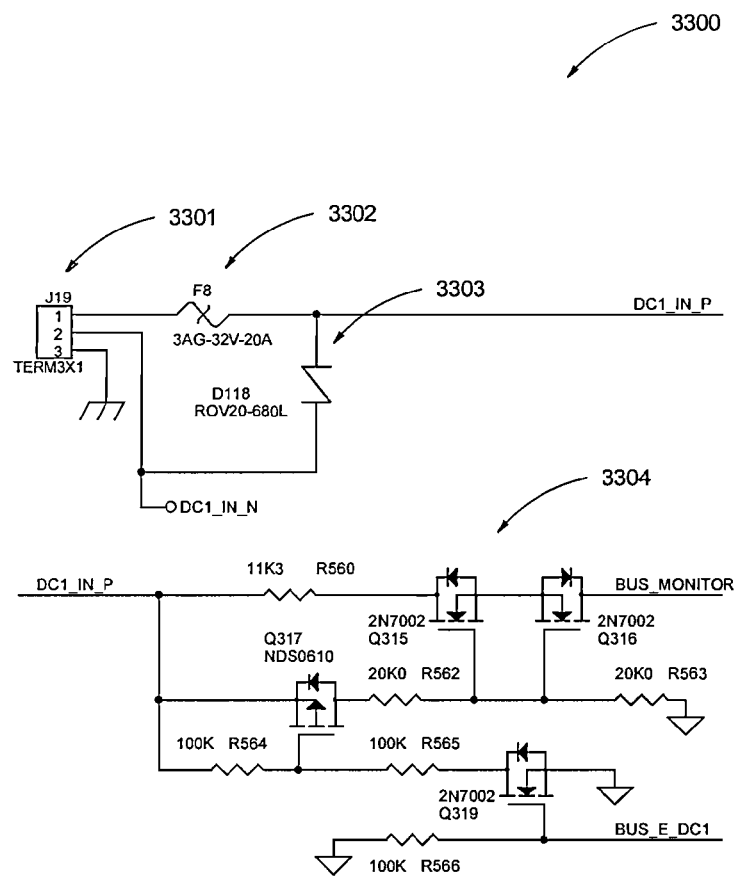
FIG. 33 is an example of First DC input circuits.

FIG. 33 illustrates 3300 First DC input circuits wherein reference numeral 3301 indicates DC input terminals for positive, negative, and ground and reference numeral 3302 DC indicates an input fuse. DC input transient voltage suppression circuit 3303 is illustrated as an MOV. DC input voltage monitoring selective coupling circuit 3304 is illustrated and was described elsewhere referring to FIG. 4A (reference numeral 438).

Figure 34:
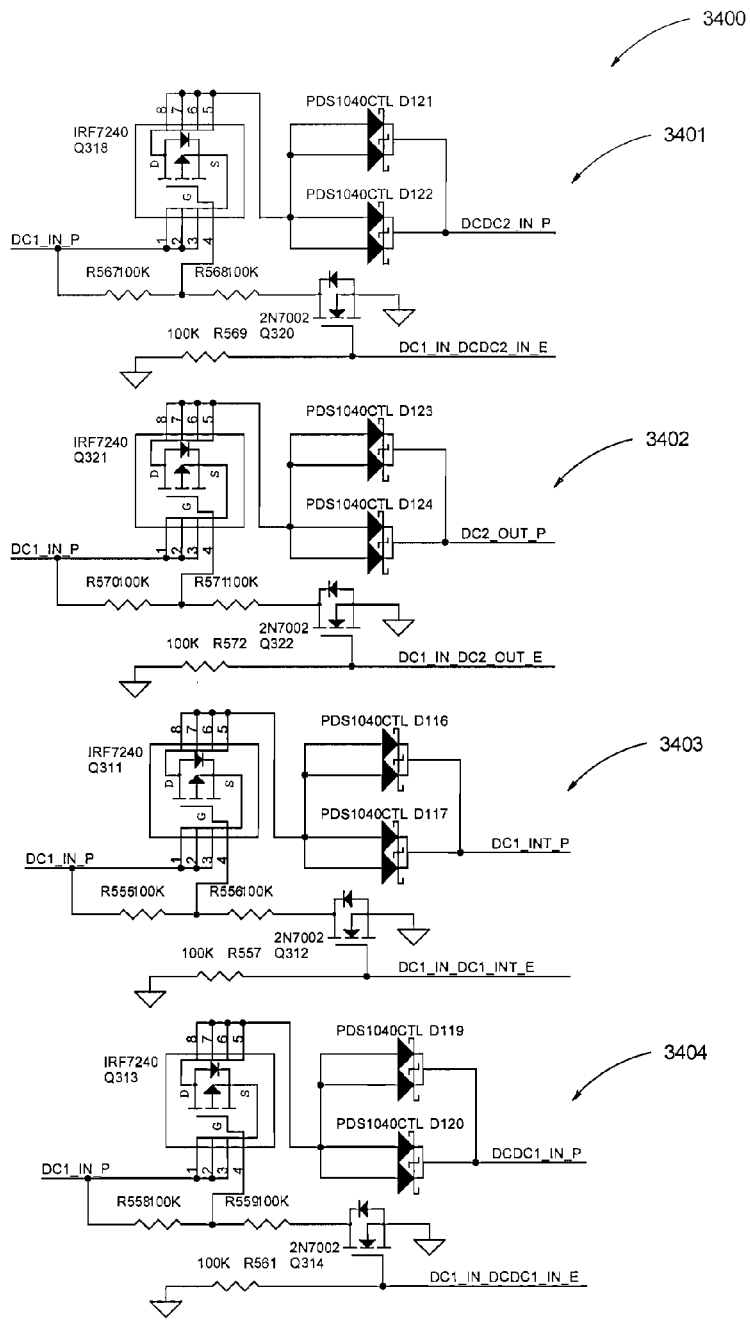
FIG. 34 illustrates an example of First DC input bus connections switches.

FIG. 34 illustrates 3400 the First DC input bus connections switches in exemplary fashion and as described elsewhere referring to FIG. 4A. Selective coupling circuits 3401 for coupling first DC input to second DC bus (FIG. 4A, reference numerals 430A, 432A, 436, 412A) are illustrated in FIG. 34 as are the selective coupling circuits 3402 for coupling the first DC input to third DC bus (FIG. 4A, reference numerals 430A, 433, 437, 412C). FIG. 34 also depicts selective coupling circuits 3403 for the first DC input to DC INT bus as described above in connection with FIG. 4A, reference numerals 430A, 431, 434, 412B.

Selective coupling circuits 3404 for coupling the first DC input to the first DC bus are illustrated in FIG. 34 and also as described above in connection with FIG. 4A, reference numerals 430A, 432, 435, 412J.

Figure 35:
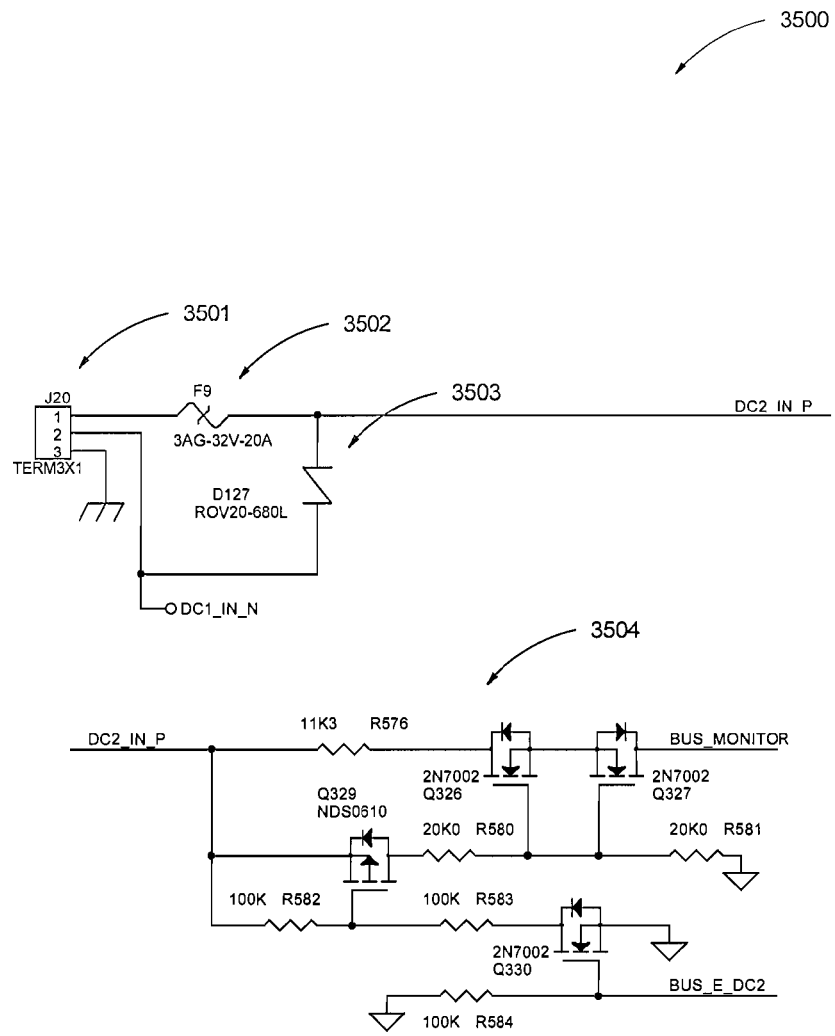
FIG. 35 illustrates an example of Second DC input circuits.

FIG. 35 illustrates 3500 the Second DC input circuits wherein reference numeral 3501 DC indicates the input terminals for positive, negative, and ground and reference numeral 3502 indicates the DC input fuse. Reference numeral 3503 indicates the DC input transient voltage suppression circuit (MOV) and reference numeral 3504 illustrates the DC input voltage monitoring selective coupling circuit as described above referring to FIG. 4A, reference numeral 448.

Figure 36:
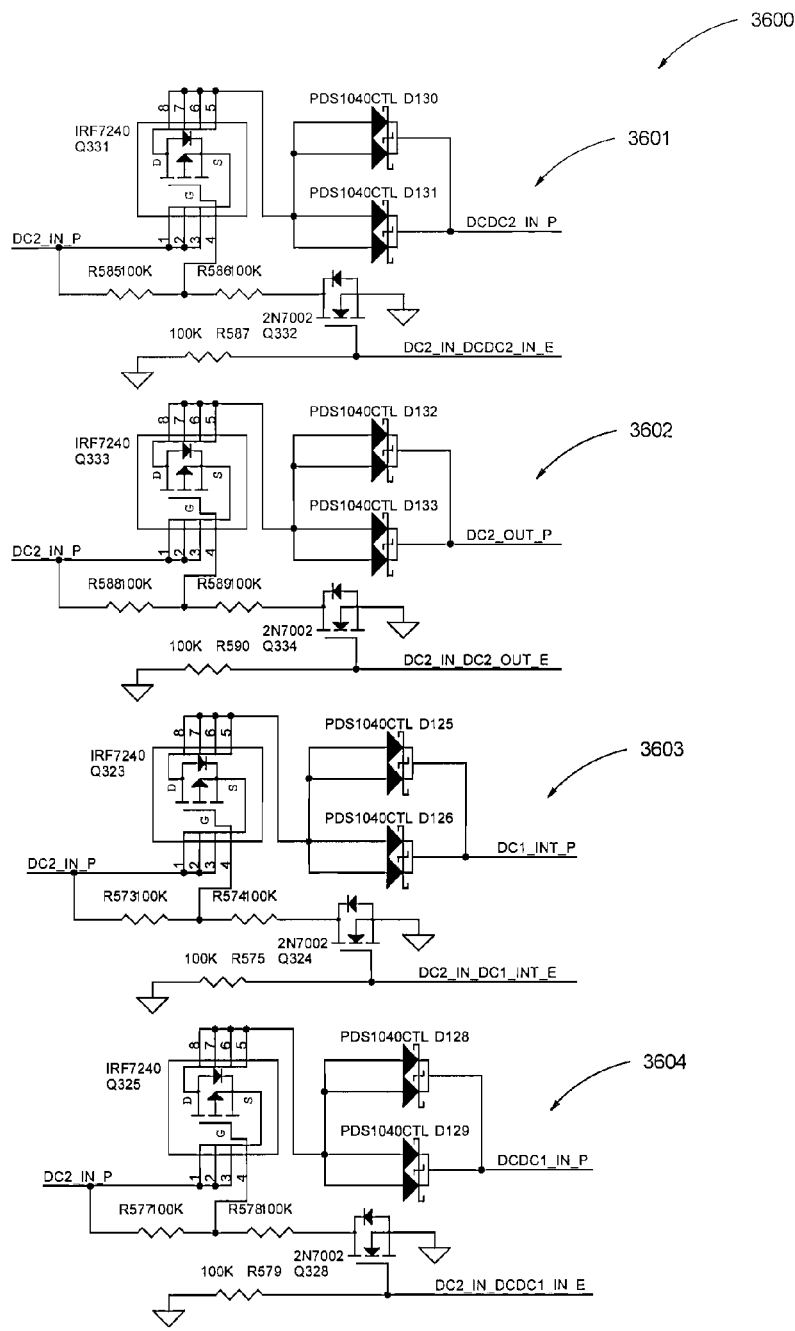
FIG. 36 illustrates an example of Second DC input bus connections switches.

FIG. 36 illustrates 3600 exemplary Second DC input bus connection switches, as described above referring to FIG. 4A. Selective coupling circuits 3601 for coupling the second DC input to second DC bus are illustrated in FIG. 36 and have been described previously in FIG. 4A, reference numerals 439A, 442, 446, 412A. Selective coupling circuits 3602 for coupling second DC input to third DC bus are illustrated in FIG. 36 in exemplary fashion and are discussed above in connection with FIG. 4A, reference numerals 439A, 443, 447, 412C. Selective coupling circuits 3603 for coupling the second DC input to DC INT bus are illustrated by way of example in FIG. 36 and were discussed above in connection with FIG. 4A, reference numerals 439A, 440, 444, 412B. And, selective coupling circuits 3604 for coupling the second DC input to the first DC bus are illustrated by way of example in FIG. 36 and are discussed above in connection with FIG. 4A, reference numerals 439A, 441, 445, 412J.

Figure 37:
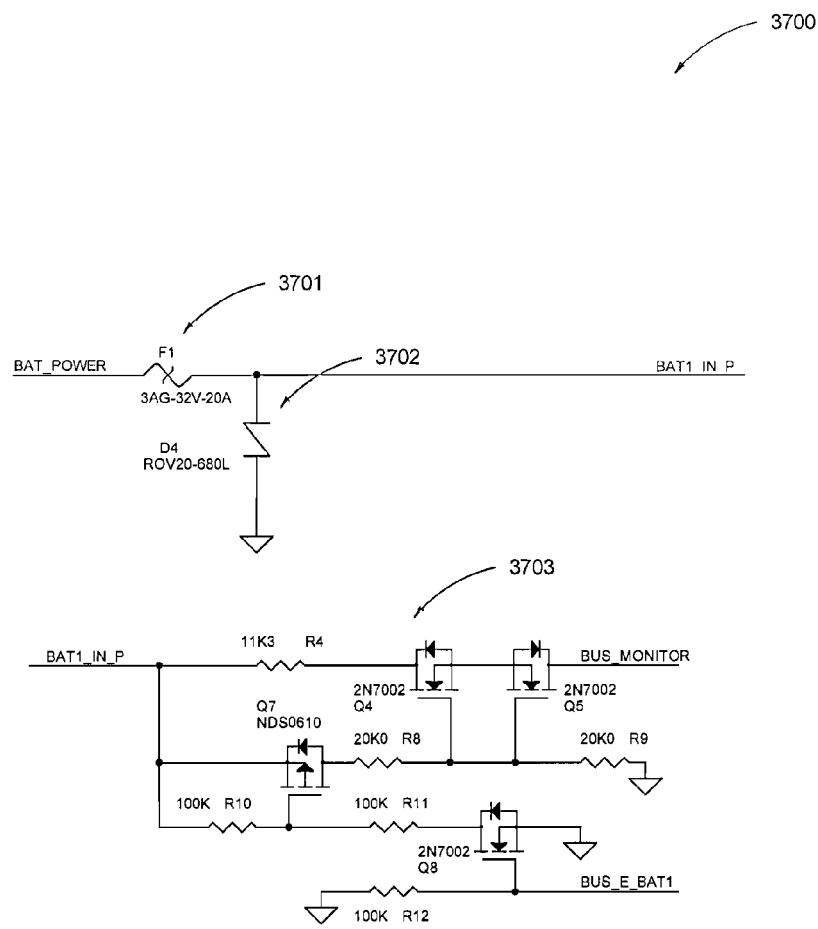
FIG. 37 illustrates Third DC input battery pack array circuits.

FIG. 37 illustrates 3700 the Third DC input battery pack array circuits wherein reference numeral 3701 indicates DC input fuse and reference numeral 3702 indicates DC input transient voltage suppression circuit as described above as an MOV. DC input voltage monitoring selective coupling circuit 3703 is also depicted in FIG. 37 and is described elsewhere described elsewhere in FIG. 4A, reference numeral 459.

Figure 38:
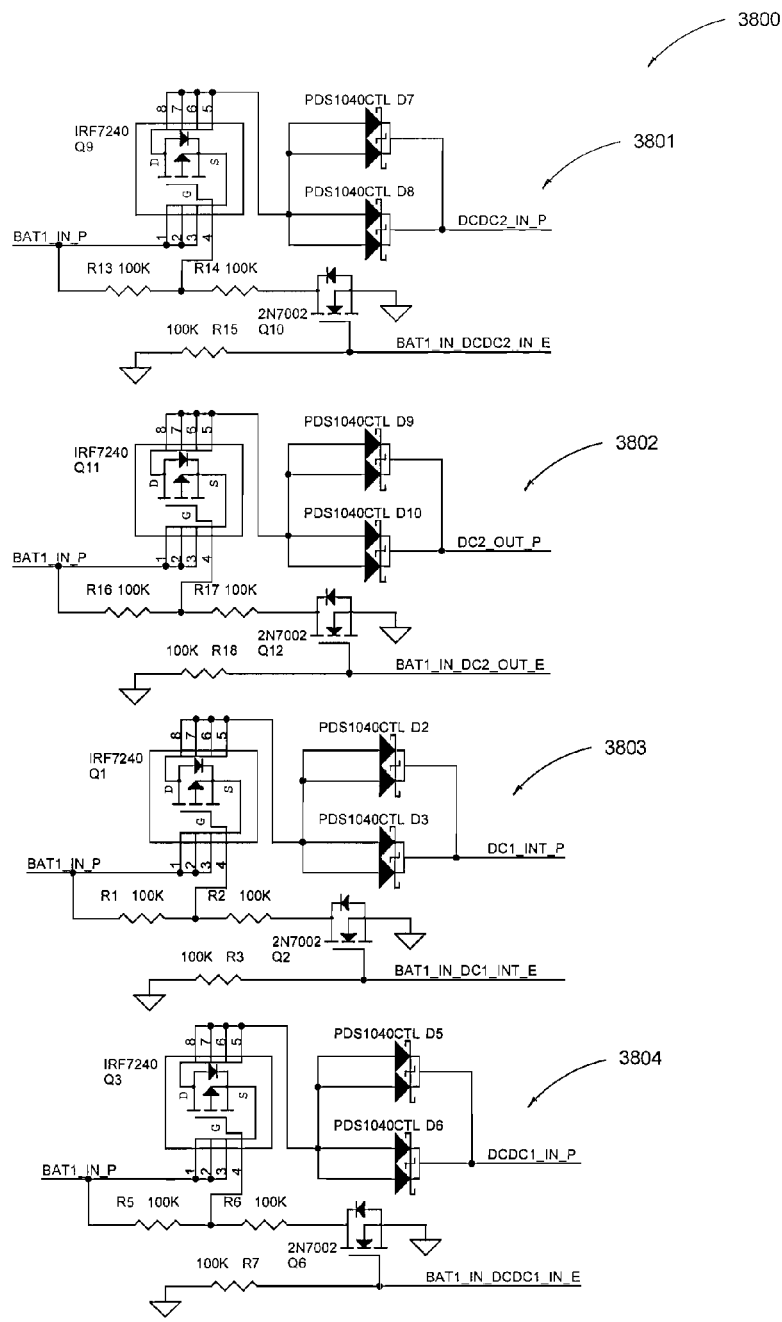
FIG. 38 illustrates the Third DC input bus connection switches.

FIG. 38 illustrates 3800 the Third DC input bus connections switches described above in connection with FIG. 4A wherein selective coupling circuits 3801 couple the third DC input with the second DC bus, FIG. 4A, reference numerals 450B, 453, 457, 412A. Also shown in FIG. 38 are the selective coupling circuits 3802 for coupling the third DC input to third DC bus as described above in connection with FIG. 4A, reference numerals 450B, 454, 458, 412C. Selective coupling circuits 3803 for coupling the third DC input to DC INT bus as described above in connection with FIG. 4A, reference numerals 450B, 451, 455, 412B and selective coupling circuits 3804 for coupling the third DC input to first DC bus are shown in FIG. 38 and were previously described above in connection with FIG. 4A, reference numerals 450B, 452, 456, 412J.

Figure 39:
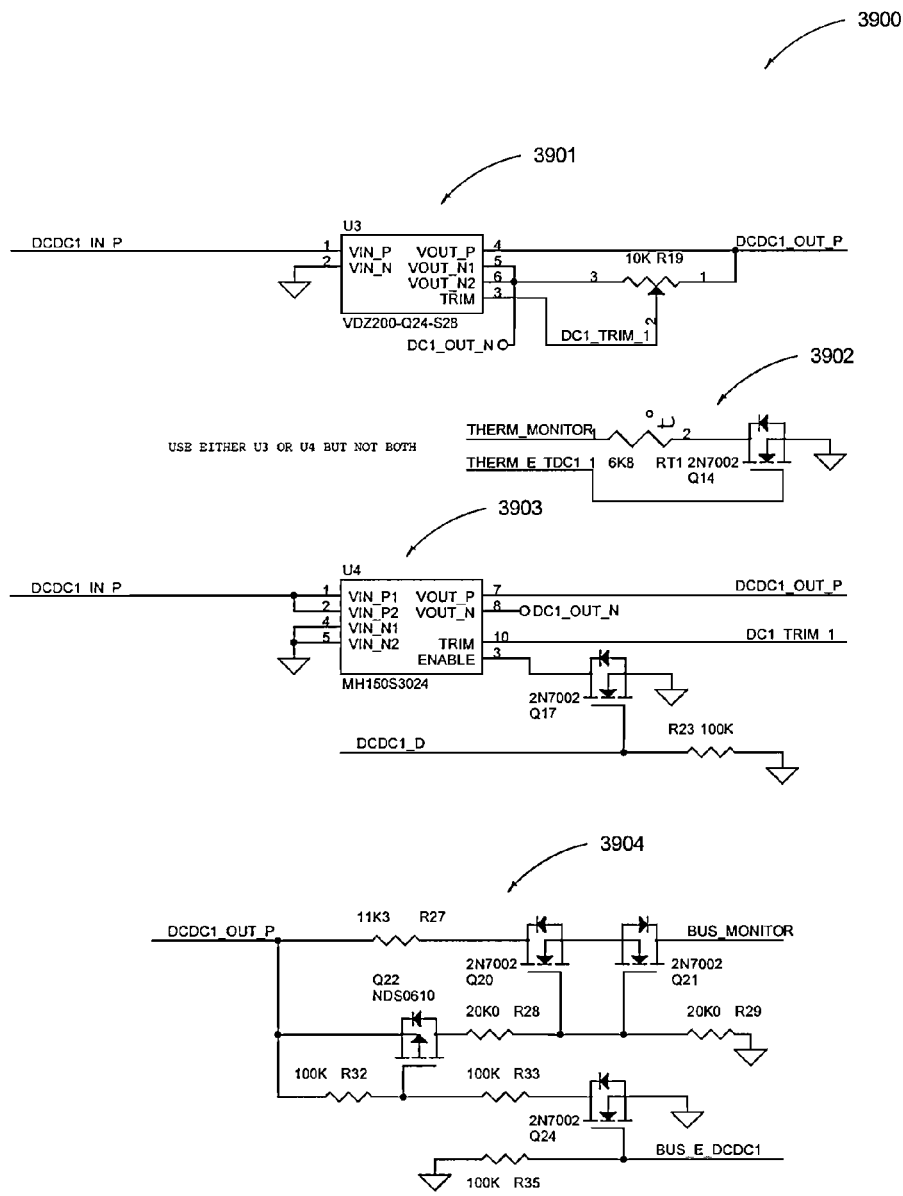
FIG. 39 illustrates an example of First DC/DC converter circuits.

FIG. 39 illustrates 3900 the First DC/DC converter circuits 3901 described above in FIG. 4B (reference numeral 475) wherein First DC/DC converter temperature measuring circuit 3902 was described in FIG. 4B in connection with reference numeral 482E. Alternative first DC/DC converter 3903 having a detailed pin assignment differing from 3901 is also illustrated in FIG. 39. DC/DC converter voltage monitoring selective coupling circuit 3904 described in connection with FIG. 4B, reference numeral 482 and is illustrated in FIG. 39.

Figure 40:
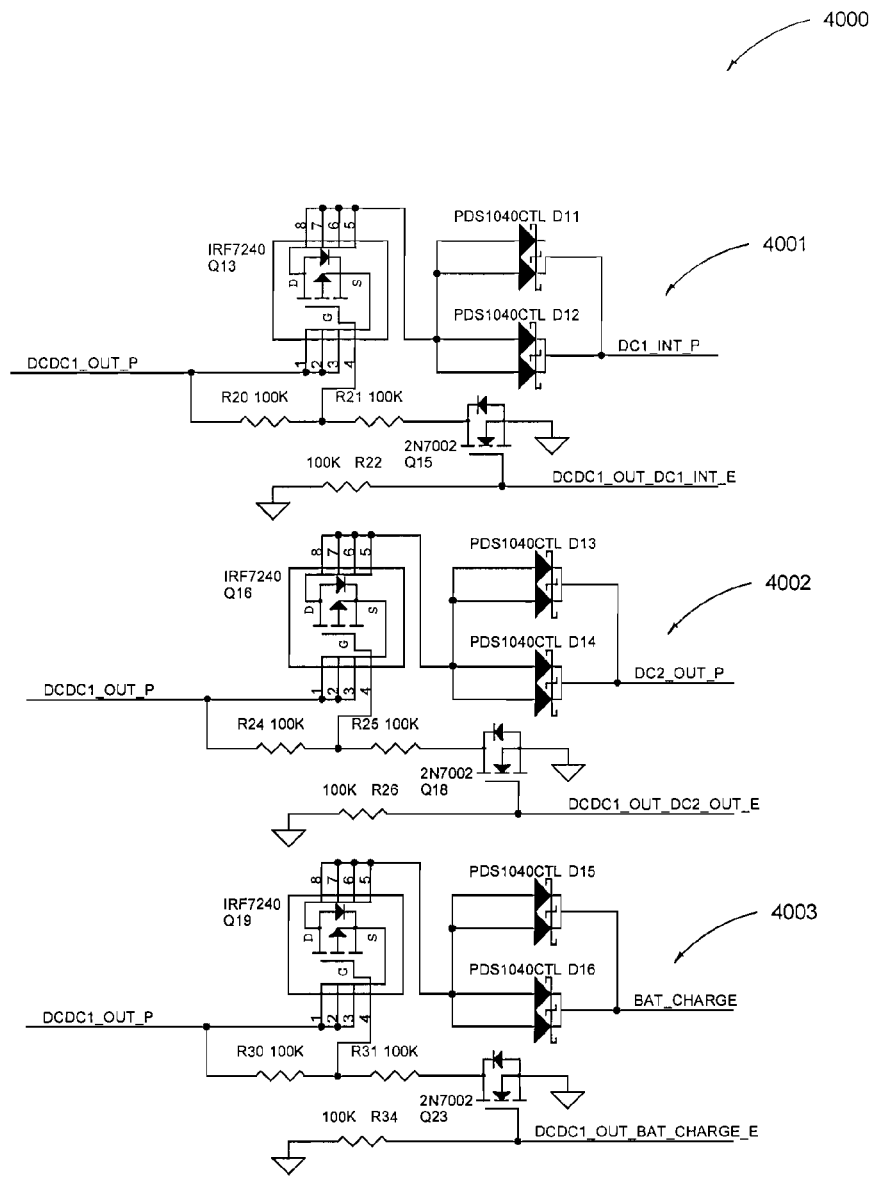
FIG. 40 illustrates an example of First DC/DC converter bus connection switches.

FIG. 40 illustrates 4000 the First DC/DC converter bus connections switches described in connection with FIG. 4B wherein selective coupling circuits 4001 for coupling the first DC/DC converter to DC INT bus were described in connection with reference numerals 475A, 477, 480, 412B. Selective coupling circuits 4002 for coupling the first DC/DC converter to third DC bus are illustrated in FIG. 40 and were described above in connection with FIG. 4B, and in particular with reference numerals 475A, 478, 480A, 412C. Selective coupling circuits for 4003 for coupling the first DC/DC converter to the DC charge bus are illustrated in FIG. 40 and were described above in connection with FIG. 4B, reference numerals 475A, 479, 481, 489A.

Figure 41:
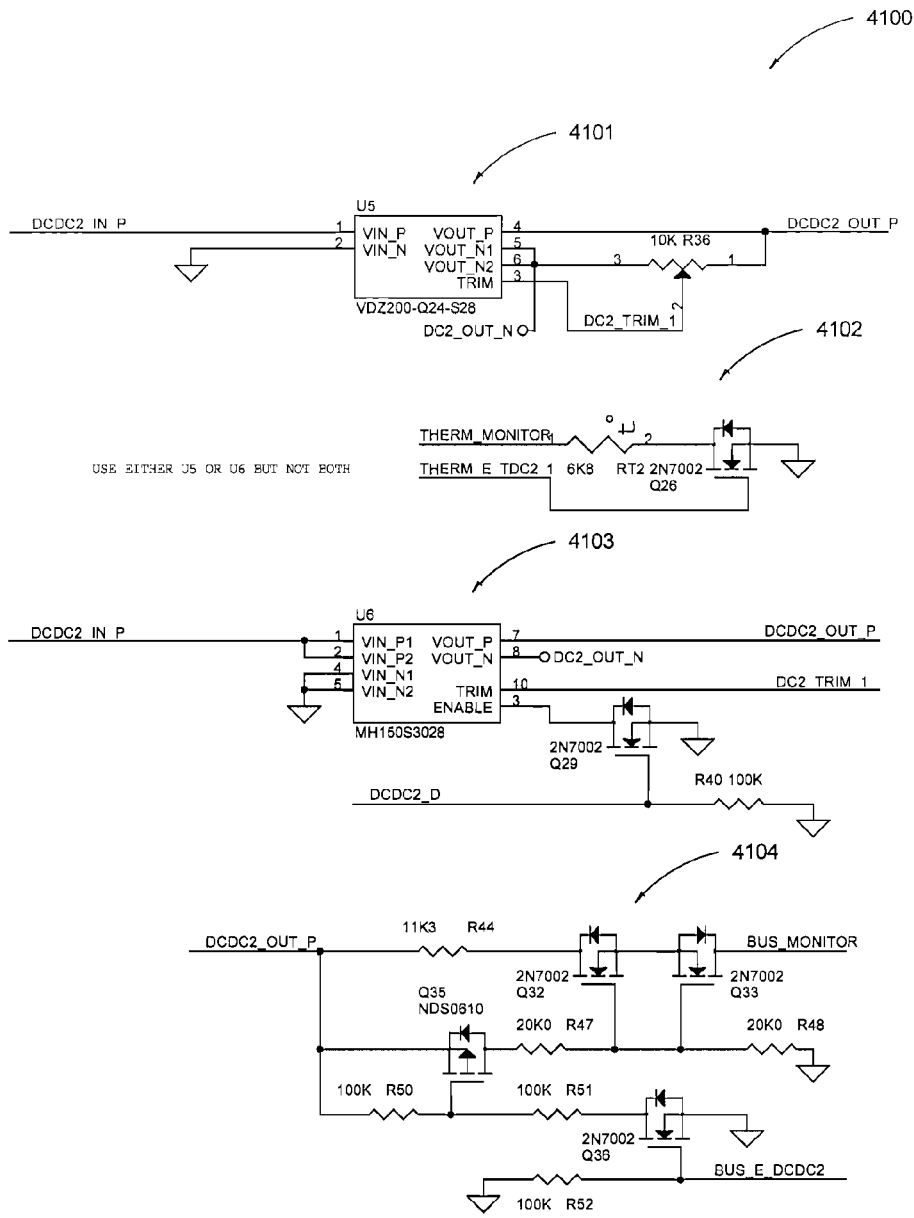
FIG. 41 illustrates an example of Second DC/DC converter circuits.

FIG. 41 illustrates 4100 the Second DC/DC converter circuits 4101 described elsewhere referring to FIG. 4B (reference numeral 483) and the Second DC/DC converter temperature measuring circuit 4102 as described elsewhere referring to FIG. 4B (reference numeral 490E). Alternative second DC/DC converter 4103 having a detailed pin assignment differing from 4101 is illustrated in FIG. 41 as well. DC/DC converter voltage monitoring selective coupling circuit 4104 as described elsewhere referring to FIG. 4B (reference numeral 490) is also illustrated in FIG. 41.

Figure 42:
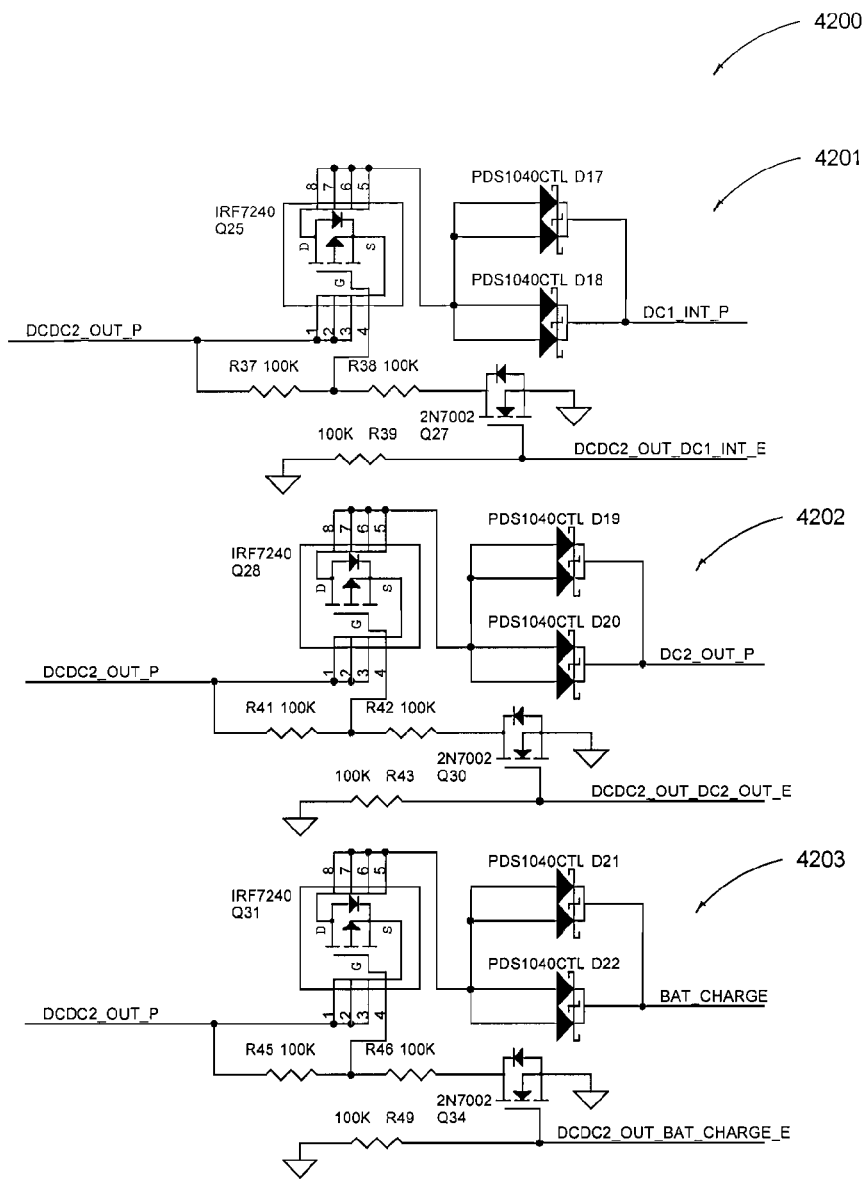
FIG. 42 illustrates an example of First DC/DC converter bus connection switches.

FIG. 42 illustrates 4200 in exemplary fashion the Second DC/DC converter bus connections switches described in FIG. 4B wherein the selective coupling circuits 4201 for coupling the second DC/DC converter to DC INT bus. See the discussion of FIG. 4B as it pertains to reference numerals 483A, 484, 487, 412B. Selective coupling circuits 4202 for coupling the second C/DC converter to third DC bus as described in above in connection FIG. 4B and reference numerals 483A, 485, 488, 412C are shown in FIG. 42. Also, selective coupling circuits 4203 for coupling the second DC/DC converter to DC charge bus are shown in FIG. 42 and were discussed above in connection with FIG. 4B, reference numerals 483A, 486, 489, 489A.

Figure 43:
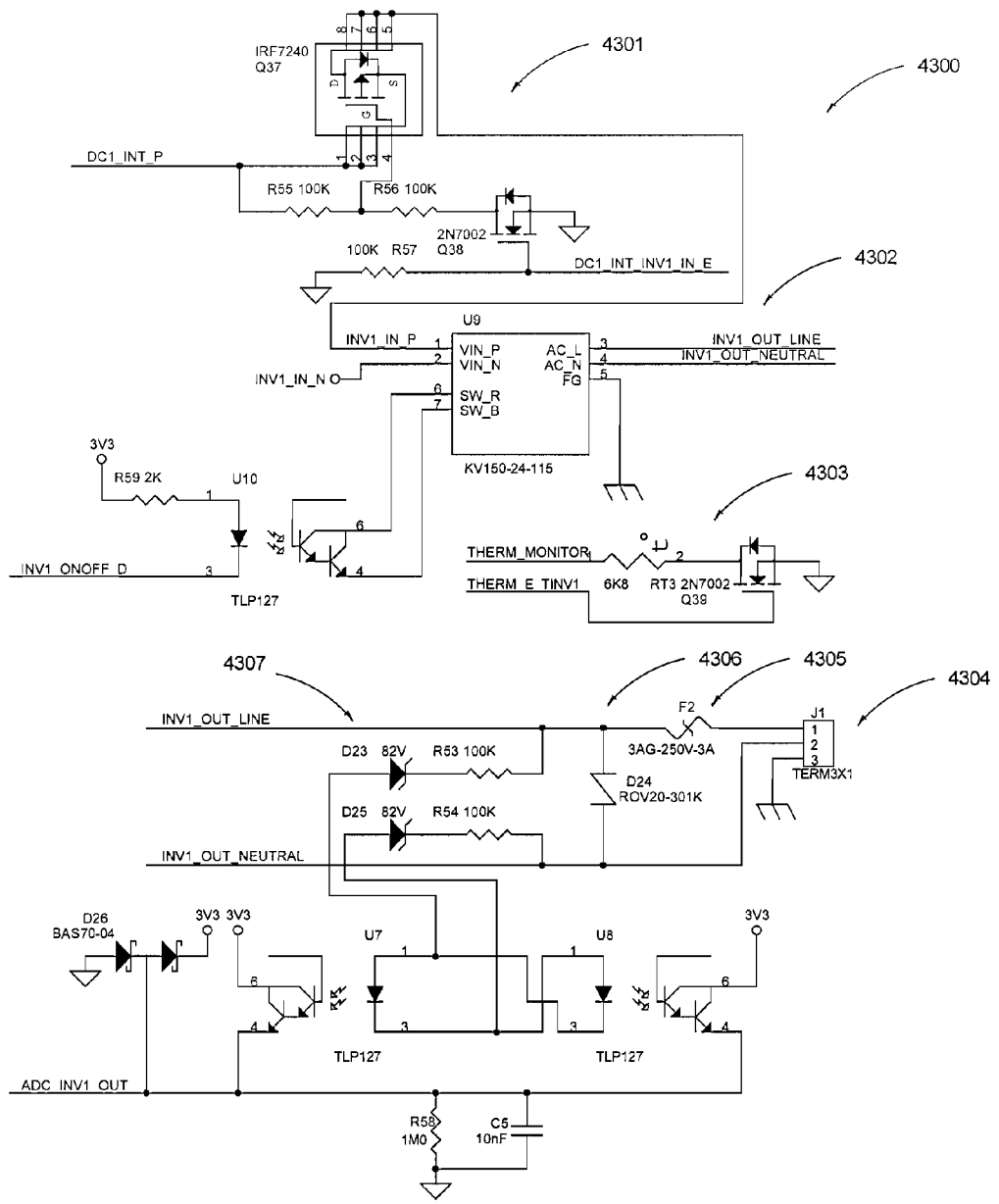
FIG. 43 illustrates an example of DC/AC inverter circuits.

FIG. 43 illustrates 4300 the DC/AC inverter circuits wherein the DC/AC inverter input power switch 4301 as described elsewhere referring to FIG. 4, reference numeral 413, and DC/AC inverter 4302 as described in FIG. 4, reference numeral 414 are shown. DC/AC inverter temperature measuring circuit 4303 is also illustrated in FIG. 43 and previously described referring to FIG. 4, reference numeral 416B.

Still referring to FIG. 43, DC/AC inverter output terminals 4303 for line, neutral, and ground are shown as is the DC/AC inverter output fuse 4305. DC/AC inverter output transient voltage suppression circuit 4306 is illustrated in FIG. 43 as an MOV and was described previously. DC/AC inverter AC detect circuit 4307 is illustrated in FIG. 43 and was described above in regard to FIG. 4, reference numeral 415 and 416.

Figure 44:
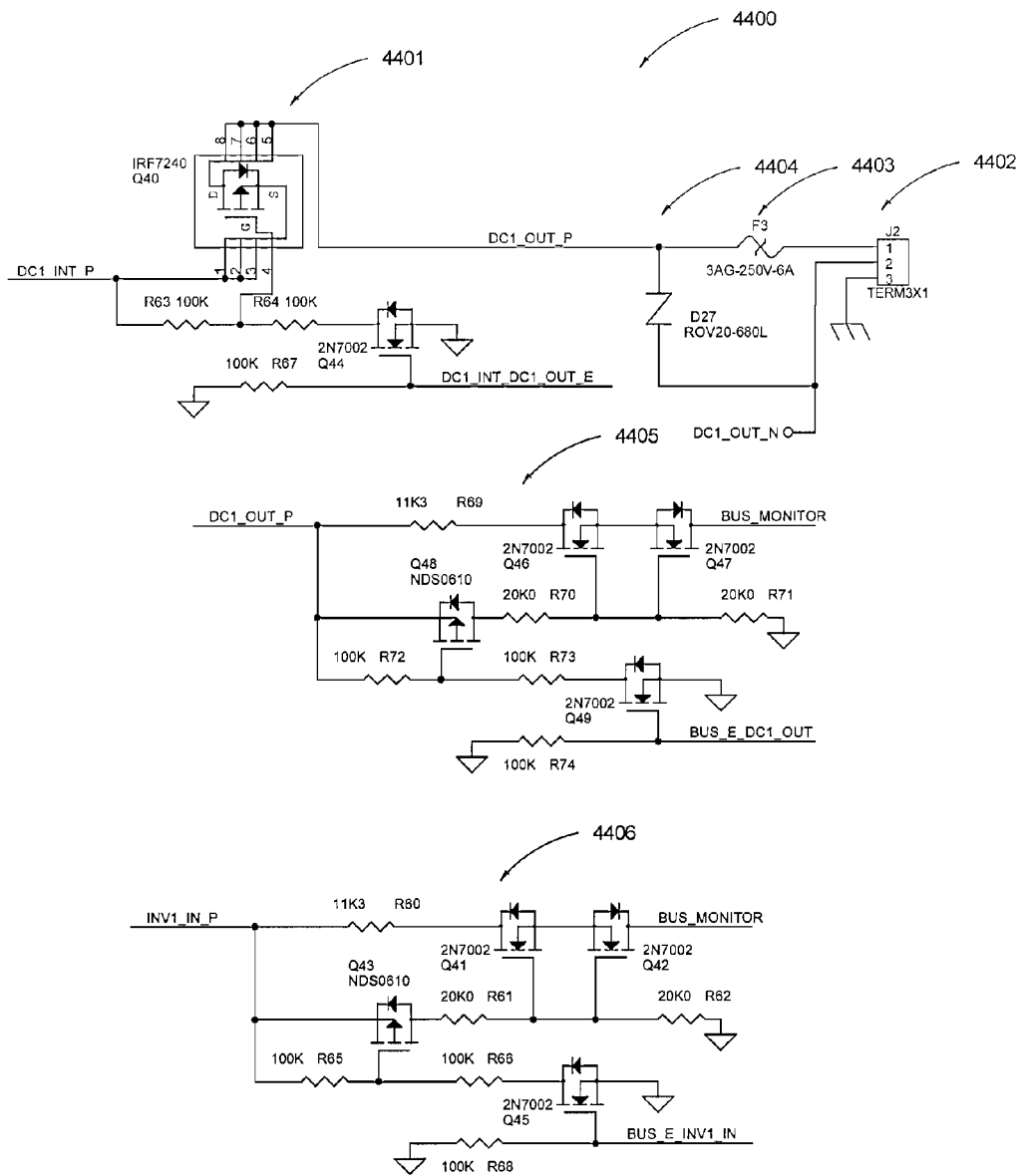
FIG. 44 illustrates an example of First DC output circuits.

FIG. 44 illustrates 4400 the First DC output circuits wherein the First DC output switch 4401 was described elsewhere referring to FIG. 4, reference numeral 425. First DC output terminals 4402 for positive, neutral, and ground are shown in FIG. 44 as is the First DC output fuse 4403. First DC output transient voltage suppression circuit 4404 is an MOV as was previously described above. First DC output voltage monitoring selective coupling circuit 4405 is illustrated in FIG. 4 and described above in connection with FIG. 4, reference numeral 420. DC/AC inverter input voltage monitoring selective coupling circuit 4406 is also illustrated in FIG. 44 and was described hereinabove in connection with FIG. 4, reference numeral 419.

Figure 45:
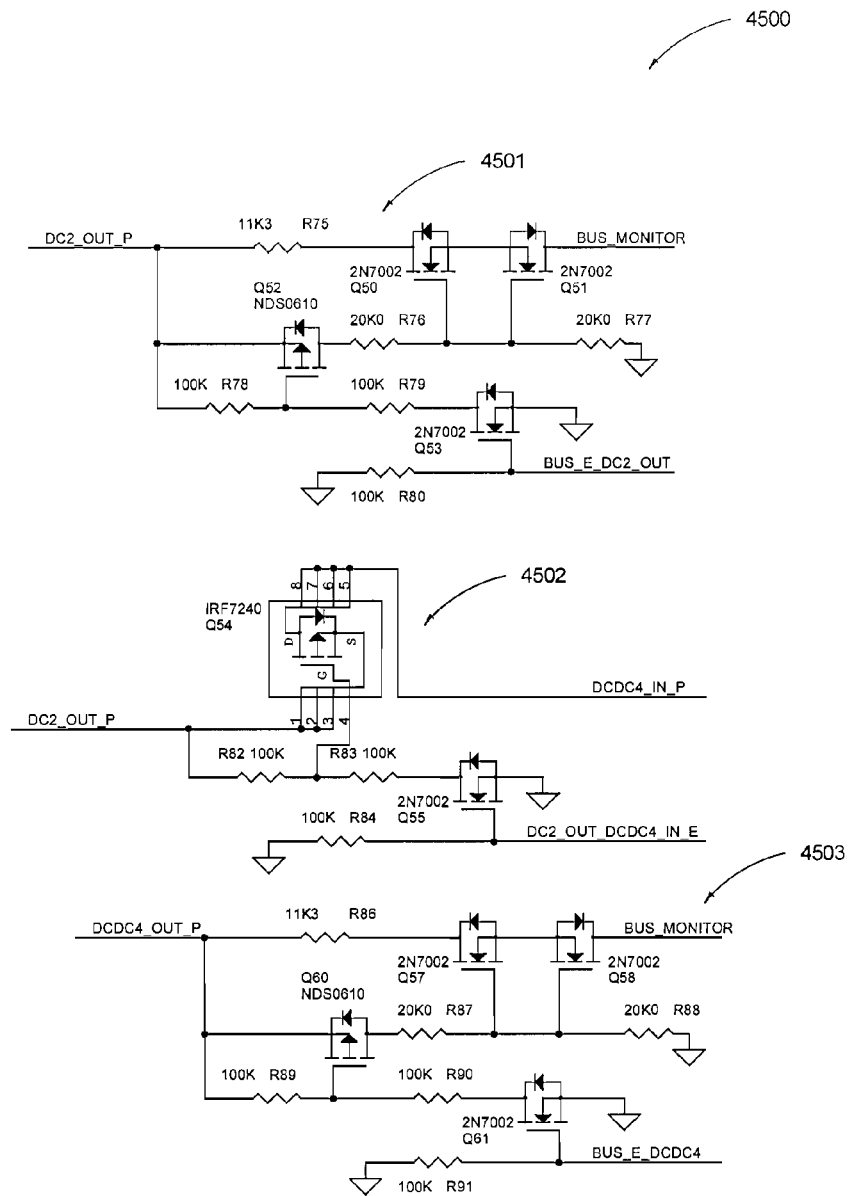
FIG. 45 illustrates an example of Third DC bus and fourth DC/DC converter circuits.

FIG. 45 illustrates 4500 the Third DC bus and fourth DC/DC converter circuits wherein the Third DC bus voltage monitoring selective coupling circuit 4501 as described elsewhere referring to FIG. 4A, reference numeral 470A. Fourth DC/DC converter input voltage switch 4502 is disclosed in FIG. 45 as described elsewhere referring to FIG. 4A, reference numeral 474. Fourth DC/DC converter output voltage monitoring selective coupling circuit 4503 as described elsewhere referring to FIG. 4A, reference numeral 473A.

Figure 46:
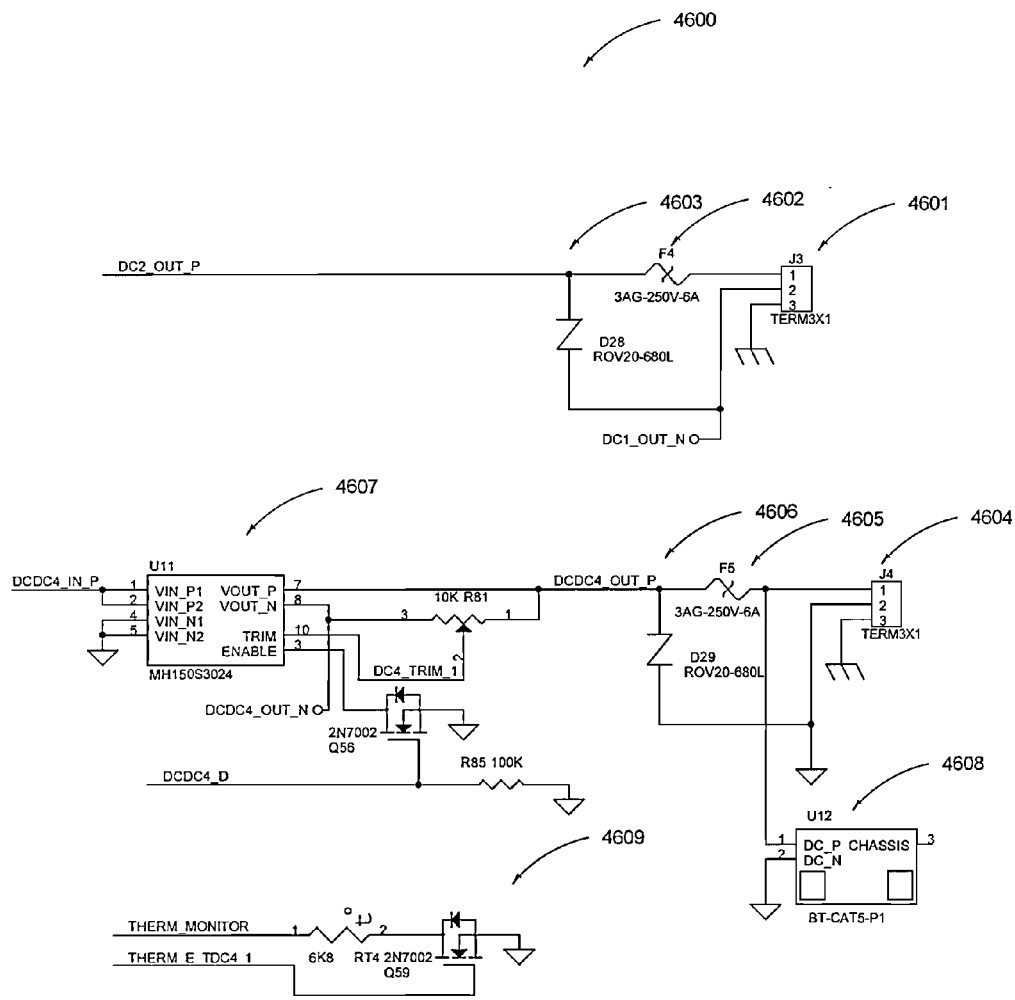
FIG. 46 illustrates an example of Fourth, Fifth, and Sixth DC outputs and Fourth DC/DC converter circuits.

FIG. 46 illustrates 4600 the fourth, fifth, and sixth DC outputs and fourth DC/DC converter circuits wherein the Fourth DC output terminals for positive, neutral, and ground 4601 and the Fourth DC output fuse 4602 are illustrated. The Fourth DC output transient voltage suppression circuit 4603 is an MOV and the Fifth DC output terminals 4604 for positive, neutral, and ground are also illustrated in FIG. 46. Fifth DC output fuse 4605 and the Fifth DC output transient voltage suppression circuit 4606 which is an MOV are illustrated in FIG. 46. Fourth DC/DC converter 4607 and Sixth DC output 4608 as described elsewhere referring to FIG. 4A, reference numeral 473 and 472, respectively, are also illustrated in FIG. 46. And, Fourth DC/DC converter temperature measuring circuit 4609 is illustrated in FIG. 46 and was illustrated previously in FIG. 4A as reference numeral 473E.

Figure 47:
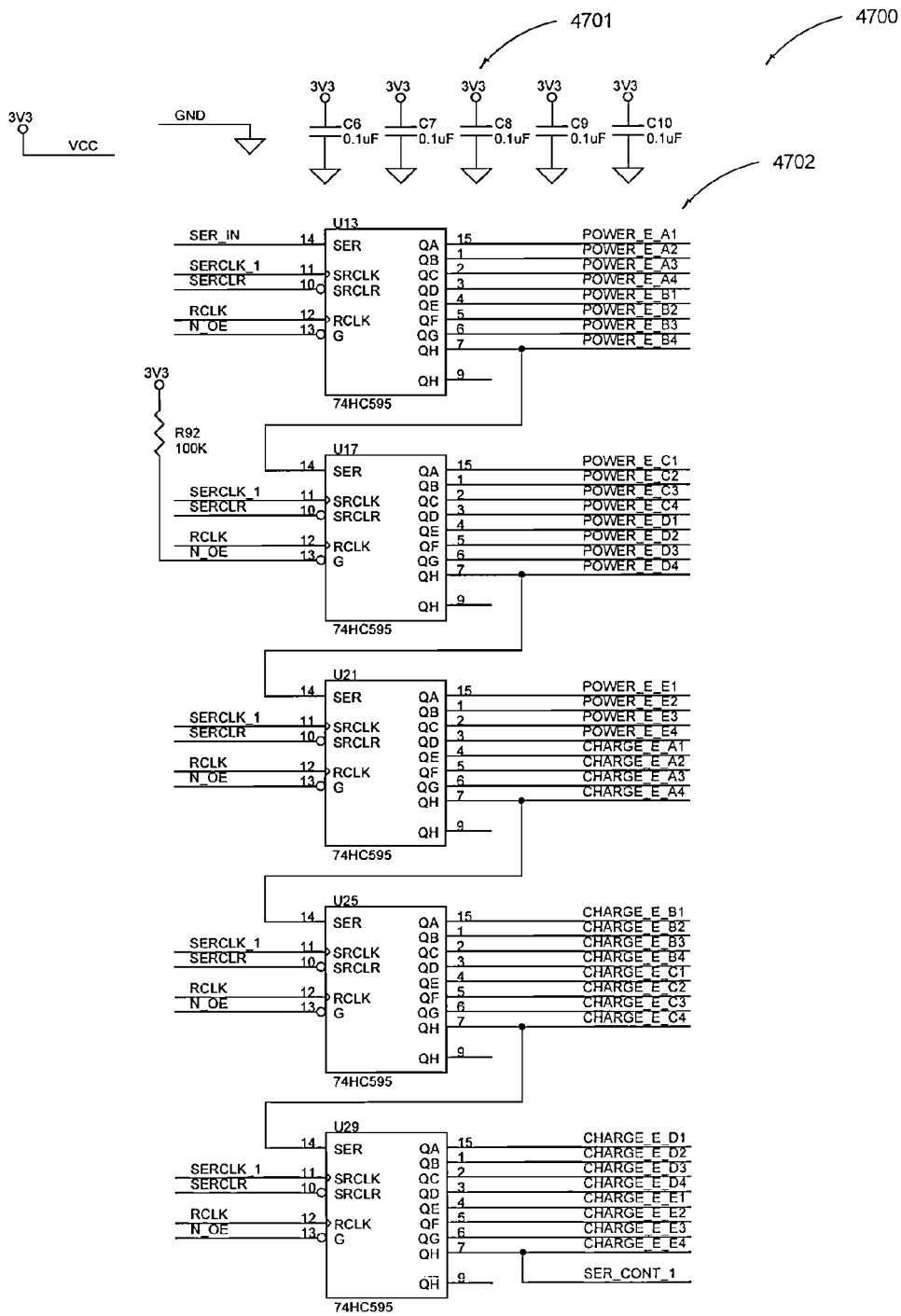
FIG. 47 illustrates an example serial to parallel circuits to implement serial microprocessor control instructions into parallel control signals.

FIG. 47 illustrates 4700 serial to parallel circuits to implement serial microprocessor control instructions into parallel control signals wherein power supply decoupling capacitors 4701 for the respective integrated circuits are shown. Serial to parallel converters 4702 are also illustrated in FIG. 47.

Figure 48:
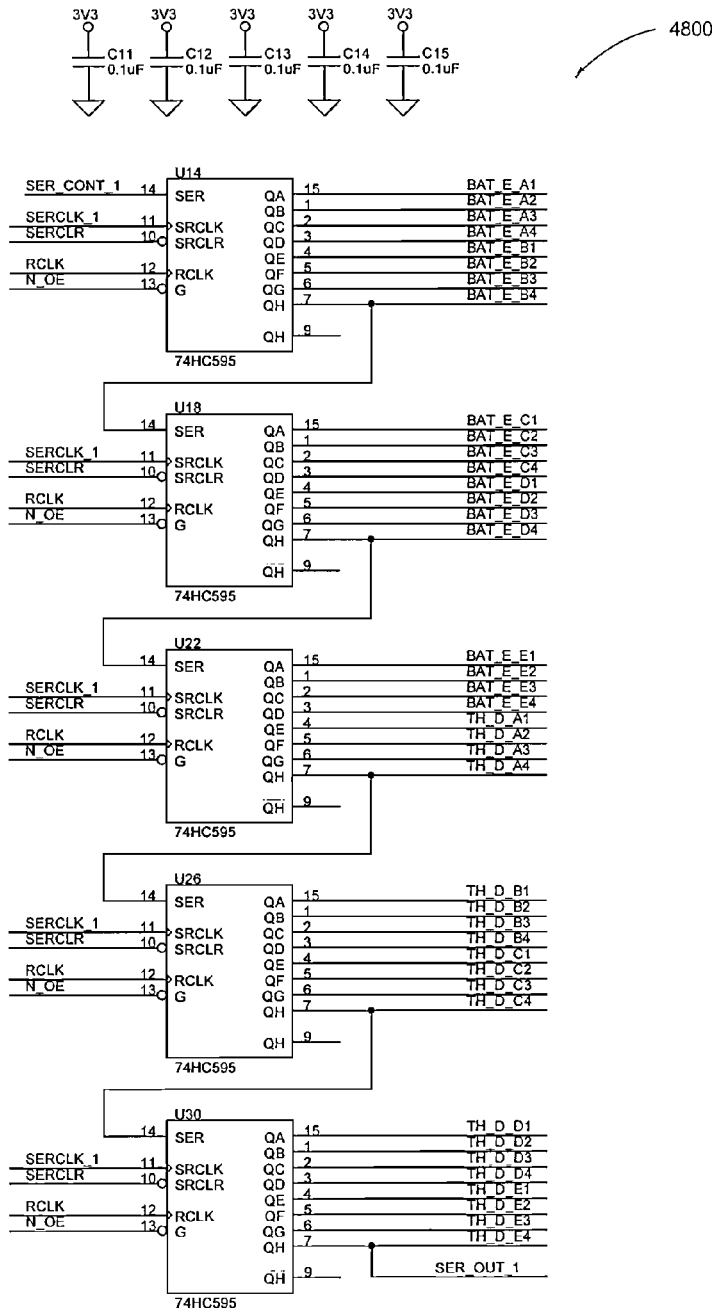
FIG. 48 illustrates an example of additional serial to parallel circuits implementing the microprocessor control signals.
Figure 49:
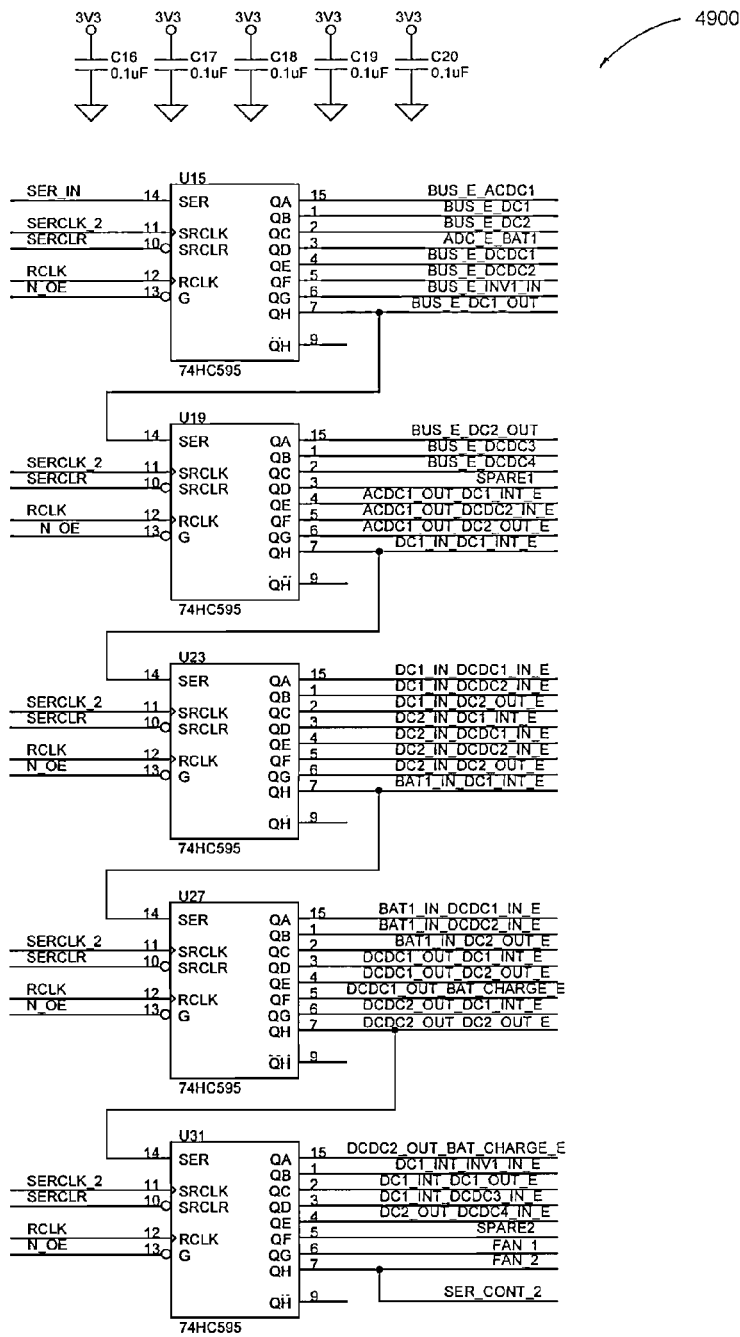
FIG. 49 illustrates an example of additional serial to parallel circuits implementing the microprocessor control signals.
Figure 50:
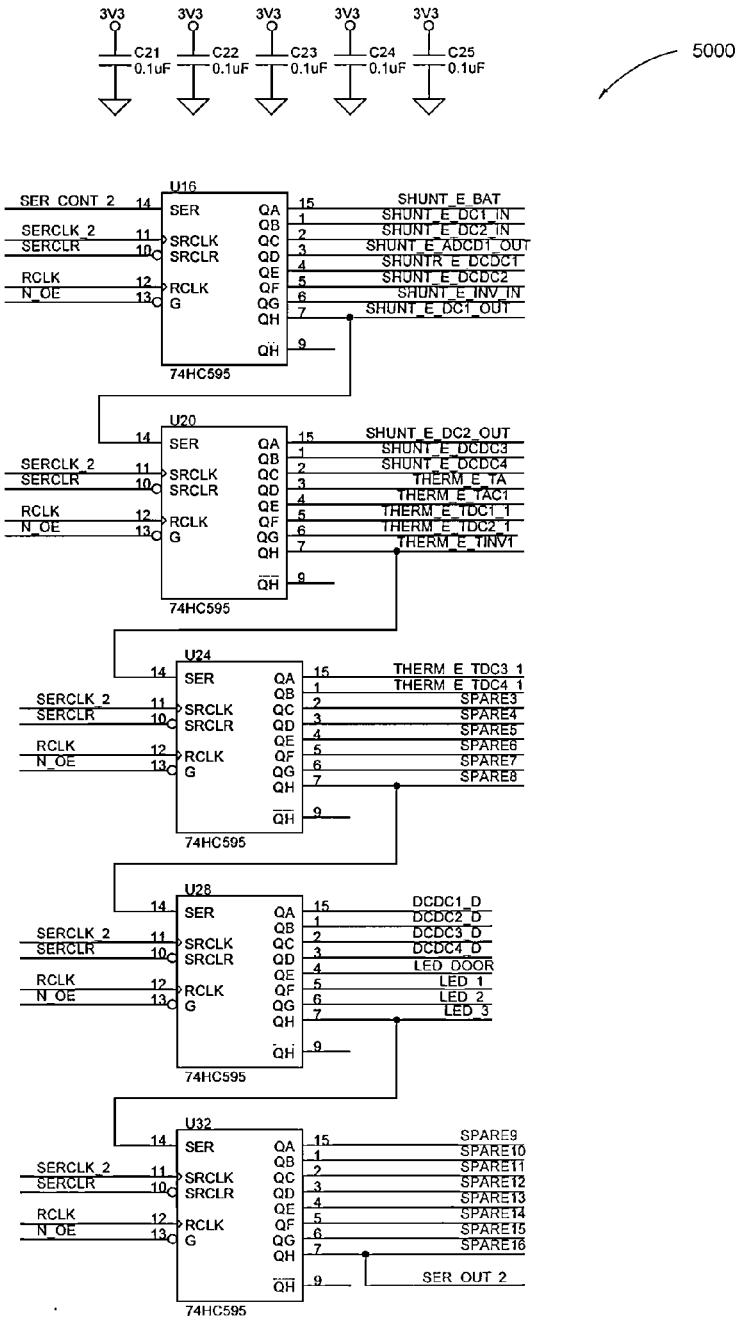
FIG. 50 illustrates an example of additional serial to parallel circuits implementing the microprocessor control signals.

FIGS. 48-50, reference numerals 4800, 4900, 5000, illustrate additional serial to parallel circuits implementing the microprocessor control signals.

Figure 51:
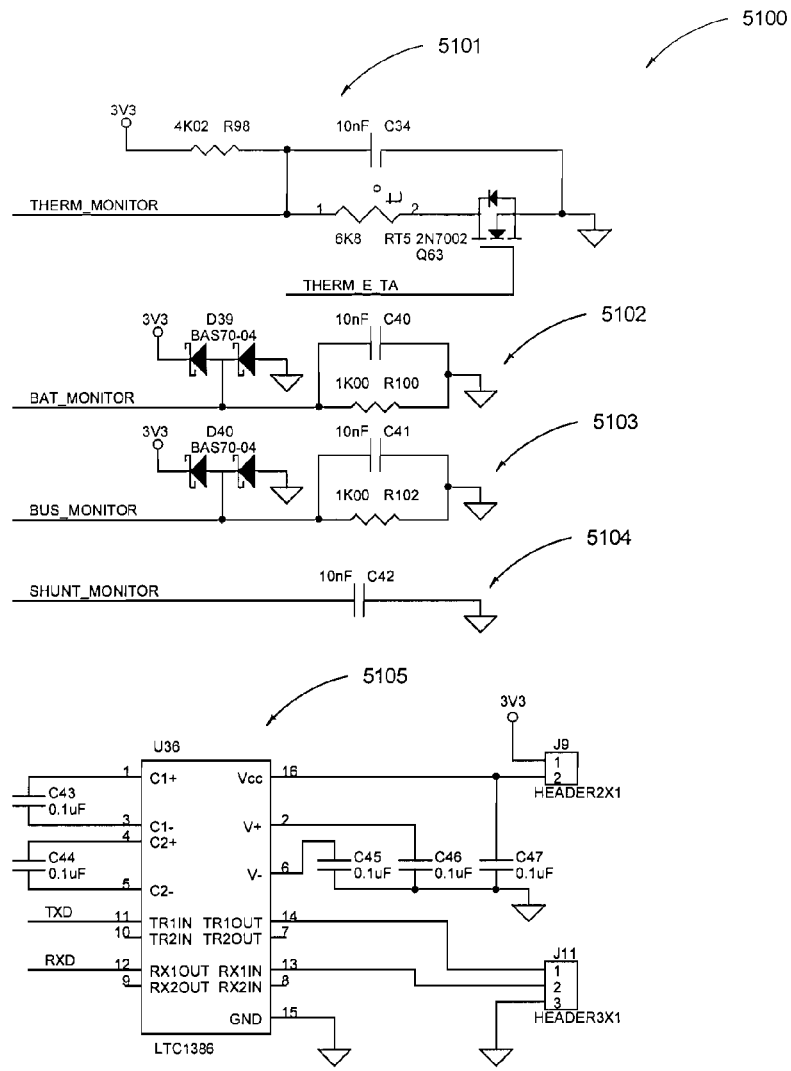
FIG. 51 illustrates an example of Microcontroller interface circuits.

FIG. 51 illustrates 5100 Microcontroller interface circuits wherein the temperature measuring circuit interface 5101 to the microcontroller is shown and was described elsewhere referring to FIG. 4C, reference numeral 462. Reference numeral 5102 indicates the battery monitor bus circuit interface to microcontroller as described elsewhere referring to FIG. 5, reference numeral 495A. Reference numeral 5103 indicates a voltage monitor circuit interface to the microcontroller as described elsewhere referring to FIG. 4C, reference numeral 460. The current monitor circuit interface 5104 to the microcontroller is shown in FIG. 51 and is described elsewhere referring to FIG. 4C, reference numeral 461. And, reference numeral 5105 indicates the serial interface to microcontroller as described elsewhere referring to FIG. 4C, reference numeral 499.

FIG. 52 illustrates 5200 the Microcontroller and support circuits. Reference numeral 5201 indicates the voltage regulator and power supply for the microcontroller as described elsewhere referring to FIG. 4C, reference numerals 403, 430A, 439A, 450B, 497A and 497. The Microcontroller unit is indicated as reference numeral 5202.

Figure 53:
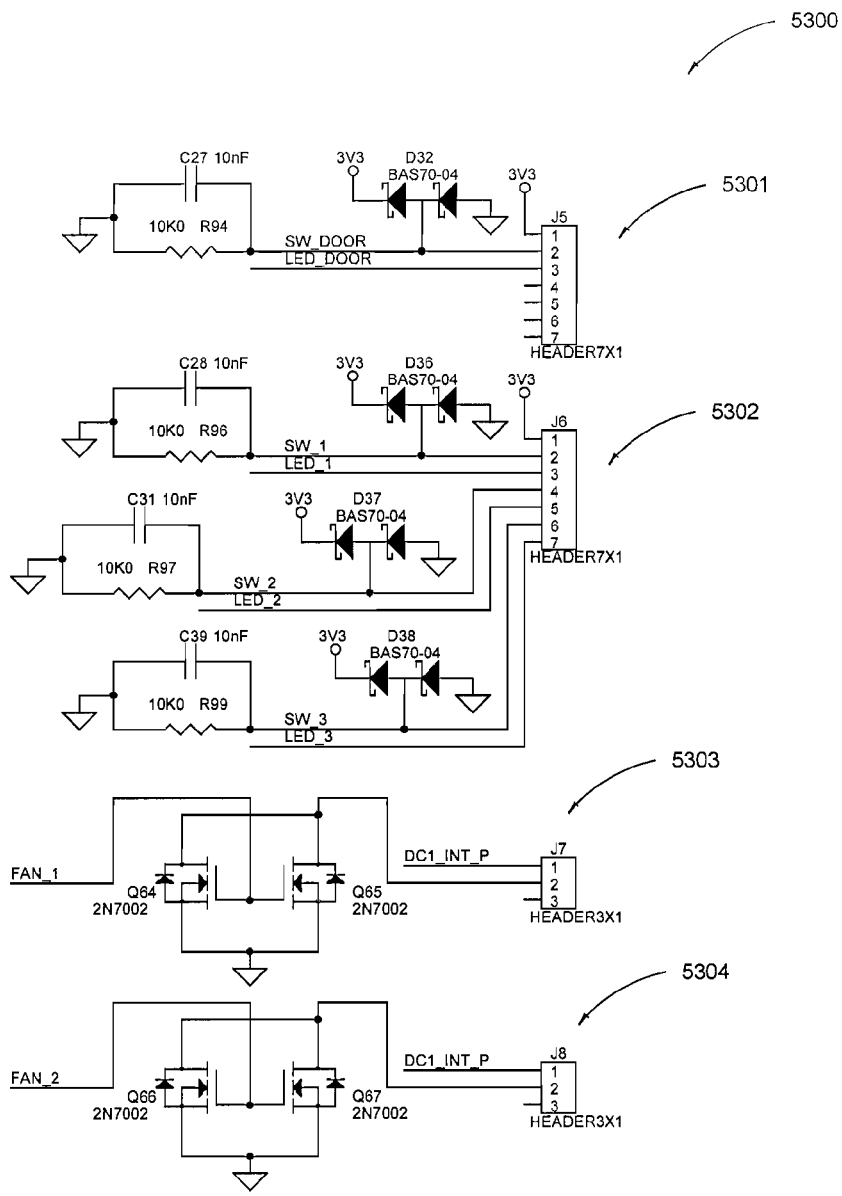
FIG. 53 illustrates an example of Microcontroller interface circuits.

FIG. 53 illustrates 5300 the Microcontroller interface circuits wherein door switch interface circuit 5301 to the microcontroller is shown and was described elsewhere referring to FIG. 4C, reference numeral 491. Reference numeral 5302 represents a light emitting diode interface circuit to the microcontroller as was described elsewhere referring to FIG. 4C, reference numeral 494. Dual cooling fan control circuits interface 5303, 5304 to the microcontroller are shown and were described elsewhere referring to FIG. 4C (498).

Figure 54:
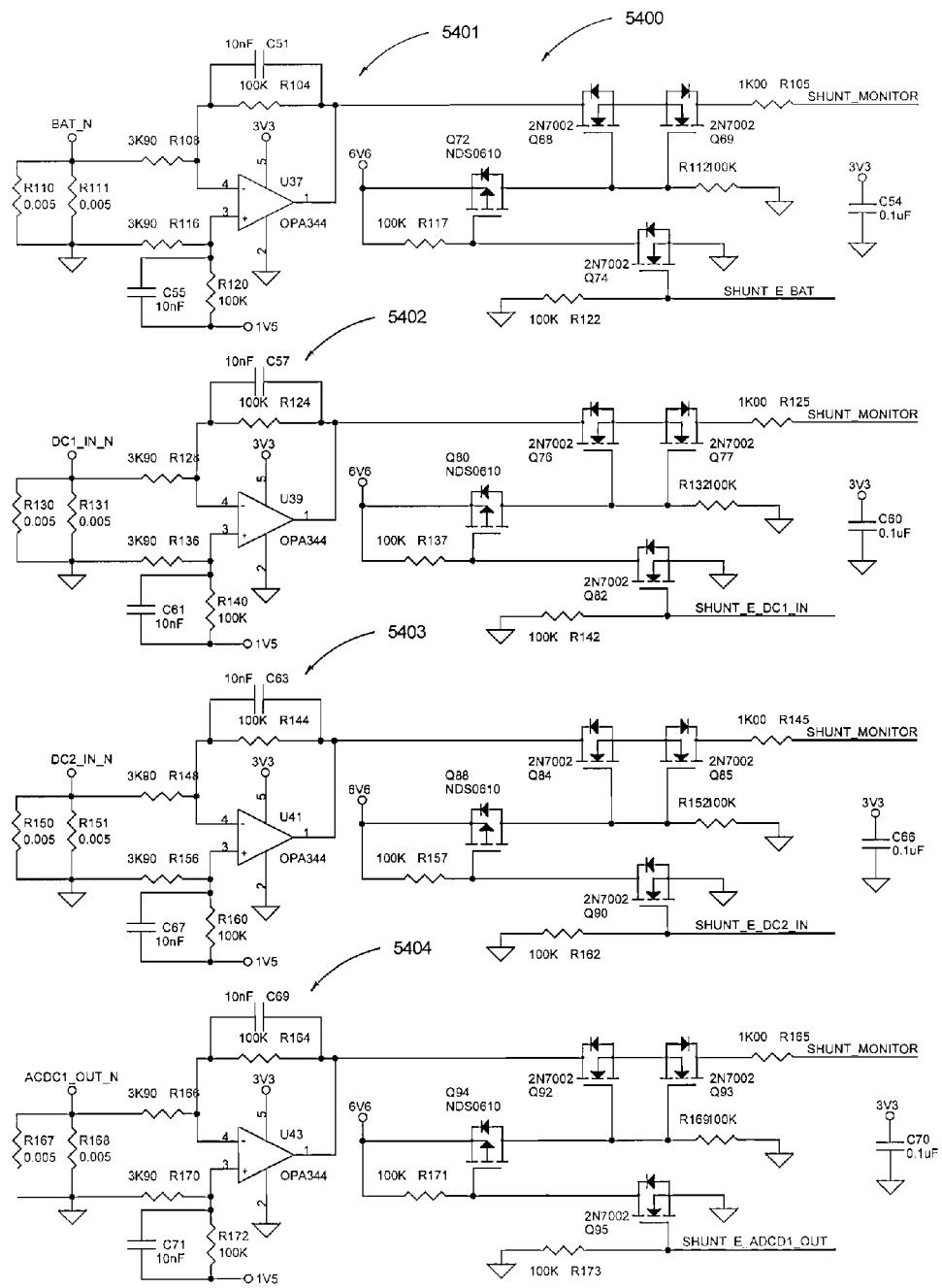
FIG. 54 illustrates an example of current monitoring circuits.

FIG. 54 illustrates 5400 current monitoring circuits in an exemplary fashion. Reference numeral 5401 indicates the current monitor interface for third DC input battery pack array as described elsewhere referring to FIG. 4A, reference numeral 495A. Reference numeral 5402 indicates the current monitor interface for the first DC input as described elsewhere referring to FIG. 4A, reference numeral 438A. Current monitor interface 5403 for second DC input is also shown in FIG. 54 and was previously described above referring to FIG. 4A, reference numeral 448A. Current monitor interface 5404 for AC/DC converter output is indicated in FIG. 54 as well and was described elsewhere referring to FIG. 4, reference numeral 412D.

Figure 55:
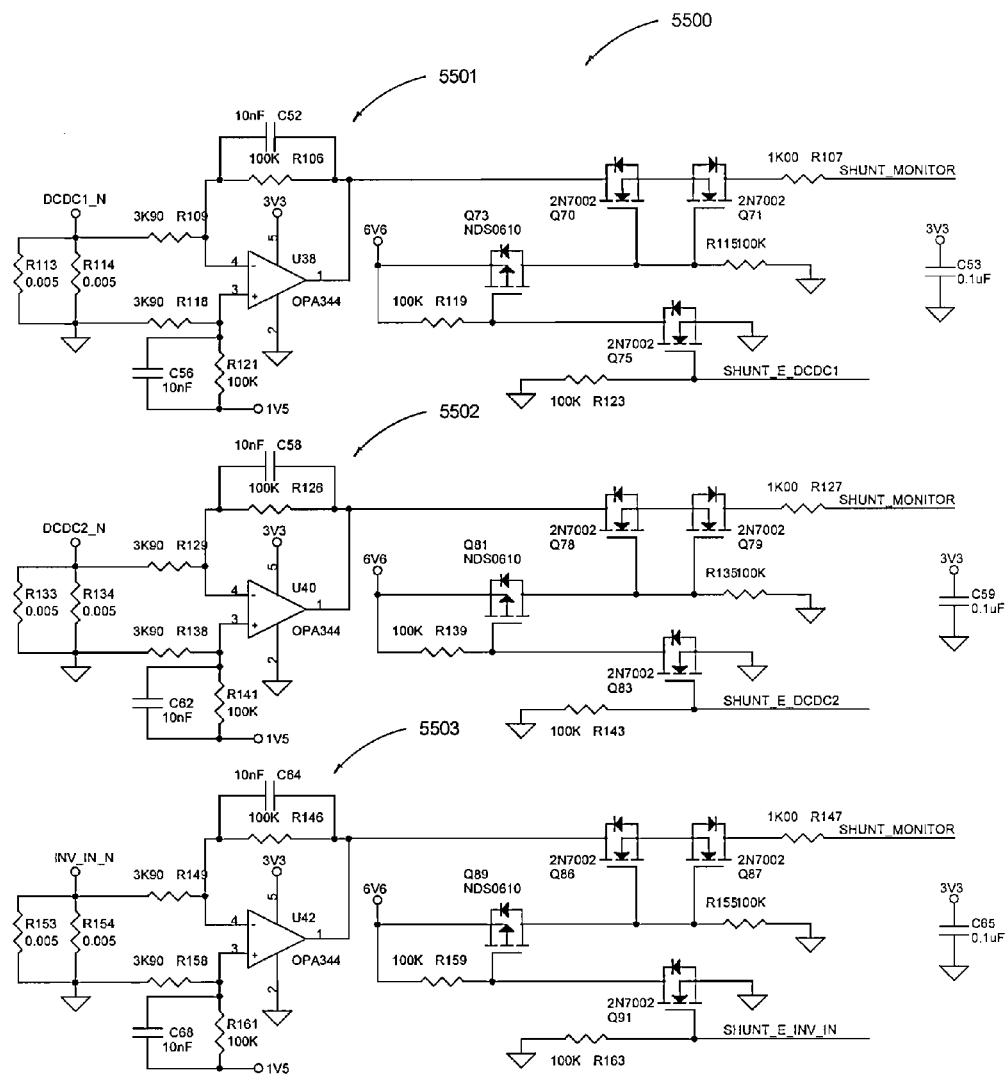
FIG. 55 illustrates an example of current monitoring circuits.

FIG. 55 illustrates 5500 the current monitoring circuits wherein the current monitor interface for the first DC/DC converter 5501 is shown and was described elsewhere referring to FIG. 4B, reference numeral 482A. Reference numeral 5502 indicates the current monitor interface for the second DC/DC converter and was described elsewhere herein in regard to FIG. 4B, reference numeral 490A. Reference numeral 5503 indicates current monitor interface for DC/AC inverter input as was described elsewhere referring to FIG. 4, reference numeral 416A.

Figure 56:
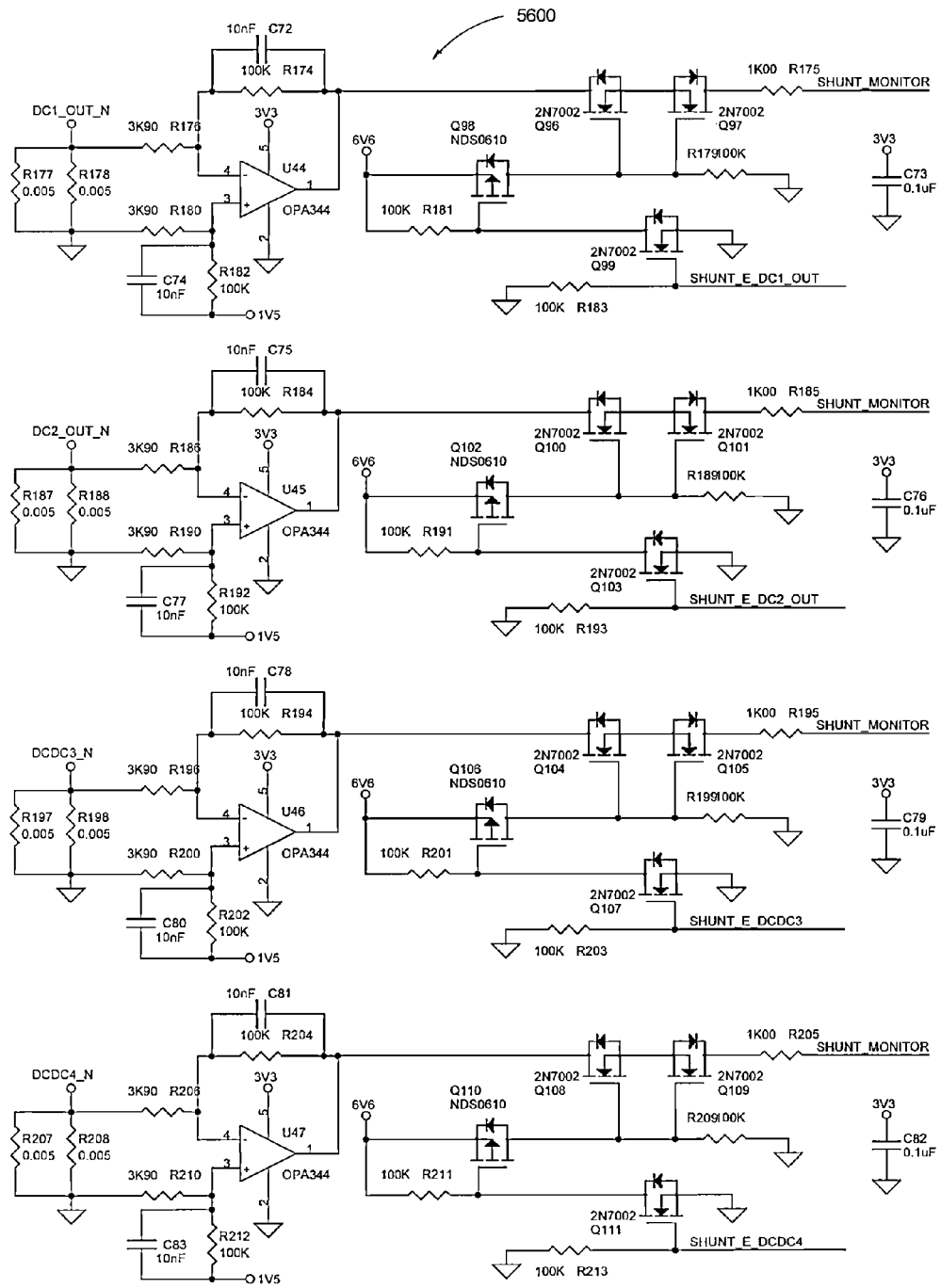
FIG. 56 illustrates an example of current monitoring circuits.

FIG. 56 illustrates 5600 a current monitoring circuits wherein reference numeral 5601 indicates the current monitor interface for first DC output as described elsewhere referring to FIG. 4, reference numeral 420A. Current monitor interface 5602 for the second DC output as described elsewhere referring to FIG. 4 Reference numeral 5603 indicates the current monitor interface for third DC/DC converter as described elsewhere referring to FIG. 4, reference numeral 424A and reference numeral 5604 indicates the current monitor interface for fourth DC/DC converter as described elsewhere referring to FIG. 4A, reference numeral 473B.

FIG. 57 illustrates 5700 the DC/DC converter voltage programming circuits wherein reference numeral 5701 indicates the voltage programming circuit for the first DC/DC converter as described elsewhere referring to FIG. 4B, reference numeral 495X. Voltage programming circuit 5702 for the third DC/DC converter is illustrated in FIG. 57 and was described elsewhere referring to FIG. 4B, reference numeral 495X. Reference numeral 5703 is the voltage programming circuit for the second DC/DC converter as described elsewhere referring to FIG. 4B, reference numeral 495X. Reference numeral 5704 indicates the voltage programming circuit for the fourth DC/DC converter as described elsewhere referring to FIG. 4B, reference numeral 495X. And, reference numeral 5705 indicates the digital to analog converter used to generate voltage programming levels.

Figure 58:
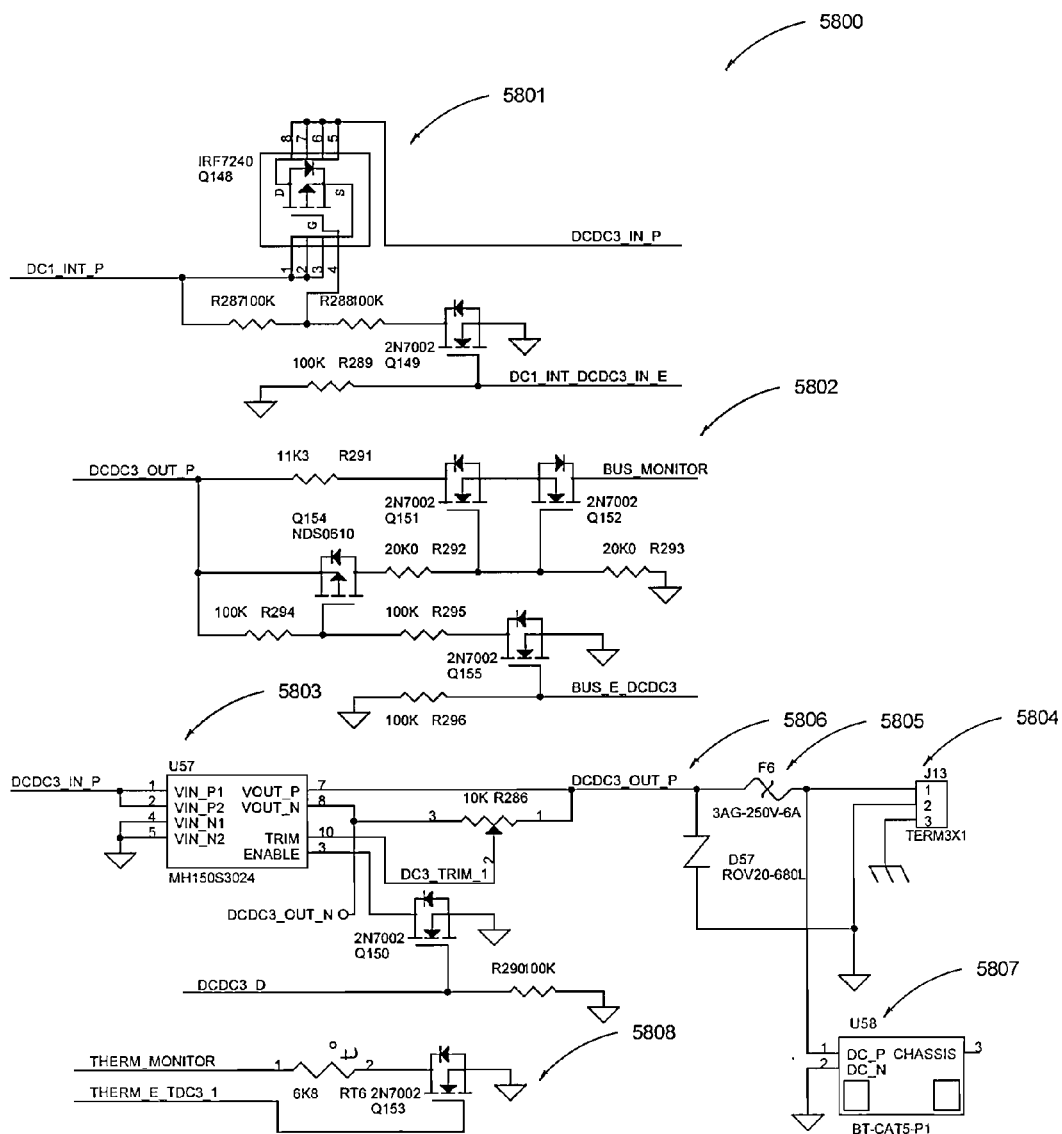
FIG. 58 illustrates an example of Second and Third DC outputs and third DC/DC converter circuits.

FIG. 58 illustrates 5800 the second and third DC outputs and third DC/DC converter circuits in an exemplary fashion wherein the Third DC/DC converter input voltage switch 5801 is shown and was described elsewhere referring to FIG. 4, reference numeral 425A. The Third DC/DC converter voltage monitoring selective coupling circuit 5802 is also shown in FIG. 58 and was described elsewhere referring to FIG. 4, reference numeral 424. Third DC/DC converter 5803 is shown as well in FIG. 58 and was described elsewhere referring to FIG. 4, reference numeral 427. Second DC output terminals 5804 are indicated as well for positive, neutral, and ground (426). Also shown is the Second DC output fuse 5805 and the Second DC output transient voltage suppression circuit 5806 which is an (MOV). Third DC output 5807 (FIG. 4, reference numeral 428). Third DC/DC converter temperature measuring circuit 5808 is also shown in FIG. 58 and was described elsewhere referring to FIG. 4, reference numeral 424B.

Figure 59A:
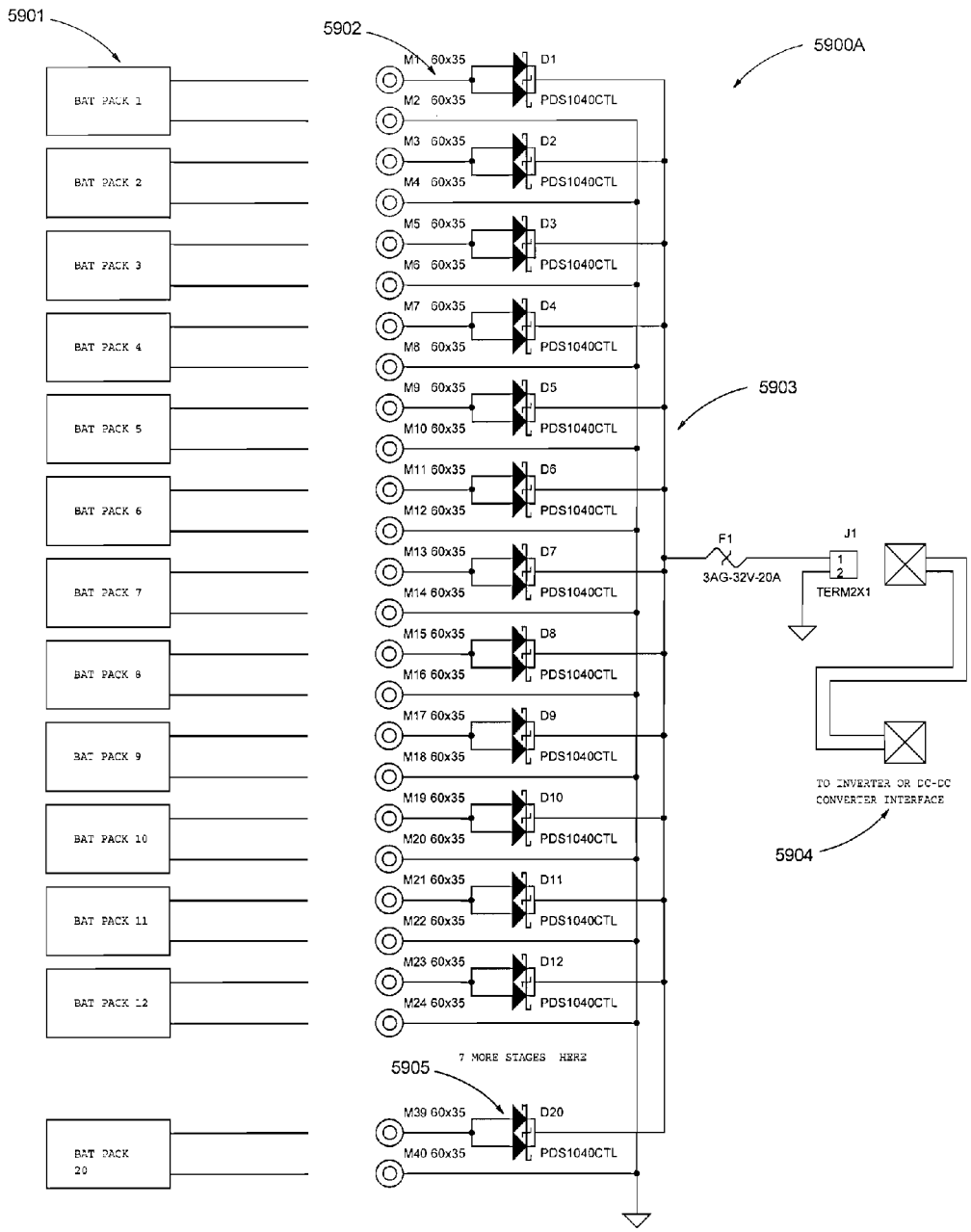
FIG. 59A schematically illustrates twenty battery packs interconnected in parallel to a common battery bus leading to either a DC-AC inverter or to a DC-DC converter which subsequently is interconnected to a DC-AC inverter.

FIG. 59A is schematic 5900A illustrating twenty battery packs 5901 interconnected in parallel to a common battery bus 5903 leading to either a DC-AC inverter 5915 of FIG. 59 or to a DC-DC converter 5906 of FIG. 59B which subsequently is interconnected to a DC-AC inverter 5916.

Figure 59B:
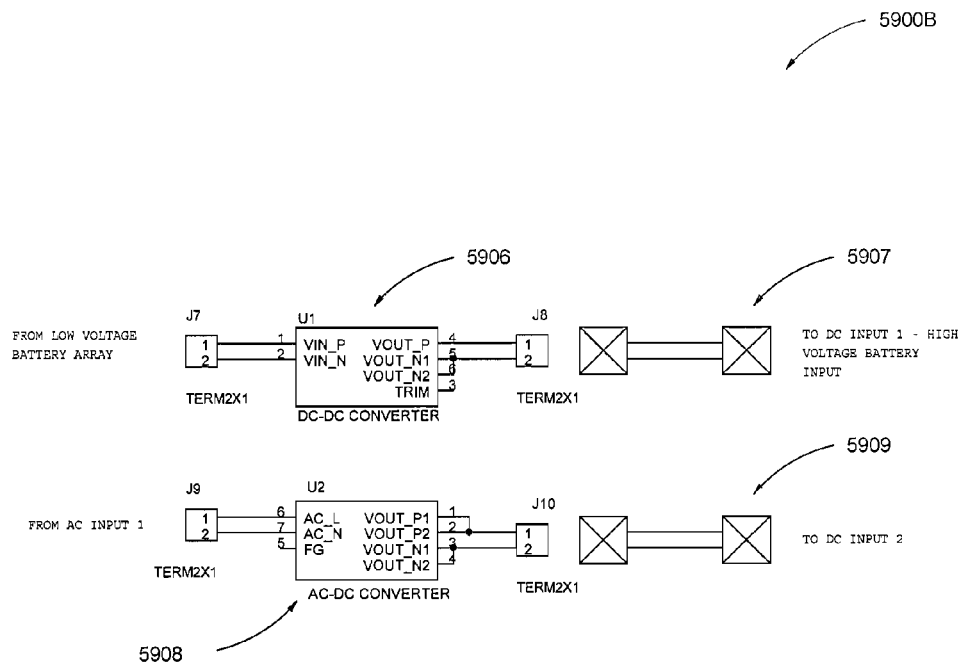
FIG. 59B schematically illustrates the interconnection of the battery array with a DC-DC converter which is interconnected with a diode which in turn is interconnected with a bus leading to a DC-AC inverter.
Figure 59C:
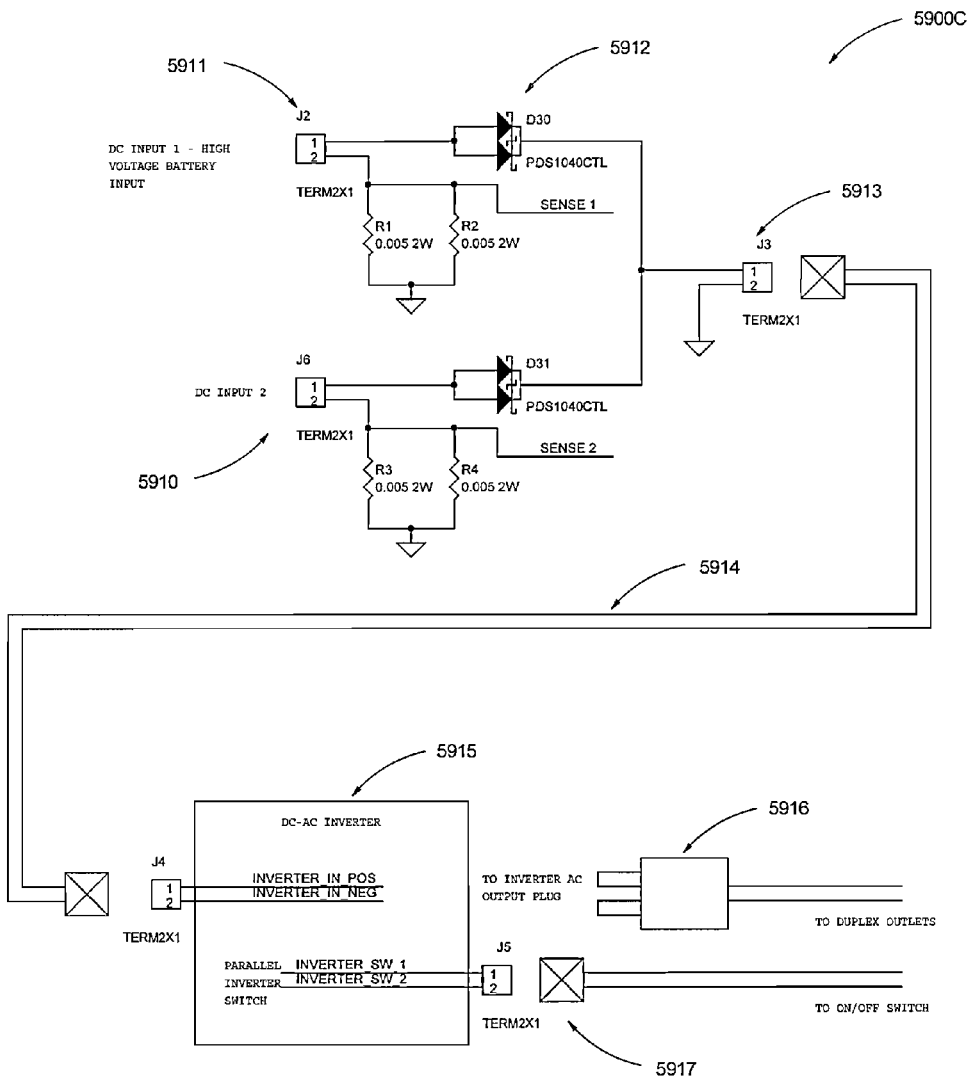
FIG. 59C schematically illustrates the interconnection of an AC input with an AC-DC converter which in interconnected with a diode which in turn is interconnected with a bus leading to the DC-AC inverter.

FIGS. 59B and 59C are schematics 5900B and 5900C illustrating: the interconnection of the battery array 5901 with a DC-DC converter 5906 which is interconnected via cable assembly 5907 with a diode 5912 which in turn is interconnected with a bus leading to a DC-AC inverter; and, the interconnection via cable assembly to connector 5909 to connector 5910 of an AC-DC converter 5908 which in turn is interconnected with a diode which in turn is interconnected with a bus leading to the DC-AC inverter 5915.

Figure 59D:
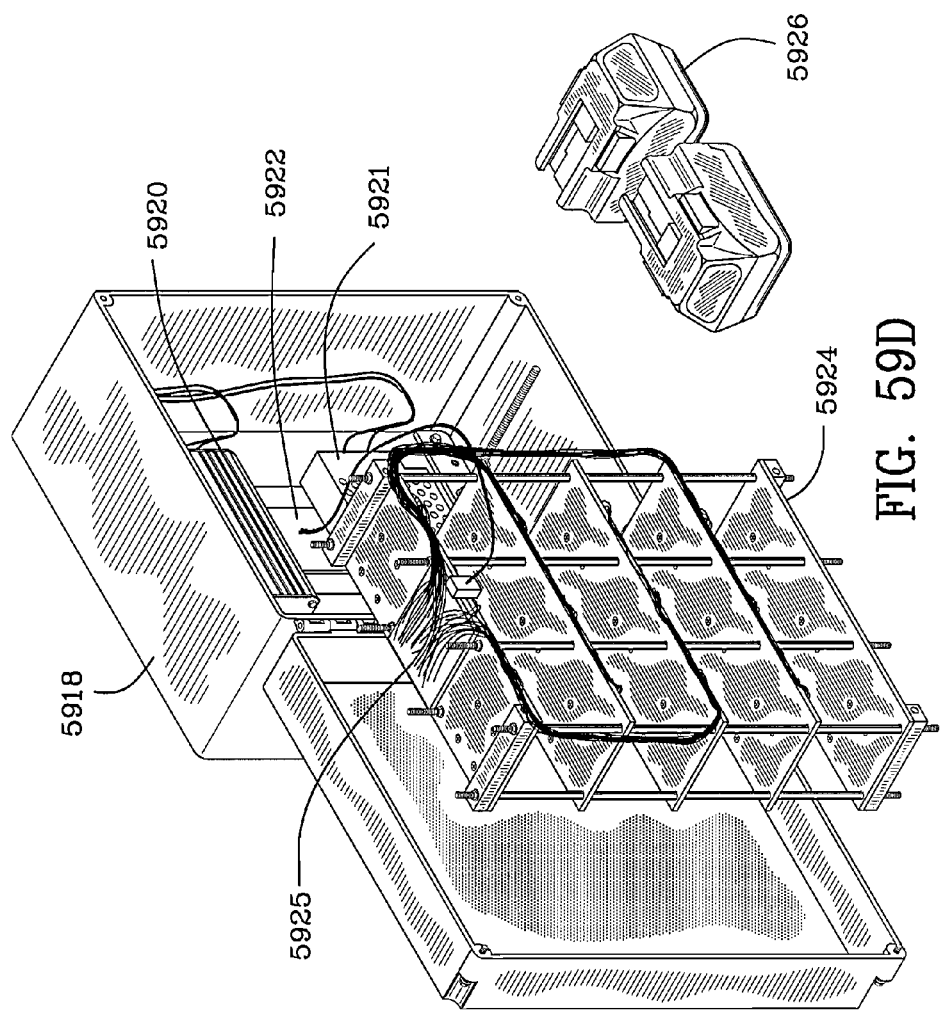
FIG. 59D pictorially illustrates the power supply with the battery rack removed therefrom and the electronics (inverter, diodes etc.) mounted to the rear wall of the housing or frame; also shown are two removable Lithium Ion rechargeable battery packs.

FIG. 59D illustrates 5900D the power supply with the battery rack 5924 is removed therefrom and the electronics 5921 (AC/DC converter, diodes etc.) mounted to the rear wall 5922 of the housing or frame 5918; also shown are two removable Lithium Ion rechargeable battery packs 5926. Electronics 5920 (DC/AC inverters) are also mounted to the rear wall on the ceiling of the power supply. A grouping of wires (harness) 5925 is also illustrated.

Figure 59E:
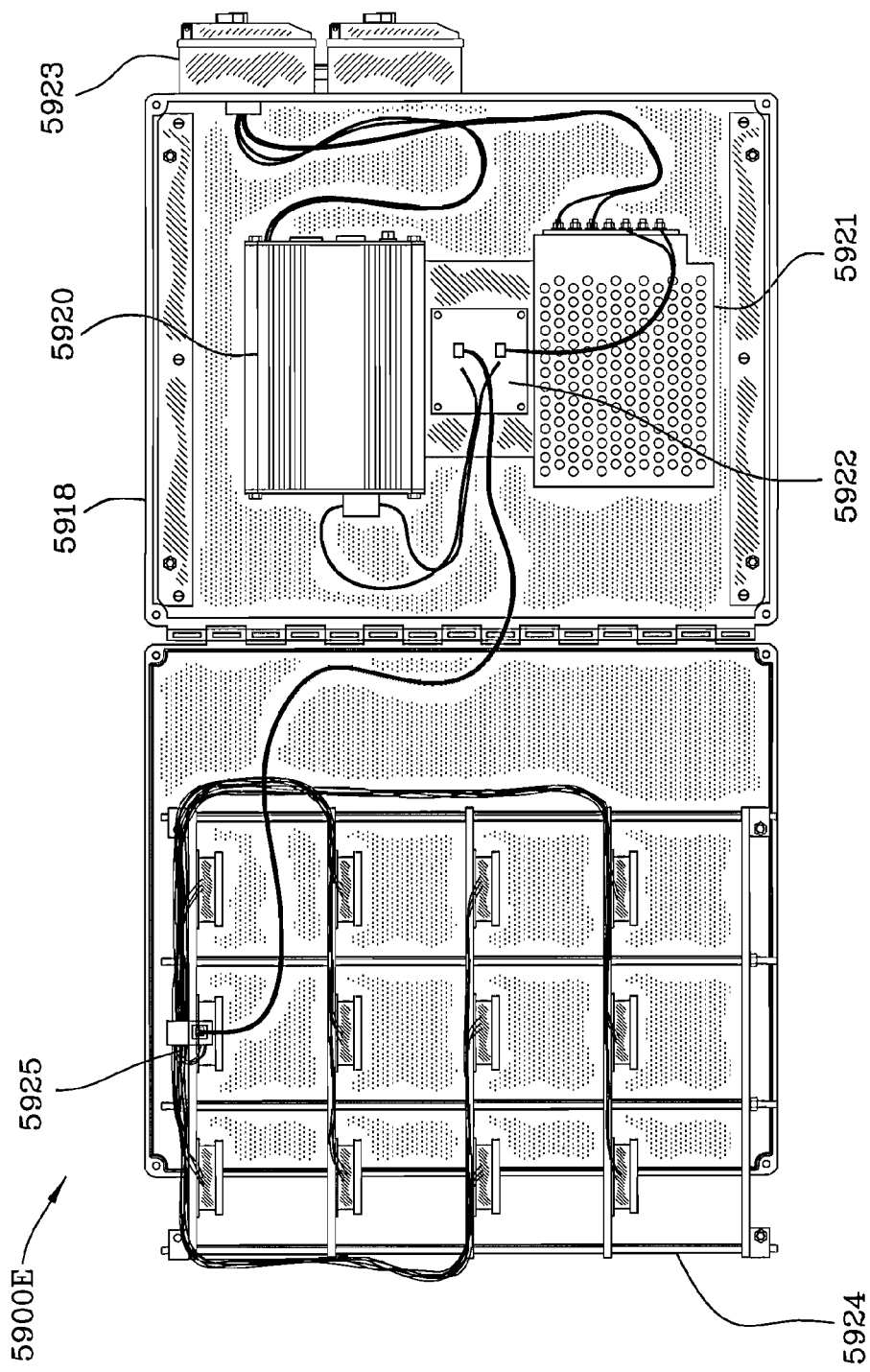
FIG. 59E is a view similar to FIG. 59D illustrating the power supply with the battery rack removed therefrom and further illustrating the power receptacles, the AC input on the right hand side thereof, and the on-off switch.
Figure 59F:
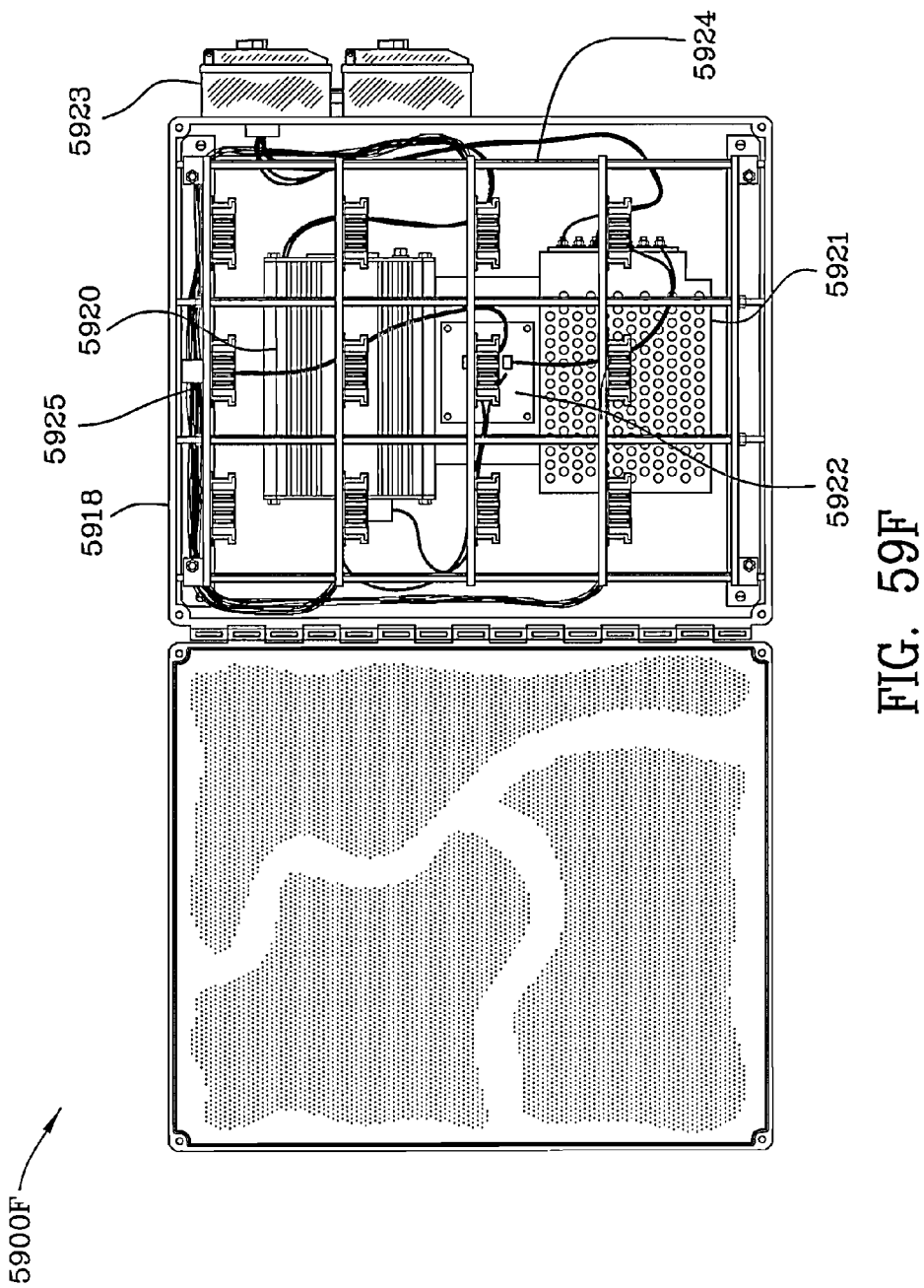
FIG. 59F is a view similar to FIGS. 59D and 59E with the battery rack mounted in the housing or frame.

FIG. 59E is a view 5900E similar to FIG. 59D illustrating the power supply with the battery rack removed therefrom and further illustrating the power receptacles 5923, the AC input on the right hand side thereof, and the on-off switch. FIG. 59F is a view similar to FIGS. 59D and 59E with the battery rack 5924 mounted in the housing or frame.

Figure 59G:
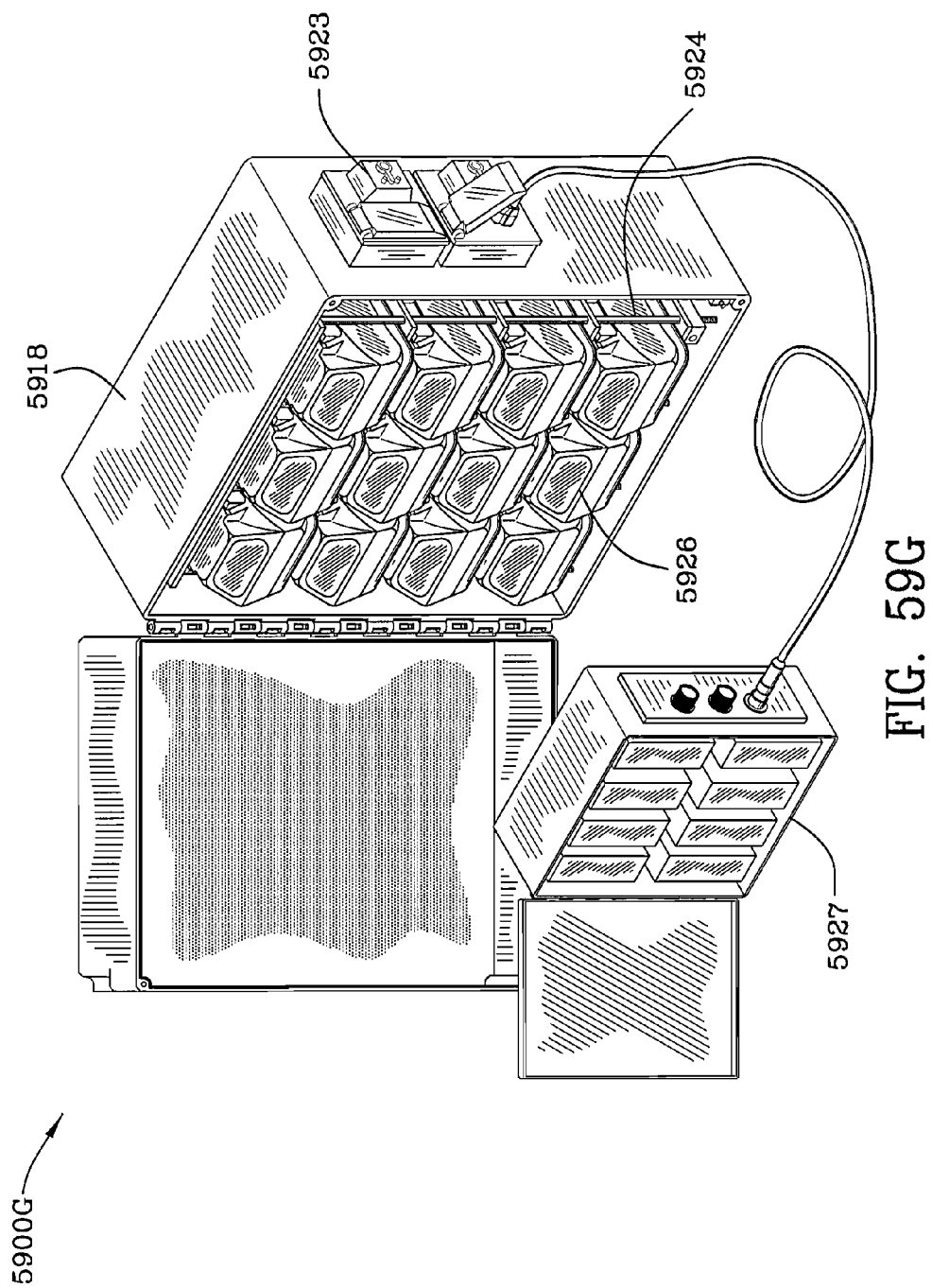
FIG. 59G is a view similar to the immediately preceding FIGS. 59D-59F inclusive with the battery rack populated with removable cartridge type Lithium Ion batteries and illustrating the power supply interconnected with a load such as wireless radio equipment.

FIG. 59G is a view 5900G similar to the immediately preceding FIGS. 59D-59F inclusive with the battery rack populated with removable cartridge type Lithium Ion batteries 5926. Also shown is box 5927 with electronic communications equipment therein representing a load device being powered by the power supply.

Figure 59H:
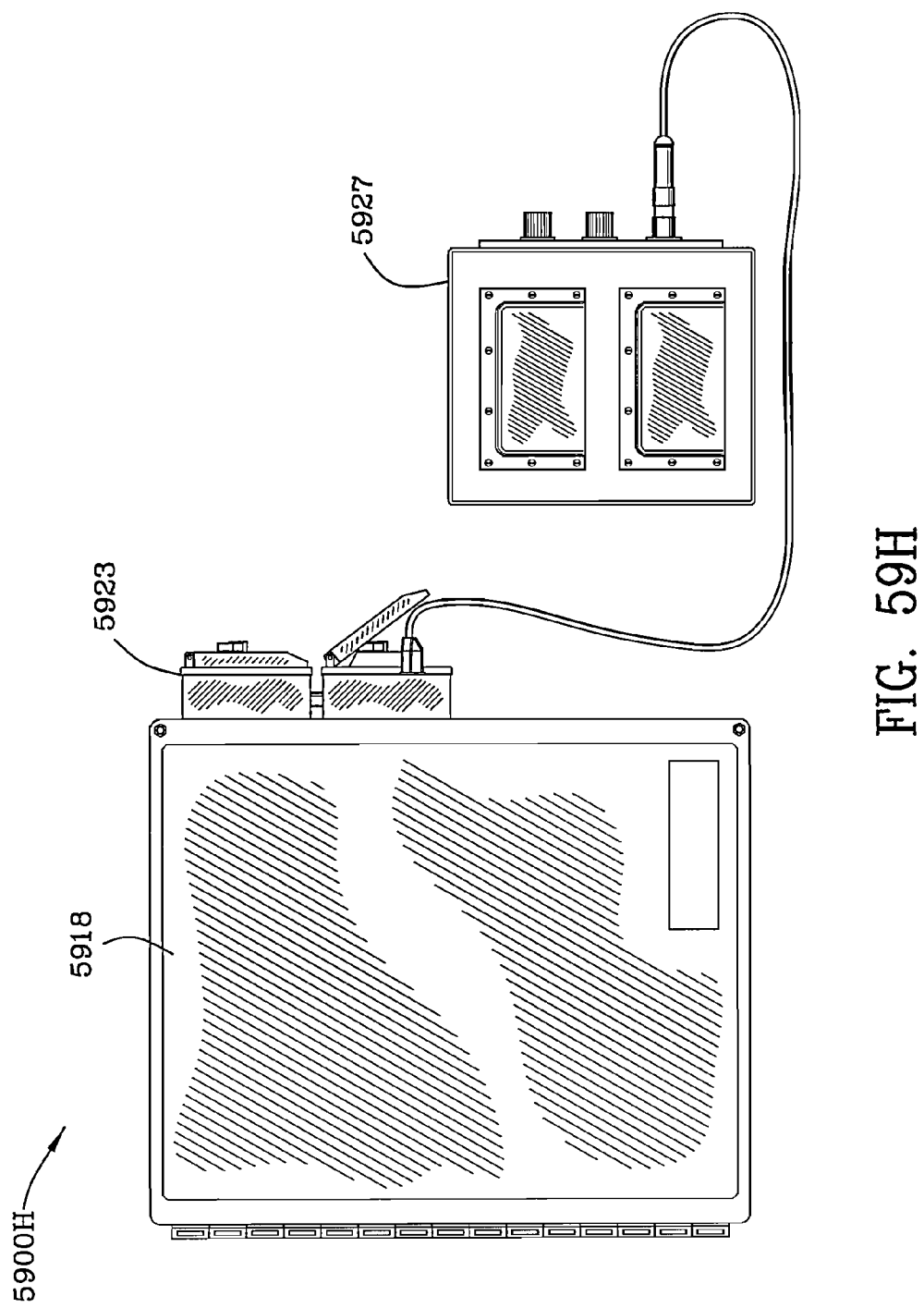
FIG. 59H is a view similar to the immediately preceding FIGS. 59D-59G inclusive with the door of the power supply closed and illustrating the power supply interconnected with a load such as wireless radio equipment.

FIG. 59H is a view 5900H similar to the immediately preceding FIGS. 59D-59G inclusive with the door of the power supply closed and illustrating the power supply interconnected with a load 5927 such as wireless radio equipment.

FIGS. 59A-59H illustrate the example of a power supply having a DC input from a plurality of removable, hot-swappable, and interchangeable power batteries 5901 which provide power on a common battery bus 5903 to a DC-AC inverter 5915. Alternatively, and additionally, AC power may be supplied to the power supply through an AC-DC converter 5908 which is then converted back to AC by inverter 5915 outputting to 5916 for purposes of reliability and for the purpose of seamless transition (on-line topology). The output of the AC to DC converter is arranged in a diode oring fashion together with the output from the common battery bus 5903 via diodes 5912. The diode oring selects of the higher voltage in converting from DC to AC power. Further, the common battery bus voltage may be converted by a DC to DC converter 5906 intermediate the common battery bus 5903 and the diode 5912 in series leading to the junction with the output of the AC-DC converter. Use of the DC to DC converter is optional depending on the voltage of the batteries used in the power supply and thus enables use of rechargeable batteries which have a relatively low output voltage. In the example of FIGS. 59A-59G a power supply is provided which does not require a microprocessor to manage its operations. Rather, this example provides a seamless transition from an AC power input to a DC power input with hot-swappablility of the batteries. The batteries may be cordless tool batteries capable of dual use. Further, the batteries may be Li-Ion or any of the types referred to herein.

Figure 60:
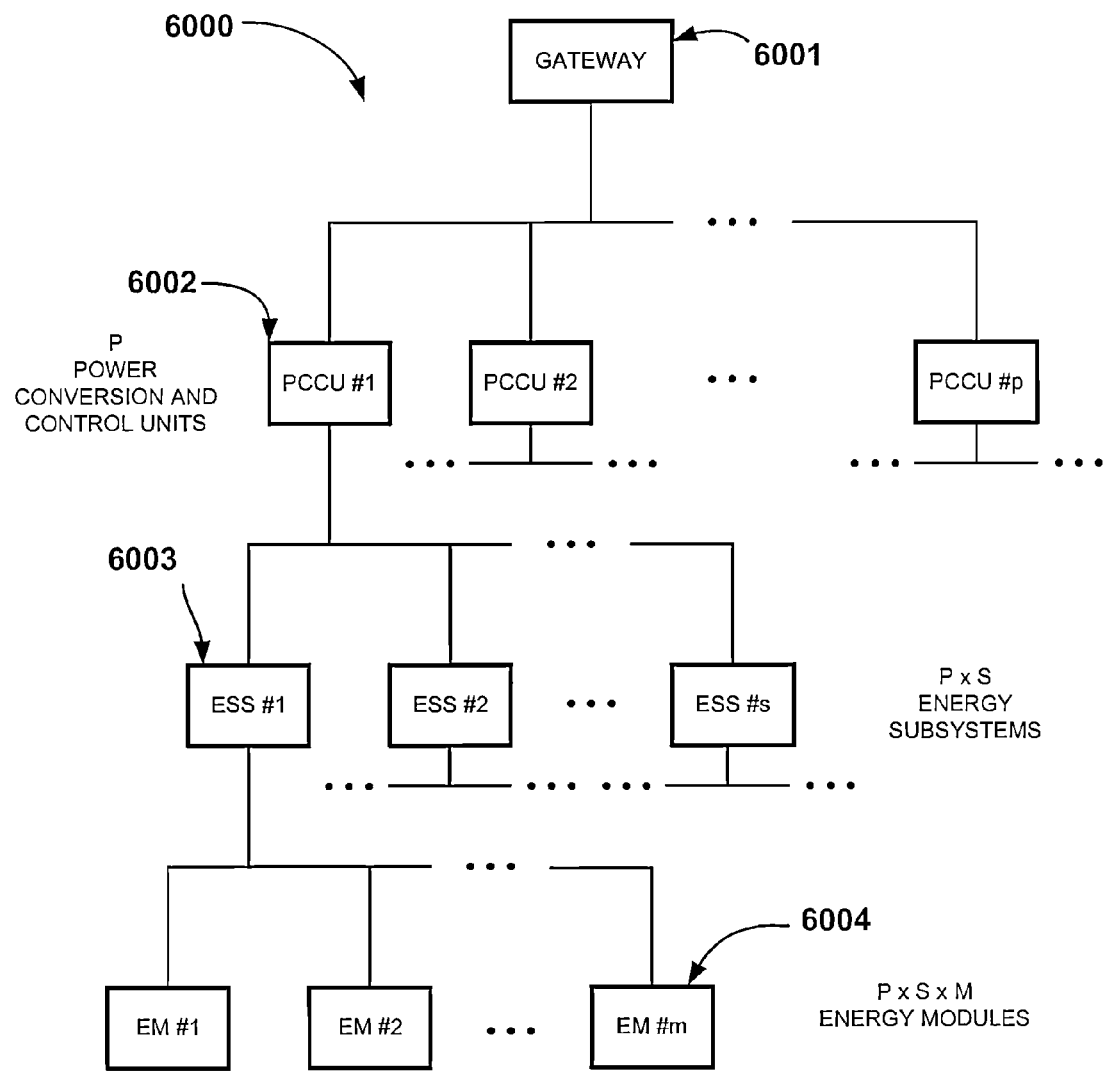
FIG. 60 is an illustration of the conceptual management hierarchy of the power supply system.

FIG. 60 is an illustration of the conceptual management hierarchy of the power supply system. By virtue of this hierarchical arrangement the network management user may access the status and control parameters for all subsystems under a particular gateway. This is described elsewhere referring to FIGS. 9A and 9B. In particular, in FIG. 9B, information is shown for batteries (energy subsystems and energy modules of FIG. 60), inputs, converters, and outputs (power conversion and control units of FIG. 60), and SIPS IP ADDR (gateway of FIG. 60).

Reference numeral 6001 is the Gateway which interconnects the power supply system below to a network (local or wide area). All aspects of the underlying power supply status and operation may be monitored and controlled by the user via this network. Reference numeral 6002 is used to indicate in exemplary fashion that up to P (where P is a positive integer) power conversion and control units may be connected for management purposes to each gateway. Similarly, reference numeral 6003 indicates in exemplary fashion that up to S energy subsystems (where S is a positive integer) may be connected for management purposes to each power conversion and control unit. Reference numerals 6004 indicates that up to M energy modules (where M is a positive integer) may be connected for management purposes to each energy subsystem. Energy modules include but are not limited to lithium ion based batteries.

Figure 61A:
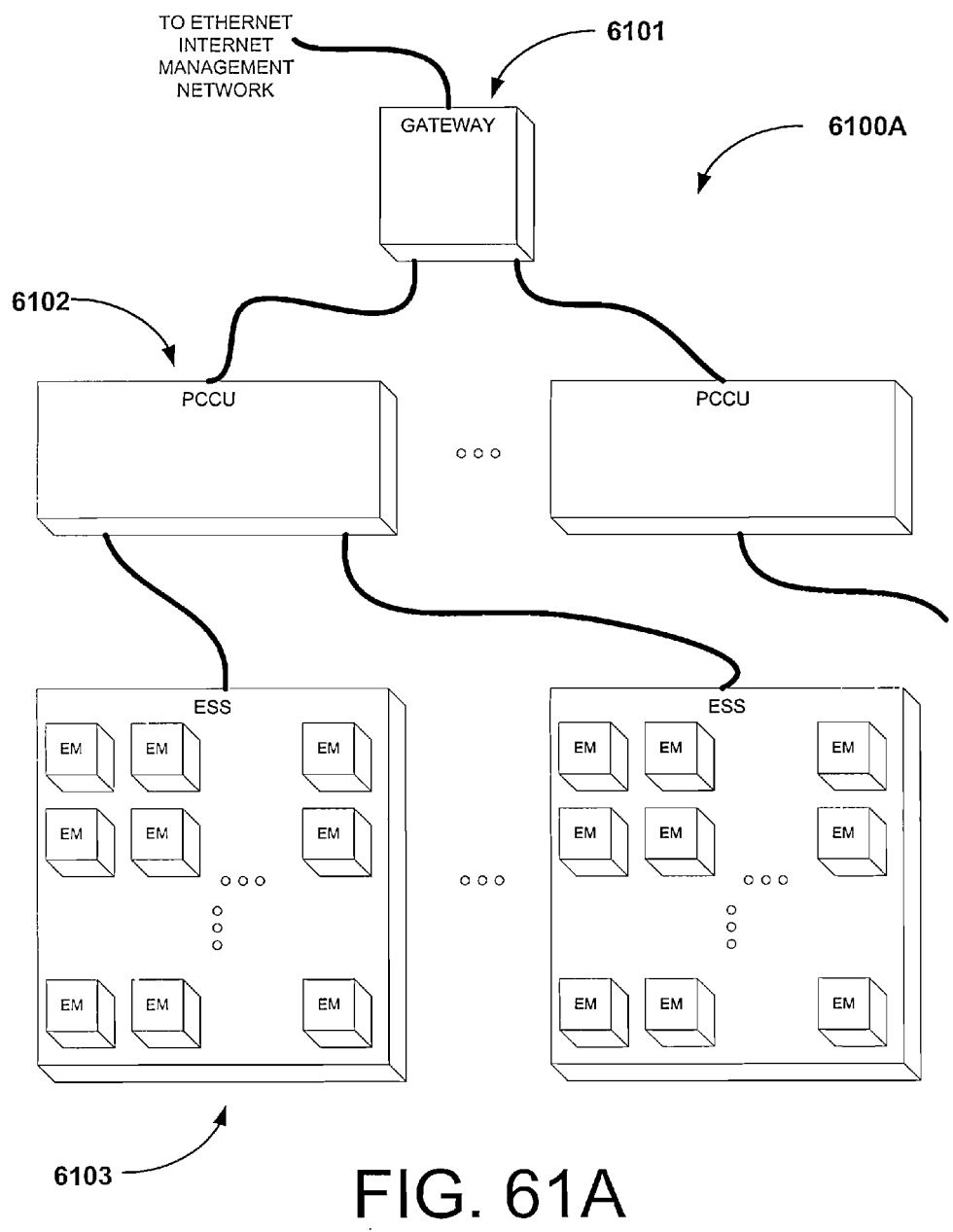
FIG. 61A is an exemplary depiction of the physical arrangement of a power supply system.

FIG. 61A is an exemplary depiction of the physical arrangement of a power supply system. By virtue of this hierarchical arrangement the power supply user may configure and control a power supply systems under a particular gateway. In particular FIG. 61 shows an example of a physical arrangement of a gateway unit 6101 connected to at least one power conversion and control unit 6102 which in turn is connected to at least one energy subsystem 6103 which in turn is connected to at least one energy module 6104. In particular, in FIG. 61, the power conversion and control unit is depicted as physically separate from the energy subsystems. Further the energy subsystems are shown to house the energy modules. As long as at least one energy subsystem having at least one energy module is connected to a power conversion and control unit, the power conversion and control unit may continue to operate provide power and management control to the user.

Figure 61B:
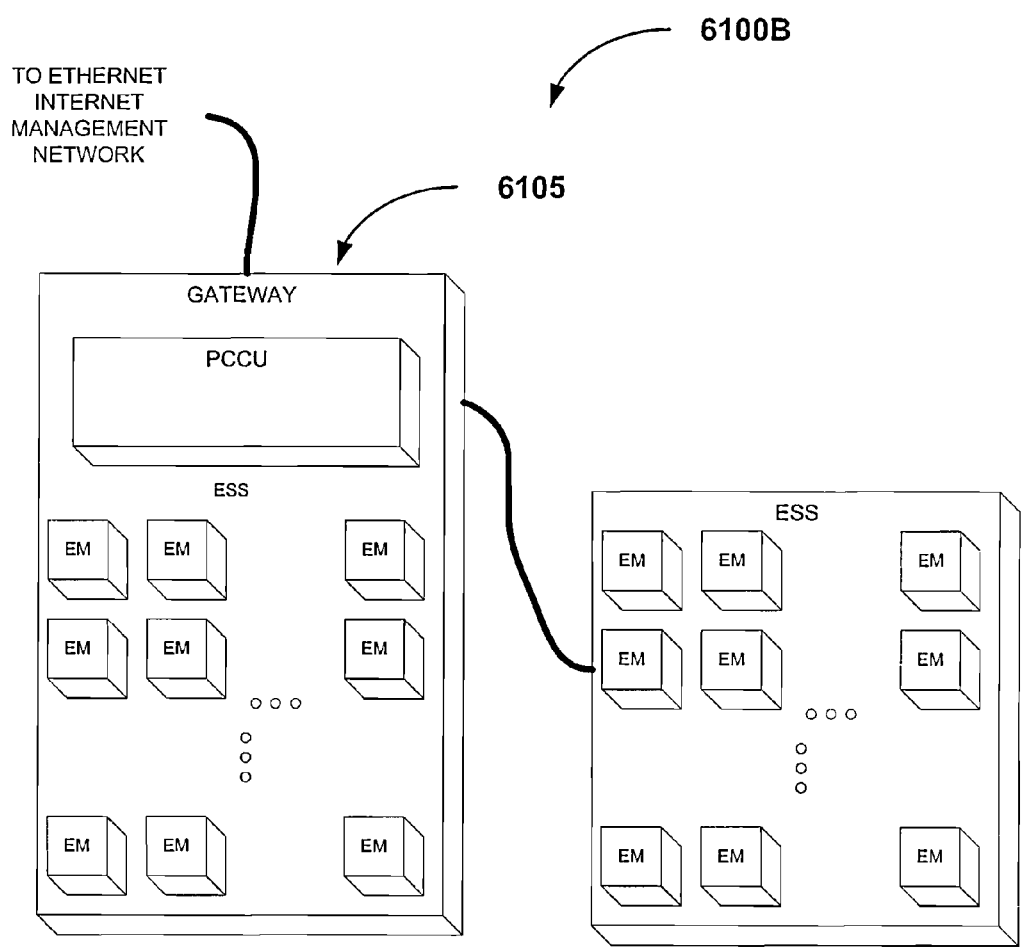
FIG. 61B is an alternative depiction of a physical arrangement of a power supply system.

FIG. 61B is an alternative depiction of a physical arrangement of a power supply system. In this case the gateway, power conversion and control unit, energy subsystem, and energy modules are co-housed in a common enclosure 6105. Electrical interconnections are otherwise equivalent with the arrangement of FIG. 61A. Additionally, an energy subsystem 6103 (separately housed) is shown connected to the power conversion and control unit housed within 6105. Additional external energy subsystems may be connected at the same time. As mentioned earlier, as long as at least one energy subsystem (co-housed or separately housed) having at least one energy module is connected to a power conversion and control unit, said power conversion and control unit may continue to operate provide power and management control to the user.

Just as the instant invention contemplates that various functional units may be packaged separately or coincidentally, so does the invention also contemplate that control may be implemented in a single microcontroller or distributed across multiple intercommunicating microcontrollers. In one example, each gateway may have a microcontroller, each power conversion and control unit may have a microcontroller, each energy subsystem may have a microcontroller, each of the microcontrollers intercommunicating with others to which it is connected for that purpose. In another example, a single microcontroller may control all units including gateway, multiple PCCU's, etc.

Figure 62:
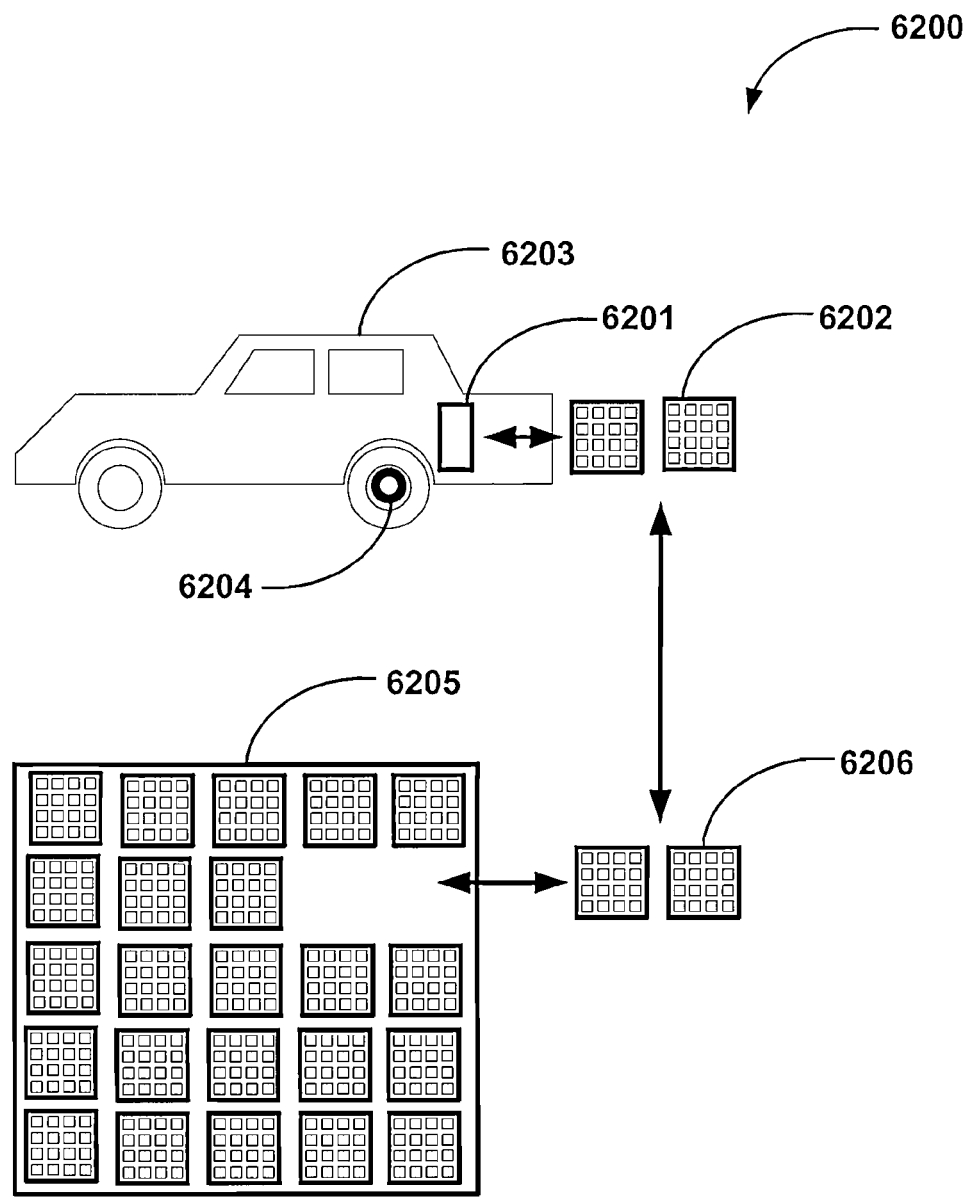
FIG. 62 illustrates a power supply using quick disconnect cartridge type batteries for use in an automobile wherein the vehicles may be refueled.

The battery power supply circuitry and control methodology described herein is equally applicable to modular energy systems for battery electric vehicles of types including but not limited to automobiles, ultra light weight automobiles, scooters, motorized bicycles and tricycles, buses, trucks, military vehicles, boats, etc. For instance, the control methodology described herein may be used in connection with lithium ion batteries in an electric automobile. Referring to FIG. 62, a power supply 6201 using quick disconnect cartridge type batteries 6202 within an automobile 6203 connects any combination of batteries via switches 508 to a battery bus 450A which in turn connects battery power to the vehicle electric motor system to power motors 6204. The power supply 6201 can also receive power regenerated by braking during vehicle operation from the vehicle motor control system and can connect said received power to the charge bus 489A which in turn routes power via switches 512 to batteries for re-charging. At an appropriately configured service station 6205, the automobile's partially discharged batteries 6202 may be quickly removed and replaced with fully charged batteries 6206 from the service station. The batteries 6202 may be energy modules or hand sized battery packs such as 6104 or they may be energy subsystems including multiple energy modules such as 6103. Removal and replacement at the service station may proceed at the module 6104 or subsystem 6103 level. Repair or replacement of failed modules is still possible at the module 6104 level.

Removed battery modules or subsystems may be recharged outside of the vehicle by a service station power supply using the control mechanisms described in conjunction with the charge bus 489A from FIGS. 4 and 5 and switches 512. The invention as taught and described herein enables various evaluations of individual batteries including the estimation of the energy remaining in the batteries at any time including the time at which they are being removed from a vehicle. This evaluation is facilitated using the battery monitor bus 495A and the battery info bus 495B along with the calculations performed by microcontroller 495. The condition of individual batteries is also estimated including remaining cycle life (how many more time a battery may be charged and discharged before end of life), present capacity (how much energy the battery can hold in its current state of health), internal resistance or impedance, and maximum current or power capability. Batteries may be likewise evaluated at the time they are being installed into a vehicle. Either the vehicle born system or the service station system or both may perform these evaluations. In this way the battery power supply vehicle system can calculate a "refueling" fee to be paid by the motorist which corresponds appropriately to the net gain in energy (i.e. energy of the replacement batteries less energy of removed batteries) as well as any fee components, surcharges, or credits corresponding to the differential life or other conditions of the replacement versus the removed batteries. As mentioned above, batteries removed from vehicles are re-charged external to the vehicle at the service station after the motorist continues on his way with his charge laden replacement batteries. In this way the motorist can effectively "refuel" his or her vehicle and proceed on his or her way quickly, in a time frame comparable to the gasoline refueling process, for a fair fee based on the actual energy gained in refueling, without worrying about the significant recharge time for lithium ion or other battery types that would otherwise require inconvenient delays if the batteries needed to be recharged in place aboard the vehicle.

Since many batteries are processed (evaluated, recharged, and maintained) external to vehicles at appropriate service stations, the station can be configured to optimize the recharging and other handling procedures associated with its array of batteries. For example, batteries can be charged at a moderate rate that is optimized for maximizing battery life, or at a rate or time of day that is optimal for minimizing recharge energy cost, or other cost factors. For example, electrical demand costs can be controlled by controlling in turn which batteries are connected to the charge bus at any given time. In other words, batteries may be charged at night when the availability of power is high and the demand costs are low. In this way, refueling of an electric vehicle using quick disconnect batteries or groups of batteries is most cost effective. Additionally, use of the electric utility grid to charge batteries at a service station for insertion into a vehicle to refuel it effectively enables energy to be supplied to a vehicle through batteries charged with power made from coal, natural gas, atomic energy, wind or solar panels. This optimization is not as feasible if the batteries remain in the vehicle to be recharged while the motorist waits. Under such conditions the motorist's convenience becomes the limiting factor.

It is also an aspect of the present invention that the batteries may be recharged while remaining in the vehicle such that, when recharge time is not a limiting factor such as when the vehicle is not in use, and when a satisfactory electrical power source is available such as an electric utility outlet, "refueling" can occur without the need of a battery exchange at a battery service station. The invention disclosed herein allows the charge bus and related control and switching mechanisms to operate to the effect of the desired recharging while the batteries remain aboard the vehicle.

It is also an aspect of the present invention that auxiliary vehicle batteries may be held by the motorist, either at the vehicle's home or depot site, or carried aboard the vehicle as additional payload, said auxiliary batteries being interchangeable with the operating batteries of the vehicle in relatively efficient fashion so that the vehicle may be "refueled" by the motorist by exchanging spent batteries with charged auxiliary batteries. Spent batteries may then be delivered to a battery service station for credit, recharging, or exchanged for charged batteries, or may be recharged external to or onboard the vehicle by the motorist himself or other party.

FIG. 63 is a view 6300 of a refuelable electric vehicle 6308. An electric motor drive unit 6301 is illustrated with electrical connections 6302 between the electric motor drive unit 6301 and the battery system 6399. Motor drive unit 6301 is secured to support 6309. Aft battery system enclosure 6303 and quick removable/replaceable cartridge-style battery 6304 modules are illustrated in FIG. 63. Generally, as illustrated in FIG. 63, the battery modules 6304 are shown within the trunk 6307 of the electric-powered automobile.

Figure 63A:
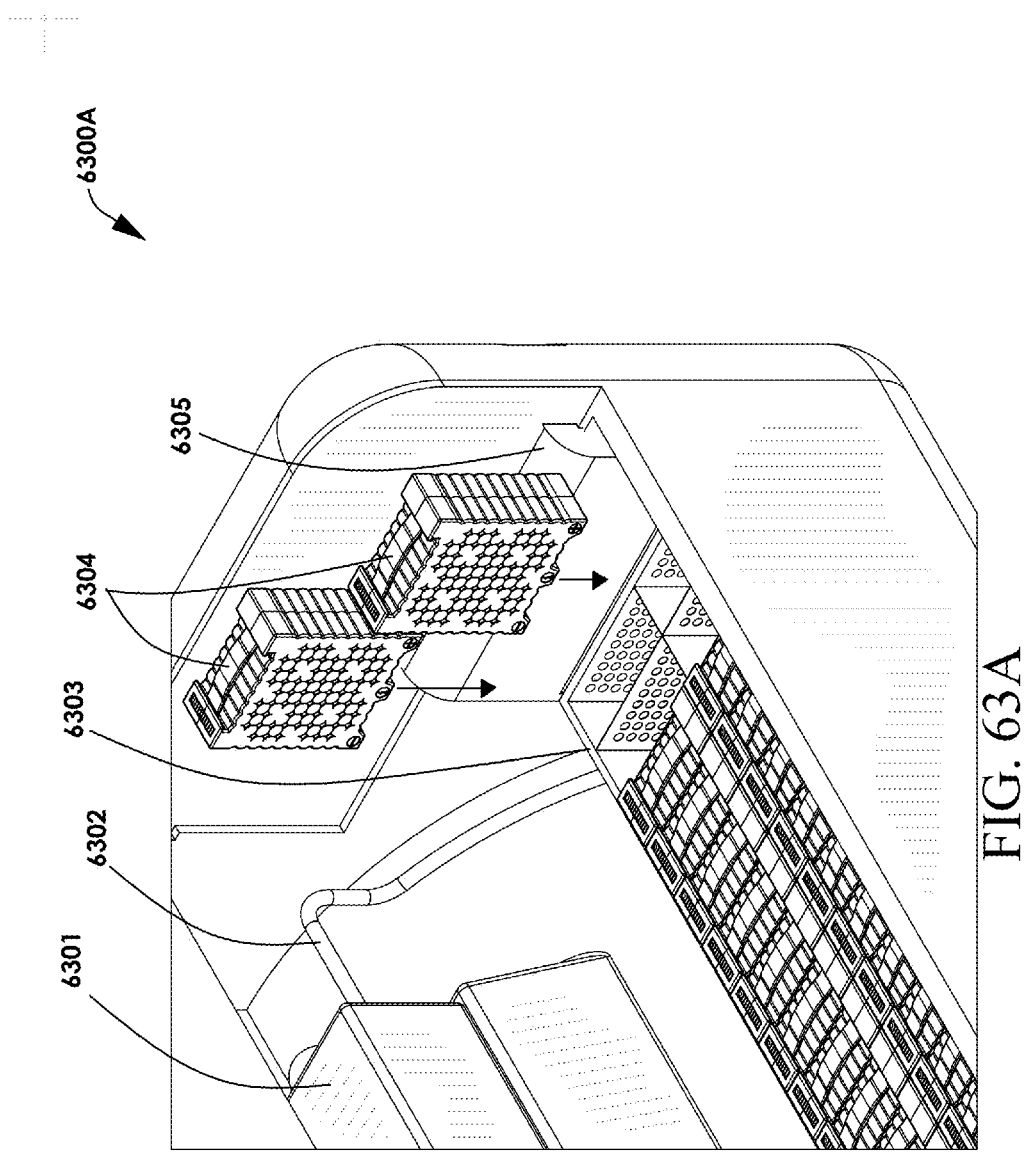
FIG. 63A is an enlarged view of the refuelable electric vehicle of FIG. 63 and, in particular, the aft battery compartment.
Figure 63B:
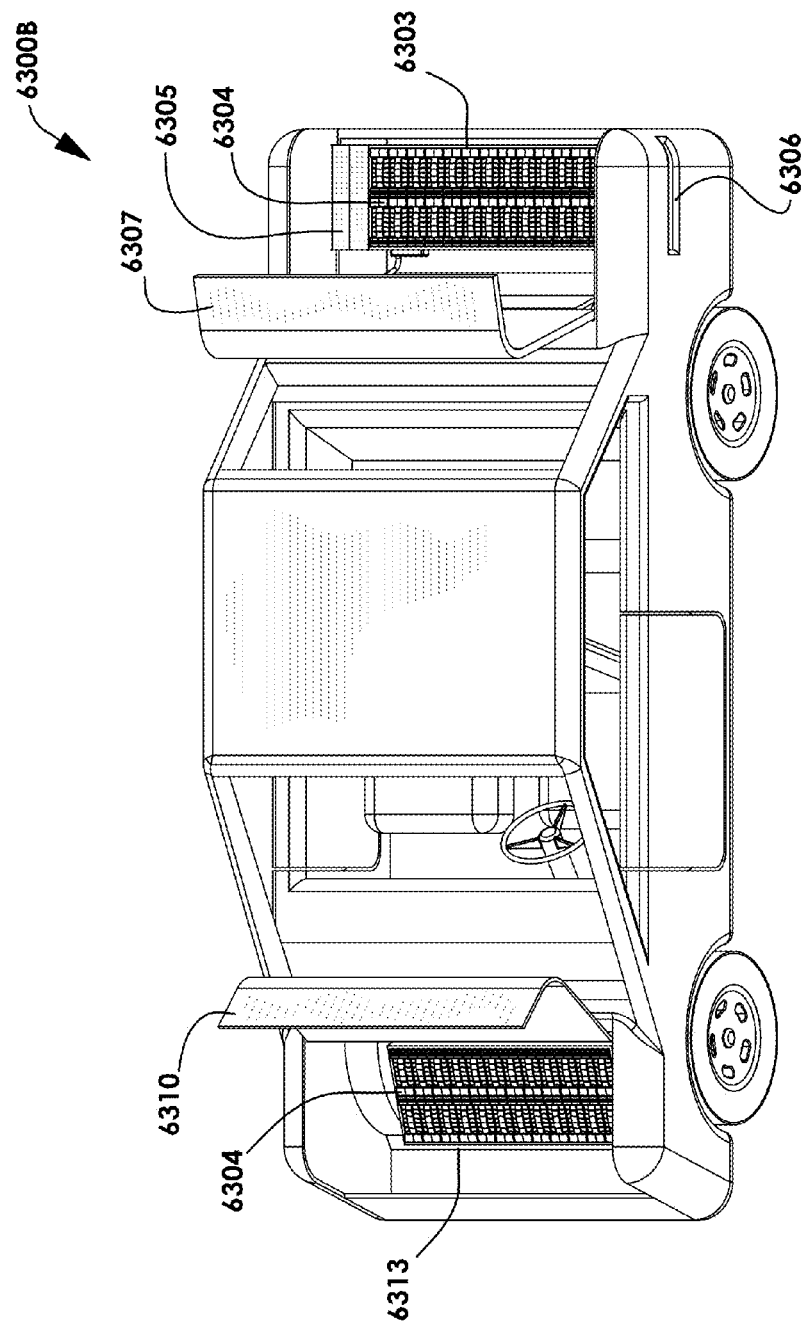
FIG. 63B is a view of a refuelable electric vehicle of FIG. 63 and the fore and aft battery compartments.

FIG. 63A is an enlarged view 6300A of the refuelable electric vehicle illustrated in FIG. 63 and, in particular, the aft battery compartment. FIG. 63B is a view 6300B of the refuelable electric vehicle of FIG. 63 and the fore and aft battery compartments. The fore battery compartment includes a hood 6310, battery modules 6304 and a battery enclosure 6313.

Figure 63C:
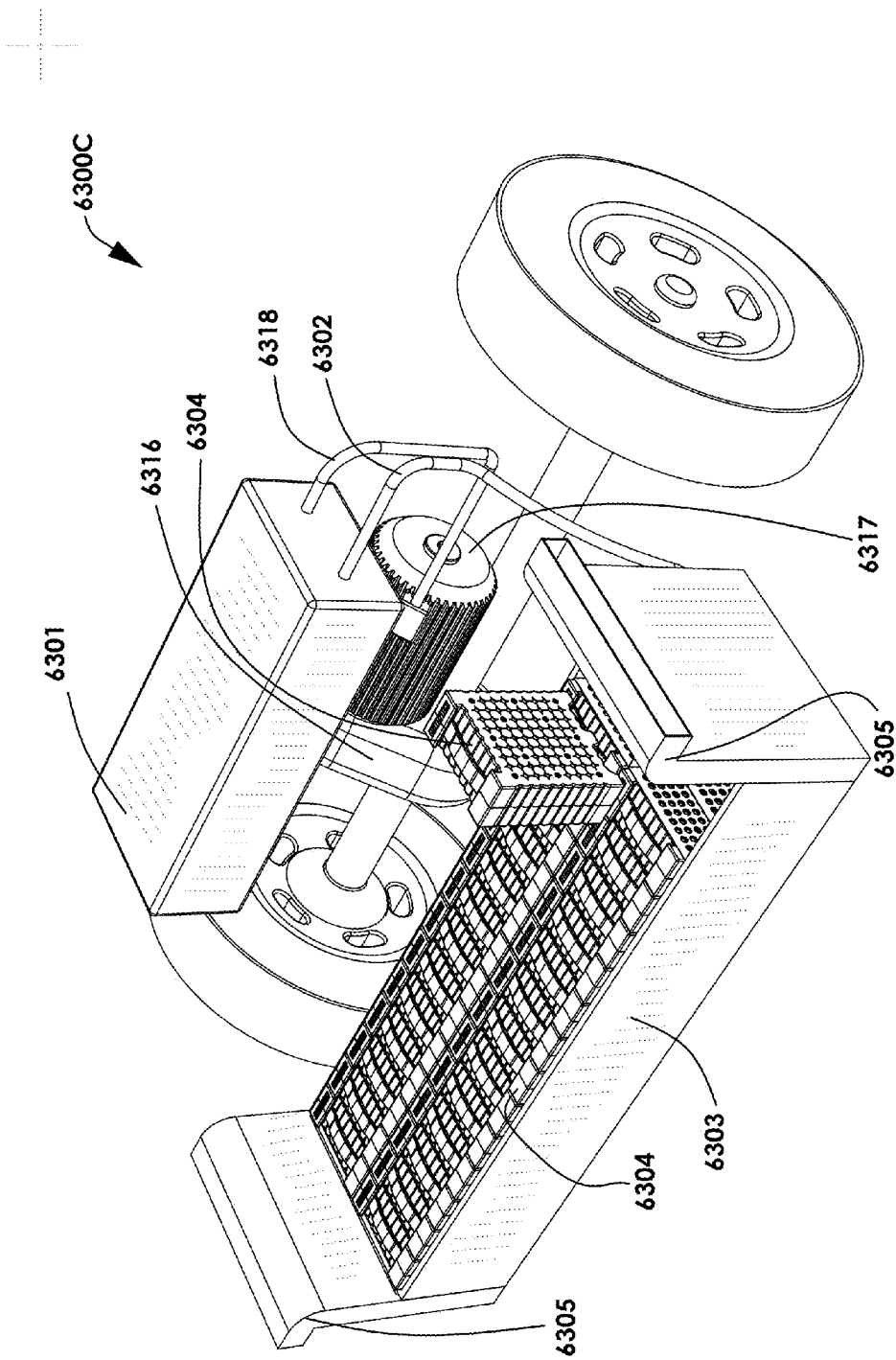
FIG. 63C is a view of the rear wheel drive of the refuelable electric vehicle of FIG. 63 and, in particular, the propulsion system with the frame and other components removed therefrom.

FIG. 63C is a view 6300C of the rear wheel drive of the refuelable electric vehicle of FIG. 63 and, in particular, the propulsion system with the frame and other components removed therefrom. Still referring to FIG. 63C reference numeral 6318 is used to represent electrical communication between the drive unit 6301 and the electric motor 6317. Drive housing 6316 communicates energy from the electric motor to the shaft of the wheels. The drive unit, electric motor, and axle (shaft) are illustrated schematically and those skilled in the art will readily recognize that other electric drive arrangements may be used.

Cooling air duct 6305 of the battery system is illustrated in FIG. 63. A port 6306 in the sidewall of the body 6308 of the refuelable electric vehicle 6300 interconnects with duct 6305 to allow air to flow though the cartridge-style battery modules 6304. Also see FIG. 63D for a view of the port 6306 in the body of the vehicle.

Figure 63D:
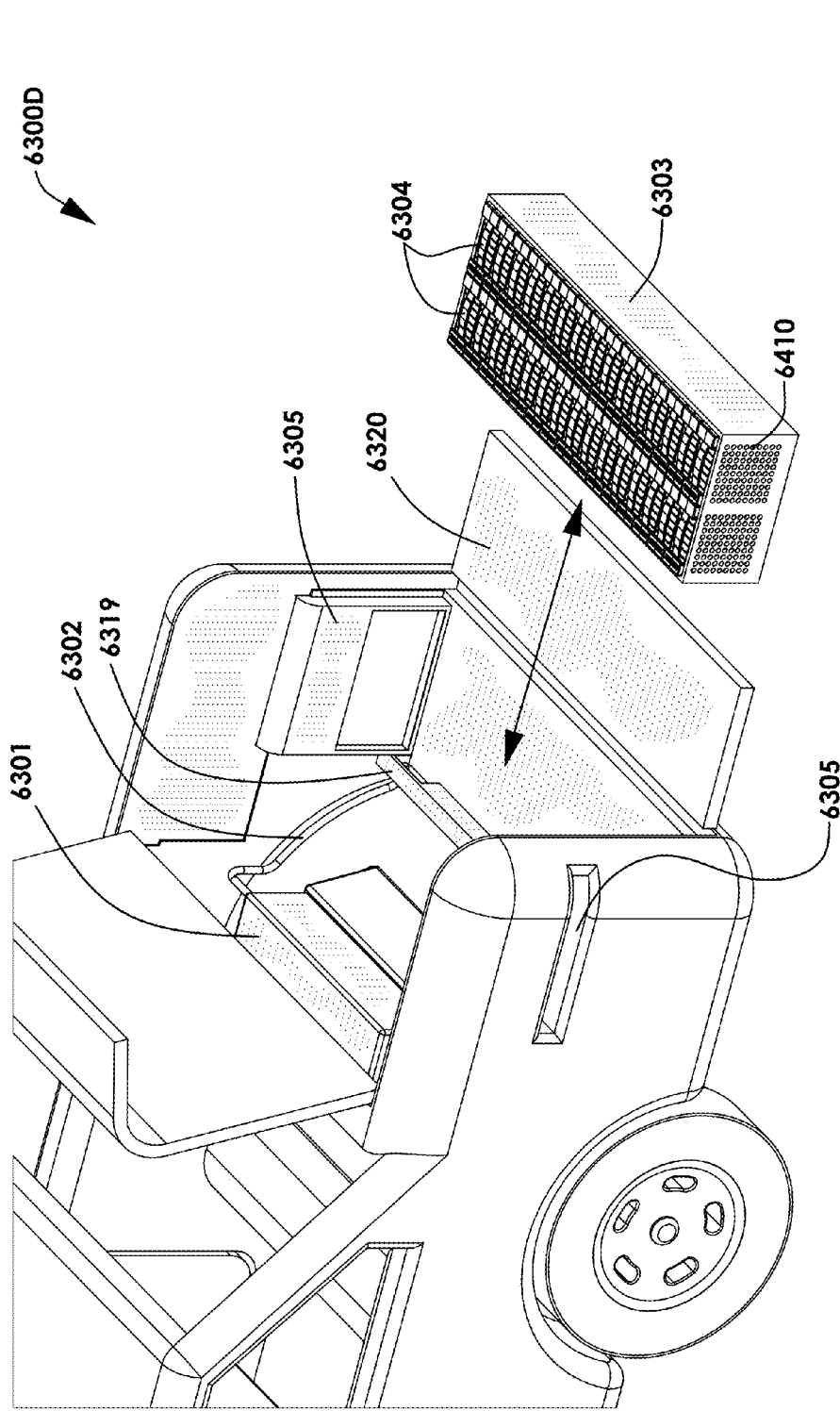
FIG. 63D is a view of the refuelable electric vehicle battery system drawer replacement.

FIG. 63D is an enlarged view 6300D of a portion of the aft battery compartment of the refuelable electric vehicle illustrated in FIG. 63 with the rear gate 6320 opened. Enclosure 6303 may be slid or otherwise placed into the rear or aft compartment of the vehicle and wiring is then connected to the enclosure as illustrated by reference numeral 6319. FIG. 63D provides a good view of the perforations 6410 in the enclosure 6303 which permit cooling air to flow through the enclosure and through the battery modules 6304.

Figure 64:
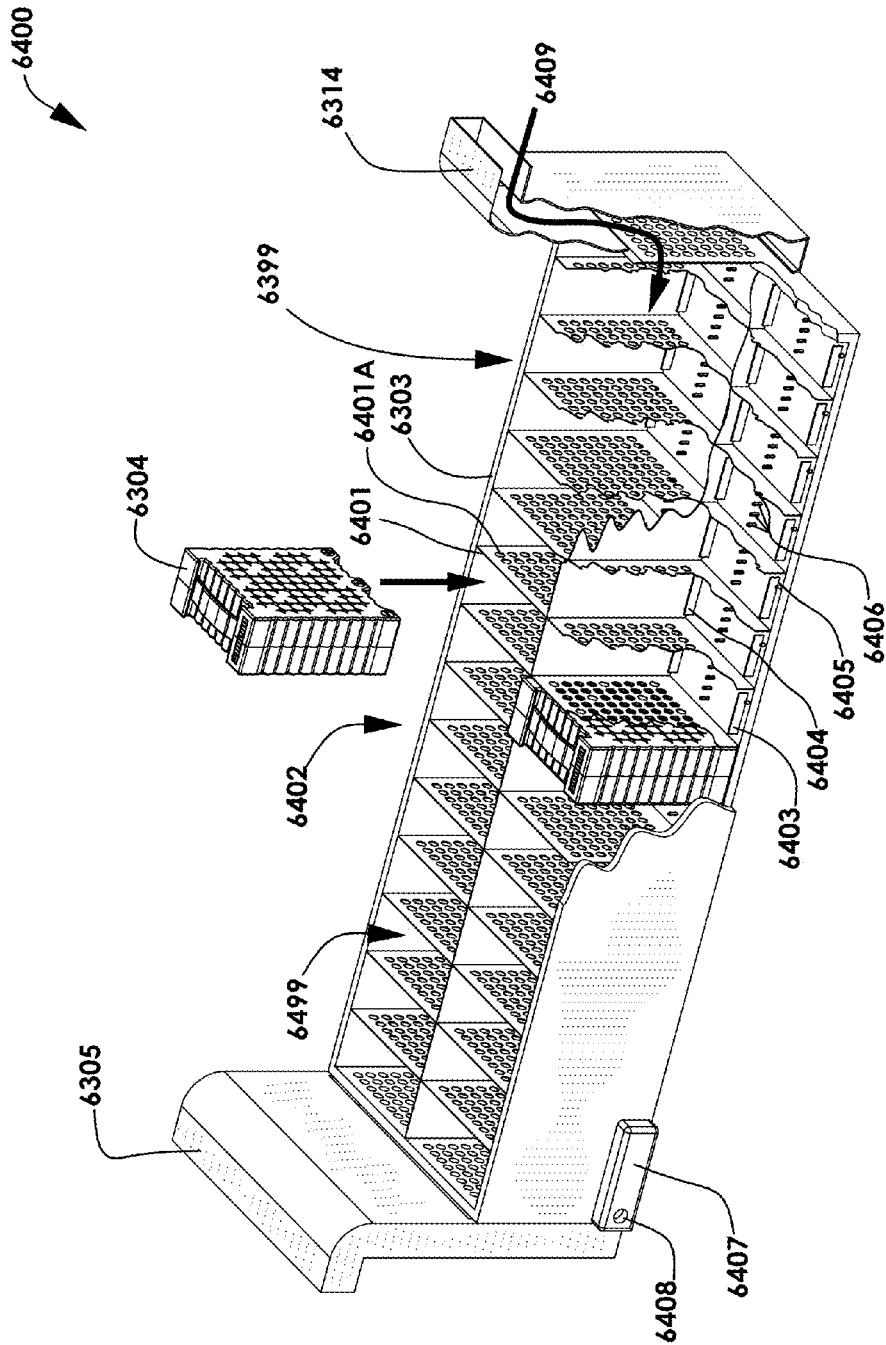
FIG. 64 is a view of the scalable battery system.

FIG. 64 is a view 6400 of the scalable battery system 6399. The battery modules 6304 include perforations 6410A and passageways therethrough in alignment with perforations 6401A compartment panels 6401 allowing cooling air to flow therethrough. Each panel 6401 includes a plurality of perforations 6401A. Each battery module 6304 includes battery cells 6602 which generate heat as they are discharged or charged and the perforations 6401A in the panels 6401 and the perforations and passageways in the battery module allow air to flow therethrough cooling the individual battery cells.

Figure 69:
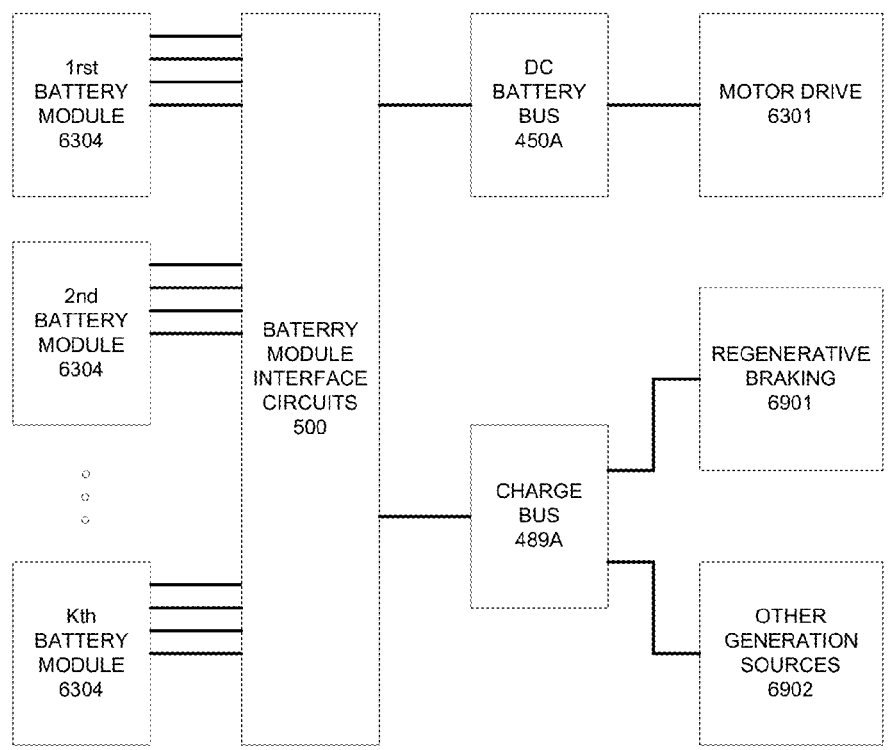
FIG. 69 is an electrical block diagram of the battery modules, the interface circuit, the direct current battery bus, drive unit, charge bus and on-board energy recovery/regenerative system.

Referring to FIGS. 5 and 11-30, it will be recalled as discussed hereinabove that a given battery module or modules 6304 may be operated so as to generate heat in cold weather conditions. Battery performance is affected by the temperature of the surroundings in which it operates and operations of the packs/battery modules increases the temperature in the battery compartment. FIG. 69 is an electrical block diagram 6900 of the battery modules 6304, the battery module interface circuit 500, the direct current battery bus 450A, motor drive unit 6301, charge bus 489A, on-board energy recovery/regenerative system 6901, and other generation sources such as internal combustion engine driven generator, grid power connection, solar panel generation, etc. sources 6902. Interface circuit 500 performs all of the functions described above in connection with FIG. 5 and controls discharge and charging of the battery modules 6304. The direct current bus in this example is interconnected with electric motor drive unit 6301 and the charge bus 489A is interconnected with the energy recovery/regenerative and generating systems 6901 and 6902 of the vehicle or associated charging equipment.

Still referring to FIG. 64, arrow 6402 indicates a battery module 6304 in place within the battery system 6399. Reference numeral 6499 is used to identify a battery compartment into which a battery module 6304 is placed. The battery system 6399 is structurally similar to the scalable intelligent battery systems illustrated in FIGS. 1, 1M, 1N and 2 illustrated above. In like fashion, the control structure and method described above in connection with FIGS. 4-8 and 62 as well as other structures is equally applicable to FIGS. 63-67C. Enclosure 6303 includes a battery system negative electrical contact 6403 and a battery system positive electrical contact 6404. As viewed in FIG. 64, the electrical contacts 6403, 6404 are metal knife blades which engage clips 6607, 6609. Clips 6607, 6609 are positioned in proximity to apertures 6510 and 6512 in the battery module. The electrical contacts or blades 6403, 6404 extend through the enclosure 5303 and communicate with interface circuits as illustrated in FIGS. 5 and 11-30.

Still referring to FIG. 64, enclosure 6303 includes a lockout override stud 6405 which deactivates the battery module 6403 lockout function as explained in more detail below. Information and control electrical contacts 6406 reside at the base of the enclosure 6303. Battery system electrical I/O modules 6407, 6408 communicate information to and from a plurality of interface circuits as represented by FIG. 5 which are located on the bottom side of the within enclosure 6303. Alternatively, the functions implemented by the interface circuits as represented by of FIG. 5, for example, may be located on the printed circuit boars for boards within the battery modules as disclosed hereinbelow. Battery system electrical I/O modules 6407, 6408 also communicate information to and from an electric filling station which can allow the electric filling station to interrogate the status of the battery modules 6304 directly and/or to read the status of the battery modules as stored in the MCU 495.

Referring to FIG. 5, electrical contacts 6403, 6404, and 6406 communicate through the enclosure 6303 to the circuit of FIG. 5. FIG. 5 is similar to FIGS. 11-30. Each battery module 6403 is in selective electrical communication with a DC Battery Bus 450A, Charge Bus 489A, Battery Monitor Bus 495A, and Battery Information Bus 495B which carry electrical signals and current to the connectors 6407, 6408 for communication with the electric wheel drives and the controller 495. Similarly the power enable 495C, charge enable 495D, monitor enable 495E and the info disable lines 495F are in electrical communication with the controller 495. Each battery module 6403 is represented in FIG. 5 by the First Battery through the Kth Battery. FIG. 5, therefore, is equally usable with individual battery packs and/or with battery modules 6403 in an electric vehicle. Simply put, the battery modules store more energy at higher voltages than the individual battery packs. Referring to FIG. 64, there are four electrical contacts 6406 which may relate various characteristics of the battery module's performance such as temperature, an internal voltage, volumetric cooling air flow and the like. Those skilled in the art will recognize that a larger or smaller number of electrical contacts may be used.

The circuit of FIG. 5 in combination with the microprocessor 495 enables a vehicle operator to determine the state of charge and energy content of the individual battery modules 6403 for replacement (i.e. refueling). Additionally, the microprocessor 495 can be interrogated through connectors 6407, 6408 as illustrated in FIG. 64. The microprocessor 495 may reside in the motor drive unit 6301 or other desired location which communicates via wiring 6302 with the connectors 6407, 6408.

Referring again to FIG. 64, cooling air flow into and through battery the system is represented by flow arrow 6409. Reference numeral 6410A illustrates one of the plurality of cooling ports 6410 of each battery module 6304. Each of the cooling ports 6410 align with perforations 6401A of the compartment panels to enable cooling air to flow therethrough. Referring to FIGS. 63C and 63D, reference numeral 6305 indicates ducts on both sides of the rear of the vehicle (in the area generally known as the trunk) which allow air to flow across the entire rear portion of the vehicle.

Forced air flow may be implemented by the use of fans placed at suitable locations within ducting 6305 or elsewhere.

FIG. 64A is a view 6400A of a battery module 6304 mating with the battery system enclosure 6303 and in particular the negative electrical contact 6403, lockout override stud 6405, and the lockout keyhole and switch 6511. FIG. 64B is a view 6400B of a battery module 6304 mated within the battery system enclosure 6303 with a portion of a compartment panel 6401 cutaway. In other words the battery module 6304 is fully inserted into and between the compartment panels 6401. FIG. 64B illustrates the alignment of the perforations 6401A of the compartment panels 6401 and the cooling air ports 6506 of the battery module. Cooling air ports 6506 communicate with passageway through the battery modules.

Figure 65:
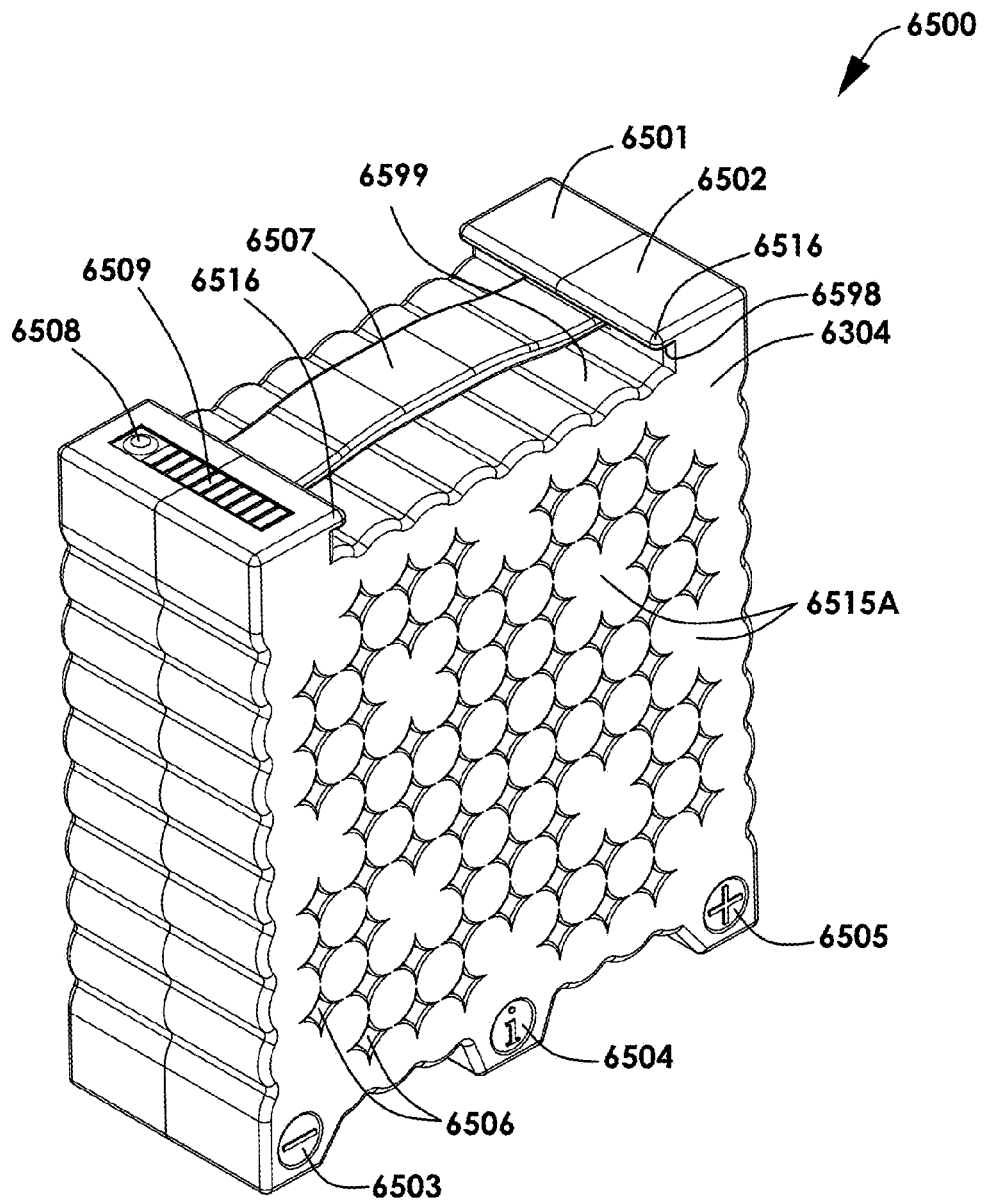
FIG. 65 is a view of a quick removable and replaceable battery module.

FIG. 65 is a view 6500 of a quick removable and replaceable battery module 6304. Indicia 6505 indicates the location of the positive contact of the battery module 6304 and indicia 6503 indicates the location of the negative contact of the battery module 6304. Indicia 6504 indicates information contacts of the battery module 6304. Battery module 6304 includes a first half 6501 and a second half 6502 molded from plastic or made from some other lightweight material such as Aluminum Enclosure 6303 which houses the battery modules 6304 is also molded or cast plastic or other lightweight material such as Aluminum or carbon composites. Reference numeral 6515A represents areas where the air flow is occluded or blocked because screw threads for receiving screws 6515 are formed in the second half 6502 of the molded plastic. State of charge (SOC) of the module is indicated by an LED or other suitable display type 6509 which is activated by push button or other type actuator 6508. SOC indication on the module itself enables a person to quickly evaluate the status of the module and to remove it for charging at home or in the office or to differentiate among several modules those office that are charged from those that are discharged or in between states. Handle 6507 interconnects posts 6516 which overhang the first and second half of the battery module 6304. Posts 6516 overhang the battery module 6304 and form a recess 6598 between posts 6516 and the top 6599 of the battery module 6304.

Figure 65A:
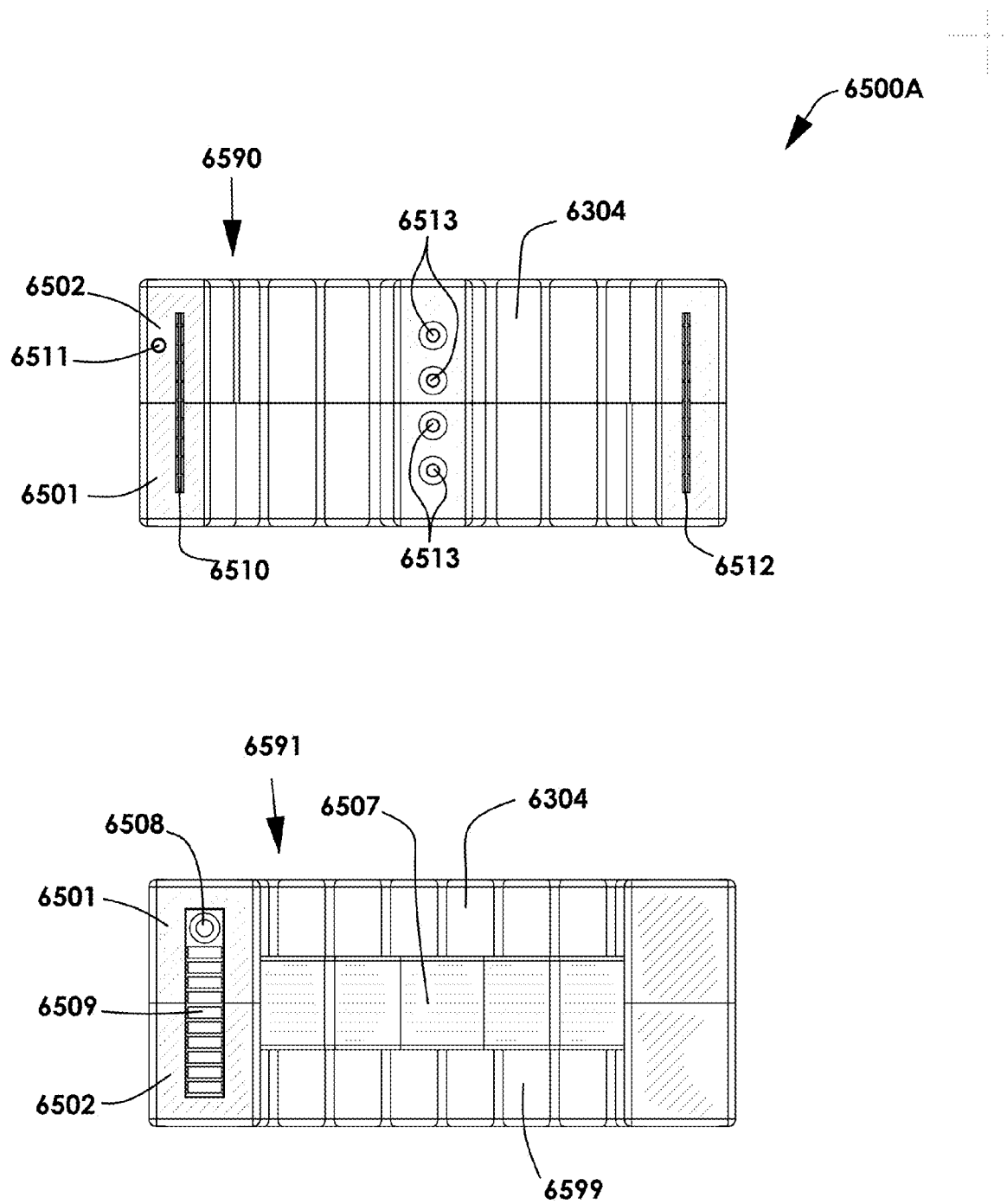
FIG. 65A is a top and bottom view of a quick removable and replaceable battery module.
Figure 65B:
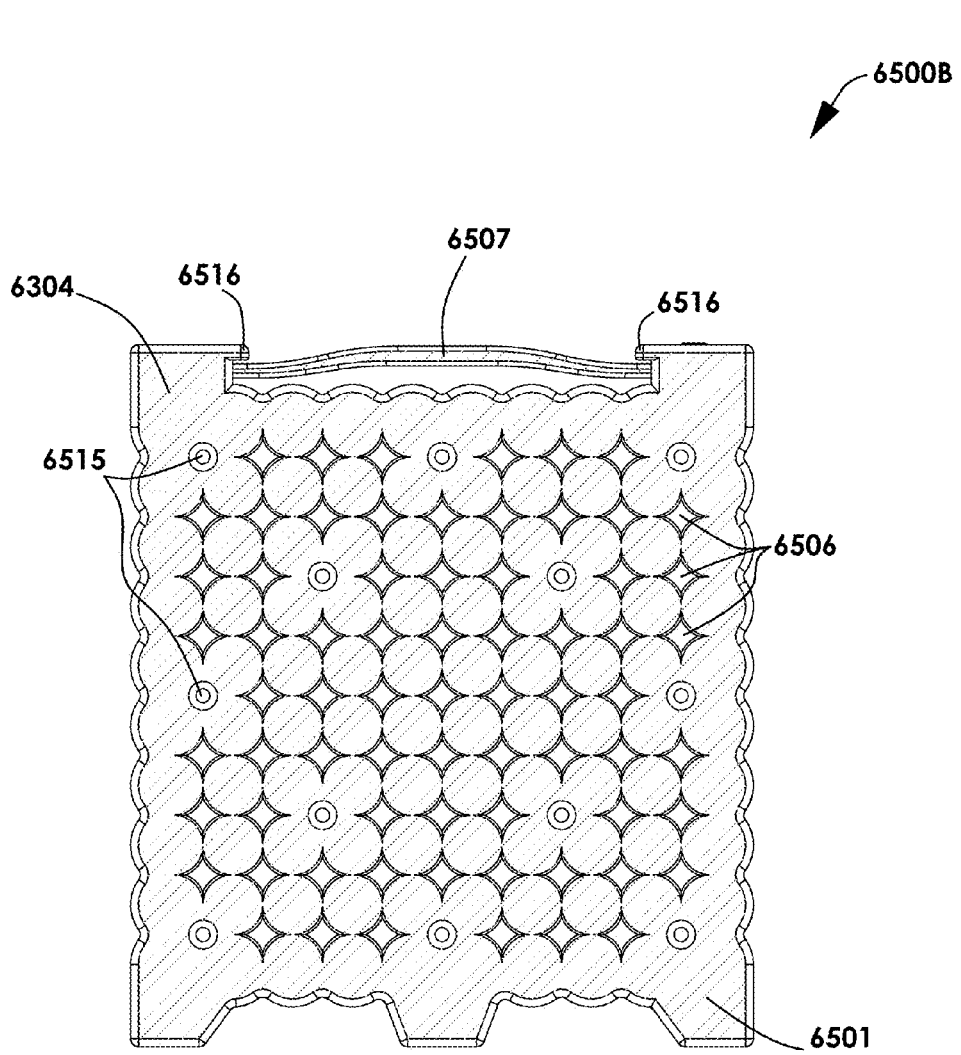
FIG. 65B is a side view of a quick removable and replaceable battery module.

FIG. 65A is a top 6591 and bottom 6591 view 6500A of a quick removable and replaceable battery module 6304. Electrical contacts 6513 are battery module information contacts which convey information about battery temperature, state of charge, state of health, and other performance and use temperature and performance history related information. FIG. 65B is a left side view 6500B (first half 6501 of the molded plastic or other material) of a quick removable and replaceable battery module 6304 illustrating screws 6515 which extend therethrough for securement to threaded receptacles 6515T in the second half 6502 (See FIG. 66).

Figure 66:
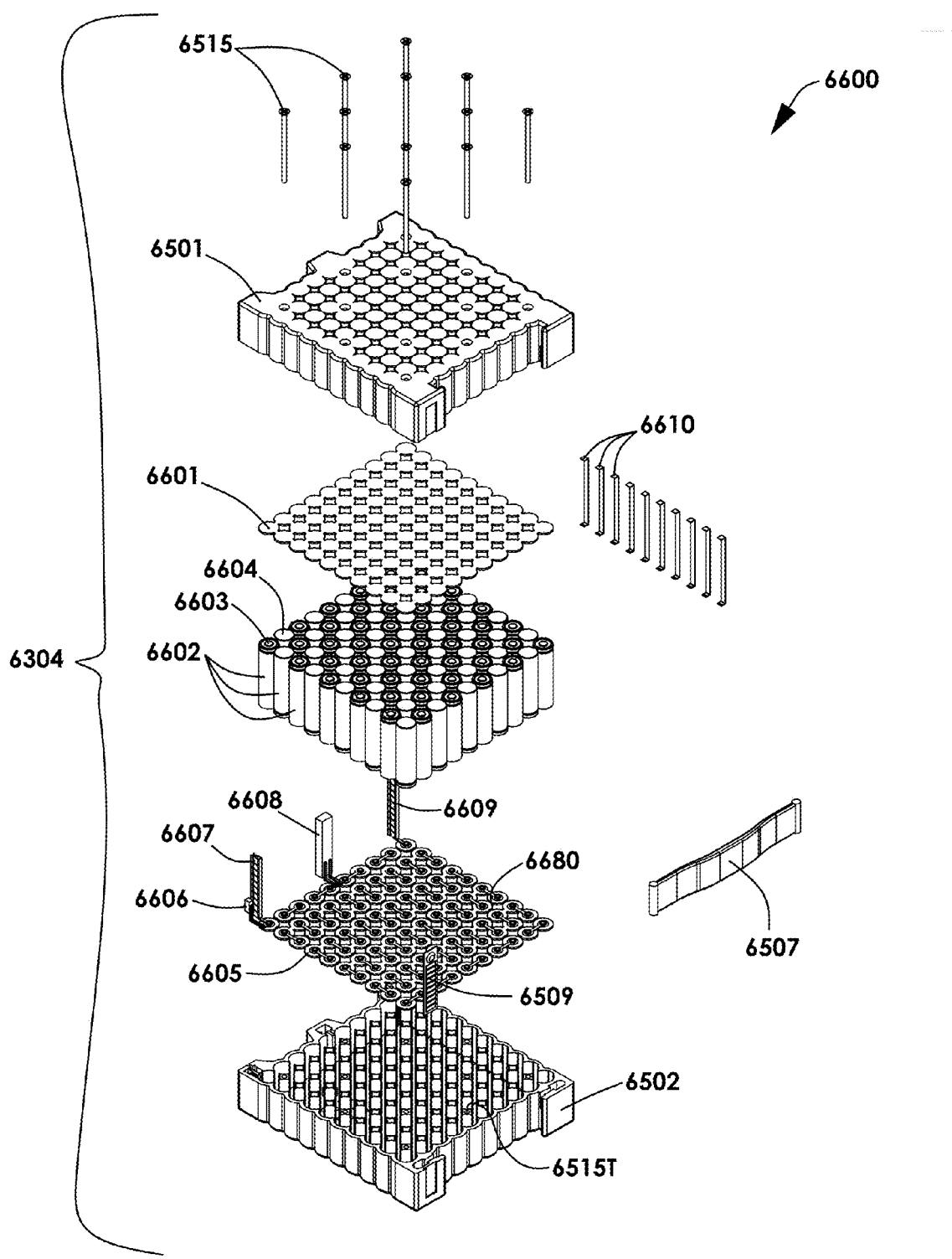
FIG. 66 is an exploded view of a quick removable and replaceable battery module.

FIG. 66 is an exploded view 6600 of a quick removable and replaceable battery module 6304 illustrating first half 6501 and second half 6502 of the battery module 6304. First 6601 and second 6605 printed circuit boards reside adjacent to first and second halves of the battery module 6304 when assembled. Printed circuit boards 6601 and 6605 include communication channels and conductors which reside within the board itself. Flexible straps 6610 having conductors therein interconnect the first and second printed circuit boards 6601, 6605 together thus communicating voltage and other together. information between each other. One hundred battery cells 6602 are arranged in series so as to produce a voltage of approximately 370 volts per battery module. Positive electrical contacts 6603 and negative electrical contacts 6604 are viewed along with clips 6607 and 6609 so as to prevent inadvertent and unwanted shorting across the terminals of the module. Clips 6607 and 6609 function like knife-switches sometimes used in electrical switchgear. Also illustrated in FIG. 66 is the lockout switch 6606 which is deactivated, i.e. open, when the battery module is not fully inserted into the knife-switches 6607 and 6609. The state of charge (SOC) indicator is also viewed in FIG. 66. Battery performance contacts 6613 are mounted in element 6608 which may be molded from or otherwise formed in plastic or other lightweight materials. Reference numerals 6615, 6616 represent clearances for circuit components.

Figure 66A:
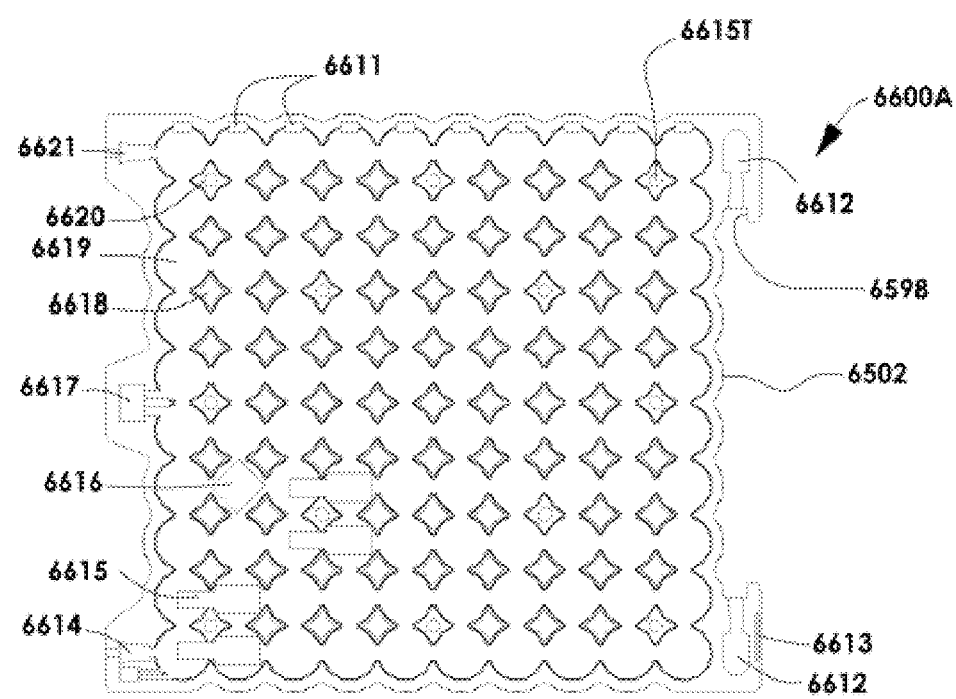
FIG. 66A is a view of one-half of the quick removable and replaceable battery module housing.
Figure 66A:
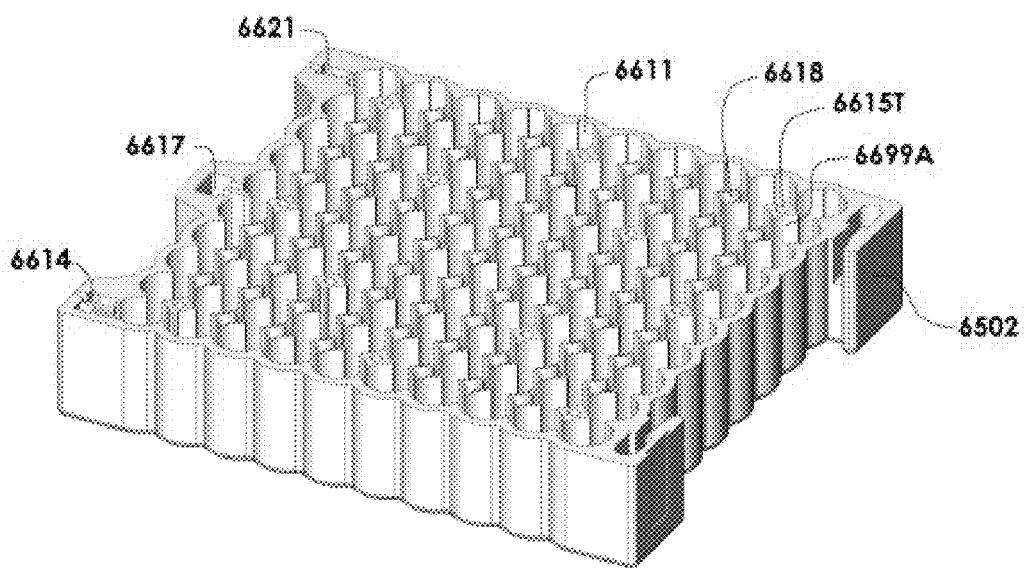

FIG. 66A is a view 6600A of the second half 6502 of the quick removable and replaceable battery module 6304. Slots 6614, 6621 receive the clips 6607, 6609, respectively. Hollow molded studs 6618 protrude form the inner wall 6619 of the second half of the battery module and form cooling air passageways aligned with perforations 6401A and 6410. Additionally, some of the molded studs are not hollow and reference numeral 6620 is used to indicate the solid studs having threads therein for the reception of screw 6515. Hollow studs 6618 provide a channel for air to flow within the battery module. Studs 6618 and 6620 have an exterior shape so as to generally match the curvature of the battery cells 6602.

Still referring to FIG. 66A, slot 6617 receives element 6608 which carries the electrical contacts 6313 which communicate information about the battery module to the MCU 495. Reference numeral 6612 indicates a slot which can be used by automated lift equipment to remove and securely grasp an individual battery module to remove it from or replace it into the electric vehicle or the multi-pack rack or drawer.

It should be noted at this juncture that the vehicle owner might not own the specific battery modules in his/her electric vehicle. Exchanges may be made with electric filling stations which automatically replace entire enclosures full of batteries battery modules or the electric filling stations may replace an occasionally defective battery module or an occasionally defective cell within a battery module. Referring to FIG. 66, 66A, 67, 67A, 67B and 67C, it will be noticed that my design enables easy maintenance of the battery module. Specifically, flexible straps 6610 allow one or the other of the printed circuit boards 6601, 6605 to be simply folded open once the battery module has been opened by removing screws 6615. A particular cell 6602 may then be easily replaced and the battery module restored and charged.

A process for operating an electric vehicle includes the process steps of: leasing a battery enclosure having an unspecified number of battery modules; measuring, periodically, the state of charge (SOC) and the energy content of each of the battery modules; exchanging one or more of the battery modules at an electric filling station or at the lessor's place of business; and, receiving credit for the battery modules and the energy remaining in them at the time they are returned to the lessor or the lessor's agent. Alternatively, and/or additionally, the process includes the steps of: charging a battery module with a regenerative device on-board the electric vehicle; self-charging owner-charging selected battery modules at one's home, office, or factory; sharing energy between battery modules; and/or heating or cooling select battery modules.

Another important process of the present invention for efficiently operating an electric vehicle having a group of disparately charged and aged battery modules relies upon the structures of FIG. 5 wherein more highly charged, younger battery modules are switched to the DC battery bus (load bus) with greater duty cycle while less charged, older battery modules are switched to the charge bus with increased duty cycle such that, over time, the states of the various battery modules converge to equality in charge and electrical age. The process steps rely on the continuous measurement of battery module states via the battery monitor bus and battery info bus depicted in FIG. 5 followed by appropriate actuation of the switches connecting each module to the DC battery bus and charge bus respectively.

Figure 67:
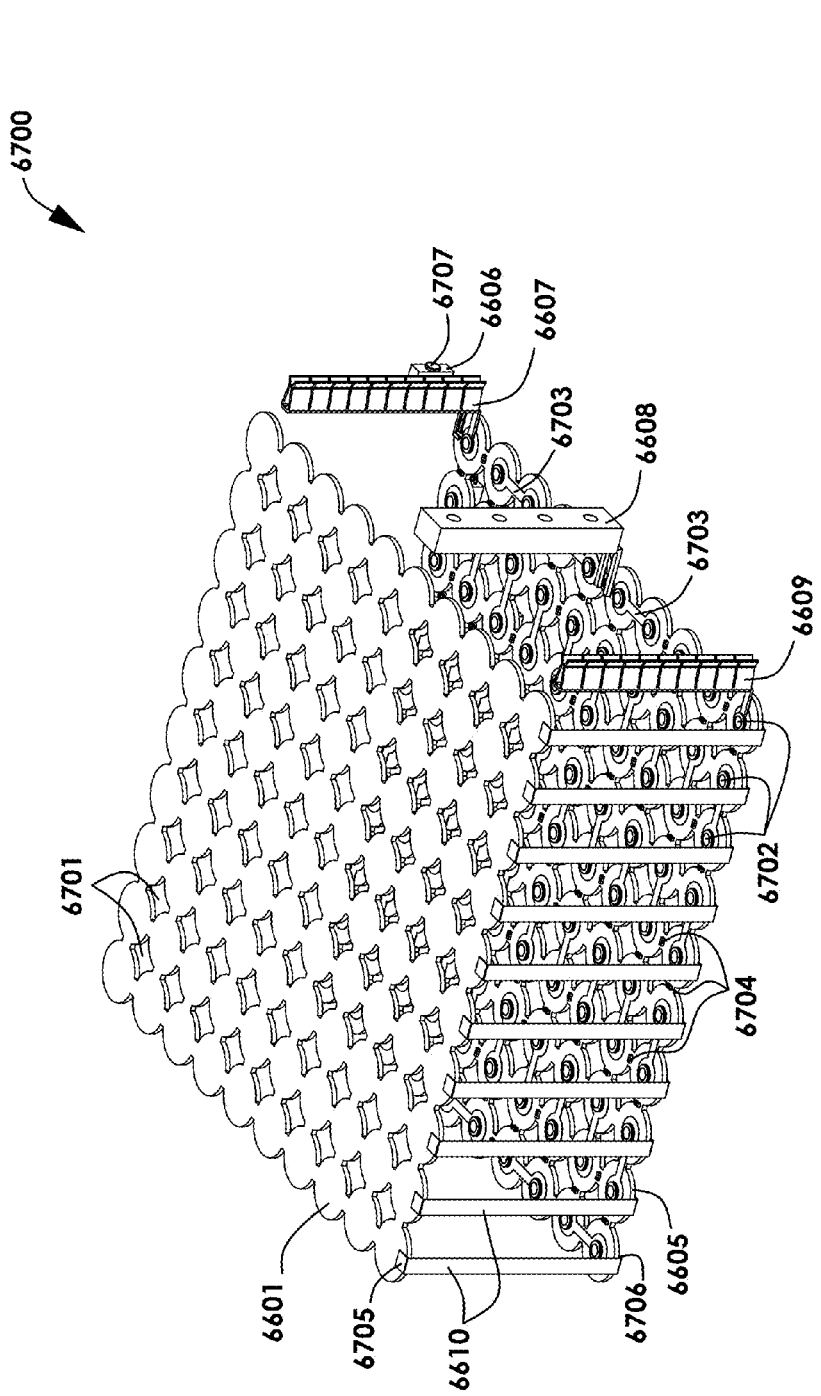
FIG. 67 is a view of the electronics of the quick removable and replaceable battery module.
Figure 67A:
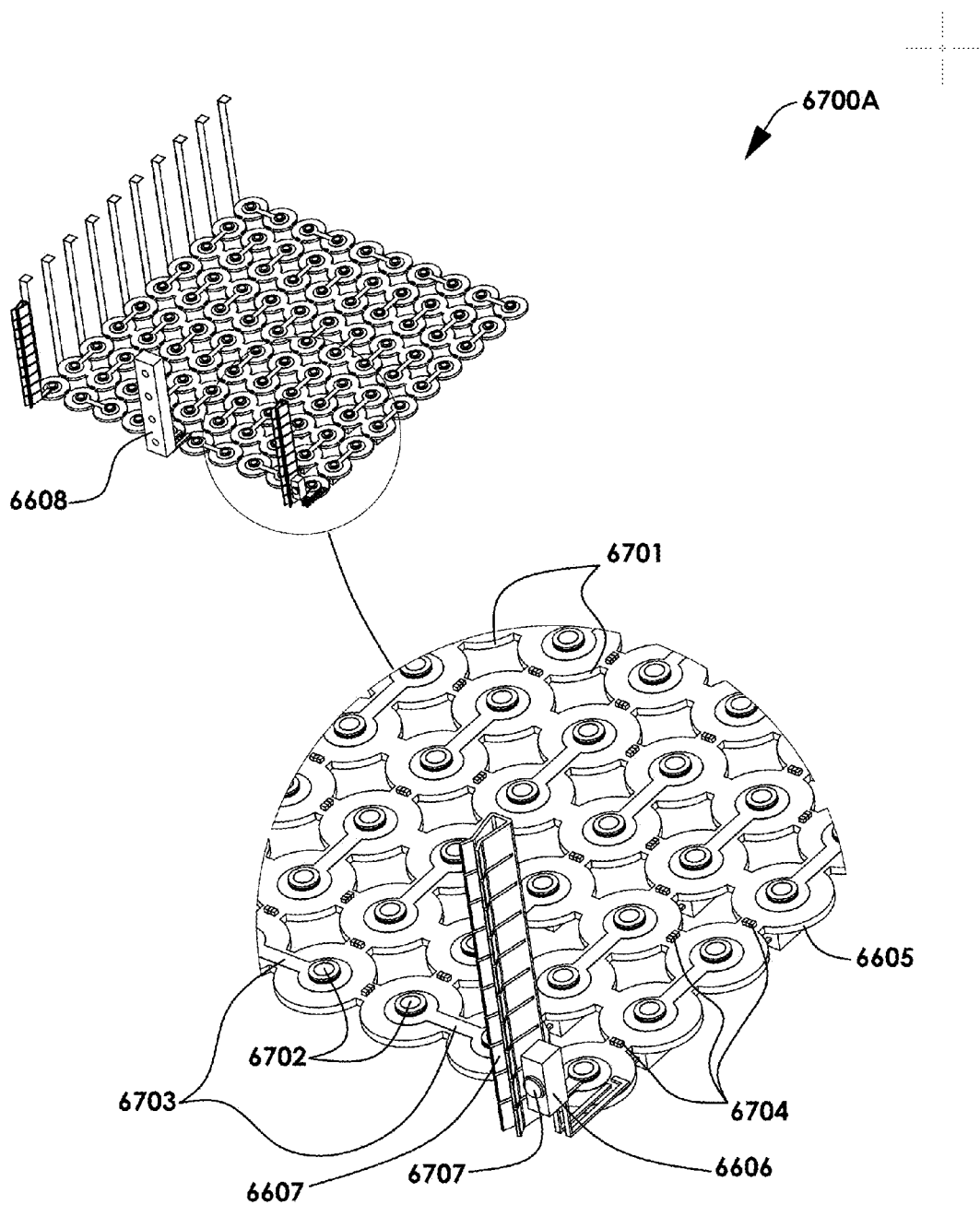
FIG. 67A is a detailed view of the electronics of the quick removable and replaceable battery module.
Figure 67B:
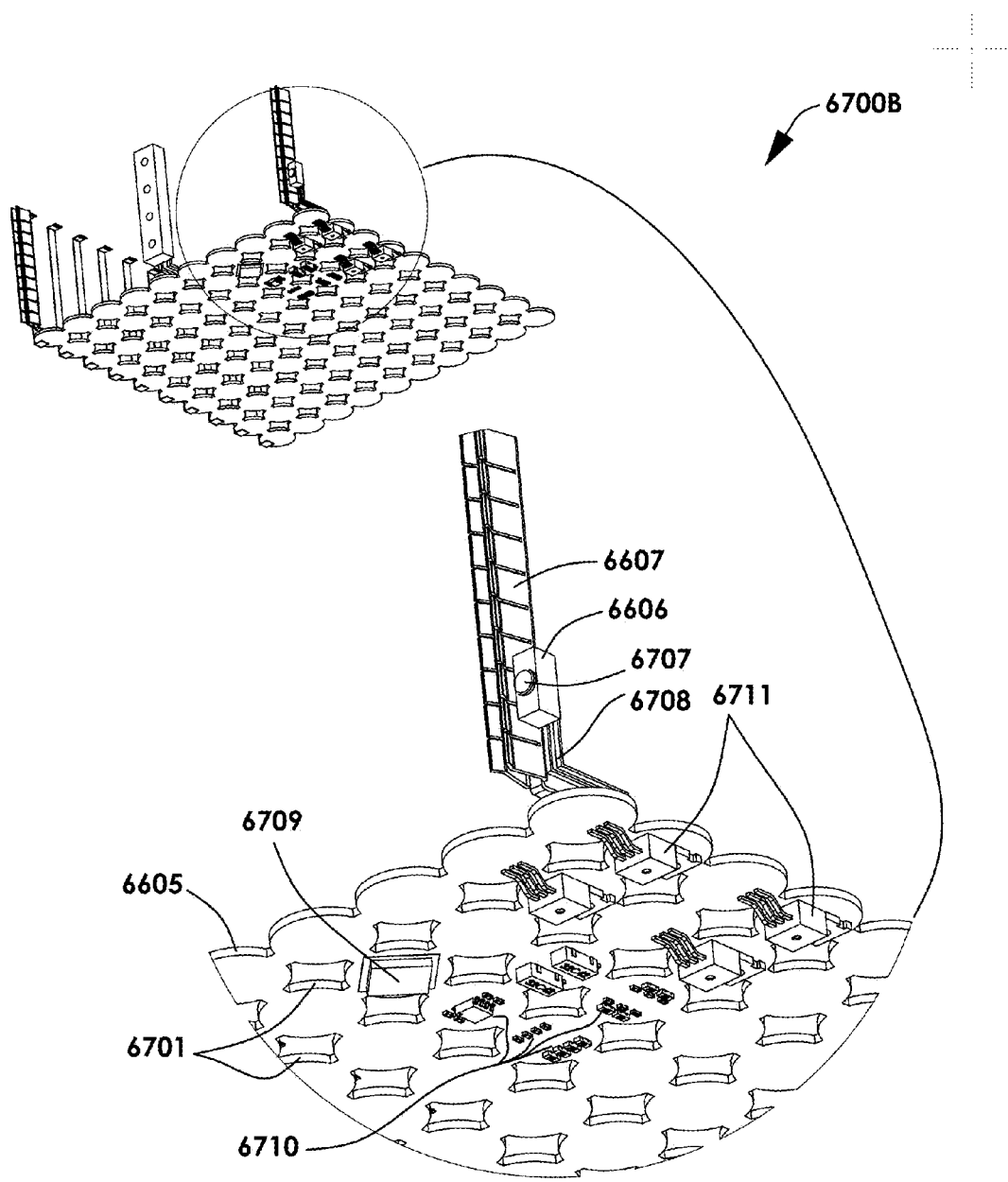
FIG. 67B is another detailed view of the electronics of the quick removable and replaceable battery module.
Figure 67C:
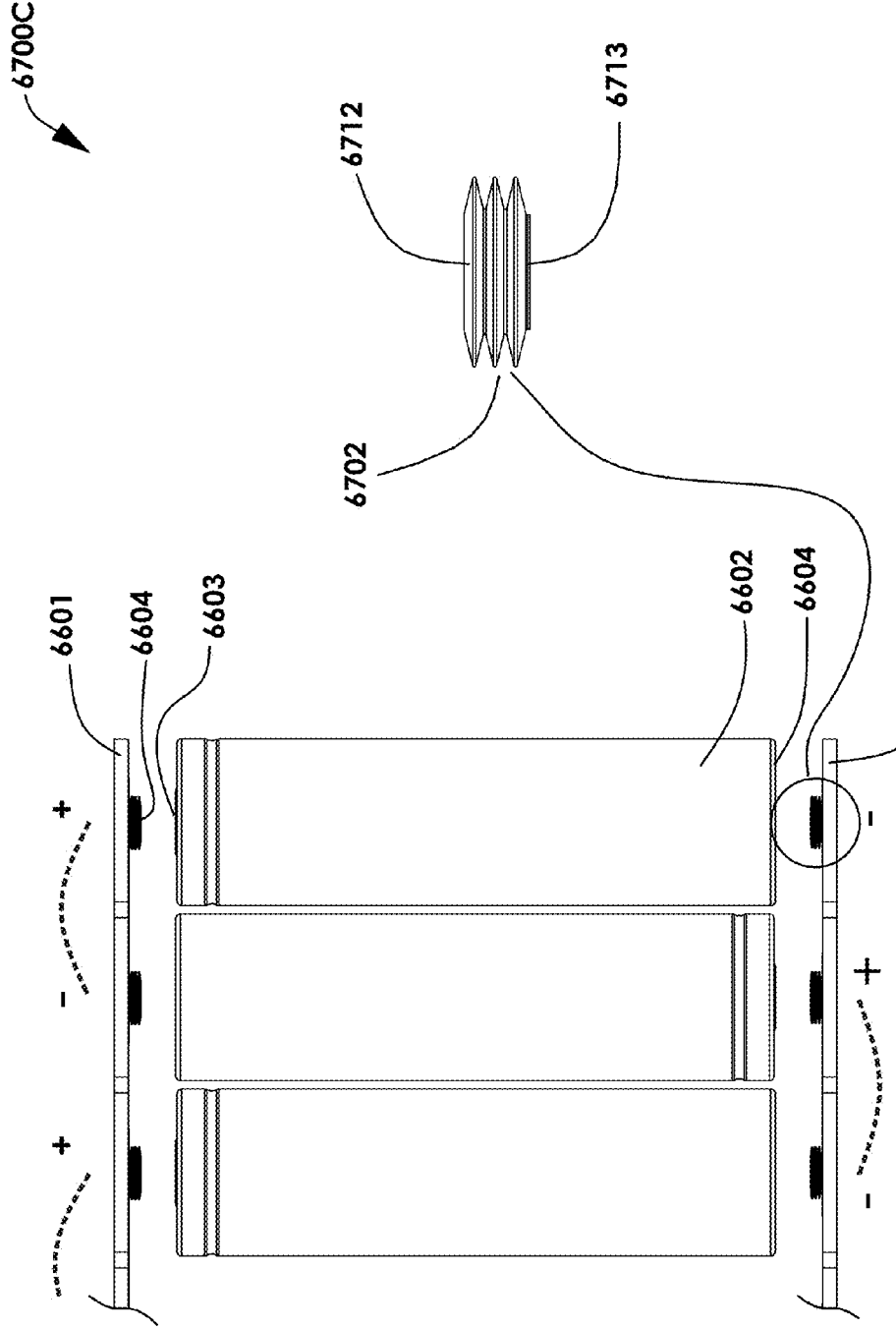
FIG. 67C is a detailed view of the cell connection detail of the quick removable and replaceable battery module.

FIG. 67 is a view 6700 of the electronics of the quick removable and replaceable battery module with the printed circuit boards 6601, 6605 shown in their folded operational state minus the individual battery cells. Flexible straps 6610 allow limited flexing 6705, 6706 for maintenance and manufacture of the battery module 6304. Straps 6610 also carry information between the two printed circuit boards in conductors embedded therein. As best illustrated in FIG. 67C, bellows contacts 6702 engage contacts 6603, 6604 of individual battery cells 6602. FIG. 67C is detailed view 6700C of the cell connection of the quick removable and replaceable battery module.

Bellows 6702 employ high contact pressure yet protect the battery cells from damage due to vibration or dropping the battery module. These bellows contacts are mechanically robust, spring force contacts having a high current carrying capability such as those manufactured by Servometer Precision Manufacturing Group, LLC of Cedar Grove, N.J. These contacts are manufactured from electro-deposited nickel and gold plated to enhance conductivity, designed to provide a long lifetime of reliable interconnection. Use of these contacts provides significant advantages over welded strap interconnection techniques in typical use, the bellows contact approach allowing individual cells to be interchanged with ease when required as well as providing better immunity to the shock and vibration especially characteristic in over-road or off-road vehicle applications. Additionally, the bellows 6702 include contact face 6713 for solder or weld engagement with the respective printed circuit board 6601, 6605 and contact 6712 for spring force contact interengagement with battery cell 6602. Printed circuit traces 6703 obtain the series arrangement of the battery cells 6602 as viewed in FIG. 67. Temperature sensors 6704 are illustrated as residing on the printed circuit board 6605 in FIG. 67 and information therefrom is conveyed to the MCU 495.

It should be noted at this juncture that the printed circuit boards 6601, 6605, utilized herein include multiple embedded layers of conductors which may communicate power and/or information.

Referring to FIG. 67 again, the electrical contact elements 6313 of 6608 may communicate information to the MCU 495. Bellows 6702 are shown populating printed circuit board 6605. FIG. 67A is a detailed view 6700A of the core electronics of the quick removable and replaceable battery module. Alternatively, the interface circuit of FIG. 5 (which controls a pack/battery module) the respective packs/battery modules) can be mounted on one or the other printed circuit boards 6601, 6605 as illustrated in FIG. 67B. FIG. 67B is a detailed view 6700B of the electronics of the quick removable and replaceable battery module 6304. Still alternatively, a portion of the interface circuit may reside on one or the other printed circuit boards 6601, 6605. Alternatively, and as indicated above, the interface circuit of FIG. 5 can be mounted on circuit elements housed within an area of enclosure 6303 such as the bottom of the enclosure 6303.

Still referring to FIG. 67B, field effect transistors are illustrated as mounted on circuit board 6605. Other circuit components 6710 such as, for instance, components of FIG. 5 or the microcontroller 6709, 495 may be mounted on the circuit board as is schematically shown in FIG. 67B. The microcontroller communicates past the battery enclosure 6303 via electrical contacts 6313 and the communication lines are not visible on the underside of the battery enclosure and then out through connectors 6407, 6408. Also illustrated in FIG. 67B are cooling ports 6701.

Referring to FIG. 67A, button 6707 of the lockout switch is illustrated well and it is this button which interengages the lockout deactivation stud 6405 when the battery module fully engages the stud and the knife conductors 6403, 6404. When lockout switch 6707 is deactivated, all 100 battery cells are connected in series and their net voltage applied to and available across battery module electrical contacts 6607 and 6609. When 6707 is not engaged by the lockout deactivation stud, the battery cells become effectively disconnected from the aforementioned electrical contacts rendering the pack safe for handling when disengaged from its intended connections.

Figure 68:
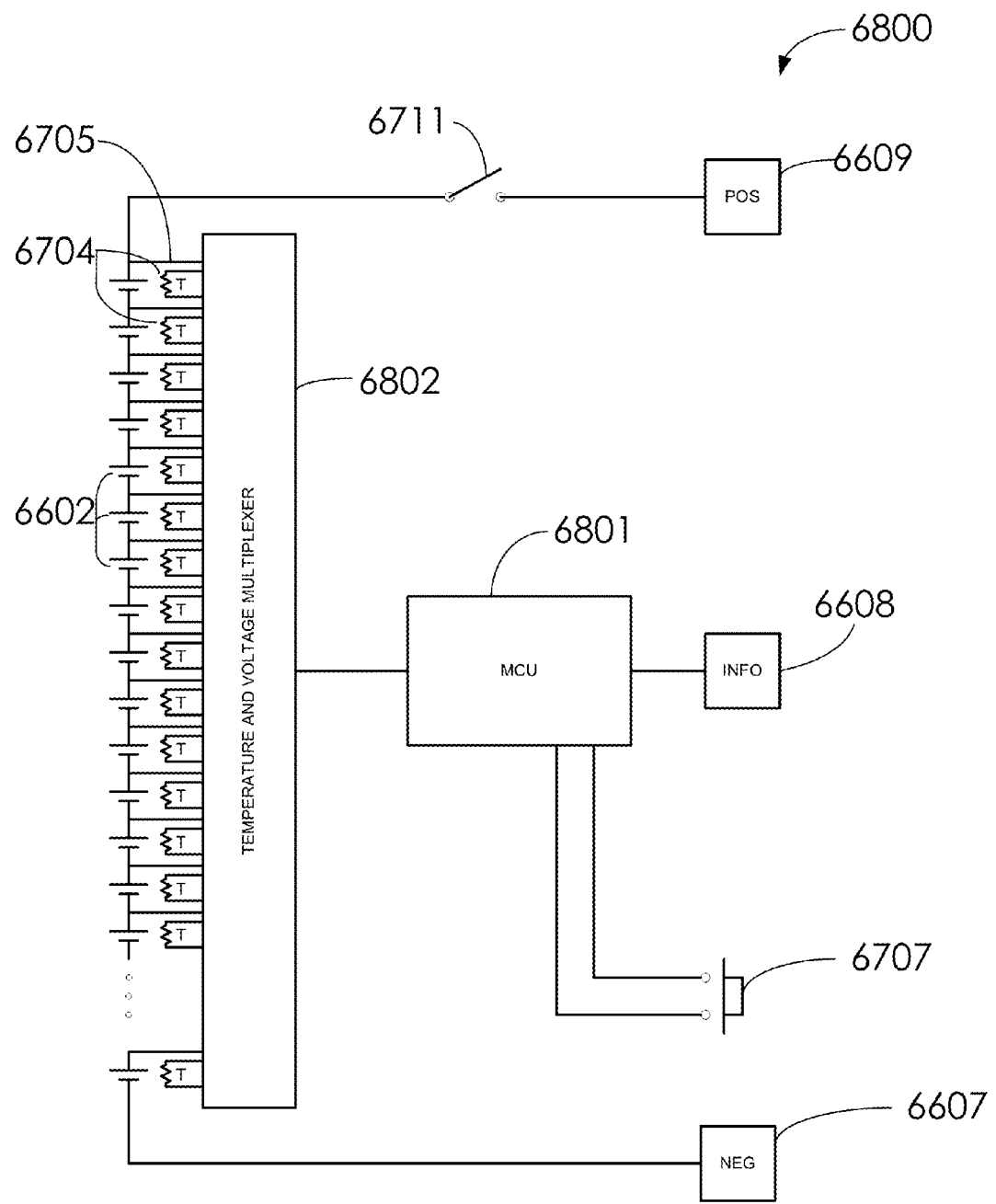
FIG. 68 is an electrical block diagram of the quick removable and replaceable battery module.

The block diagram of FIG. 68 shows possible relationships of the electrical and control components within the intelligent battery module. Microcontroller 6801 is configured via a multiplexer 6802 to measure the voltage and temperature of individual battery cells 6602 within the module. The microcontroller also controls the state of a switch 6711 which selectively connects or disconnects the series configured battery cells to or from external electrical contact 6609. Information connections 6608 enable communications of information and control functions between microcontroller 6801 and external controller such as microcontroller 495 or controller located within the vehicle drive system or within external recharging/refueling subsystems not shown. The state of lockout switch 6608 is also monitored so that the microcontroller or other mechanism may properly open switch 6711 and electrically disconnect the battery power from the external connections when the pack is not suitably engaged in a power system.

My invention allows the number of cells used in a battery module to vary. The example disclosed herein uses 100 cells connected in series. Other numbers of cells may be used in the battery module, for instance, 200 to 1100 or more cells may be used in the battery module in a variety of series-parallel configurations. For example, a 200 cell module could be implemented as a 100 series×2 parallel array or alternatively as 50 series×4 parallel array. Increasing the number of cells in a given module will increase the weight of the battery module, increase the cost of the module, increase the volume of the module, increase the energy capacity of the module, increase the power capability of the module, increase the power required to recharge the module in a constant period of time, decrease the number of modules needed for equivalent driving range, etc. If the module weight increases significantly, machinery may be needed to remove the battery module from the vehicle. Using 100 cells as set forth in the example results in a module sufficiently lightweight that a person can carry one or two of the battery modules into the person's home or office for recharging. The ultimate choice of how many cells are incorporated in which series-parallel configuration within modules will be dictated by the performance goals in each specific vehicle application. A significant advantage of my invention is that the any reasonable choice of cell count and configuration is readily accommodated. It is also worth restating that the particular chemistry or type of cell may be varied freely while still realizing all of the advantages of the invention herein described. Similarly the number of battery modules illustrated is by way of example only and a different number of battery modules may be used in any given application.

Referring to FIGS. 63-67C, assembly of the battery module is as follows: affixing straps 6610 to the first and second printed circuit boards; inserting the second printed circuit board 6605 into the second half 6502 by sliding the openings 6680 over the studs 6618, 6620 until the printed circuit board 6605 engages the sidewall of the second half 6502. Next, the first circuit board back is folded back so as to not occlude or block access to the second half of the battery module. While board 6605 is guided over the studs 6618, 6620, the clips or fingers of the contacts 6607, 6609 are guided into slots 6614, 6621. Next, the step of populating the second half 6502 of the printed circuit board with individual battery cells 6602 is performed followed by placing (rotating) the first printed circuit board 6601 over the assembly. Next, the step of orienting and placing the first half 6501 of the battery module into engagement with the second half 6502 of the module is performed. Finally the step of inserting screws 6515 and threading them into the threaded studs of the second half 6502 of the battery module is accomplished. In this way a rugged, durable and intelligent battery module is created.

The invention described herein has been set forth by way of example only. Those skilled in the art will readily recognize that changes may be made to the invention without departing from the spirit and scope of the invention as defined by the claims which are set forth below.

I claim:

1. A process for operating an electric vehicle comprising the steps of:
    measuring state of charge of each of a plurality of battery modules, each of said plurality of battery modules includes specified limits for charging and discharging duty cycles, respectively, said specified limits of each of said plurality of battery modules include a predefined low state of charge and a predefined high state of charge, and, said predefined low state of charge and said predefined high state of charge are calculated by a microprocessor based on known battery chemistry, cell size, nominal voltage and a set of measured values including operating voltage of each of said plurality of battery modules, operating current of each of said plurality of battery modules, and operating temperature of each of said plurality of battery modules;
    measuring power demand of the electric drive system of said electric vehicle;
    selectively coupling, on a battery module by battery module basis, utilizing a battery interface circuit associated with and dedicated to each said battery module and a microprocessor, one or more highly charged battery modules to said electrical drive system more often than lesser charged battery modules when said drive system is under load requiring power from said battery modules, said battery interface circuit includes switches interconnecting said highly charged battery modules to said electrical drive system and said battery interface circuit includes diodes or equivalent current steering circuit components permitting current flow from said battery modules to said electric drive system but not permitting current flow from said electric drive system to said highly charged battery modules, said microprocessor controlling said switches of said battery interface circuit enabling said selective coupling of said highly charged battery modules to said electric drive system;
    selectively coupling, on a battery module by battery module basis, utilizing said battery interface circuit associated with and dedicated to each said battery module and a microprocessor, one or more of said lesser charged battery modules to said electric drive system more often than said highly charged battery modules when said drive system is sourcing power under conditions of regenerative braking, said battery interface circuit includes switches interconnecting said lesser charged battery modules to said electric drive system when said drive system is sourcing power under conditions of regenerative braking, said battery interface circuit includes diodes or equivalent current steering circuit components permitting current flow from said electric drive system to said lesser charged battery modules but not permitting current flow from said lesser charged battery modules to said electric drive system, said microprocessor controlling said switches of said battery interface circuit enabling said selective coupling of said lesser charged battery modules to said electric drive system during conditions of regenerative braking;
    maintaining said charging and discharging duty-cycles of each of said battery modules within said specified limits of each said battery module; and,
    facilitating, by said selective coupling of said battery modules, convergence of said plurality of said battery modules to an equal state of charge.

2. A process for operating an electric vehicle as claimed in claim 1 wherein said plurality of battery modules is selected from the group consisting of a Lithium battery, a Lithium-ion battery, a Nickel Cadmium battery, a Nickel Metal Hydride, a lead acid battery, a zinc battery, and an alkaline battery.

3. A process for operating an electric vehicle as claimed in claim 1 wherein said plurality of battery modules includes different battery chemistries.

4. A process for operating an electric vehicle as claimed in claim 1 wherein said plurality of battery modules have different nominal output voltages.

5. A process for operating an electric vehicle comprising the steps of:
    measuring state of charge of each of a plurality of battery modules, each of said plurality of battery modules includes specified limits for charging and discharging duty cycles, respectively;

measuring power demand of the electric drive system of said electric vehicle;

selectively coupling, on a battery module by battery module basis, utilizing a battery interface circuit associated with and dedicated to each said battery module and a microprocessor, one or more highly charged battery modules to said electrical drive system more often than lesser charged battery modules when said drive system is under load requiring power from said battery modules, said battery interface circuit includes switches interconnecting said highly charged battery modules to said electrical drive system and said battery interface circuit includes diodes or equivalent current steering circuit components permitting current flow from said battery modules to said electric drive system but not permitting current flow from said electric drive system to said highly charged battery modules, said microprocessor controlling said switches of said battery interface circuit enabling said selective coupling of said highly charged battery modules to said electric drive system;

selectively coupling, on a battery module by battery module basis, utilizing said battery interface circuit associated with and dedicated to each said battery module and a microprocessor, one or more of said lesser charged battery modules to said electric drive system more often than said highly charged battery modules when said drive system is sourcing power under conditions of regenerative braking, said battery interface circuit includes switches interconnecting said lesser charged battery modules to said electric drive system when said drive system is sourcing power under conditions of regenerative braking, said battery interface circuit includes diodes or equivalent current steering circuit components permitting current flow from said electric drive system to said lesser charged battery modules but not permitting current flow from said lesser charged battery modules to said electric drive system, said microprocessor controlling said switches of said battery interface circuit enabling said selective coupling of said lesser charged battery modules to said electric drive system during conditions of regenerative braking;

measuring voltage, current, and temperature of each of said plurality of battery modules;

calculating, with said microprocessor, an absolute charge capacity of each of said plurality of battery modules at any time during a discharge cycle and a charge cycle;

maintaining said charging and discharging duty-cycles of each of said battery modules within said specified limits of each said battery module; and, facilitating, by said selective coupling of said battery modules, convergence of said plurality of said battery modules to an equal state of charge.

6. A process for operating an electric vehicle as claimed in claim 5 further comprising the steps of:

connecting each of said plurality of battery modules to said electrical drive system until each of said battery modules reaches a predefined low state of charge;

disconnecting each of said plurality of battery modules from said electrical drive system once each of said battery modules reaches said predefined low state of charge;

connecting each of said plurality of battery modules that were disconnected from said electrical drive system once each of said plurality of battery modules has reached said predefined low state of charge to a charge bus;

disconnecting each of said plurality of battery modules from said charge bus when each of said battery modules reaches a predefined high state of charge; and reconnecting each of said plurality of battery modules that has reached said predefined high state of charge to said electrical drive system.

7. A process for operating an electric vehicle as claimed in claim 6 wherein said predefined high state of charge and said predefined low state of charge are calculated by a microprocessor based on known battery chemistry, cell size, nominal voltage and a set of measured values including operating voltage of each of said plurality of battery modules, operating current of each of said plurality of battery modules, and operating temperature of each of said plurality of battery modules.

8. A process for operating an electric vehicle as claimed in claim 7 wherein said high state of charge, said low state of charge, and a preferred state of charge are calculated by said microprocessor based upon battery age and battery state of health.

9. A process for operating an electric vehicle as claimed in claim 5 wherein said plurality of battery modules is selected from the group consisting of a Lithium battery, a Lithium-ion battery, a Nickel Cadmium battery, a Nickel Metal Hydride, a lead acid battery, a zinc battery, and an alkaline battery.

10. A process for operating an electric vehicle as claimed in claim 5 wherein said plurality of battery modules includes different battery chemistries.

11. A process for operating an electric vehicle as claimed in claim 5 wherein said plurality of battery modules have different nominal output voltages.

\* \* \* \* \*